United States Patent
Byun et al.

(10) Patent No.: US 11,422,942 B2
(45) Date of Patent: Aug. 23, 2022

(54) MEMORY SYSTEM FOR UTILIZING A MEMORY INCLUDED IN AN EXTERNAL DEVICE

(71) Applicant: SK hynix Inc., Gyeonggi-do (KR)

(72) Inventors: Eu-Joon Byun, Gyeonggi-do (KR); Jong-Hwan Lee, Gyeonggi-do (KR); Byung-Jun Kim, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/838,567

(22) Filed: Apr. 2, 2020

(65) Prior Publication Data
US 2020/0320008 A1    Oct. 8, 2020

Related U.S. Application Data

(63) Continuation-in-part of application No. 16/733,900, filed on Jan. 3, 2020, and a continuation-in-part of
(Continued)

(30) Foreign Application Priority Data

Apr. 2, 2019    (KR) .................... 10-2019-0038414
Apr. 22, 2019   (KR) .................... 10-2019-0046914
(Continued)

(51) Int. Cl.
G06F 12/0873    (2016.01)
G06F 12/1045    (2016.01)
(Continued)

(52) U.S. Cl.
CPC ........ G06F 12/0873 (2013.01); G06F 9/5016 (2013.01); G06F 9/546 (2013.01);
(Continued)

(58) Field of Classification Search
None
See application file for complete search history.

(56) References Cited

U.S. PATENT DOCUMENTS 5,459,850 A    10/1995  Clay et al.
9,164,888 B2 * 10/2015  Borchers ................. G06F 11/00
(Continued)

FOREIGN PATENT DOCUMENTS

KR        10-1366960 B1    2/2014
KR    10-2015-0114958 A    10/2015
(Continued)

OTHER PUBLICATIONS

Jeong, W et al., Improving Flash Storage Performance by Caching Address Mapping Table in Host Memory, Jul. 12-14, 2017, HotStorage '17, Santa Clara, CA.
(Continued)

*Primary Examiner* — Elias Mamo
(74) *Attorney, Agent, or Firm* — IP & T Group LLP

(57) ABSTRACT

A memory system includes a memory device configured to store a piece of data in a location which is distinguished by a physical address and a controller configured to generate a piece of map data associating a logical address, inputted along with a request from an external device, with the physical address and to transfer a response including the piece of map data to the external device.

13 Claims, 64 Drawing Sheets

Related U.S. Application Data application No. 16/733,867, filed on Jan. 3, 2020, and a continuation-in-part of application No. 16/732,958, filed on Jan. 2, 2020, and a continuation-in-part of application No. 16/721,716, filed on Dec. 19, 2019, and a continuation-in-part of application No. 16/707,851, filed on Dec. 9, 2019, and a continuation-in-part of application No. 16/599,870, filed on Oct. 11, 2019.

(30) Foreign Application Priority Data

| | | |
|---|---|---|
| May 29, 2019 | (KR) | 10-2019-0063085 |
| Jun. 4, 2019 | (KR) | 10-2019-0065945 |
| Jul. 4, 2019 | (KR) | 10-2019-0080573 |
| Jul. 5, 2019 | (KR) | 10-2019-0081023 |

(51) Int. Cl.
  *G06F 9/54* (2006.01)
  *G06F 9/50* (2006.01)
  *G06F 11/07* (2006.01)
  *G06F 11/30* (2006.01)

(52) U.S. Cl.
  CPC ...... *G06F 11/0784* (2013.01); *G06F 11/3037* (2013.01); *G06F 12/1045* (2013.01); *G06F 2209/508* (2013.01); *G06F 2209/5022* (2013.01); *G06F 2212/7201* (2013.01)

(56) References Cited

U.S. PATENT DOCUMENTS

| | | | |
|---|---|---|---|
| 9,195,396 B2* | 11/2015 | Peterson | G06F 11/3485 |
| 9,378,135 B2 | 6/2016 | Bennett | |
| 9,400,749 B1 | 7/2016 | Kuzmin et al. | |
| 10,108,366 B2 | 10/2018 | Huang et al. | |
| 10,126,982 B1 | 11/2018 | Colgrove et al. | |
| 10,409,511 B1 | 9/2019 | Subbarao et al. | |
| 10,558,393 B2 | 2/2020 | Shin et al. | |
| 2008/0313405 A1 | 12/2008 | Sakata et al. | |
| 2009/0013149 A1 | 1/2009 | Uhlig et al. | |
| 2010/0185883 A1 | 7/2010 | Hamilton | |
| 2011/0219106 A1 | 9/2011 | Wright | |
| 2011/0231623 A1 | 9/2011 | Goss et al. | |
| 2014/0052898 A1 | 2/2014 | Nan | |
| 2014/0089761 A1 | 3/2014 | Kwok | |
| 2014/0244897 A1 | 8/2014 | Goss et al. | |
| 2016/0246726 A1 | 8/2016 | Hahn | |
| 2016/0259723 A1 | 9/2016 | Lee et al. | |
| 2016/0299715 A1 | 10/2016 | Hashimoto et al. | |
| 2016/0342509 A1 | 11/2016 | Kotte et al. | |
| 2017/0039141 A1 | 2/2017 | Yeh et al. | |
| 2017/0083436 A1 | 3/2017 | Jung | |
| 2017/0192902 A1* | 7/2017 | Hwang | G06F 12/0246 |
| 2018/0004413 A1* | 1/2018 | Zhang | G06F 3/0655 |
| 2018/0225176 A1* | 8/2018 | Kim | G06F 11/1448 |
| 2018/0275873 A1 | 9/2018 | Frid et al. | |
| 2018/0322042 A1 | 11/2018 | Jang | |
| 2019/0089383 A1 | 3/2019 | Funaoka et al. | |
| 2019/0102291 A1* | 4/2019 | Zhou | G06F 3/0659 |
| 2019/0121540 A1 | 4/2019 | Shin et al. | |
| 2019/0227929 A1 | 7/2019 | Lin et al. | |
| 2019/0243773 A1 | 8/2019 | Li | |
| 2019/0258585 A1 | 8/2019 | Marcu et al. | |
| 2019/0266079 A1 | 8/2019 | R et al. | |
| 2019/0332542 A1 | 10/2019 | Li et al. | |
| 2019/0377647 A1 | 12/2019 | Rao et al. | |
| 2020/0004701 A1 | 1/2020 | Subbarao et al. | |
| 2020/0034307 A1 | 1/2020 | Duzly et al. | |
| 2020/0092194 A1 | 3/2020 | Tillotson et al. | |
| 2020/0151108 A1* | 5/2020 | Yen | G06F 12/1009 |
| 2020/0210344 A1 | 7/2020 | Manganelli et al. | |
| 2020/0371908 A1 | 11/2020 | Cariello | |
| 2020/0409584 A1 | 12/2020 | Matsumoto et al. | |

FOREIGN PATENT DOCUMENTS

| | | |
|---|---|---|
| KR | 101631039 B1 | 6/2016 |
| KR | 10-2017-0002866 A | 1/2017 |
| KR | 1020170005915 A | 1/2017 |
| KR | 101736647 B1 | 5/2017 |
| KR | 101867487 B1 | 7/2018 |
| KR | 10-2020-0116704 A | 10/2020 |
| WO | 2014/120698 A1 | 8/2014 |

OTHER PUBLICATIONS

Office Action issued by the USPTO for U.S. Appl. No. 16/733,867 dated Jun. 14, 2021.
Notice of Allowance issued by the USPTO for U.S. Appl. No. 16/732,958 dated Mar. 9, 2021.
Office Action issued by the USPTO for U.S. Appl. No. 16/707,851 dated Mar. 16, 2021.
Office Action issued by the USPTO for U.S. Appl. No. 16/721,716 dated Apr. 1, 2021.
Office Action issued by the USPTO of U.S. Appl. No. 16/721,716 dated Aug. 6, 2021.
Office Action issued by the USPTO of U.S. Appl. No. 16/599,870 dated Sep. 1, 2021.
Office Action issued by the USPTO of U.S. Appl. No. 16/733,900 dated Sep. 14, 2021.
Office Action issued by the USPTO of U.S. Appl. No. 16/733,867 dated Oct. 8, 2021.

* cited by examiner

FIG. 6D

HOST — 710

| LBA1 | PBA1 |
|------|------|
| LBA2 | PBA2 |
| LBA3 | PBA3 |
| LBA4 | PBA4 |
| LBA5 | PBA7 |

MEMORY SYSTEM — 708

| LBA1 | PBA1 |
|------|------|
| LBA2 | PBA6 |
| LBA3 | PBA3 |
| LBA4 | PBA4 |
| LBA5 | PBA7 |

FIG. 6E

HOST — 712

| LBA1 | PBA1 |
|------|------|
| LBA2 | PBA6 |
| LBA3 | PBA3 |
| LBA4 | PBA4 |
| LBA5 | PBA7 |

MEMORY SYSTEM — 708

| LBA1 | PBA1 |
|------|------|
| LBA2 | PBA6 |
| LBA3 | PBA3 |
| LBA4 | PBA4 |
| LBA5 | PBA7 |

MEMORY SYSTEM FOR UTILIZING A MEMORY INCLUDED IN AN EXTERNAL DEVICE

CROSS-REFERENCE TO RELATED APPLICATIONS

This patent application claims to the benefit of Korean Patent Applications: No. 10-2019-0038414 filed on Apr. 2, 2019; No. 10-2019-0046914 filed on Apr. 22, 2019; No. 10-2019-0063085 filed on May 29, 2019; No. 10-2019-0065945 filed on Jun. 4, 2019; No. 10-2019-0080573, filed on Jul. 4, 2019; No. 10-2019-0081023, filed on Jul. 5, 2019, and the benefit of United States Patent Applications: Ser. No. 16/599,870 filed on Oct. 11, 2019; Ser. No. 16/733,867 filed on Jan. 3, 2020; Ser. No. 16/733,900 filed on Jan. 3, 2020; Ser. No. 16/707,851 filed on Dec. 9, 2019; Ser. No. 16/732,958 filed on Jan. 2, 2020; Ser. No. 16/721,716 filed on Dec. 19, 2019, the entire disclosures of which is incorporated herein by reference.

TECHNICAL FIELD

An embodiment of this disclosure relates to a memory system and a data processing system including the memory system, and more particularly, to a memory system which is capable of utilizing a memory included in an external device of the data processing system.

BACKGROUND

Recently, a paradigm for a computing environment has shifted to ubiquitous computing, which enables computer systems to be accessed anytime and everywhere. As a result, the use of portable electronic devices, such as mobile phones, digital cameras, notebook computers and the like, are rapidly increasing. Such portable electronic devices include a data storage device operating together with a memory device. The data storage device can be used as a main storage device or an auxiliary storage device of a portable electronic device.

A data storage device using a nonvolatile semiconductor memory device is advantageous in that it has excellent stability and durability because it has no mechanical driving part (e.g., a mechanical arm). Such data storage device also has high data access speed and low power consumption. Examples of data storage devices having such advantages include a USB (Universal Serial Bus) memory device, a memory card having various interfaces, a solid state drive (SSD) or others.

BRIEF DESCRIPTION OF THE DRAWINGS

The description herein makes reference to the accompanying drawings wherein like reference numerals refer to like parts throughout the figures.

FIGS. 6A to 6E illustrate a map update operation in accordance with embodiments of the disclosure.

Figure 1:
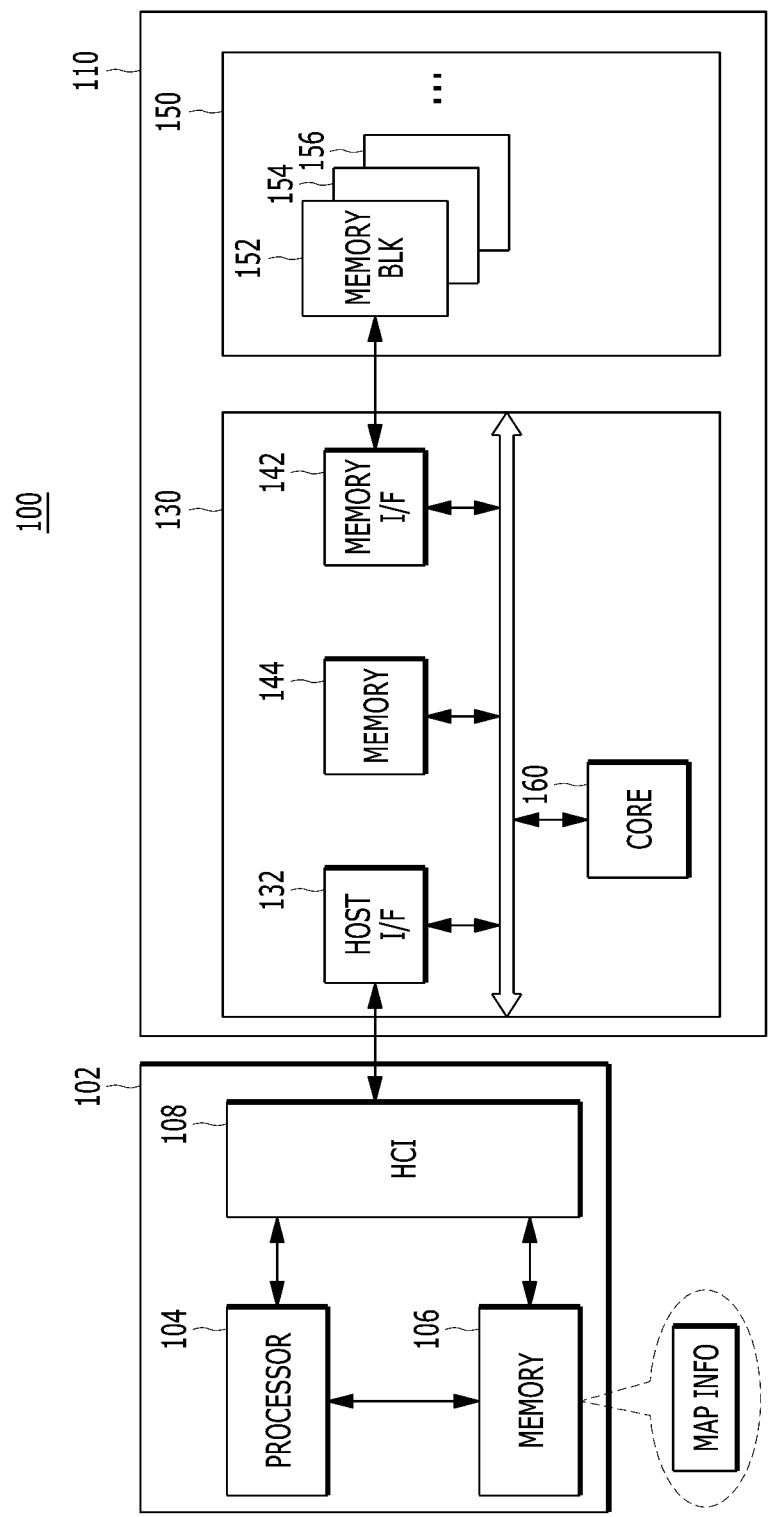
FIG. 1 shows a data processing system including a memory system in accordance with an embodiment of the disclosure.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

DETAILED DESCRIPTION

Various embodiments of the disclosure are described below in with reference to the accompanying drawings. Elements and features of the disclosure, however, may be configured or arranged differently to form other embodiments, which may be variations of any of the disclosed embodiments.

In this disclosure, the terms "comprise," "comprising," "include" and "including" are open-ended. As used in the appended claims, these terms specify the presence of the stated elements and do not preclude the presence or addition of one or more other elements. The terms in a claim does not foreclose the apparatus from including additional components (e.g., an interface unit, circuitry, etc.). Further, the term "and/or" includes any and all combinations of one or more of the associated listed items.

In this disclosure, various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware-for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

As used herein, these terms are used as labels for nouns that they precede, and do not imply any type of ordering (e.g., spatial, temporal, logical, etc.). The terms "first" and "second" do not necessarily imply that the first value must be written before the second value. Further, although the terms "first", "second", "third", and so on may be used herein to identify various elements, these elements are not limited by these terms. These terms are used to distinguish one element from another element that otherwise have the same or similar names. For example, a first circuitry may be distinguished from a second circuitry.

Further, this term "based on" is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

As used in the disclosure, the term 'circuitry' refers to any and all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" also covers an implementation of merely a processor (or multiple processors) or portion of a processor and its (or their) accompanying software and/or firmware. The term "circuitry" also covers, for example, and if applicable to a particular claim element, an integrated circuit for a storage device.

An embodiment of the disclosure can provide an apparatus or a method for operating a memory system and an external device which can be operatively engaged with the memory system. Specifically, the memory system can transfer map information to the external device. Herein, the map information can be referred as to map data, mapping data or mapping information which can be used for associating two different addresses with each other. Two different addresses may be a kind of means indicating a piece of data or a location where a piece of data is stored. For example, the external device such as a computing device or a host generally uses a logical address, while a nonvolatile memory system uses its own address such as a physical address. Accordingly, the apparatus can be configured to generate the map information for associating the logical address with the physical address. When the external device transfers a request with a logical address, the memory system may perform address translation for finding a physical address corresponding to the logical address, based on the map information.

When the external device may include the map information, the external device can transfer a request along with the logical address which the external device uses for indicating a piece of data and the physical address which the memory system independently uses but the external device does not use. Further, the apparatus can transfer the map information to the external device so that the external device uses the map information to send a request along with two addresses. In this case, the memory system may skip address translation so that an input/output (I/O) throughput may be improved.

An embodiment of the disclosure is linked to how the memory system transfers the map information to the external device or how the memory system utilizes a portion of memory included in the external device. By the way of example but not limitation, an embodiment of the disclosure may provide an apparatus or a method for determining which map information the memory system transfers to the external device. Another embodiment of the disclosure may provide an apparatus or a method for activating or inactivating an operation mode where the memory system or the external device transfers or receives the map information to or from each other. Another embodiment of the disclosure may provide an apparatus or a method for controlling or managing the map information transferred from the memory system and stored in the memory of the external device. Another embodiment of the disclosure may provide an apparatus or a method for checking whether the received or transferred map information is valid and determining whether the external device or the memory system continue to use the received or transferred map information.

Another embodiment of the disclosure may provide a memory system capable of generating a response signal including map information which is modified by a background operation and outputting the response signal.

Another embodiment of the disclosure may provide a data processing system which transfers data between components in the data processing system including components or resources such as a memory system and a host.

Another embodiment of the disclosure may provide an apparatus in which a memory system in a data processing system may transmit map information to a host or a computing device to allow the host or the computing device to transmit a command including map information to the memory system, thereby improving the operation performance of the memory system.

Another embodiment of the disclosure may provide an apparatus in which, after a memory system in a data processing system transmits map information to a host or a computing device, information corresponding to whether the update of the map information is performed in the memory system may be transmitted to the host or the computing device to allow the host or the computing device to self-unmap the map information therein, thereby preventing a command from including unnecessary map information being transmitted from the host or the computing device to the memory system and thus improving the operation performance of the memory system.

Another embodiment of the disclosure may provide an apparatus which can transmit map information in a memory system to a host or a computing device in a data processing system, such that the host or the computing device transmits a command along with map information to the memory system, thereby improving operational performance of the memory system.

Another embodiment of the disclosure may provide an apparatus which can transmit map information in a memory system to a host or a computing device in a data processing system such that the host or the computing device independently decides whether to use the map information, and selects and uses only specific map information, thereby avoiding a command with unnecessary map information from being transmitted to the host or the computing device from the memory system and improving the operation performance of the memory system.

Another embodiment of the disclosure may provide an apparatus which can transmit map information and a read count to a host or computing device in a memory system within a data processing system, and control the host or computing device to transmit a command including the map information and the read count to the memory system, thereby improving the operation performance of the memory system.

Another embodiment of the disclosure may provide an apparatus which can transmit map information and a read count corresponding to the map information to a host or computing device in a memory system within a data processing system such that the host or computing device can manage the read count, and maintains the read count of the memory system in a valid state even when a sudden power-off (SPO) occurs in the memory system, thereby improving the operation performance of the memory system.

Another embodiment of the disclosure may provide a memory system, a memory controller and a method for operating the memory system that enable a host to quickly refer to necessary mapping information.

In an embodiment, a memory system can include a memory device configured to store a piece of data in a location which is distinguished by a physical address; and a controller configured to generate a piece of map data associating a logical address, inputted along with a request from an external device, with the physical address and to transfer a response including the piece of map data to the external device.

By the way of example but not limitation, the response can include the piece of map data obtained through an operation performed in response to the request and the logical address.

For example, in response to a write request inputted along with the logical address, the controller can be configured to generate the piece of map data associating the logical address with a new physical address and to transfer the response including information indicating a pass or a failure regarding an operation corresponding to the write request and the piece of data generated during the operation.

For another example, in response to a read request inputted along with a first logical address and a first physical address, the controller can be configured to transfer the response including a piece of data corresponding to the first logical address and a second physical address when the first physical address is no longer associated with the first logical address.

The response can include the piece of map data generated regardless of an operation performed in response to the request and the logical address.

The controller can be configured to store the piece of map data in an exclusive area of a memory included, or coupled to, the controller and to process the piece of map data in a form suitable for being transferred to the external device.

For another example, in response to a read request inputted along with the logical address and the physical address, the controller can be configured to transfer the response including a piece of data corresponding to the logical address and the physical address as well as a read count linked to the physical address.

The controller can be configured to monitor a workload based on the request inputted from the external device and to transfer an inquiry regarding whether the external device uses the piece of map data, based on the workload.

The controller can be configured to establish a reference parameter based on the request or the logical address which is inputted from the external device and to dynamically determine the workload based on the reference parameter.

In another embodiment, a controller can operate between plural devices, each device including an independent address scheme to indicate a location in which a piece of data is stored. The controller can be configured to perform an operation in response to a request inputted from one of the plural devices, to generate a piece of map data associating plural addresses used in the plural devices with each other, and to transfer a response including the piece of map data to another of the plural devices.

The response can include the piece of map data obtained through an operation performed in response to the request and a logical address of the plural addresses.

In response to a write request inputted along with the logical address, the controller can be configured to generate the piece of map data associating the logical address with a new physical address and to transfer the response including information indicating a pass or a failure regarding an operation corresponding to the write request and the piece of data generated during the operation.

In response to a read request inputted along with a first logical address and a first physical address of the plural addresses, the controller can be configured to transfer the response including a piece of data corresponding to the first logical address and a second physical address when the first physical address is no longer associated with the first logical address.

The response can include the piece of map data generated regardless of an operation performed in response to the request and a logical address of the plural addresses.

The controller can be configured to store the piece of map data in an exclusive area of a memory included, or coupled to, the controller and to process the piece of map data in a form suitable for being transferred to one of the plural devices.

In response to a read request inputted along with a logical address and a physical address of the plural addresses, the controller can be configured to transfer the response including a piece of data corresponding to the logical address and the physical address as well as a read count linked to the physical address.

The controller can be configured to monitor a workload based on the request inputted from one of the plural devices and to transfer an inquiry regarding whether the one of the plural devices uses the piece of map data, based on the workload.

The controller can be configured to establish a reference parameter based on the request or a logical address of the plural addresses, which is inputted from the one of the plural devices, and to dynamically determine the workload based on the reference parameter.

In another embodiment, a method for operating a memory system including a memory device configured to store a piece of data in a location which is distinguished by a physical address, can include generating a piece of map data associating a logical address, inputted along with a request from an external device, with the physical address; and transferring a response including the piece of map data to the external device.

The response can include the piece of map data which is either obtained through an operation performed in response to the request and the logical address or generated regardless of an operation performed in response to the request and the logical address.

Hereinafter, embodiments of the disclosure will be described in detail with reference to the accompanying drawings.

FIG. 1 is a block diagram illustrating a data processing system 100 including a memory system in accordance with an embodiment of the disclosure.

Referring to FIG. 1, the data processing system 100 may include a host 102 and a memory system 110.

The host 102 may include a processor 104, a memory 106, and a host controller interface (HCI) 108.

The host memory 106 may store data for driving the host 102 and the memory system 110. Unlike a memory 144 in the memory system 110, using the host's memory 106 is advantageous in that there is less space constraints, and the hardware may be upgraded as needed. Accordingly, the memory system 110 may utilize the resources of the host 102 to increase the operation efficiency. In particular, the memory system 110 may store map information MAP INFO, which is information on a physical address corresponding to a logical address, in the memory 106. As will be described later, the processor 104 may provide the memory system 110 with not only a read command and a logical address but also the physical address by performing a mapping operation based on the map information MAP INFO stored in the memory 106. The mapping operation may be an operation of translating a logical address used in the host 102 into a physical address used in the memory system 110. The memory system 110 may not perform a mapping operation in response to the read command but perform a read operation quickly by reading the data stored in the physical address.

The host controller interface 108 may transfer a plurality of commands corresponding to the user request to the memory system 110 to control the memory system 110 to perform operations corresponding to the user request.

The memory system 110 may include a controller 130 and a memory device 150. The memory device 150 may retain the stored data even when power is not supplied. In particular, the memory device 150 may store the data provided from the host 102 through a program operation, and provide the host 102 with the data stored through a read operation. The memory device 150 may include a plurality of memory blocks 152, 154, 156. Each of the memory blocks 152, 154, 156 may include a plurality of pages. Each of the pages may include a plurality of memory cells that are coupled to a plurality of word lines WL. The memory device 150 may also include a plurality of memory dies. Each of the memory dies may include a plurality of planes. Each of the planes may include a plurality of memory blocks 152, 154, 156. The memory device 150 may be a non-volatile memory device, e.g., a flash memory, having a three-dimensional stereoscopic stack structure.

The controller 130 may control the memory device 150 in response to a request from the host 102. For example, the controller 130 may provide the host 102 with the data that are read from the memory device 150, store the data provided from the host 102 in the memory device 150, and control the memory device 150 to perform a program operation and an erase operation.

The controller 130 may include a host interface (I/F) 132, a core 160, a memory interface (I/F) 142, and a memory 144.

The host interface 132 may process commands and data of the host 102. The host interface 132 may be formed to communicate with the host 102 based on at least one protocol among diverse interface protocols. The host interface 132 may be an area for exchanging data with the host 102. The host interface 132 may be driven based on firmware which is called a host interface layer (HIL).

The memory interface 142 may be a memory or storage interface that performs interfacing between the controller 130 and the memory device 150 for the controller 130 to control the memory device 150 in response to a request from the host 102.

The memory 144 may be an operation memory of the memory system 110. The controller 130 and the memory 144 may store data for driving the memory system 110 and the controller 130.

The memory 144 may be realized as a volatile memory, for example, a static random access memory (SRAM) or a dynamic random access memory (DRAM). The memory 144 may be in the inside of the controller 130 or in the outside of the controller 130. The memory 144 may be realized as an external volatile memory which exchanges data with the controller 130 through a memory interface.

The core 160 may control the overall operation of the memory system 110. In particular, the core 160 may control a program operation or a read operation that is performed on the memory system 110 in response to a program request or a read request applied from the host 102. The core 160 may be able to drive firmware called a flash translation layer (FTL) in order to control the general operations of the memory system 110. The core 160 may be realized as a microprocessor or a central processing unit (CPU).

The controller 130 may be able to perform an operation requested by the host 102 in the memory device 150 through the core 160. The controller 130 may also be able to perform a background operation for the memory device 150 through the core 160. The background operation for the memory device 150 may include, for example, a garbage collection (GC) operation, a wear leveling (WL) operation, a map flush operation, and a bad block management operation.

The core 160 may perform a mapping operation for coupling a file system used by the host 102 to a storage space of the memory device 150. An address of data according to the file system used by the host 102 may be referred to as a logical address or a logical block address. An address of data in the storage space including a non-volatile memory cell may be referred to as a physical address or a physical block address. When the host 102 provides the memory system 110 with a logical address together with a read command, the core 160 may control the memory device 150 to load the map information MAP INFO stored in the memory device 150 into the memory 144, perform a mapping operation, and read the data stored in a physical address corresponding to the logical address.

As the amount of data that may be stored in the memory device 150 increases, the amount of map information MAP INFO for the data stored in the memory device 150 may increase as well. Since the space of the memory 144 is limited, the size of the map information MAP INFO by which the core 160 can load the map information MAP INFO stored in the memory device 150, may have a limitation. Therefore, the core 160 may be able to load only the map information MAP INFO for some data into the memory 144, instead of loading the map information MAP INFO for all the data stored in the memory device 150.

As the amount of map information MAP INFO increases, the core 160 may frequently load the map information MAP INFO in order to perform a mapping operation. When the map information MAP INFO for the logical address to be accessed by the host 102 is not loaded into the memory 144, the core 160 may control the memory device 150 to read the map information MAP INFO from memory blocks and load the map information MAP INFO into the memory 144. When a part of the map information MAP INFO loaded in the memory 144 is updated, the core 160 may control the memory device 150 to program the map information MAP INFO into memory blocks and update the map information MAP INFO of the memory device 150. The loading and updating the map information MAP INFO by the core 160 may be performed in order to perform a read operation or a program operation which is requested by the host 102. As the read or program operation is repeatedly performed, the performance of the memory system 110 may be degraded.

When the host 102 is capable of performing a mapping operation performed by the core 160, the core 160 may omit the mapping operation and control the memory device 150 to access a physical address provided from the host 102. Therefore, the operation load caused when the core 160 uses the memory 144 may be alleviated so that the operation efficiency of the memory system 110 may be increased, and the time required for the memory system 110 to output the data corresponding to a read command provided by the host 102 may be decreased.

Figure 2:
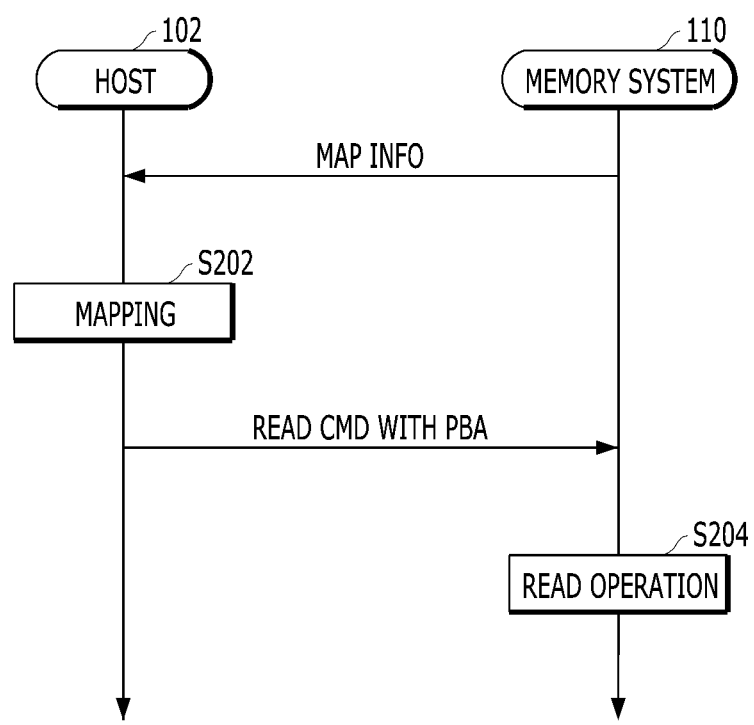
FIG. 2 describes a method of sharing map information in accordance with an embodiment of the disclosure.

FIG. 2 is a flowchart illustrating a method of sharing map information in accordance with an embodiment of the disclosure.

Referring to FIG. 2, the host 102 may store map information MAP INFO for performing a mapping operation in the memory 106. The memory system 110 may provide the host 102 with map information MAP INFO. It may be difficult for the host 102 to allocate storage space in the memory 106 to store the whole map information MAP INFO stored in the memory system 110. Thus, the memory system 110 may selectively provide the host 102 with the map information MAP INFO for data or logical addresses that are frequently used by the host 102.

The host 102 may store the map information MAP INFO in the memory 106. In an embodiment, the host 102 may delete old map information MAP INFO out of the memory 106 according to the time order that the map information MAP is provided from the memory system 110. The provided map information MAP INFO may include update information. Since the memory 106 is formed of a volatile memory cell, the host 102 may update the map information MAP INFO which corresponds to the update information and store the updated map information MAP INFO in the memory 106 without deleting other map information MAP INFO.

In step S202, the host 102 may perform a mapping operation based on the map information MAP INFO stored in the memory 106. The host 102 may search for a physical address corresponding to a logical address for a read command that is provided to the memory system 110 based on the map information MAP INFO. When the map information MAP INFO includes the physical address corresponding to the logical address for the read command, the host 102 may provide the memory system 110 with a read command including the physical address "READ CMD WITH PBA".

In step S204, the memory system 110 may perform a read operation in response to the read command. The memory system 110 may read the data stored in the physical address without performing a separate mapping operation based on the physical address in the read command. When the host 102 performs a direct mapping operation and provides a read command, a logical address, and a physical address to the memory system 110, the memory system 110 may access the data based on the physical address and output the data, decreasing the time required for the read operation.

Figure 3:
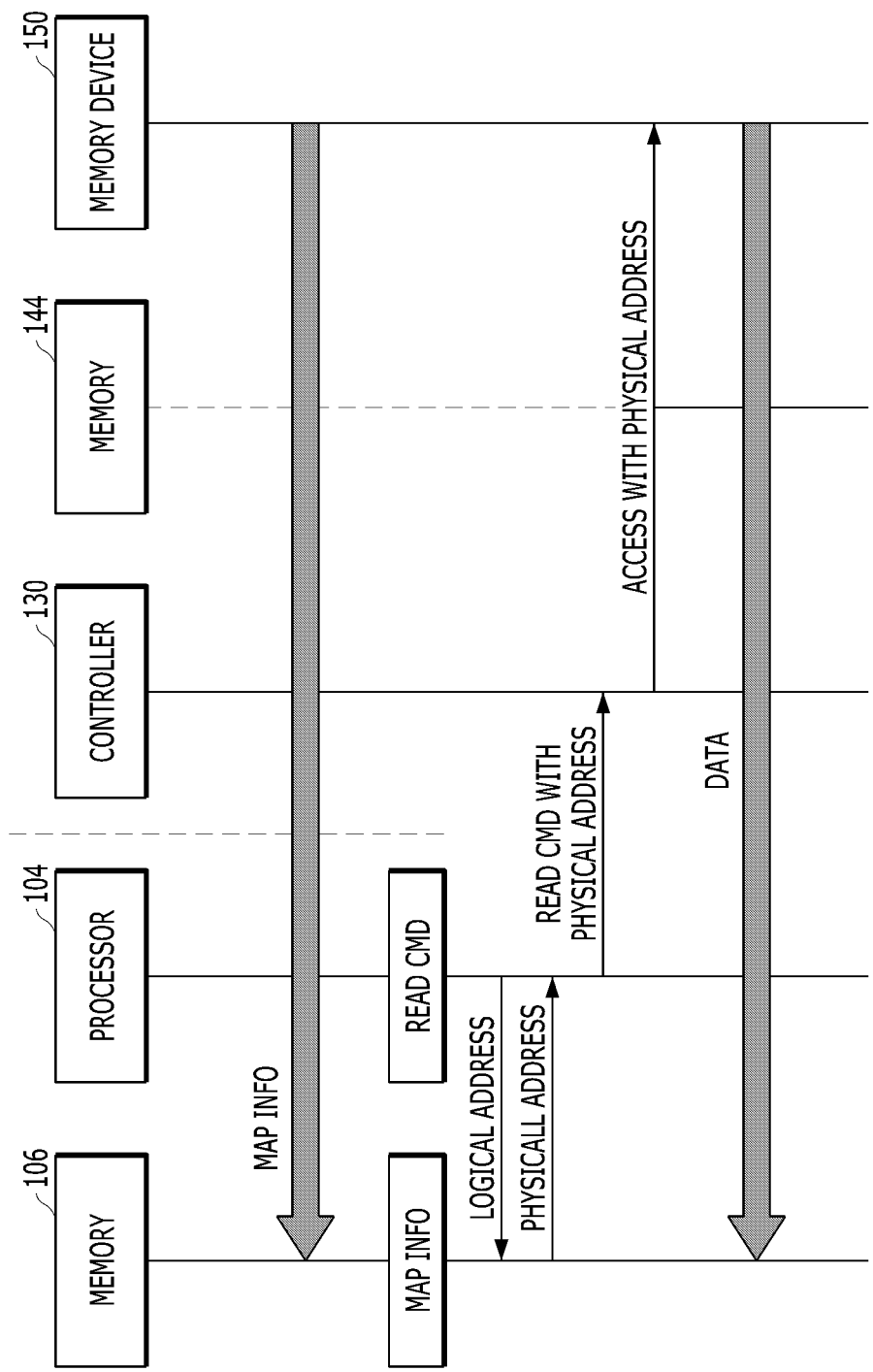
FIG. 3 illustrates a read operation between a host and a memory system in a data processing system in accordance with an embodiment of the disclosure.

FIG. 3 illustrates a read operation between the host 102 and the memory system 110 in the data processing system 100 in accordance with an embodiment of the disclosure.

When power is supplied to the host 102 and the memory system 110, the host 102 and the memory system 110 may interlock with each other, and the memory system 110 may provide the memory 106 of the host 102 (hereinafter, referred to as host memory 106) with the map information MAP INFO stored in the memory device 150.

The processor 104 of the host 102 may generate a read command READ CMD and perform a mapping operation of searching for the physical address corresponding to the logical address for the read command READ CMD based on the map information MAP INFO stored in the host memory 106. The processor 104 may provide the controller 130 with the physical address which is searched according to the mapping operation, together with the read command READ CMD. The controller 130 may access the memory device 150 based on the physical address and the read command READ CMD. The memory device 150 may read the data DATA stored in the physical address and provide the host memory 106 with the data.

The operation of reading the data in the memory device 150 including a non-volatile memory device may consume more time than the operation of reading the data from a volatile memory, such as the host memory 106. In the case of the above-described read operation, a mapping operation performed by the controller 130 may be omitted. In particular, in order to search for the physical address corresponding to the logical address for a read command, the operation of accessing the memory device 150 and reading the map information MAP INFO by the controller 130 may be omitted. Thus, the operation of reading the data stored in the memory system 110 by the host 102 may be performed more quickly.

Figure 4:
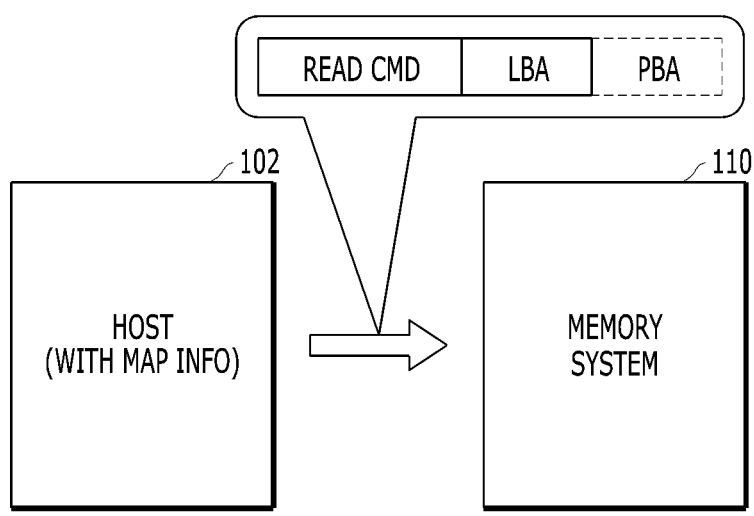
FIG. 4 illustrates a transaction between a host and a memory system in a data processing system in accordance with an embodiment of the disclosure.

FIG. 4 is a diagram illustrating a transaction between the host and the memory system in the data processing system in accordance with the embodiment of the disclosure.

Referring to FIG. 4, the host 102 storing the map information MAP INFO may provide the memory system 110 with a read command including a logical address LBA and a physical address PBA. When the map information MAP INFO stored in the host 102 includes the physical address PBA corresponding to the logical address LBA for the read command, the host 102 may provide the memory system 110 with the read command that includes the logical address LBA and the physical address PBA. When the map information MAP INFO stored in the host 102 does not include a physical address PBA corresponding to the logical address LBA for the read command, the host 102 may provide the memory system 110 with a read command which includes only the logical address LBA excluding the physical address. Although FIG. 4 illustrates a read command as an example, the disclosure may be applied to a delete command which may be provided by the host 102 to the memory system 110 according to an embodiment of the disclosure.

Figure 5:
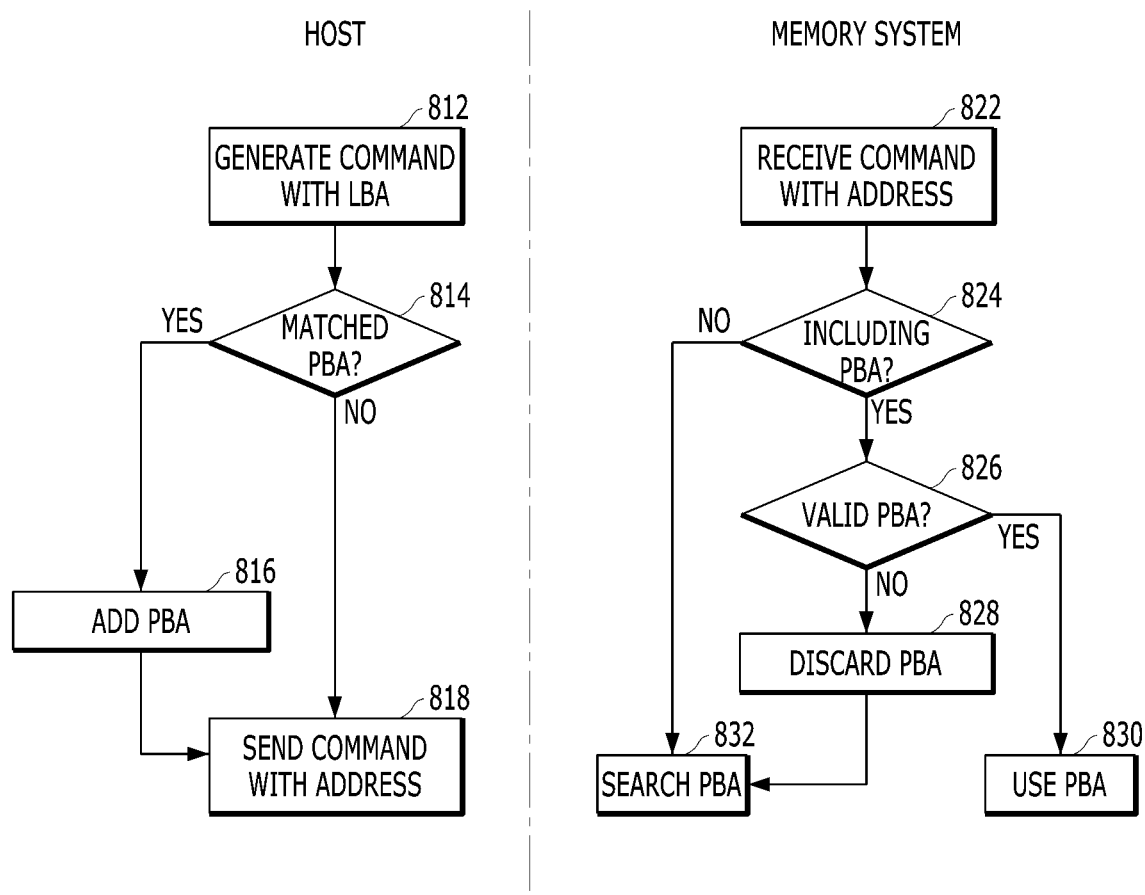
FIG. 5 shows an operation of the host and the memory system in accordance with the embodiment of the disclosure.

FIG. 5 illustrates a first operation of a host and a memory system according to an embodiment of the disclosure. FIG. 5 illustrates detailed operations of the host transmitting a command including a logical address LBA and a physical address PBA, and the memory system receiving the command with the logical address LBA and the physical address PBA, like the host 102 and the memory system 110 described with reference to FIG. 4.

Referring to FIG. 5, the host may generate a command COMMAND including a logical address LBA (step 812). Thereafter, the host may check whether a physical address PBA corresponding to the logical address LBA is in the map information stored therein (step 814). If there is no physical address PBA (NO in step 814), the host may transmit a command COMMAND with the logical address LBA and without the physical address PBA (step 818).

If there is a physical address PBA (YES of step 814), the host may add the physical address PBA to the command COMMAND with the logical address LBA (step 816). The host may send the command COMMAND with the logical address LBA and the physical address PBA (step 818).

The memory system may receive a command (step 822). The memory system may check whether the command is received with a physical address PBA (step 824). When the command is not received with a physical address PBA (NO in step 824), the memory system may perform a mapping operation or an address translation, e.g., search for a physical address corresponding to the logical address received with the command (step 832).

When the command is received with the physical address PBA (YES of step 824), the memory system may check whether the physical address PBA is valid (step 826). The memory system has delivered the map information to the host, and the host may perform the mapping operation based on the map information delivered from the memory system, to transmit the command with the physical address PBA to the memory system. However, after the memory system transmits map information to the host, the map information may be changed and updated by the memory system. When map information is dirty, the physical address PBA received from the host might not be used to access data as it is, so the memory system may determine whether the physical address PBA received with the command is valid, i.e., whether map information corresponding to the physical address PBA is changed or updated. When the physical address PBA received with the command is valid (YES at step 826), the memory system may perform an operation corresponding to the command using the physical address PBA (step 830).

When the physical address PBA received with the command is not valid (NO in step 826), the memory system may ignore the physical address PBA received with the command (step 828). In this case, the memory system may search for a physical address PBA based on the logical address LBA received with the command (step 832).

FIGS. 6A to 6E illustrate a map update operation in accordance with an embodiment of the disclosure.

By way of example, map information on the physical addresses corresponding to five logical addresses will be described.

Figure 6A:
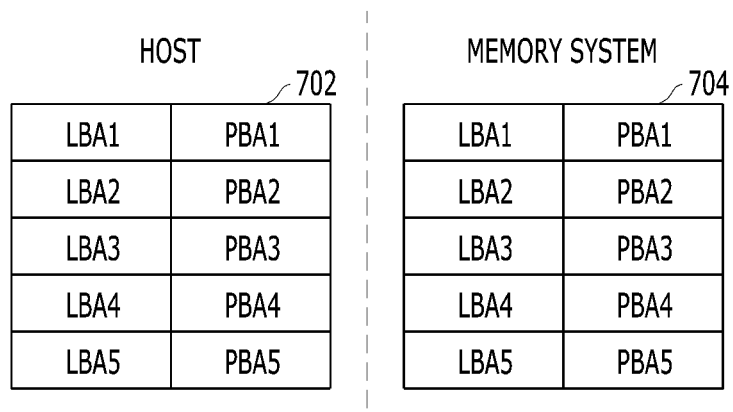

FIG. 6A illustrates an initial state of map information stored in the host 102 and the memory system 110.

As described above with reference to FIG. 2, the memory system 110 may selectively provide the host 102 with map information for logical addresses that the host 102 frequently uses. The first to fifth logical addresses LBA1 to LBA5 shown in FIG. 6A may be an example of a logical address selected by the memory system 110. The memory 144 may store map information 704 for the first to fifth logical addresses LBA1 to LBA5. The map information 704 may include logical to physical (L2P) information for the first to fifth logical addresses LBA1 to LBA5. Referring to FIG. 6A, the physical addresses for the first to fifth logical addresses LBA1 to LBA5 may be first to fifth physical addresses PBA1 to PBA5, respectively. The memory system 110 may provide the host 102 with the map information 704.

The host 102 may store the provided map information 704 in the host memory 106. Right after the memory system 110 provides the host 102 with the map information 704, that is, in the initial state, the map information 702 stored in the host memory 106 may be the same as the map information 704 stored in the memory 144. Referring to FIG. 6A, it may be seen that the physical addresses for the first to fifth logical addresses LBA1 to LBA5 of the map information 702 stored in the host memory 106 are respectively the first to fifth physical addresses PBA1 to PBA5, and thus the map information 702 stored in the host memory 106 may be the same as the map information 704 stored in the memory 144.

Figure 6B:
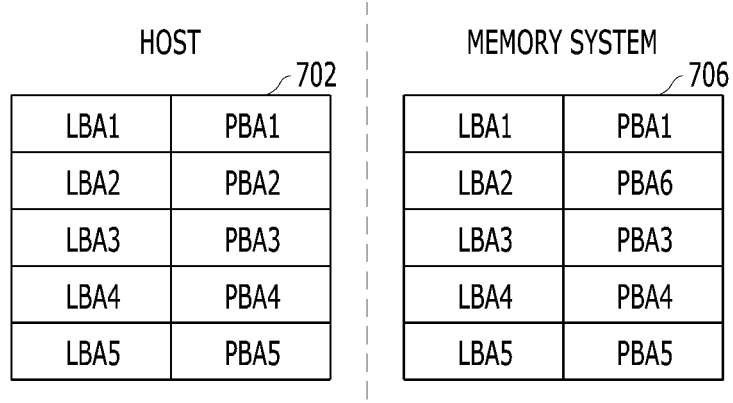

FIG. 6B illustrates map information stored in the host 102 and the memory system 110 after a background operation.

The memory system 110 may perform a background operation after providing the map information 704 to the host 102. Since the background operation may include a program operation, the map information stored in the memory 144 may be changed according to the background operation. For example, when a garbage collection operation is performed on a memory block for a second physical address PBA2 corresponding to a second logical address LBA2, the memory system 110 may read the data stored at the second physical address PBA2 and program the read data in a new physical address, e.g., a sixth physical address PBA6. The memory system 110 may generate updated map information 706 by changing the physical address corresponding to the second logical address LBA2 into the sixth physical address PBA6. The physical address corresponding to the second logical address LBA2 may be included in the initial map information 704 that is stored in the memory 144.

According to an embodiment, the host 102 may not immediately update the map information 702 stored in the memory 106 into the changed map information 706 according to the background operation. Referring to FIG. 6B, it may be seen that the map information 702 stored in the memory 106 is the same as the map information 704 which is stored in the memory 144 in the initial state.

Figure 6C:
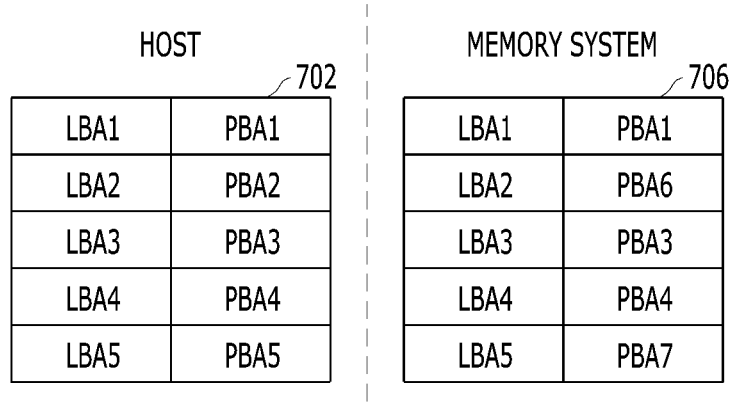

FIG. 6C illustrates map information stored in the host 102 and the memory system 110, before providing the host 102 with a response signal to the program command after the program operation is performed in response to the program command.

The host 102 may provide the memory system 110 with a program command, a logical address, and data. The memory system 110 may program the data in an open block in response to the program command and update map information for the logical address. For example, when the host 102 issues a program command for the fifth logical address LBA5, the memory system 110 may program the data for the program command into a seventh physical address PBA7, which is a new physical address. The memory system 110 may invalidate the fifth physical address PBA5 corresponding to the fifth logical address LBA5 based on the old map information 706. Further, the memory system 110 may generate updated map information 708 by changing the physical address for the fifth logical address LBA5 into the seventh physical address PBA7.

Referring to FIG. 6C, it may be seen that the physical address for the fifth logical address LBA5 is changed into the seventh physical address PBA7 in the map information 708 stored in the memory 144. Since FIG. 6C shows the map information 702 stored in the host memory 106 before providing the host 102 with a response to the program command after the program operation performed in response to the program command, it may be seen that the map information 702 is the same as the map information 704 stored in the memory 144 in the initial state.

FIG. 6D illustrates map information stored in the host 102 and the memory system 110 after the host 102 updates the map information MAP INFO.

The memory system 110 may provide the host 102 with map information MAP INFO PGM which is changed according to a program operation together with a response signal RESPONSE to a program command after performing the program operation in response to the program command. The host 102 may update the map information MAP INFO stored in the memory 106 based on the provided map information MAP INFO PGM. Referring to FIG. 6D, the memory system 110 may output the physical address information for the fifth logical address LBA5 changed according to the program operation performed in response to the program command together with a response signal to the program command. The host 102 may generate updated map information 710 by updating the physical address for the fifth logical address LBA5 into the seventh physical address PBA7 based on the physical address information for the changed fifth logical address LBA5.

According to an embodiment, since the memory system 110 provides the host 102 with only the map information MAP INFO PGM which is changed according to the program operation performed in response to the program command, it may not provide the host 102 with the map information MAP INFO BOP which is changed according to a background operation. Therefore, the host 102 may be able to only update the map information stored in the memory 106 based on only the map information MAP INFO PGM which is changed according to the program operation performed in response to the program command. Further, the host 102 may not be able to update the map information for the map information MAP INFO BOP according to a background operation. Therefore, when a read command is issued for a logical address corresponding to the map information MAP INFO BOP which is changed according to the background operation later, the host 102 may fail to perform the mapping operation based on the latest physical address information. When the physical address provided together with the read command to the memory system 110 according to the mapping operation performed by the host 102 is not valid, it takes a long time to perform a read operation because the memory system 110 needs to perform the mapping operation before performing a read operation.

Referring to FIG. 6D, since the memory system 110 may not provide the host 102 with the map information MAP INFO BOP for the second logical address LBA2 which is changed by the background operation, the host 102 may not update the map information 710 stored in the memory 106 into the changed physical address for the second logical address LBA2. When a read command for the second logical address LBA2 is issued later, the host 102 may perform a mapping operation based on the map information 710. Further, the host 102 may provide the memory system 110 with the second physical address PBA2 together with the read command and the second logical addresses LBA2. Since the second physical address PBA2 is not valid as a physical address for the second logical address LBA2, the memory system 110 may search the map information 708 stored in the memory 144 for the sixth physical address PBA6 as a valid physical address for the second logical address LBA2 by performing a mapping operation prior to performing a read operation. Due to the provided invalid physical address, the frequency of the memory system 110 performing a mapping operation itself increases and the time required for performing a read operation increases as well.

FIG. 6E illustrate a method of performing a map update operation in accordance with another embodiment of the disclosure.

Whenever the memory system 110 outputs a response signal to a command provided from the host 102, the memory system 110 may output map information which is changed according to a background operation together with the response signal. The command may include diverse commands provided from the host 102, such as a read command, a program command, and an erase command. The host 102 may update the map information stored in the memory 106 based on the map information which is provided together with the response signal. When a read command is issued for a logical address corresponding to the map information which is changed according to a background operation later, the host 102 may perform a mapping operation based on the latest map information. The host 102 may provide the memory system 110 with the physical address by searching for a physical address corresponding to the logical address according to the mapping operation. Since the physical address is highly likely to be valid, the memory system 110 may perform a read operation from the physical address immediately without performing a separate mapping operation. In this way, the speed of the read operation may be improved.

Referring to FIG. 6E, when a command is provided from the host 102, the memory system 110 may output map information for the second logical address LBA2 which is changed by a background operation together with the response signal to the command. The host 102 may update the map information 712 stored in the memory 106 based on the provided map information. The host 102 may update the physical address for the second logical address LBA2 into the sixth physical address PBA6 in the map information 712. Therefore, when the read command for the second logical address LBA2 is issued later, the host 102 may perform a mapping operation based on the updated map information 712. Further, the host 102 may provide the memory system 110 with the sixth physical address PBA6, which is the latest physical address corresponding to the second logical address LBA2. Since the sixth physical address PBA6 is valid, the memory system 110 may read data stored in the sixth physical address PBA6 without performing a separate mapping operation. According to the second embodiment, the memory system 110 may secure the validity of the physical address which is outputted by the host 102 by providing the host 102 with the map information that is changed by a background operation. When the validity of the physical address is secured, the frequency of the memory system 110 performing a mapping operation may be lowered. As a result, the speed of a read operation may be improved.

Figure 7:
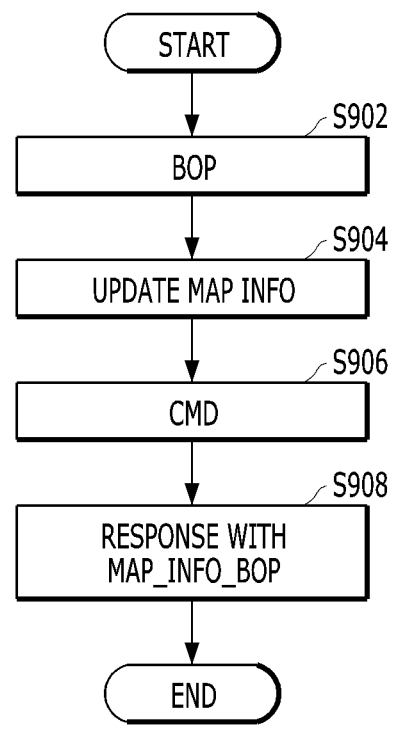
FIG. 7 shows an operation of a memory system in accordance with an embodiment of the disclosure.

FIG. 7 is a flowchart illustrating an operation of the memory system 110 in accordance with an embodiment of the disclosure.

Referring to FIG. 7, in step S902, the controller 130 may control the memory device 150 to perform a background operation BOP. As described earlier with reference to FIG. 1, the background operation BOP may include a garbage collection operation, a wear-leveling operation, and a read re-claim operation. Since the background operation may include a program operation, the map information may be changed according to the background operation. In the case of a garbage collection operation, the controller 130 may control the memory device 150 to read valid data in a victim block, and program the read valid data in a target block. The victim block may be a block whose number of valid pages is less than a predetermined threshold. The target block may be a block whose number of blank pages is greater than or equal to a predetermined threshold. According to the garbage collection operation, the physical address of the valid data may be changed from a page in the victim block into a page in the target block.

In step S904, the controller 130 may update map information MAP INFO which is changed according to the background operation performed in the step S902. The map information MAP INFO may be logical to physical (L2P) information on a physical address corresponding to a logical address. When the physical address corresponding to a logical address for a particular data is changed according to the background operation, the controller 130 may update the map information MAP INFO by loading map information MAP INFO for the logical address into the memory 144. The capacity of the memory 144 may be limited. Since the memory 144 is a volatile memory, the controller 130 may control the memory device 150 to program the updated map information MAP INFO into a memory block.

In step S906, the host 102 may issue a command CMD and provide the controller 130 with the command CMD. The command CMD may include diverse commands, such as a read command, a program command, and an erase command. The controller 130 may control the memory device 150 to perform an operation according to the command CMD in response to the command CMD. As will be described later, according to the second embodiment, whenever the controller 130 provides the host 102 with a response signal RESPONSE for the diverse commands other than a specific command, the controller 130 may increase the update frequency of the map information stored in the host memory 104 by providing the map information MAP INFO which is changed according to a background operation.

In step S908, the controller 130 may provide the host 102 with a response signal RESPONSE in response to an operation for the executed command CMD. The response signal RESPONSE may include an identifier for the command CMD and information on whether the operation for the command CMD has succeeded or not. The controller 130 may generate the response signal RESPONSE including the map information MAP INFO which is changed by the background operation in the step S904. Further, the controller 130 may provide the host 102 with the response signal RESPONSE. The response signal RESPONSE may include a reserve region which is an empty space. The controller 130 may generate the map information MAP INFO including the reserve region.

According to an embodiment, the host 102 may reflect the map information changed by the background operation into the map information in the memory 106, based on the map information MAP INFO in the response signal RESPONSE. Therefore, when a read command is issued for a logical address corresponding to the map information changed by the background operation, the host 102 may perform a mapping operation to provide the controller 130 with a valid physical address. The controller 130 may improve the speed of a read operation by performing a read operation immediately without performing a mapping operation separately based on the provided physical address.

Figure 8:
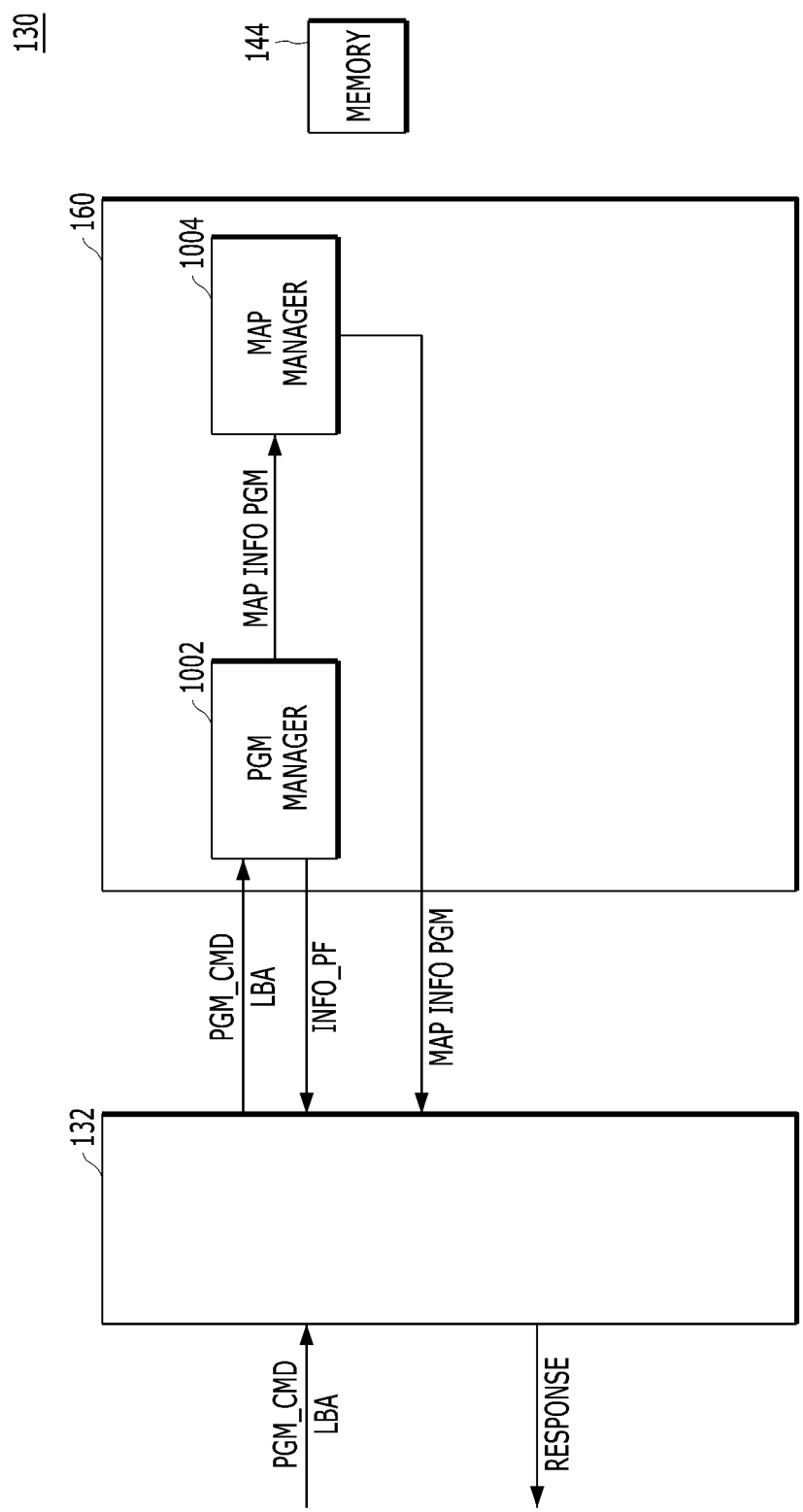
FIG. 8 illustrates an example of a memory system in accordance with an embodiment of the disclosure.

FIG. 8 is a block diagram illustrating the memory system 110 in accordance with an embodiment of the disclosure.

FIG. 8 schematically shows only the structures related to the disclosure in the data processing system 100 of FIG. 1.

As described earlier with reference to FIG. 1, the controller 130 may include a host interface 132, a memory 1440, and a core 160. The core 160 may include a program (PGM) manager 1002 and a map manager 1004.

The host interface 132 may perform steps S602 and S606 of FIG. 6. The host interface 132 may communicate with the host 102 through at least one among diverse interface protocols, and provide a program command PGM_CMD provided from the host 102 to the program manager 1002. The host interface 132 may transfer a logical address LBA and data to the program manager 1002 together with the program command PGM_CMD. Also, the host interface 132 may transfer a response signal RESPONSE including the pass/failure information INFO_PF provided from the program manager 1002 and program map information MAP INFO PGM provided from the map manager 1004 to the host 102.

The program manager 1002 may perform the operation of the step S602 of FIG. 6. The program manager 1002 may control the memory device 150 to perform a program operation in response to a program command PGM_CMD. The program manager 1002 may control the memory device 150 to program the data for the program command PGM_CMD into an open block. The memory device 150 may provide the program manager 1002 with the pass/failure information INFO_PF, which represents whether the program operation has succeeded or not, after performing the program operation. The program manager 1002 may provide the host interface 132 with the pass/failure information INFO_PF. The program manager 1002 may provide the map manager 1004 with the logical address LBA corresponding to the program command PGM_CMD and the program map information MAP INFO PGM. The program map information MAP INFO PGM represents information on the physical address of a block which is programmed with the data.

The map manager 1004 may perform the operation of the step S604 of FIG. 6. The map manager 1004 may perform a map update operation based on the provided program map information MAP INFO PGM. When map information MAP INFO for a logical address LBA corresponding to the program command PGM_CMD exists in the memory 144, the map manager 1004 may update the map information MAP INFO based on the program map information MAP INFO PGM. When the map information MAP INFO for the logical address LBA corresponding to the program command PGM_CMD does not exist in the memory 144, the map manager 1004 may control the memory device 150 to read the map information MAP INFO from a memory block. The map manager 1004 may perform the map update operation described above after loading the read map information MAP INFO into the memory 144. The map manager 1004 may provide the host interface 132 with the program map information MAP INFO PGM.

The map manager 1004 may perform the operation of the step S512 of FIG. 5B. When the map information MAP INFO of the memory system 110 is changed or updated after providing the host 102 with the map information MAP INFO, the map manager 1004 may manage the map information MAP INFO in a dirty state. The map manager 1004 may manage the map information MAP INFO in a clean state after providing the host 102 with the changed map information MAP. When the read command and the physical address are provided from the host 102, the map manager 1004 may determine the validity of the physical address based on the dirty/clean state of the map information MAP INFO for the logical address corresponding to the read command. The map manager 1004 may not perform a mapping operation when the map information MAP INFO is in a clean state. The map manager 1004 may perform the mapping operation when the map information MAP INFO is in a dirty state.

Although not illustrated in the drawing, the core 160 may include a read manager. When the map information MAP INFO is in a clean state, the read manager 160 may control the memory device 150 to read the data stored at a physical address provided from the host 102 in response to the read command. When the map information MAP INFO is in a dirty state, the read manager may control the memory device 150 to read data from the latest physical address corresponding to the logical address for the read command based on map information MAP INFO according to a mapping operation which is performed by the map manager 1004.

According to the first embodiment, the host interface 132 may be able to secure the validity of the program map information MAP INFO PGM by including the map information MAP INFO PGM which is changed according to a program operation performed in response to a program command PGM_CMD in a response signal RESPONSE and providing the host 102 with the response signal RESPONSE. The host 102 may update the map information stored in the memory 106 based on the program map information MAP INFO PGM. When a read command for the logical address corresponding to the program command PGM_CMD is issued later, the host 102 may perform a mapping operation and provide the host interface 132 with a physical address together with a read command. Since the map manager 1004 manages the map information MAP INFO for the logical address in a clean state while outputting the response signal RESPONSE, the provided physical address may be highly likely to be valid. Accordingly, the map manager 1004 may not separately perform a mapping operation, and the read manager may control the memory device 150 to read data directly from the provided physical address, thereby improving the speed of a read operation.

Figure 9:
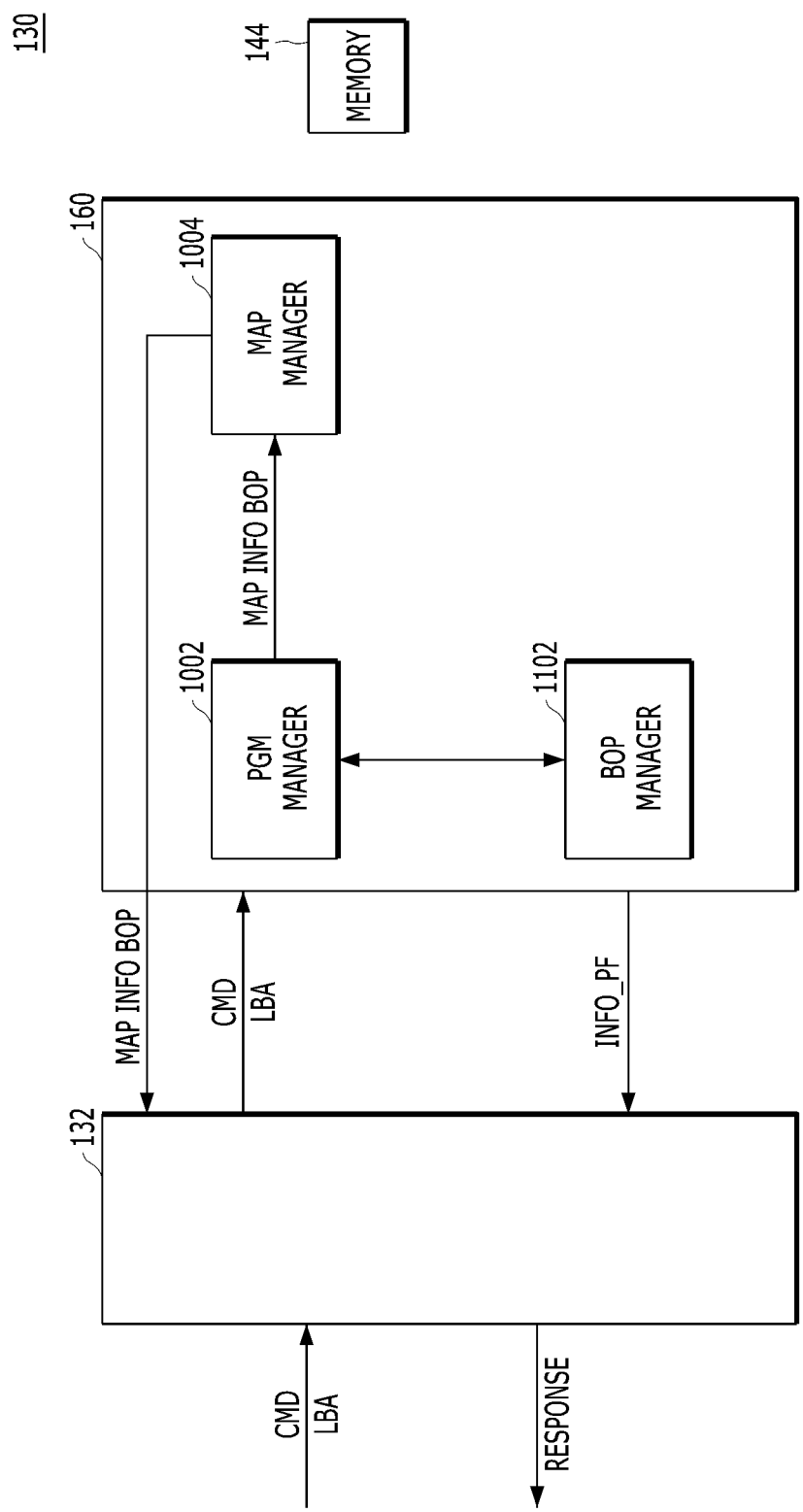
FIG. 9 illustrates another example of a memory system in accordance with an embodiment of the disclosure.

FIG. 9 is a block diagram illustrating the memory system 110 in accordance with an embodiment of the disclosure.

FIG. 9 schematically shows only the structure related to the disclosure in the data processing system 100 of FIG. 1.

As described earlier with reference to FIG. 1, the controller 130 may include a host interface 132, a memory 1440, and a core 160. The core 160 may include a program (PGM) manager 1002, a map manager 1004, and a background operation (BOP) manager 1102. The program manager 1002, the map manager 1004, and the background operation manager (BOP) 1102 include all circuits, systems, software, firmware and devices necessary for their respective operations and functions.

The background operation manager 1102 may perform the operation of the step S902 of FIG. 7. The background operation manager 1102 may control the memory device 150 to perform a background operation BOP. When the background operation includes a program operation, the background operation manager 1102 may control the program manager 1002 to perform a program operation in the background operation. For example, in the case of a garbage collection operation, the background operation manager 1102 may control the memory device 150 to read the valid data in a victim block and program the valid data in a target block. The victim block may be a block having a number of valid pages less than a predetermined threshold. The target block may be a block having a number of empty pages greater than or equal to a predetermined threshold. The garbage collection operation may include an operation of programming the valid data in the victim block into the target block. The background operation manager 1102 may control the program manager 1002 to program the valid data in the target block.

The program manager 1002 may control the memory device 150 to perform a program operation according to a background operation under the control of the background operation manager 1102. In the case of a garbage collection operation, the program manager 1002 may control the memory device 150 to program the valid data of a victim block in a target block. The program manager 1002 may provide the map manager 1004 with the logical address of data whose physical address is changed and background map information MAP INFO BOP on the changed physical address, according to the program operation based on the background operation.

The map manager 1004 may perform the operation of the step S904 of FIG. 7. The map manager 1004 may perform a map update operation based on the provided background map information MAP INFO BOP. When the map information MAP INFO for a logical address LBA corresponding to the data whose physical address is changed according to the background operation exists in the memory 144, the map manager 1004 may update the map information MAP INFO based on the background map information MAP INFO BOP. When the map information MAP INFO for a logical address LBA corresponding to the data whose physical address is changed according to the background operation does not exist in the memory 144, the map manager 1004 may control the memory device 150 to read the map information MAP INFO from a memory block. The map manager 1004 may perform the map update operation described above after loading the read map information MAP INFO into the memory 144.

The map manager 1004 may store a list including the background map information MAP INFO BOP. As described later, when the response signal RESPONSE including the background map information MAP INFO BOP is outputted, the map manager 1004 may provide the host interface 132 with the background map information MAP INFO BOP having as much as the capacity of the reserve region of the response signal RESPONSE. The map manager 1004 may be able to delete the map information from the list. The map information may be information provided to the host 102 and included in the reserve region of the response signal RESPONSE.

The host interface 132 may perform the operations of the steps S906 and S908 of FIG. 7. The host interface 132 may communicate with the host 102 through at least one among diverse interface protocols. The host interface 132 may transfer a command CMD provided from the host 102 to the core 160. The command CMD may include diverse commands, such as a read command, a program command, and an erase command. The host interface 132 may transfer the logical address LBA and data to the core 160 together with the command CMD. Also, the host interface 132 may transfer the response signal RESPONSE including pass/failure information INFO_PF and background map information MAP INFO BOP to the host 102, which is described below. The pass/failure information INFO_PF may be provided from the core 160. The background map information MAP INFO BOP may be provided from the map manager 1004.

The core 160 may perform the operation of the step S906 of FIG. 7. The core 160 may control the memory device 150 to perform an operation for the command CMD in response to the command CMD. Although not shown in the figure, the core 160 may include not only a program manager 1002 but also a read manager and an erase manager. As described above with reference to FIG. 8, the program manager 1002 may control the memory device 150 to perform a program operation in response to the program command PGM_CMD when the command CMD is a program command PGM_CMD. Similarly, when the command CMD is a read command, the read manager may control the memory device 150 to perform a read operation in response to the read command. When the command is an erase command, the read manager may control the memory device 150 to perform an erase operation in response to the erase command. The core 160 may provide the host interface 132 with pass/failure information INFO_PF representing whether the operation corresponding to the command CMD has succeeded or failed.

The host interface 132 may transfer a response signal RESPONSE in response to the command to the host 102 based on the pass/failure information INFO_PF and the background map information MAP INFO BOP. The host interface 132 may store a command identifier and the pass/failure information INFO_PF in the first and second regions of the response signal RESPONSE and store the background map information MAP INFO BOP in the reserve region.

According to the embodiments, a memory system may include map information which is changed by a background operation in a response signal in response to a command and output the response signal. In response, a host may update the map information stored in a host memory based on the map information. The host may perform a mapping operation based on the updated map information, and output a read command and a latest physical address corresponding to a logical address of the read command. The memory system may quickly read data stored at the latest physical address without performing a mapping operation in response to the read command.

Figure 10:
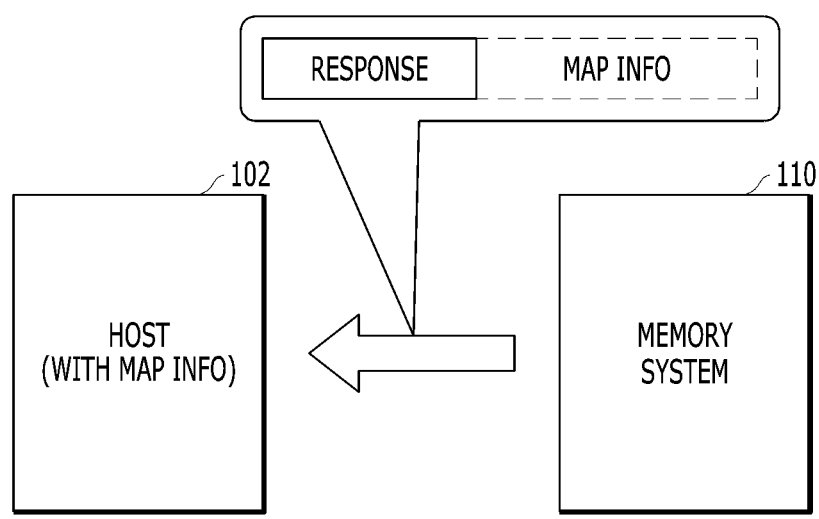
FIG. 10 shows an example regarding a transaction of the host and the memory system in the data processing system in accordance with an embodiment of the disclosure.

FIG. 10 illustrates an example regarding a transaction between a host 102 and a memory system 110 in a data processing system according to an embodiment of the disclosure.

Referring to FIG. 10, the memory system 110 may transfer map information (MAP INFO) to the host 102. The memory system 110 may use a response RESPONSE regarding the command of the host 102 to transfer the map information (MAP INFO). Herein, the response RESPONSE is a type of message or packet which is transmitted after the memory system 110 completely performs an operation in response to a command received from the host 102.

In an embodiment, there may be no particular limitation on a response for transmitting map information. For example, the memory system 110 may transmit the map information to the host 102 by using a response corresponding to a read command, a write command, or an erase command.

The memory system 110 and the host 102 may exchange a command or a response with each other in a specific format set according to a predetermined protocol. For example, a format of the response RESPONSE may include a basic header, a result (or a state) according to success or failure of the command received from the host 102, and additional information indicating an operational state of the memory system 110. The memory system 110 may add (or insert) map information (MAP INFO) into the format of the response RESPONSE to transmit the map information to the host 102.

Figure 11:
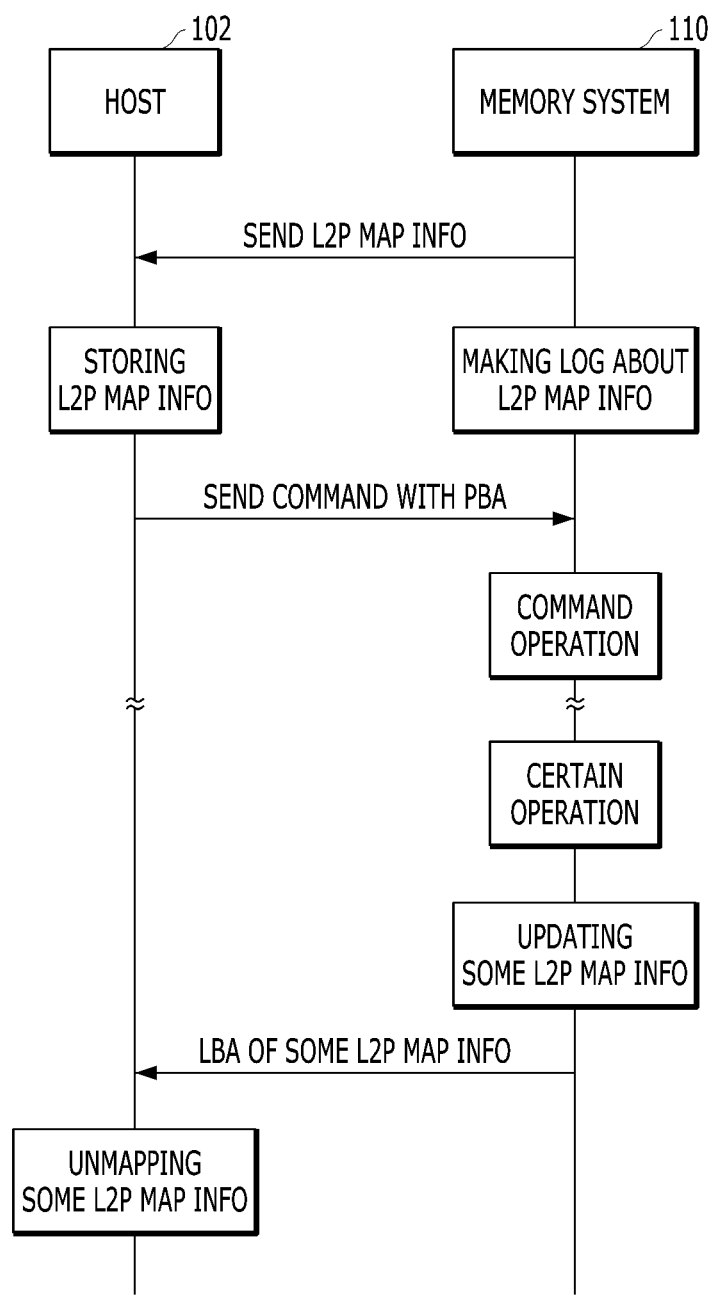
FIG. 11 shows a method for sharing map information in accordance with an embodiment of the disclosure.

FIG. 11 shows a method for sharing map information in accordance with an embodiment of the disclosure. Specifically, FIG. 11 describes how to share map information between a host 102 and a memory system 110 in a data processing system in accordance with an embodiment of the disclosure.

Referring to FIG. 11, the host 102 and the memory system 110 may be operatively engaged. The host 102 may include a computing device and may be implemented in a form of a mobile device, a computer or a server. The memory system 110 operatively engaged with the host 102 may receive a command from the host 102 and store or output data in response to the received command.

The memory system 110 may have a storage space including nonvolatile memory cells. For example, the memory system 110 may be implemented in a form of a flash memory or a solid-state drive (SSD).

In order to store data in response to a request by the host 102 in a storage space including the nonvolatile memory cells, the memory system 110 can perform a mapping operation for associating a file system used by the host 102 with a storage space including the nonvolatile memory cells. This can be referred as to an address translation between a logical address and a physical address. For example, an address identifying data according to the file system used by the host 102 may be called a logical address or a logical block address. The address indicating a physical location of data in the storage space including nonvolatile memory cells may be referred to as a physical address or a physical block address. When the host 102 sends a read command with a logical address to the memory system 110, the memory system 110 can search for a physical address corresponding to the logical address, and then read and output data stored in a physical location indicated by the physical address. During these processes, the mapping operation or the address translation may be performed while the memory system 110 searches for the physical address corresponding to the logical address inputted from the host 102. The mapping operation can be performed based on mapping information such as a mapping table which can associate a logical address with a physical address.

If the host 102 can perform the mapping operation performed by the memory system 110, an amount of time taken for the memory system 110 to read and output data corresponding to a read command transmitted by the host 102 may be reduced. The host 102 may store and access some map information for performing the mapping operation, in order to deliver the read command with the physical address to the memory system 110 through the mapping operation.

The memory system 110 may transmit map information (i.e., logical-to-physical (L2P) map information) MAP_INFO to the host 102. The host 102 may store the map information MAP_INFO in a memory included in the host 102. When the memory system 110 sends the entire map information to the host 102 and the host 102 can store the entire map information in the memory, the memory system 110 may not need to write a log regarding transmitted map information. However, it may be difficult for the host 102 to allocate a storage space in a memory for storing the entire map information, which is generated and delivered by the memory system 110. Accordingly, when the host 102 has limited storage space for storing map information, the memory system 110 may select a part of the map information in which data or a logical address is frequently used or accessed by the host 102, and transmit the selected map information to the host 102.

The memory system 110 may transmit some of the map information to the host 102 and generate a log (or a history) regarding the transmitted map information. The log may have one of various formats, structures, marks, variables, or types, and may be stored in a memory device or a storage area including nonvolatile memory cells. According to an embodiment, whenever the memory system 110 transmits map information to the host 102, the log may include data which is relevant to transmitted map information. Further, the memory system 110 may determine an amount of transmitted map information in the log corresponding to a size of map information that can be transmitted to the host 102. As an example, a size of map information that the memory system 110 can transmit to the host 102 is 512 KB. Although the memory system 110 may transmit more than 512 KB of map information to the host 102, the amount of transmitted map information in the log may be limited to 512 KB. The amount of map information that the memory system 110 can send to the host 102 at one time may be less than the amount of map information that the host 102 may store in the memory. For example, the map information may be transmitted to the host 102 in a segment unit. The memory system 110 may transfer segments of the map information to the host 102 several times. The segments of the map information may be transmitted to the host 102 continuously or intermittently.

According to an embodiment, when the memory system 110 transmits more than 1 MB of map information to the host 102, the host 102 can delete old map information, i.e., old map information previously transmitted from the memory system 110 and stored in a memory thereof. In addition, the map information may include update information. Because a memory allocated by the host 102 to store the map information includes volatile memory cells (an overwrite is supported), the host 102 can update map information based on the update information without an additional operation of erasing other map information.

The host 102 may add a physical address PBA to a command, which is to be transmitted to the memory system 110, based on the map information. In the mapping operation, the host 102 may search for and find the physical address PBA in the map information stored in the memory, based on a logical address corresponding to a command transmitted to the memory system 110. When the physical address exists and is found, the host 102 may transmit the command with the logical address and the physical address to the memory system 110.

The memory system 110 may receive a command with a logical address and a physical address from the host 102, and may perform a command operation corresponding to the command. As described above, when the host 102 transfers a physical address corresponding to a read command, the memory system 110 may use the physical address to access and output data stored in a location indicated by the physical address using the corresponding physical address. The memory system 110 may perform a certain operation in response to the read command without address translation, so that the memory system 110 may reduce a time spent on the operation.

If a predetermined operation is performed in the memory system 110, some map information (SOME L2P MAP INFO) managed in the memory system 110 may be updated (UPDATING). Thereafter, the memory system 110 may transmit a logical address LBA of the some map information (SOME L2P MAP INFO) updated therein, to the host 102. In response to at least one logical address LBA received from the memory system 110, the host 102 may unmap at least one map information among map information stored therein (UNMAPPING). Accordingly, the host 102 may transfer a physical address PBA with a command to the memory system 110, using only the remaining map information except the at least one map information unmapped among the stored map information therein.

When power is not supplied to the host 102 and the memory system 110, all map information which is stored in the memory including volatile memory cells in the host 102 is lost. Power-off or power-on at the host 102 and the memory system 110 may occur according to user's request, or in an undesired situation regardless of a user's request. While power is supplied to the host 102 and the memory system 110, the memory system 110 may store a log regarding map information transmitted to the host 102. Thereafter, when power is resumed after power-off, the memory system 110 may transmit map information to the host 102 based on the log so that the host 102 may perform a mapping operation and transmit a command with a logical address and a physical address into the memory system 110. After power is resumed, the host 102 may quickly recover an operation state regarding the mapping operation, which is substantially the same as that before the power supply is stopped or not supplied.

Before there is a power cut and after power is resumed, the needs and usage patterns of users who use a data processing system including the host 102 and the memory system 110 may be similar or different. When a user's needs and usage patterns are not changed, the host 102 may have tried to access the same data at a high frequency. When the host 102 performs a mapping operation regarding such data, and the memory system 110 can output data more quickly in response to a read command with a logical address and a physical address, it is likely that performance of the data processing system may be improved.

Figure 12:
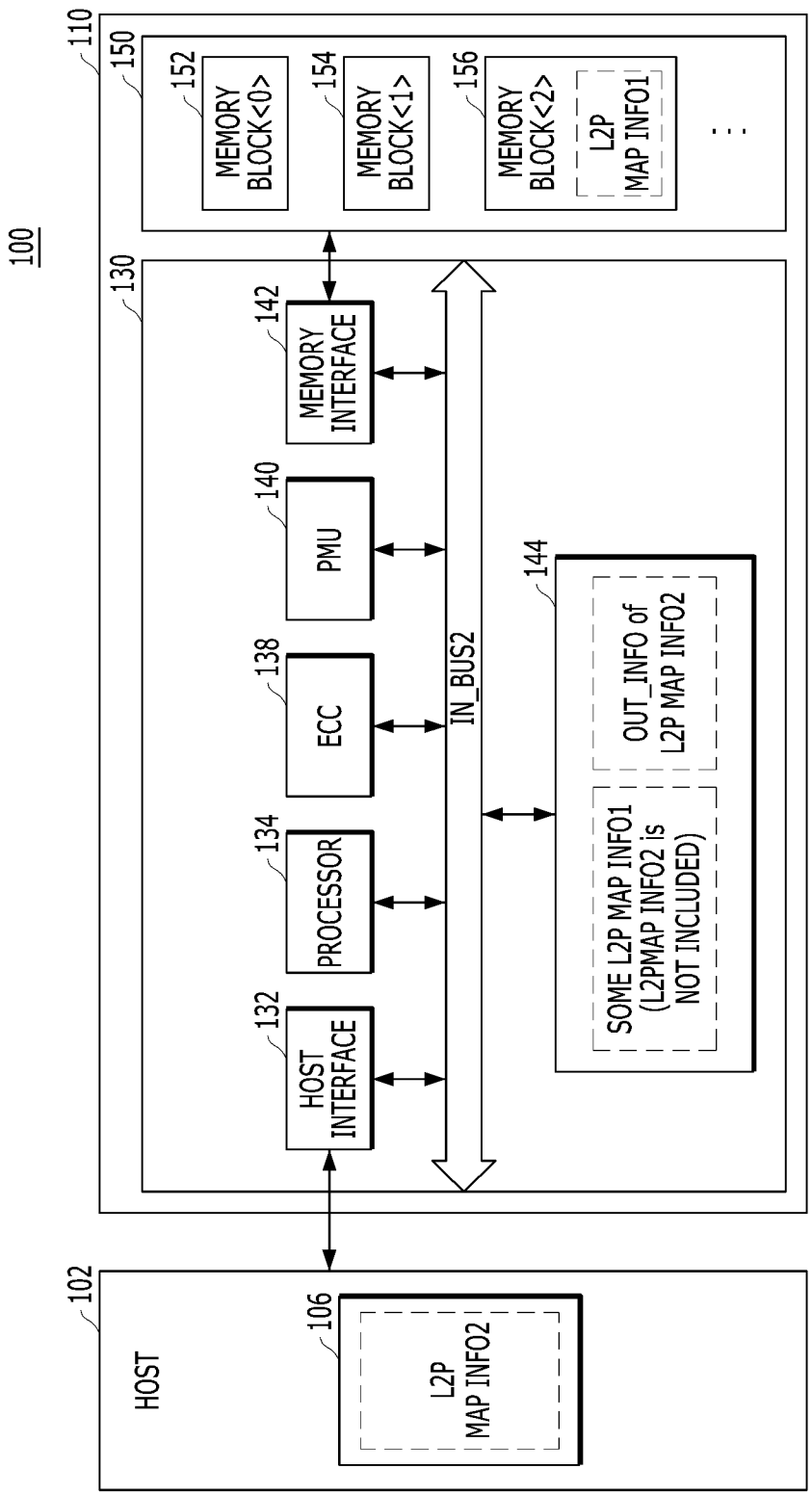
FIG. 12 shows a data processing system including a memory system in accordance with an embodiment of the disclosure.

FIG. 12 illustrates a data processing system 100 in accordance with an embodiment of the disclosure. Referring to FIG. 12, the data processing system 100 may include a host 102 engaged or operating with a memory system 110.

The host 102 may include, for example, a portable electronic device such as a mobile phone, an MP3 player, or a laptop computer, or a non-portable electronic device such as a desktop computer, a game player, a television (TV), a projector, or others.

The host 102 also includes at least one operating system (OS), which can generally manage and control functions and operations performed in the host 102. The OS can provide interoperability between the host 102 engaged with the memory system 110 and the user using the memory system 110. The OS may support functions and operations corresponding to user's requests. By the way of example but not limitation, the OS can be classified into a general operating system and a mobile operating system according to mobility of the host 102. The general operating system may be split into a personal operating system and an enterprise operating system according to system requirements or a user's environment. But the enterprise operating systems can be specialized for securing and supporting high performance. The mobile operating system may be subject to support services or functions for mobility (e.g., a power saving function). The host 102 may include a plurality of operating systems. The host 102 may execute multiple operating systems interlocked with the memory system 110, corresponding to a user's request. The host 102 may transmit a plurality of commands corresponding to the user's requests into the memory system 110, thereby performing operations corresponding to commands within the memory system 110.

The controller 130 in the memory system 110 may control the memory device 150 in response to a request or a command inputted from the host 102. For example, the controller 130 may perform a read operation to provide data read from the memory device 150 for the host 102, and perform a write operation (or a program operation) to store data inputted from the host 102 in the memory device 150. In order to perform data input/output (I/O) operations, the controller 130 may control and manage various operations to read, program, erase, or others.

In an embodiment, the controller 130 can include a host interface 132, a processor 134, an error correction circuitry 138, a power management unit (PMU) 140, a memory interface 142, and a memory 144. Components included in the controller 130 described in FIG. 2 can be varied based on implementation forms, operation performances, or others. For example, the memory system 110 may be implemented with any one of various types of storage devices, which may be electrically coupled with the host 102, according to a protocol of a host interface. Non-limiting examples of suitable storage devices include a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, a memory stick, or others. Components in the controller 130 may be added or omitted depending on implementation of the memory system 110.

The host 102 and the memory system 110 may include a controller or an interface for transmitting and receiving a signal, data, and others, under a predetermined protocol. For example, the host interface 132 in the memory system 110 may include an apparatus capable of transmitting a signal, data, and others to the host 102 or receiving a signal, data, and others inputted from the host 102.

The host interface 132 included in the controller 130 may receive a signal, a command (or a request), or data inputted from the host 102. The host 102 and the memory system 110 may use a predetermined protocol to transmit and receive data between the host 102 and the memory system 110. An example of protocols or interfaces, supported by the host 102 and the memory system 110 for sending and receiving a piece of data, can include Universal Serial Bus (USB), Multi-Media Card (MMC), Parallel Advanced Technology Attachment (PATA), Small Computer System Interface (SCSI), Enhanced Small Disk Interface (ESDI), Integrated Drive Electronics (IDE), Peripheral Component Interconnect Express (PCIE), Serial-attached SCSI (SAS), Serial Advanced Technology Attachment (SATA), Mobile Industry Processor Interface (MIPI), or others. In an embodiment, the host interface 132 may exchange data with the host 102 and is implemented with, or driven by, firmware called a host interface layer (HIL).

The Integrated Drive Electronics (IDE) or Advanced Technology Attachment (ATA), used as one of the interfaces for transmitting and receiving data, can use a cable including 40 wires connected in parallel to support data transmission and reception between the host 102 and the memory system 110. When a plurality of memory systems 110 are connected to a single host 102, the plurality of memory systems 110 may be divided into a master or a slave by using a position or a dip switch to which the plurality of memory systems 110 are connected. The memory system 110 set as the master may be used as the main memory device. The IDE (ATA) has evolved into Fast-ATA, ATAPI, and Enhanced IDE (EIDE).

Serial Advanced Technology Attachment (SATA) is a serial data communication interface that is compatible with various ATA standards of parallel data communication interfaces which is used by Integrated Drive Electronics (IDE) devices. The forty wires in the IDE interface can be reduced to six wires in the SATA interface. For example, 40 parallel signals for the IDE can be converted into 6 serial signals for the SATA to be transmitted between each other. The SATA has been widely used because of its faster data transmission and reception rate and its less resource consumption in the host 102 used for data transmission and reception. The SATA may support connection with up to 30 external devices to a single transceiver included in the host 102. In addition, the SATA can support hot plugging that allows an external device to be attached or detached from the host 102 even while data communication between the host 102 and another device is being executed. Thus, the memory system 110 can be connected or disconnected as an additional device, like a device supported by a universal serial bus (USB) even when the host 102 is powered on. For example, in the host 102 having an eSATA port, the memory system 110 may be freely detached like an external hard disk.

The Small Computer System Interface (SCSI) is a serial data communication interface used for connection between a computer, a server, and/or another peripheral device. The SCSI can provide a high transmission speed, as compared with other interfaces such as the IDE and the SATA. In the SCSI, the host 102 and at least one peripheral device (e.g., the memory system 110) are connected in series, but data transmission and reception between the host 102 and each peripheral device may be performed through a parallel data communication. In the SCSI, it is easy to connect to, or disconnect from, the host 102 a device such as the memory system 110. The SCSI can support connections of 15 other devices to a single transceiver included in host 102.

The Serial Attached SCSI (SAS) can be understood as a serial data communication version of the SCSI. In the SAS, not only the host 102 and a plurality of peripheral devices are connected in series, but also data transmission and reception between the host 102 and each peripheral device may be performed in a serial data communication scheme. The SAS can support connection between the host 102 and the peripheral device through a serial cable instead of a parallel cable, so as to easily manage equipment using the SAS and enhance or improve operational reliability and communication performance. The SAS may support connections of eight external devices to a single transceiver included in the host 102.

The Non-volatile memory express (NVMe) is a kind of interface based at least on a Peripheral Component Interconnect Express (PCIe) designed to increase performance and design flexibility of the host 102, servers, computing devices, and the like equipped with the non-volatile memory system 110. Here, the PCIe can use a slot or a specific cable for connecting the host 102, such as a computing device, and the memory system 110, such as a peripheral device. For example, the PCIe can use a plurality of pins (for example, 18 pins, 32 pins, 49 pins, 82 pins, etc.) and at least one wire (e.g. ×1, ×4, ×8, ×16, etc.), to achieve high speed data communication over several hundred MB per second (e.g. 250 MB/s, 500 MB/s, 984.6250 MB/s, 1969 MB/s, and etc.). According to an embodiment, the PCIe scheme may achieve bandwidths of tens to hundreds of Giga bits per second. A system using the NVMe can make the most of an operation speed of the nonvolatile memory system 110, such as an SSD, which operates at a higher speed than a hard disk.

In an embodiment, the host 102 and the memory system 110 may be connected through a universal serial bus (USB). The Universal Serial Bus (USB) is a kind of scalable, hot-pluggable plug-and-play serial interface that can provide cost-effective standard connectivity between the host 102 and a peripheral device such as a keyboard, a mouse, a joystick, a printer, a scanner, a storage device, a modem, a video camera, or others. A plurality of peripheral devices such as the memory system 110 may be coupled to a single transceiver included in the host 102.

Referring to FIG. 12, the error correction circuitry 138 can correct error bits of the data to be processed in (e.g., outputted from) the memory device 150, which may include an ECC encoder and an ECC decoder. Here, the ECC encoder can perform error correction encoding of data to be programmed in the memory device 150 to generate encoded data into which a parity bit is added and store the encoded data in memory device 150. The ECC decoder can detect and correct errors contained in a data read from the memory device 150 when the controller 130 reads the data stored in the memory device 150. In other words, after performing error correction decoding on the data read from the memory device 150, the ECC component 138 can determine whether the error correction decoding has succeeded and output an instruction signal (e.g., a correction success signal or a correction fail signal). The ECC component 138 can use the parity bit which is generated during the ECC encoding process, for correcting the error bit of the read data. When the number of the error bits is greater than or equal to a threshold number of correctable error bits, the ECC component 138 might not correct error bits but instead may output an error correction fail signal indicating failure in correcting the error bits.

In an embodiment, the error correction circuitry 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and so on. The error correction circuitry 138 may include and all circuits, modules, systems or devices for performing the error correction operation based on at least one of the above described codes.

The power management unit (PMU) 140 may control electrical power provided in the controller 130. The PMU 140 may monitor the electrical power supplied to the memory system 110 (e.g., a voltage supplied to the controller 130) and provide the electrical power to components included in the controller 130. The PMU 140 can not only detect power-on or power-off, but also generate a trigger signal to enable the memory system 110 to back up a current state urgently when the electrical power supplied to the memory system 110 is unstable. In an embodiment, the PMU 140 may include a device or a component capable of accumulating electrical power that may be used in an emergency.

The memory interface 142 may serve as an interface for handling commands and data transferred between the controller 130 and the memory device 150, to allow the controller 130 to control the memory device 150 in response to a command or a request inputted from the host 102. The memory interface 142 may generate a control signal for the memory device 150 and may process data inputted to, or outputted from, the memory device 150 under the control of the processor 134 in a case when the memory device 150 is a flash memory. For example, when the memory device 150 includes a NAND flash memory, the memory interface 142 includes a NAND flash controller (NFC). The memory interface 142 can provide an interface for handling commands and data between the controller 130 and the memory device 150. In accordance with an embodiment, the memory interface 142 can be implemented through, or driven by, firmware called a Flash Interface Layer (FIL) as a component for exchanging data with the memory device 150.

According to an embodiment, the memory interface 142 may support an open NAND flash interface (ONFi), a toggle mode or the like for data input/output with the memory device 150. For example, the ONFi may use a data path (e.g., a channel, a way, etc.) that includes at least one signal line capable of supporting bi-directional transmission and reception in a unit of 8-bit or 16-bit data. Data communication between the controller 130 and the memory device 150 can be achieved through at least one interface regarding an asynchronous single data rate (SDR), a synchronous double data rate (DDR), and a toggle double data rate (DDR).

The memory 144 may be a sort of working memory in the memory system 110 or the controller 130, while storing temporary or transactional data occurred or delivered for operations in the memory system 110 and the controller 130. For example, the memory 144 may temporarily store a piece of read data outputted from the memory device 150 in response to a request from the host 102, before the piece of read data is outputted to the host 102. In addition, the controller 130 may temporarily store a piece of write data inputted from the host 102 in the memory 144, before programming the piece of write data in the memory device 150. When the controller 130 controls operations such as data read, data write, data program, data erase or etc. of the memory device 150, a piece of data transmitted or generated between the controller 130 and the memory device 150 of the memory system 110 may be stored in the memory 144. In addition to the piece of read data or write data, the memory 144 may store information (e.g., map data, read requests, program requests, etc.) necessary for performing operations for inputting or outputting a piece of data between the host 102 and the memory device 150. According to an embodiment, the memory 144 may include a command queue, a program memory, a data memory, a write buffer/cache, a read buffer/cache, a data buffer/cache, a map buffer/cache, and the like.

In an embodiment, the memory 144 may be implemented with a volatile memory. For example, the memory 144 may be implemented with a static random access memory (SRAM), a dynamic random access memory (DRAM), or both. Although FIG. 12 illustrates, for example, the memory 144 disposed within the controller 130, the embodiments are not limited thereto. The memory 144 may be located within or external to the controller 130. For instance, the memory 144 may be embodied by an external volatile memory having a memory interface transferring data and/or signals between the memory 144 and the controller 130.

The processor 134 may control the overall operations of the memory system 110. For example, the processor 134 can control a program operation or a read operation of the memory device 150, in response to a write request or a read request entered from the host 102. According to an embodiment, the processor 134 may execute firmware to control the program operation or the read operation in the memory system 110. Herein, the firmware may be referred to as a flash translation layer (FTL). An example of the FTL is later described in detail, referring to FIG. 3. In an embodiment, the processor 134 may be implemented with a microprocessor or a central processing unit (CPU).

Further, in an embodiment, the memory system 110 may be implemented with at least one multi-core processor. The multi-core processor is, for example, a circuit or chip in which two or more cores, which are considered distinct processing regions, are integrated. For example, when a plurality of cores in the multi-core processor drive or execute a plurality of flash translation layers (FTLs) independently, data input/output speed (or performance) of the memory system 110 may be improved. According to an embodiment, the data input/output (I/O) control circuitry 198 and the information collection circuitry 192 described in FIG. 1 may be independently performed through different cores in the multi-core processor.

The processor 134 in the controller 130 may perform an operation corresponding to a request or a command inputted from the host 102. Further, the memory system 110 may be independent of a command or a request inputted from an external device such as the host 102. Typically, an operation performed by the controller 130 in response to the request or the command inputted from the host 102 may be considered a foreground operation, while an operation performed by the controller 130 independently (e.g., regardless of the request or the command inputted from the host 102) may be considered a background operation. The controller 130 can perform the foreground or background operation for read, write or program, erase and others regarding data in the memory device 150. In addition, a parameter set operation corresponding to a set parameter command or a set feature command as a set command transmitted from the host 102 may be considered a foreground operation. As a background operation without a command transmitted from the host 102, the controller 130 can perform garbage collection (GC), wear leveling (WL), bad block management for identifying and processing bad blocks, or others may be performed, in relation to a plurality of memory blocks 152, 154, 156 included in the memory device 150.

In an embodiment, substantially similar operations may be performed as both the foreground operation and the background operation. For example, if the memory system 110 performs garbage collection in response to a request or a command inputted from the host 102 (e.g., Manual GC), garbage collection can be considered a foreground operation. However, when the memory system 110 may perform garbage collection independently of the host 102 (e.g., Auto GC), garbage collection can be considered a background operation.

When the memory device 150 includes a plurality of dies (or a plurality of chips) including non-volatile memory cells, the controller 130 may be configured to perform a parallel processing regarding plural requests or commands inputted from the host 102 in to improve performance of the memory system 110. For example, the transmitted requests or commands may be divided into and processed simultaneously in a plurality of dies or a plurality of chips in the memory device 150. The memory interface 142 in the controller 130 may be connected to a plurality of dies or chips in the memory device 150 through at least one channel and at least one way. When the controller 130 distributes and stores pieces of data in the plurality of dies through each channel or each way in response to requests or commands associated with a plurality of pages including nonvolatile memory cells, plural operations corresponding to the requests or the commands can be performed simultaneously or in parallel. Such a processing method or scheme can be considered as an interleaving method. Because data input/output speed of the memory system 110 operating with the interleaving method may be faster than that without the interleaving method, data I/O performance of the memory system 110 can be improved.

By the way of example but not limitation, the controller 130 can recognize statuses regarding a plurality of channels (or ways) associated with a plurality of memory dies included in the memory device 150. The controller 130 may determine the state of each channel or each way as one of a busy state, a ready state, an active state, an idle state, a normal state and/or an abnormal state. The controller's determination of which channel or way an instruction (and/or a data) is delivered through can be associated with a physical block address, e.g., which die(s) the instruction (and/or the data) is delivered into. The controller 130 can refer to descriptors delivered from the memory device 150. The descriptors can include a block or page of parameters that describe something about the memory device 150, which is data with a predetermined format or structure. For instance, the descriptors may include device descriptors, configuration descriptors, unit descriptors, and others. The controller 130 can refer to, or use, the descriptors to determine which channel(s) or way(s) an instruction or a data is exchanged via.

Referring to FIG. 12, the memory device 150 in the memory system 110 may include the plurality of memory blocks 152, 154, 156. Each of the plurality of memory blocks 152, 154, 156 includes a plurality of nonvolatile memory cells. According to an embodiment, the memory block 152, 154, 156 can be a group of nonvolatile memory cells erased together. The memory block 152, 154, 156 may include a plurality of pages which is a group of nonvolatile memory cells read or programmed together. Although not shown in FIG. 12, each memory block 152, 154, 156 may have a three-dimensional stack structure for a high integration. Further, the memory device 150 may include a plurality of dies, each die including a plurality of planes, each plane including the plurality of memory blocks 152, 154, 156. Configuration of the memory device 150 can be different for performance of the memory system 110.

In the memory device 150 shown in FIG. 12, the plurality of memory blocks 152, 154, 156 are included. The plurality of memory blocks 152, 154, 156 can be any of different types of memory blocks such as a single level cell (SLC) memory block, a multi-level cell (MLC) Cell) memory block or others, according to the number of bits that can be stored or represented in one memory cell. In an embodiment, the SLC memory block includes a plurality of pages implemented by memory cells, each storing one bit of data. The SLC memory block can have high data I/O operation performance and high durability. The MLC memory block includes a plurality of pages implemented by memory cells, each storing multi-bit data (e.g., two bits or more). The MLC memory block can have larger storage capacity for the same space compared to the SLC memory block. The MLC memory block can be highly integrated in a view of storage capacity. In an embodiment, the memory device 150 may be implemented with MLC memory blocks such as a double level cell (DLC) memory block, a triple level cell (TLC) memory block, a quadruple level cell (QLC) memory block and a combination thereof. The double level cell (DLC) memory block may include a plurality of pages implemented by memory cells, each capable of storing 2-bit data. The triple level cell (TLC) memory block can include a plurality of pages implemented by memory cells, each capable of storing 3-bit data. The quadruple level cell (QLC) memory block can include a plurality of pages implemented by memory cells, each capable of storing 4-bit data. In another embodiment, the memory device 150 can be implemented with a block including a plurality of pages implemented by memory cells, each capable of storing 5-bit or more bit data.

In an embodiment, the controller 130 may use a multi-level cell (MLC) memory block included in the memory system 150 as a SLC memory block that stores one-bit data in one memory cell. A data input/output speed of the multi-level cell (MLC) memory block can be slower than that of the SLC memory block. When the MLC memory block is used as the SLC memory block, a margin for a read or program operation can be reduced. The controller 130 can utilize a faster data input/output speed of the multi-level cell (MLC) memory block when using the multi-level cell (MLC) memory block as the SLC memory block. For example, the controller 130 can use the MLC memory block as a buffer to temporarily store a piece of data, because the buffer may require a high data input/output speed for improving performance of the memory system 110.

In an embodiment, the controller 130 may program pieces of data in a multi-level cell (MLC) a plurality of times without performing an erase operation on a specific MLC memory block included in the memory system 150. In general, nonvolatile memory cells have a feature that does not support data overwrite. The controller 130 may use a feature in which a multi-level cell (MLC) may store multi-bit data, in order to program plural pieces of 1-bit data in the MLC a plurality of times. For the MLC overwrite operation, the controller 130 may store the number of program times as separate operation information when a piece of 1-bit data is programmed in a nonvolatile memory cell. In an embodiment, an operation for uniformly levelling threshold voltages of nonvolatile memory cells can be carried out before another piece of data is overwritten in the same nonvolatile memory cells.

In an embodiment of the disclosure, the memory device 150 is embodied as a nonvolatile memory such as a flash memory such as a NAND flash memory, a NOR flash memory or others. Alternatively, the memory device 150 may be implemented by at least one of a phase change random access memory (PCRAM), a ferroelectrics random access memory (FRAM), a spin injection magnetic memory (SU-RAM), a spin transfer torque magnetic random access memory (STT-MRAM), or others.

Referring to FIGS. 11 and 12, the memory system 110 may generate first map information L2P MAP INFO1 which maps a physical address of data in the memory device 150, corresponding to a logical address inputted from the host 102. The entire first map information L2P MAP INFO1 may be stored in at least one memory block MEMORY BLOCK<2> in the memory device 150, in a nonvolatile state. Also, some first map information SOME L2P MAP INFO1 of the entire first map information L2P MAP INFO1 stored in the memory device 150 may be stored in the memory 144 in the controller 130. Further, some second map information L2P MAP INFO2 of the entire first map information L2P MAP INFO1 stored in the memory device 150 may be transmitted to the host 102 and be stored in the host memory 106. The some first map information SOME L2P MAP INFO1 and the second map information L2P MAP INFO2 may not overlap each other. After transmitting the second map information L2P MAP INFO2 to the host 102, the controller 130 may generate log information OUT_INFO of L2P MAP INFO2 on the second map information L2P MAP INFO2.

While FIG. 12 illustrates that the log information OUT_INFO of L2P MAP INFO2 on the second map information L2P MAP INFO2 is stored in the memory 144, the invention may not be limited. In practice, the log information OUT_INFO of L2P MAP INFO2 on the second map information L2P MAP INFO2 may be stored in the memory 144 and at the same time may be stored in a specific memory block of the memory device 150 in a nonvolatile state.

Figure 13:
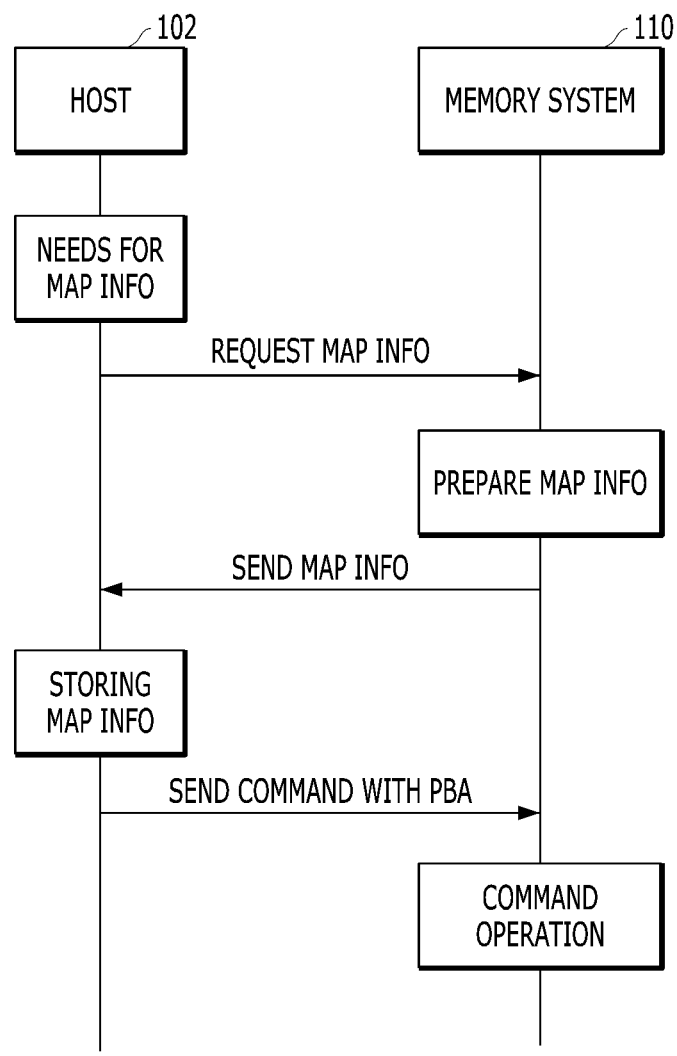
FIG. 13 illustrates another operation of the host and the memory system in accordance with the embodiment of the disclosure.

FIG. 13 illustrates a second operation between a host and a memory system according to an embodiment of the disclosure. Specifically, FIG. 13 illustrates an operation where the host 102 first requests map information to the memory system 110 and then the memory system 110 transmits map information in response to a request of the host 102.

Referring to FIG. 13, a need for map information may occur at the host 102. For example, if the host 102 can allocate a space to store map information, or if the host 102 expects faster data input/output (I/O) of the memory system 110, the host 102 may request the map information to the memory system 110. In addition, a need for the map information may also be generated by the host 102 at a user's request.

The host 102 may request map information to the memory system 110. The memory system 110 may prepare the map information in response to the request from the host 102. In an embodiment, the host 102 may request specific map information such as a specific range of map information from the memory system 110. In another embodiment, the host 102 may generally request map information from the memory system 110, and the memory system 110 may determine which map information is provided to the host 102.

After the memory system 110 sends prepared map information to the host 102, the host 102 may store the map information in an internal storage space, e.g., the host memory 106 described with reference to FIGS. 2 and 3.

Using the stored map information, the host 102 may add the physical address PBA in a format of a command COMMAND and send the format of the command COMMAND with the physical address PBA to the memory system 110. Then, the memory system 110 may use the physical address PBA received with the command COMMAND from the host 102 to perform an operation corresponding to the command COMMAND.

Figure 14:
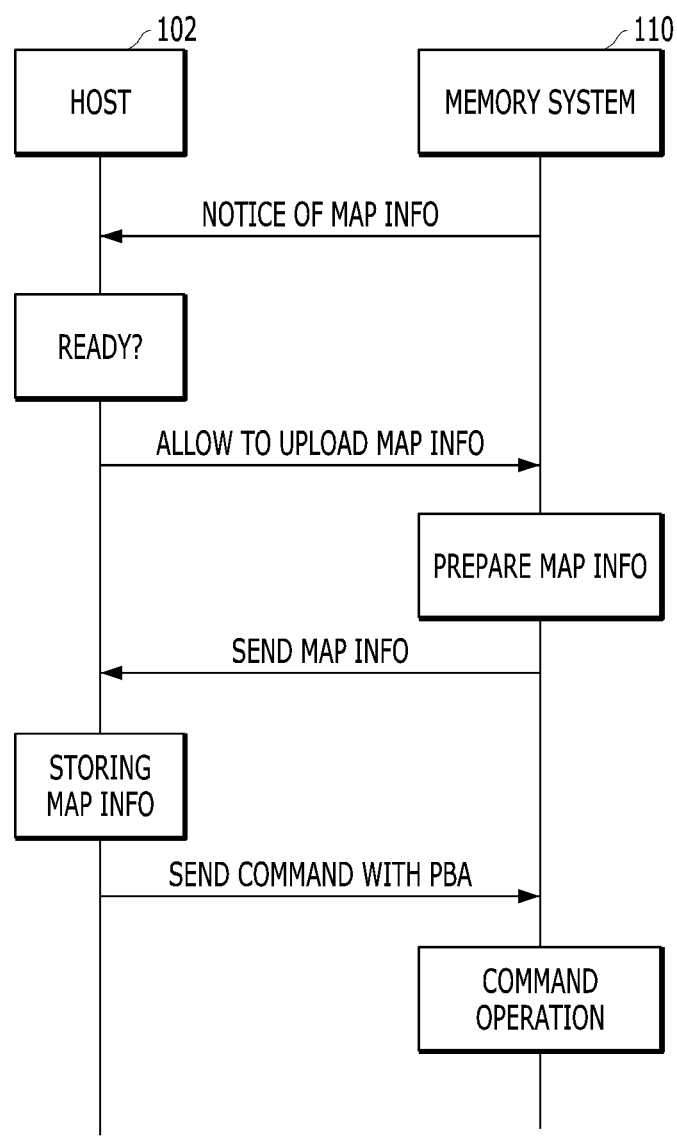
FIG. 14 illustrates another operation of the host and the memory system in accordance with the embodiment of the disclosure.

FIG. 14 illustrates a third operation between a host and a memory system according to an embodiment of the disclosure. Specifically, FIG. 14 illustrates an operation where the memory system 110 inquires the host 102 for transmitting map information, the host 102 determines whether to allow transmission from the memory system 110, and the host 102 receives the map information in response to the inquiry of the memory system 110.

Referring to FIG. 14, the memory system 110 may notify the host 102 of transmitting map information. The host 102 may determine whether the host 102 can store the map information associated with the notification regarding transmission of the map information, which is delivered from the memory system 110. If the host 102 can receive and store the map information received from the memory system 110, the host 102 may allow the memory system 1100 to transfer the map information. According to an embodiment, the memory system 110 may prepare map information to be transmitted, and then transmit the prepared map information to the host 102.

The host 102 may store the received map information in an internal storage space (e.g., the memory 106 described with reference to FIGS. 2 and 3). The host 102 may generate a command with a physical address PBA, which are to be transmitted to the memory system 110, after performing a mapping operation based on the stored map information.

The memory system 110 may check whether the physical address PBA is included in the command from the host 102, and apply the physical address PBA to perform an operation corresponding to the command.

Regarding the transmission of the map information, FIG. 13 illustrates that the host 102 may initially perform the operation between the host 102 and the memory system 110 described with reference to FIG. 13. In contrast, FIG. 14 illustrates that the memory system 110 may initially perform the operation between the host 102 and the memory system 110. In other embodiments, the memory system 110 may perform the transmission of the map information differently. According to an operational condition or environment, the memory system 1102 and the host 110 may selectively use a method for transmitting map information described with reference to FIGS. 8 and 9.

Figure 15:
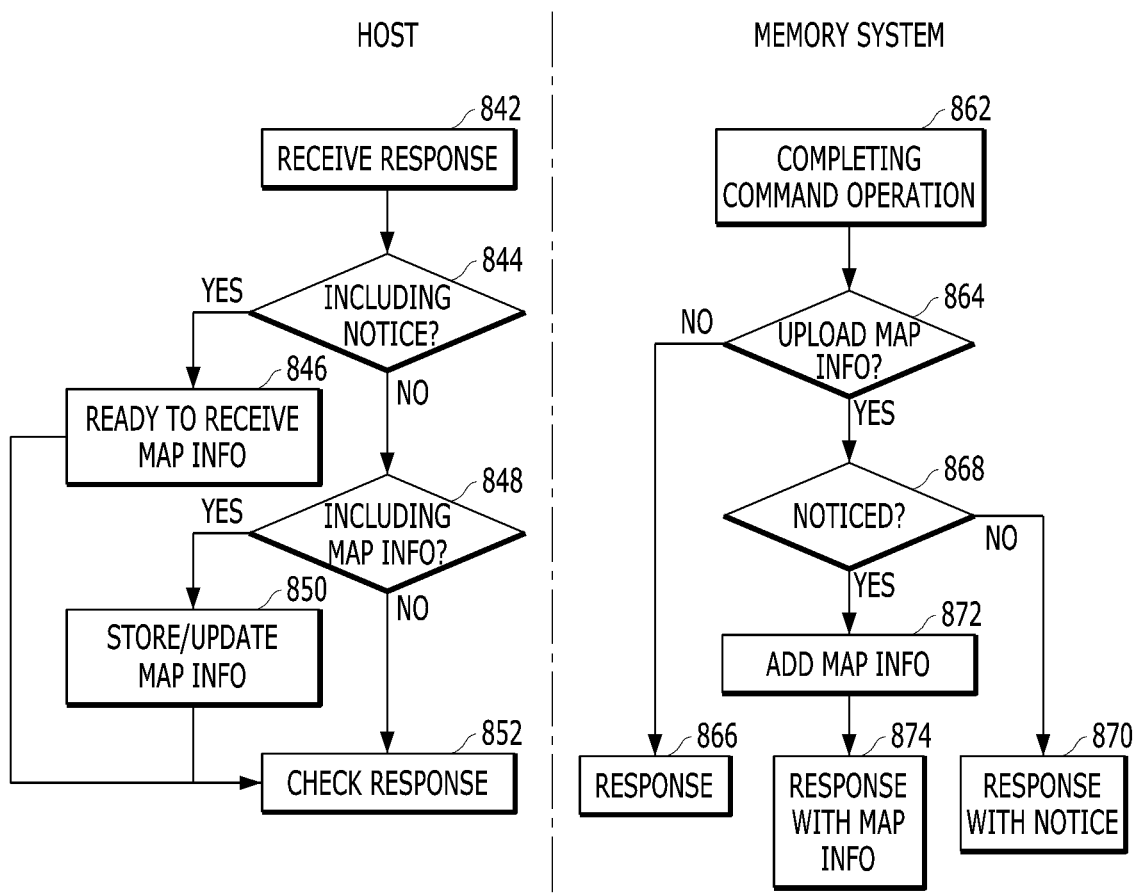
FIG. 15 illustrates another operation of the host and the memory system in accordance with the embodiment of the disclosure.

FIG. 15 illustrates a fourth operation between a host and a memory system according to an embodiment of the disclosure. In detail, FIG. 15 illustrates a case where the memory system attempts to transmit map information to the host while the host and the memory system are operatively engaged with each other.

Referring to FIG. 15, the memory system may determine whether an operation corresponding to a command received from a host is completed (step 862). After the operation corresponding to the command is completed, the memory system may check whether there is map information to be transmitted (i.e., uploaded) to the host before transmitting a response corresponding to the command (step 864). If there is no map information to be transmitted to the host (NO in step 864), the memory system may transmit a response RESPONSE including information (e.g., success or failure) regarding whether the operation corresponding to the command from the host has completed (step 866).

When the memory system recognizes map information to be transmitted to the host (YES of step 864), the memory system may check whether a notice NOTICE for transmitting the map information has been made (step 868). The notification may be similar to that described with reference to FIG. 15. When the memory system is to send the map information but the notification regarding the memory system sending the map information to the host has not been made in advance (NO of step 868), the memory system may add the notice NOTICE to the response RESPONSE. In addition, the memory system may transmit the response RESPONSE with the notice NOTICE to the host (step 870).

When the notice NOTICE for inquiring transmission of the map information has already been made (YES of step 868), the memory system may add the map information to the response RESPONSE (step 872). Thereafter, the memory system may transmit a response with the map information (step 874). According to an embodiment, the host may send permission for transmitting the map information to the memory system before the memory system transmits the map information to the host.

The host may receive at least one of the response RESPONSE, the response including the notice (RESPONSE WITH NOTICE), and the response including the map information (RESPOSNE WITH MAP INFO), from the memory system (step 842).

The host may verify whether the received response includes the notice (step 844). If the received response includes the notice (YES of step 844), the host may prepare to receive and store map information that may be delivered later (step 846). Thereafter, the host may check the response corresponding to a command previously transmitted to the memory system (step 852). For example, the host may check the response to confirm whether an operation corresponding to a command previously sent has succeeded or failed in the memory system.

When the received response does not include the notice (NO of step 844), the host may determine whether the response includes map information (step 848). When the response does not include map information (NO of step 848), the host may check the response corresponding to the command previously transmitted to the memory system (step 852).

When the received response includes map information (YES of step 848), the host may store the map information in the response within a storage space (e.g., a host memory 106 of FIG. 3) or update the map information already stored in the storage space (step 850). Then, the host may check the response corresponding to the command previously transmitted to the memory system (step 852).

Figure 16A:
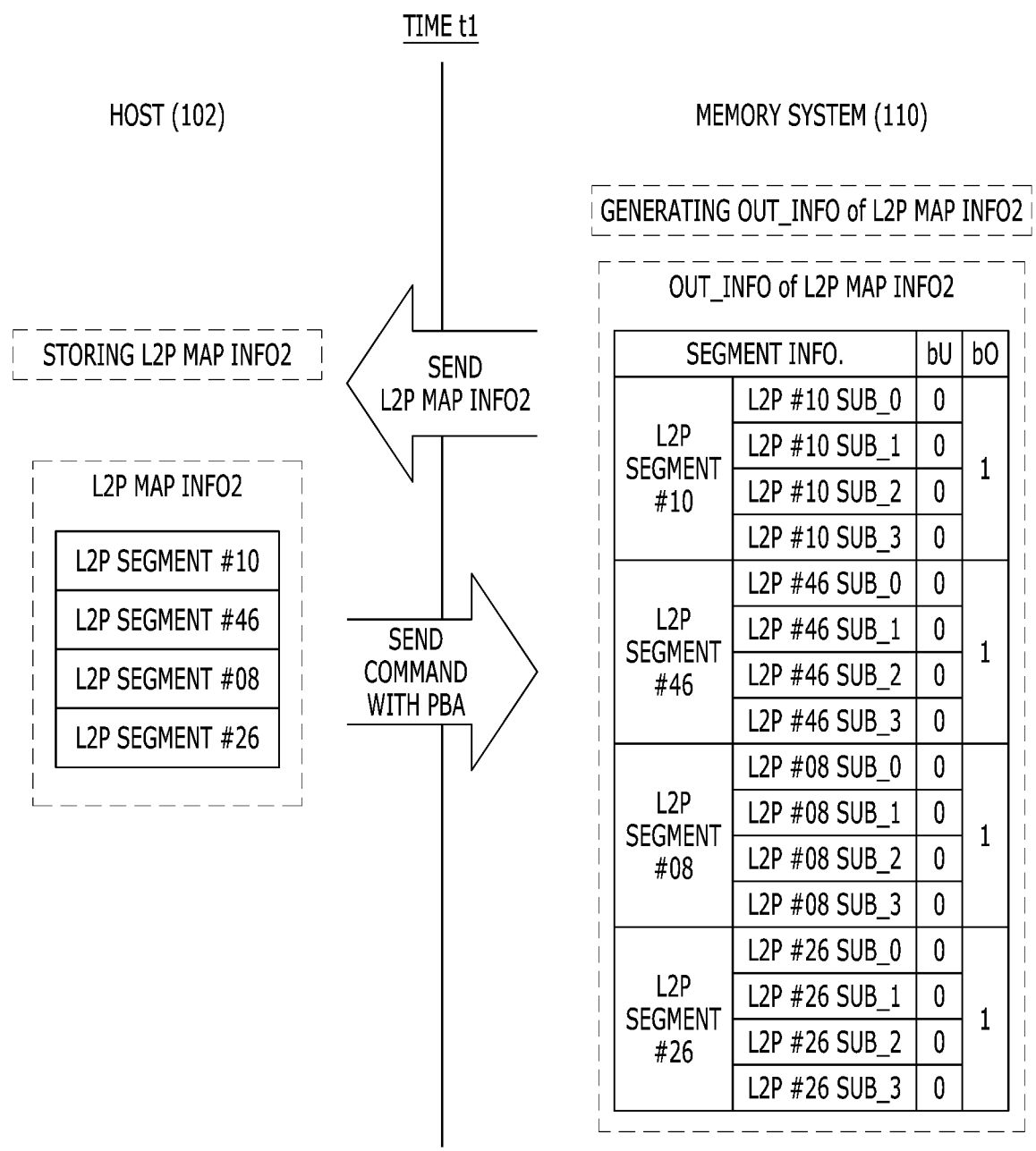
FIGS. 16A to 16C show a first operation in which the host and the memory system share map information in accordance with the embodiment of the disclosure.
Figure 16B:
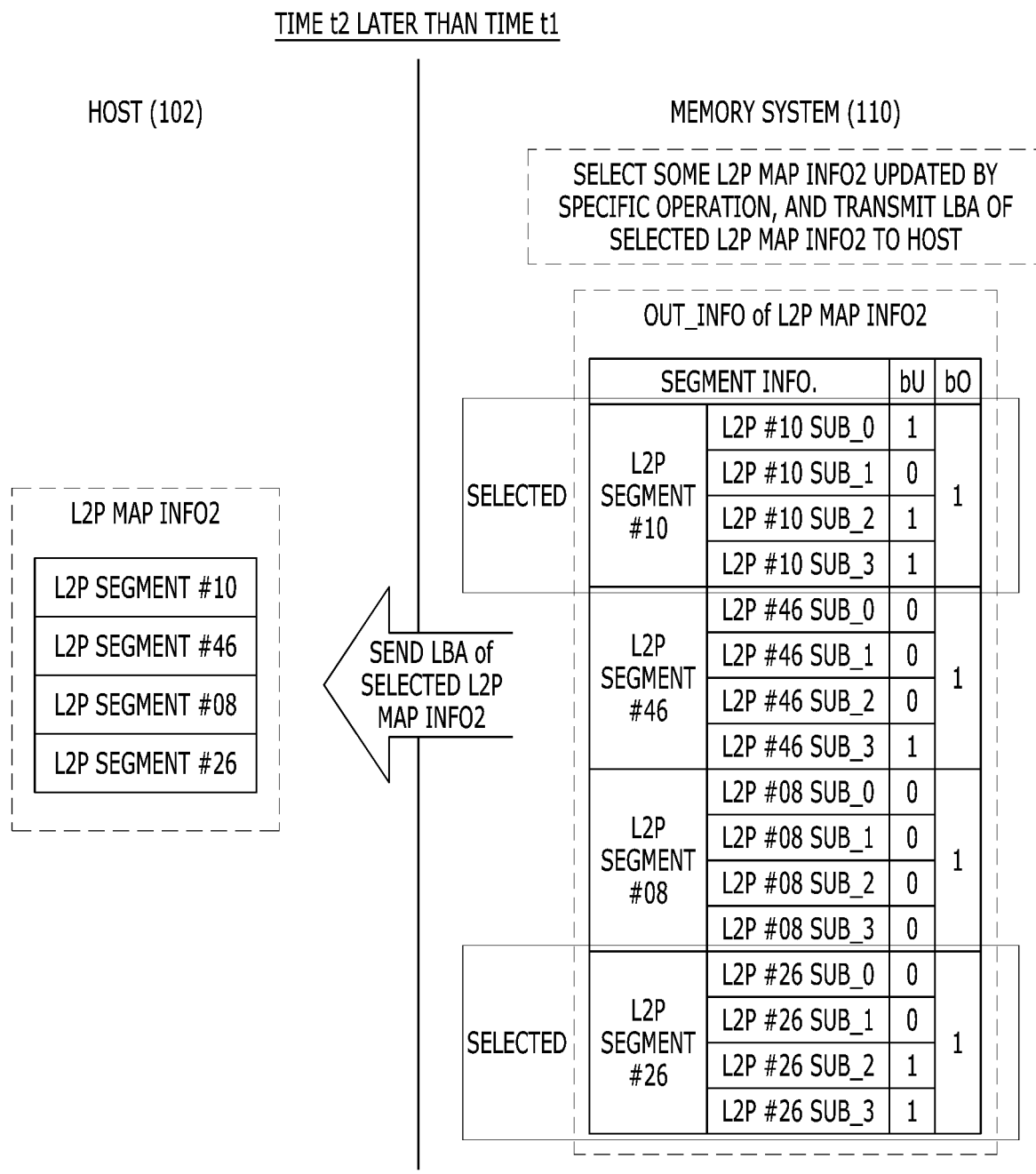
Figure 16C:
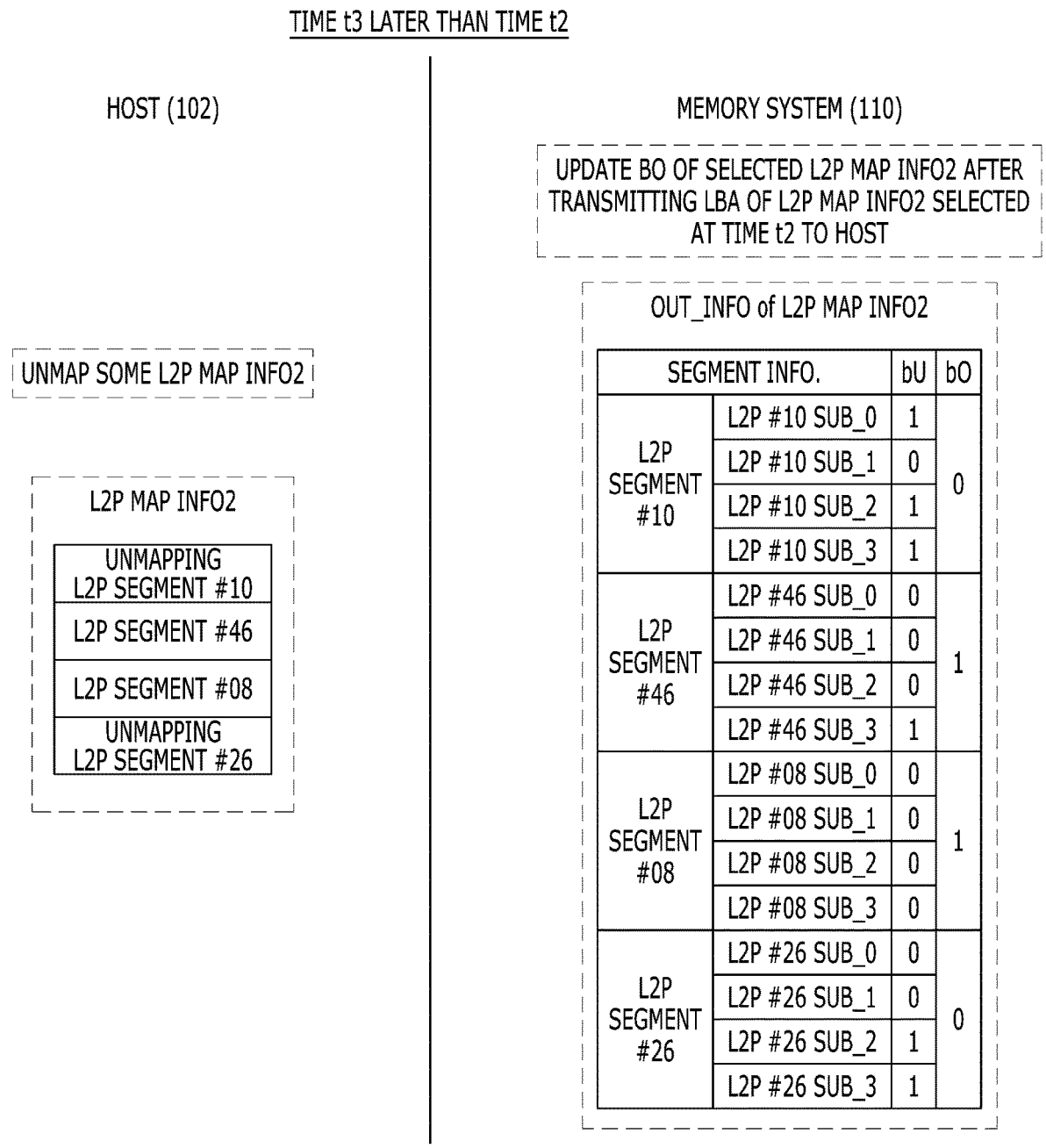

FIGS. 16A to 16C are diagrams illustrating a first operation in which the host 102 and the memory system 110 share map information in accordance with the embodiment of the disclosure.

FIG. 16A may illustrate an operation of sharing map information between the host 102 and the memory system 110 at a time t1, FIG. 16B may illustrate an operation of sharing map information between the host 102 and the memory system 110 at a time t2, and FIG. 16C may illustrate an operation of sharing map information between the host 102 and the memory system 110 at a time t3.

At the time t1, second map information L2P MAP INFO2 newly generated by the memory system 110 is transferred to and stored in the host 102 and thus the host 102 and the memory system 110 share the second map information L2P MAP INFO2 for the first time. Therefore, at the time t1, the second map information L2P MAP INFO2 which is shared by the host 102 and the memory system 110 may be in a state in which it is not updated. At the time t2 later than the time t1, only the second map information L2P MAP INFO2 stored in the memory system 110 includes some updated map information as a predetermined operation is performed and the host 102 is not aware of the fact that the some map information of the second map information L2P MAP INFO2 is updated. At the time t3 later than the time t2, the host 102 is aware of the fact that the some map information of the second map information L2P MAP INFO2 is updated and unmaps the updated some map information of the second map information L2P MAP INFO2 stored in the host 102.

Referring to FIG. 16A, at the time t1, the controller 130 may generate first map information L2P MAP INFO1 to map a physical address in the memory device 150 to a logical address from the host 102. Also, at the time t1, the controller 130 may output the some second map information L2P MAP INFO2 of the first map information L2P MAP INFO1 to the host 102 (SEND L2P MAP INFO2). Further, at the time t1, corresponding to the output of the second map information L2P MAP INFO2 to the host 102, the controller 130 may generate log information OUT_INFO of L2P MAP INFO2 on the second map information L2P MAP INFO2 (GENERATING OUT_INFO of L2P MAP INFO2). Moreover, at the time t1, the host 102 may store the second map information L2P MAP INFO2 received from the memory system 110, in the host memory 106 (STORING L2P MAP INFO2). After the time t1, the host 102 may generate a physical address and a command to be transferred to the memory system 110, based on the second map information L2P MAP INFO2. Further, the host 102 may send the command with the physical address to the memory system 110 (SEND COMMAND WITH PBA). That is, based on a logical address to be transferred to the memory system 110, the host 102 may find a physical address corresponding to the logical address, in the second map information L2P MAP INFO2 stored therein. If the physical address exists, the host 102 may transfer the command with the logical address and the physical address to the memory system 110. If the physical address does not exist, the host 102 may transfer the command with the logical address to the memory system 110. The memory system 110 may receive the command with the physical address from the host 102 and may perform a command operation corresponding to the command. For example, when the host 102 transfers the physical address corresponding to a read command, the controller 130 may access and output data using the corresponding physical address, thereby reducing a time required for the command operation corresponding to the read command.

The second map information L2P MAP INFO2 may be managed in the unit of a map segment. That is, a plurality of map segments may be included in the second map information L2P MAP INFO2, and the second map information L2P MAP INFO2 to be outputted to the host 102 from the memory system 110 may include at least one map segment. The log information OUT_INFO of L2P MAP INFO2 on the second map information L2P MAP INFO2 may also be generated in a form for identifying a map segment. For example, the second map information L2P MAP INFO2 may include four map segments L2P SEGMENT #10, L2P SEGMENT #46, L2P SEGMENT #08 and L2P SEGMENT #26. Therefore, the log information OUT_INFO of L2P MAP INFO2 may also be generated in a form for identifying a map segment.

Further, when generating the log information OUT_INFO of L2P MAP INFO2 on the second map information L2P MAP INFO2, the controller 130 may generate output information bO corresponding to the four map segments L2P SEGMENT #10, L2P SEGMENT #46, L2P SEGMENT #08 and L2P SEGMENT #26. In other words, through the output information bO, the controller 130 may indicate which map segment of the four map segments L2P SEGMENT #10, L2P SEGMENT #46, L2P SEGMENT #08 and L2P SEGMENT #26 in the second map information L2P MAP INFO2 is outputted to the host 102 and which map segment is not outputted to the host 102. For example, in the drawing, a map segment of which the value of the output information bO is '1' is outputted to the host 102 and a map segment of which the value of the output information bO is '0' is not outputted to the host 102. Unlike the illustration of the drawing, after the four map segments L2P SEGMENT #10, L2P SEGMENT #46, L2P SEGMENT #08 and L2P SEGMENT #26 of a plurality of map segments (not illustrated) in the first map information L2P MAP INFO1 are identified as the second map information L2P MAP INFO2, before the four map segments L2P SEGMENT #10, L2P SEGMENT #46, L2P SEGMENT #08 and L2P SEGMENT #26 are outputted to the host 102. Here, the values of all of the four output information bO corresponding to the four map segments L2P SEGMENT #10, L2P SEGMENT #46, L2P SEGMENT #08 and L2P SEGMENT #26 in the second map information L2P MAP INFO2 may be '0' indicating 'not outputted.' Thus, the controller 130 may identify all of the four map segments L2P SEGMENT #10, L2P SEGMENT #46, L2P SEGMENT #08 and L2P SEGMENT #26 in the second map information L2P MAP INFO2, as output map segments, by referring to the four output information bO. Then, each time at least one map segment identified as an output map segment of the four map segments L2P SEGMENT #10, L2P SEGMENT #46, L2P SEGMENT #08 and L2P SEGMENT #26 in the second map information L2P MAP INFO2 is outputted to the host 102, the controller 130 may update a value of output information bO corresponding to the at least one map segment identified as an output map segment outputted to the host 102, to '1' indicating 'outputted.' Therefore, since in FIG. 16A all of the four map segments L2P SEGMENT #10, L2P SEGMENT #46, L2P SEGMENT #08 and L2P SEGMENT #26 in the second map information L2P MAP INFO2 are transmitted to the host 102, it may be seen that the values of all the four output information bO corresponding to the four map segments L2P SEGMENT #10, L2P SEGMENT #46, L2P SEGMENT #08 and L2P SEGMENT #26 are '1.'

As the operation SEND L2P MAP INFO2 of outputting the second map information L2P MAP INFO2 to the host 102 from the memory system 110, the operation described above with reference to FIGS. 7 to 10 may be used.

In detail, when at least one map segment identified as an output map segment exists as a result of checking by referring to the output information bO, the controller 130 may output at least one map segment identified as an output map segment, to the host 102, which corresponds to a first command from the host 102. The first command is not limited. For example, the first command may be a read command, a write command or an erase command. According to an embodiment, the first command may be a command which is specially set for the host 102 to receive second map information from the memory system 110.

According to an embodiment, as described above with reference to FIGS. 7 and 8, after performing a command operation corresponding to the first command from the host 102, when at least one map segment identified as an output map segment exists as a result of checking by referring to the output information bO, the controller 130 may output at least one map segment identified as an output map segment, by including it in a response to the first command, which is to be outputted to the host 102. According to an embodiment, as described above with reference to FIGS. 9 and 10, when at least one map segment identified as an output map segment exists as a result of checking by referring to the output information bO, the controller 130 may notice a request for outputting the second map information L2P MAP INFO2 to the host 102. When the request for outputting the second map information L2P MAP INFO2 is noticed from the memory system 110, the host 102 may check a state of the memory 106 therein, may selectively generate the first command depending on a checking result, and may output the first command to the memory system 110. When the first command is received from the host 102 depending on a determination of the host 102, after a command operation corresponding to the first command is performed, at least one map segment identified as an output map segment may be outputted by being included in a response to the first command, which is to be outputted to the host 102. According to an embodiment, when at least two map segments are determined as output map segments, the controller 130 may output a predetermined number of map segments to the host 102 by successively including them in a response to one first command.

When generating the log information OUT_INFO of L2P MAP INFO2 on the second map information L2P MAP INFO2, the controller 130 may generate the log information OUT_INFO of L2P MAP INFO2 not only in the form for identifying map segments but also in a form for divisionally identifying four map sub-segments L2P #10 SUB_0, L2P #10 SUB_1, L2P #10 SUB_2, L2P #10 SUB_3, L2P #46 SUB_0, L2P #46 SUB_1, L2P #46 SUB_2, L2P #46 SUB_3, L2P #08 SUB_0, L2P #08 SUB_1, L2P #08 SUB_2, L2P #08 SUB_3, L2P #26 SUB_0, L2P #26 SUB_1, L2P #26 SUB_2 and L2P #26 SUB_3 of the respective four map segments L2P SEGMENT #10, L2P SEGMENT #46, L2P SEGMENT #08 and L2P SEGMENT #26. This is because: when the second map information L2P MAP INFO2 is identified in the unit of a map segment, the number of logical/physical information in one map segment may include a plurality of map information, and, when a substantially small number of logical/physical information among the plurality of map information is updated, if it is determined that the entire one map segment is updated, an inefficient operation may be caused. When a specific segment is determined to be in an updated state, the controller 130 may need to perform an operation of outputting the specific segment to the host 102 or storing the specific segment in the memory device 150. By identifying one segment through dividing it into a plurality of sub-segments to efficiently perform an operation of determining an updated state of a specific segment, the controller 130 may prevent the specific segment from being too frequently updated or outputted to the host 102.

In detail, when generating the log information OUT_INFO of L2P MAP INFO2 on the four map segments L2P SEGMENT #10, L2P SEGMENT #46, L2P SEGMENT #08 and L2P SEGMENT #26 in the second map information L2P MAP INFO2, the controller 130 may generate 16 update information bU corresponding to the 16 map sub-segments L2P #10 SUB_0, L2P #10 SUB_1, L2P #10 SUB_2, L2P #10 SUB_3, L2P #46 SUB_0, L2P #46 SUB_1, L2P #46 SUB_2, L2P #46 SUB_3, L2P #08 SUB_0, L2P #08 SUB_1, L2P #08 SUB_2, L2P #08 SUB_3, L2P #26 SUB_0, L2P #26 SUB_1, L2P #26 SUB_2 and L2P #26 SUB_3. Through the 16 update information bU, the controller 130 may indicate which map sub-segment among the 16 map sub-segments in the second map information L2P MAP INFO2 is updated and which map sub-segment is not updated. When the occupation percentage of update information bU indicating 'updated' of the four update information bO corresponding to one specific map segment is greater than or equal to a predetermined percentage, the controller 130 may determine the one specific map segment to be in an updated state. For example, in the drawing, a map sub-segment of which the value of the update information bU is '0' is not updated and a map sub-segment of which the value of the update information bU is '1' is updated. Since in FIG. 16A none of the 16 map sub-segments in the second map information L2P MAP INFO2 are updated, it may be seen that all of the 16 update information bU corresponding to the 16 map sub-segments are '0.'

When a command from the host 102 includes not only a logical address but also a physical address as a result of checking, the controller 130 may determine the validity of the physical address by referring to update information Bu, as shown in FIG. 6. For example, when a read command from the host 102 includes a first logical address and a first physical address, the controller 130 may determine the validity of the first physical address by checking the update information bU of the map sub-segment corresponding to the first logical address in the log information OUT_INFO of L2P MAP INFO2 on the second map information L2P MAP INFO2. As a result of checking the update information bU, when the update information bU has the value of '0' indicating 'not updated,' the controller 130 may determine the first physical address as valid. Therefore, the controller 130 may perform the read command from the host 102, using the first physical address. Conversely, as a result of checking the update information bU, when the update information bU has the value of '1' indicating 'updated,' the controller 130 may determine the first physical address as invalid. Therefore, the controller 130 may neglect the first physical address and search for a valid physical address corresponding to the first logical address in the first map information L2P MAP INFO1. Then, the controller 130 may perform the read command from the host 102, by using a searched valid physical address.

Referring to FIG. 16B, at the time t2 later than the time t1, the controller 130 may identify map information updated by a predetermined operation PREDETERMINED OPERATION (see FIG. 1) of the second map information L2P MAP INFO2, as third map information SELECTED L2P MAP INFO2. For example, it may be seen that, of the four map segments L2P SEGMENT #10, L2P SEGMENT #46, L2P SEGMENT #08 and L2P SEGMENT #26 in the second map information L2P MAP INFO2, the first and fourth map segments L2P SEGMENT #10 and L2P SEGMENT #26 are updated by the predetermined operation and are identified as the third map information.

In detail, in the first map segment L2P SEGMENT #10, it may be seen that, of the four map sub-segments L2P #10 SUB_0, L2P #10 SUB_1, L2P #10 SUB_2 and L2P #10 SUB_3 included therein, the values of the update information bU corresponding to the first, third and fourth map sub-segments L2P #10 SUB_0, L2P #10 SUB_2 and L2P #10 SUB_3 are '1' indicating 'updated.' Further, according to a predetermined reference (e.g., 40%), the first map segment L2P SEGMENT #10 may be determined as the third map information. In the second map segment L2P SEGMENT #46, it may be seen that, of the four map sub-segments L2P #46 SUB_0, L2P #46 SUB_1, L2P #46 SUB_2 and L2P #46 SUB_3 included therein, the value of the update information bU corresponding to the fourth map sub-segment L2P #46 SUB_3 is '1' indicating 'updated.' Further, according to the predetermined reference (e.g., 40%), the second map segment L2P SEGMENT #46 may not be determined as the third map information. In the third map segment L2P SEGMENT #08, it may be seen that the values of all of the update information bU corresponding to the four map sub-segments L2P #08 SUB_0, L2P #08 SUB_1, L2P #08 SUB_2 and L2P #08 SUB_3 included therein are '0' indicating 'not updated.' Further, according to the predetermined reference (e.g., 40%), the third map segment L2P SEGMENT #08 may not be determined as the third map information. In the fourth map segment L2P SEGMENT #26, it may be seen that, of the four map sub-segments L2P #26 SUB_0, L2P #26 SUB_1, L2P #26 SUB_2 and L2P #26 SUB_3 included therein, the values of the update information bU corresponding to the third and fourth map sub-segments L2P #26 SUB_2 and L2P #26 SUB_3 are '1' indicating 'updated.' Further, according to the predetermined reference (e.g., 40%), the fourth map segment L2P SEGMENT #26 may be determined as the third map information.

The controller 130 may output logical addresses LBA of at least one selected map segment identified as the third map information to the host 102, in response to a command from the host 102 (SEND LBA of SELECTED L2P MAP INFO2). For example, the controller 130 may output logical addresses LBA of the first and fourth map segments L2P SEGMENT #10 and L2P SEGMENT #26 which are identified as the third map information, to the host 102. At this time, the controller 130 may output logical addresses LBA of one or more selected map segments identified as the third map information, to the host 102, by grouping the logical addresses LBA in the unit of a segment. Also, the controller 130 may select logical addresses LBA of one or more selected map segments identified as the third map information, and may output selected logical addresses LBA to the host 102. Here, selecting logical addresses LBA of selected map segments in the unit of a segment may mean selecting, at once, all of a plurality of logical addresses in one segment. Conversely, selecting logical addresses LBA of selected map segments may mean selecting some logical addresses of the logical addresses included in one segment and not selecting the remaining logical addresses included in the one segment. For example, the controller 130 may output, at once, the logical addresses LBA of the first map segment L2P SEGMENT #10 of the logical addresses LBA of the first and fourth map segments L2P SEGMENT #10 and L2P SEGMENT #26 identified as the third map information, to the host 102. Then, the controller 130 may output, at once, the logical addresses LBA of the fourth map segment L2P SEGMENT #26 to the host 102. Also, the controller 130 may select logical addresses LBA of the first and fourth map segments L2P SEGMENT #10 and L2P SEGMENT #26 identified as the third map information, and output the selected logical addresses LBA to the host 102. As the operation SEND LBA of SELECTED L2P MAP INFO2 of outputting the logical addresses LBA of one or more selected map segments identified as the third map information, from the memory system 110 to the host 102, the operation described above with reference to FIGS. 7 to 10 may be used.

In detail, as described above with reference to FIG. 7, after performing a command operation corresponding to a second command from the host 102, when the third map information exists as a result of checking, the controller 130 may output logical addresses LBA of one or more selected map segments in the third map information, in the unit of a segment or one by one, by including them in a response to the second command, which is to be outputted to the host 102. The second command may not be limited. For example, the second command may be a read command, a write command or an erase command. For example, at the time t2, after performing a read operation corresponding to a read command from the host 102, the controller 130 may output the logical addresses LBA of the first and fourth map segments L2P SEGMENT #10 and L2P SEGMENT #26 identified as the third map information, in the unit of a segment or one by one, by including them in a response to the read command. For another example, at the time t2, after performing a program operation corresponding to a program command from the host 102, the controller 130 may output the logical addresses LBA of the first and fourth map segments L2P SEGMENT #10 and L2P SEGMENT #26 identified as the third map information, in the unit of a segment or one by one, by including them in a response to the program command.

In an embodiment, a predetermined flag (not illustrated) may be included in a response to the second command, which is to be outputted to the host 102 from the memory system 110, and a default value of the predetermined flag may be '0.' The controller 130 may set the predetermined flag in a response to '1,' corresponding to a logical address of the third map information in the response. After outputting the second command to the memory system 110, when the response to the second command is received from the memory system 110, the host 102 may check a state of the flag in the response to the second command. Further, the host 102 may be aware of whether a logical address is included in the response depending on a checking result.

For example, at the time t1 described above with reference to FIG. 16A, the third map information does not exist. Because of this fact, the controller 130 may continuously maintain the flag in the response to be outputted to the host 102 after performing the command operation corresponding to the second command from the host 102, at '0.' Accordingly, at the time t1, the host 102 may check that the flag in the response to the second command is in a state of '0.' Thereby, the host 102 may be aware that a logical address is not included in the response to the second command. For another example, at the time t2 described above with reference to FIG. 16B, the third map information may exist. Because of this fact, when outputting a logical address of the third map information to the host 102, the controller 130 may change the flag in the response to '1' after performing the command operation corresponding to the second command from the host 102. Accordingly, at the time t2, the host 102 may check that the flag in the response is '1.' Further, the host 102 may thereby be aware that a logical address is included in the response, and may check a value of the logical address in the response.

Referring to FIGS. 11B and 11C, after outputting logical addresses LBA of at least one selected map segment identified as the third map information to the host 102 (SEND LBA of SELECTED L2P MAP INFO2) in response to a command from the host 102 at the time t2, the controller 130 may update the value of output information bO corresponding to the at least one selected map segment identified as the third map information, to '0' indicating 'not updated,' to identify map information not selected as the third map information in the second map information L2P MAP INFO2, at the time t3. For example, after outputting the logical addresses LBA of the first and fourth map segments L2P SEGMENT #10 and L2P SEGMENT #26 identified as the third map information of the four map segments L2P SEGMENT #10, L2P SEGMENT #46, L2P SEGMENT #08 and L2P SEGMENT #26 in the second map information L2P MAP INFO2, to the host 102 at the time t2, the controller 130 may update the values of first and fourth output information bO corresponding to the first and fourth map segments L2P SEGMENT #10 and L2P SEGMENT #26, to '0,' at the time t3.

After receiving the logical addresses LBA of the third map information from the memory system 110 at the time t2, the host 102 may unmap map information corresponding to the logical addresses LBA of the third map information in the second map information L2P MAP INFO2 stored in the host memory 106 (UNMAPPING). When the logical addresses LBA of the third map information are received from the memory system 110 in the unit of a segment, the host 102 may unmap map information corresponding to the logical addresses LBA of the third map information in the second map information L2P MAP INFO2 stored in the host memory 106, in the unit of a segment. Also, when the logical addresses LBA of the third map information are received one by one from the memory system 110, the host 102 may unmap map information corresponding to the logical addresses LBA of the third map information in the second map information L2P MAP INFO2 stored in the host memory 106, one by one. In other words, while the host 102 may unmap the second map information L2P MAP INFO2 stored in the host memory 106 in the unit of a segment as illustrated in the drawing, it can be envisaged that, unlike the illustration of the drawing, the host 102 may select one by one and unmap the second map information L2P MAP INFO2 stored in the host memory 106.

Therefore, the host 102 does not use any more map information unmapped in the second map information L2P MAP INFO2 stored in the host memory 106. Namely, the host 102 may not determine any more map information unmapped in the second map information L2P MAP INFO2 stored in the host memory 106, as valid map information. Because of this fact, when transmitting a read command corresponding to unmapped map information to the memory system 110, the host 102 may transmit the read command without a physical address as described above with reference to FIG. 6. That is, the host 102 may transmit the read command including only a logical address to the memory system 110.

FIGS. 12A to 12C are diagrams illustrating a second operation in which the host 102 and the memory system 110 share map information in accordance with the embodiment of the disclosure.

Figure 17A:
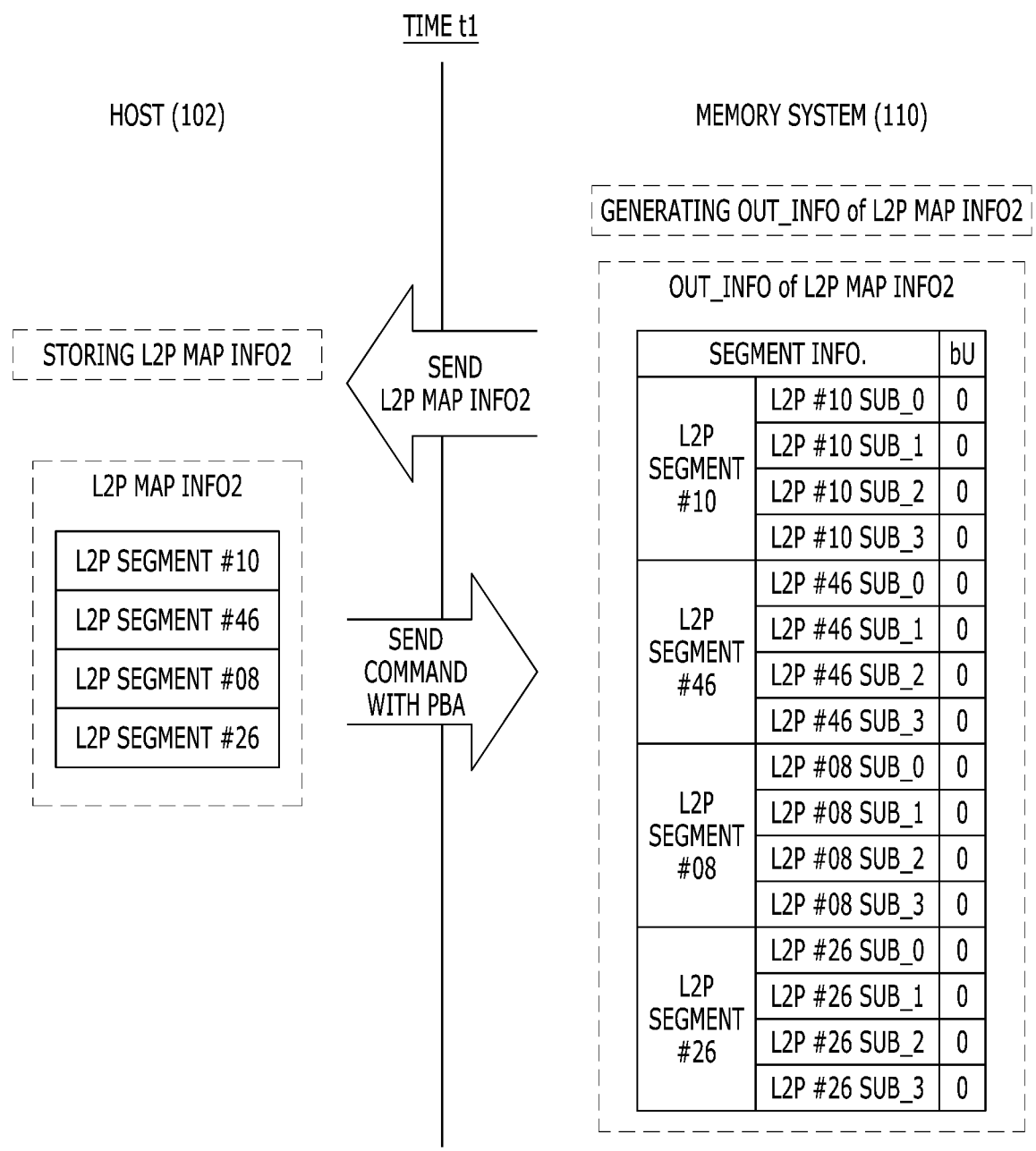
FIGS. 17A to 17C show a second operation in which the host and the memory system share map information in accordance with the embodiment of the disclosure.
Figure 17B:
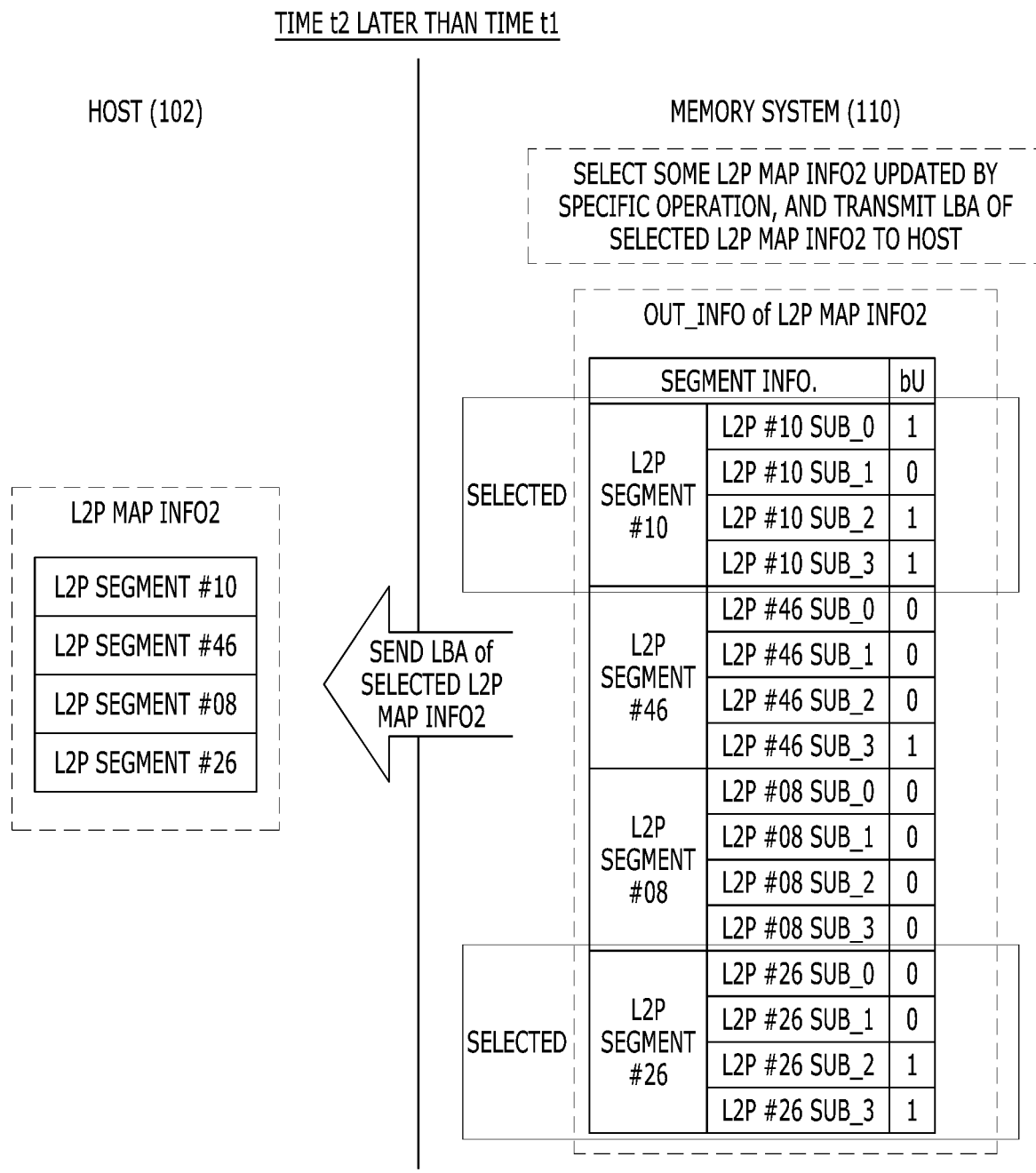
Figure 17C:
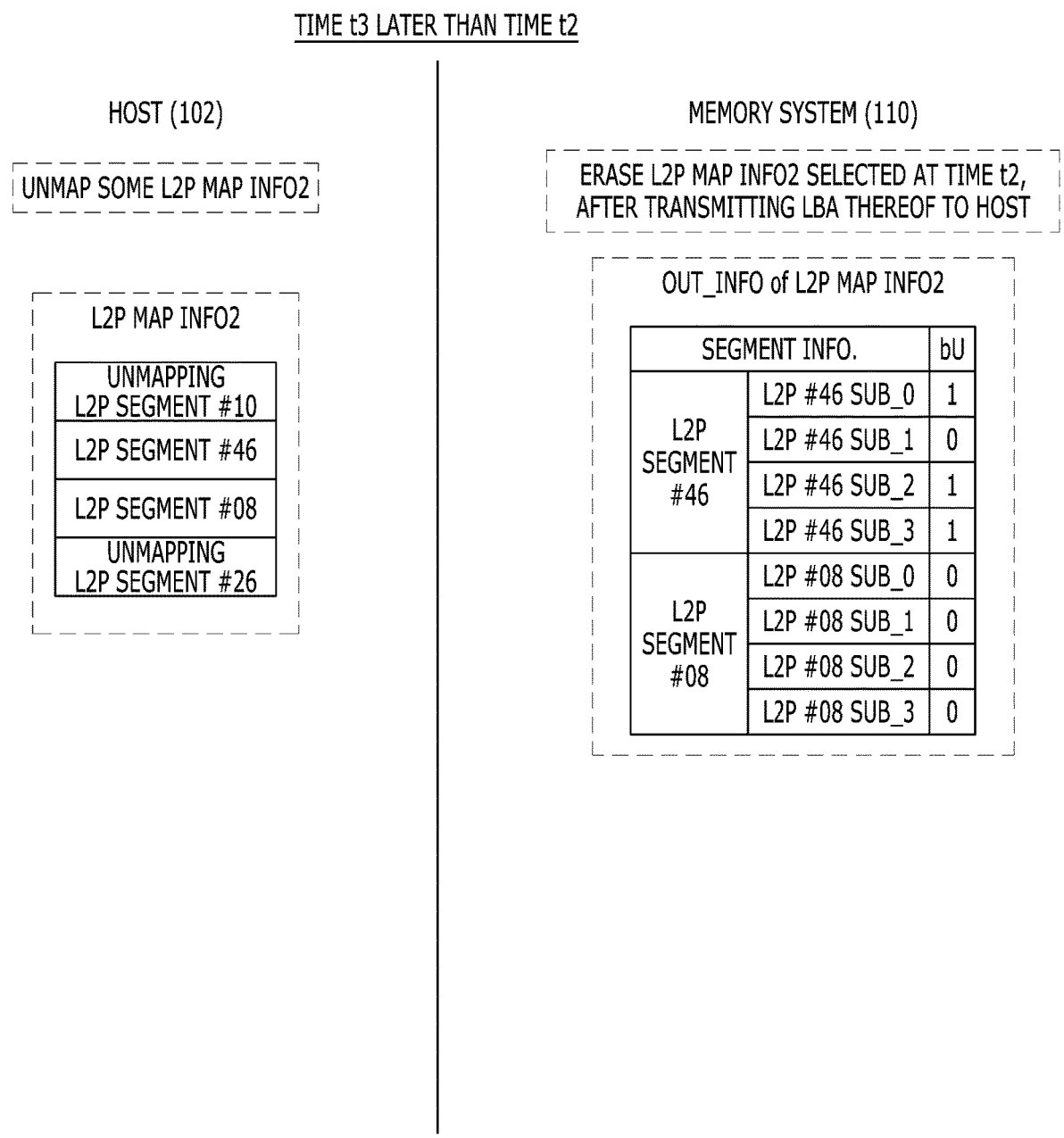

FIG. 17A illustrates an operation of sharing map information by the host 102 and the memory system 110 at a time t1 similar to FIG. 16A described above. FIG. 17B illustrates an operation of sharing map information by the host 102 and the memory system 110 at a time t2 similar to FIG. 16B described above. FIG. 17C illustrates an operation of sharing map information by the host 102 and the memory system 110 at a time t3 similar to FIG. 16C described above. Therefore, the time t1 to the time t3 to be described below with reference to FIGS. 12A to 12C may have the same meanings as the time t1 to the time t3 described above with reference to FIGS. 11A to 11C. The second operation to be described below with reference to FIGS. 12A to 12C and the first operation described above with reference to FIGS. 11A to 11C may have a difference in terms of a scheme in which the memory system 110 generates and updates log information OUT_INFO of L2P MAP INFO2 on second map information L2P MAP INFO2.

Referring to FIG. 17A, at the time t1, the controller 130 may generate first map information L2P MAP INFO1 to map a physical address of the memory device 150 to a logical address from the host 102. Also, at the time t1, the controller 130 may output the some second map information L2P MAP INFO2 of the first map information L2P MAP INFO1 to the host 102 (SEND L2P MAP INFO2). Further, at the time t1, the controller 130 may generate log information OUT_INFO of L2P MAP INFO2 on the second map information L2P MAP INFO2 (GENERATING OUT_INFO of L2P MAP INFO2) corresponding to the output of the second map information L2P MAP INFO2 to the host 102. Moreover, at the time t1, the host 102 may store the second map information L2P MAP INFO2 from the memory system 110, in the host memory 106 (STORING L2P MAP INFO2). After the time t1, the host 102 may include a physical address in a command to be transferred to the memory system 110, based on the second map information L2P MAP INFO2 stored in the host memory 106 (SEND COMMAND WITH PBA). That is, based on a logical address to be transferred to the memory system 110, the host 102 may find a physical address corresponding to the logical address, in the second map information L2P MAP INFO2. If the physical address exists, the host 102 may transfer the command with the logical address and the physical address to the memory system 110. If the physical address does not exist, the host 102 may transfer the command with the logical address to the memory system 110. The memory system 110 may receive the command with the physical address from the host 102 and may perform a command operation corresponding to the command. For example, when the host 102 transfers the physical address corresponding to a read command, the controller 130 may access and output data using the corresponding physical address, thereby reducing a time required for the command operation corresponding to the read command.

The second map information L2P MAP INFO2 may be managed in the unit of a map segment. That is, a plurality of map segments may be included in the second map information L2P MAP INFO2, and the second map information L2P MAP INFO2 to be outputted to the host 102 from the memory system 110 may include at least one map segment. The log information OUT_INFO of L2P MAP INFO2 on the second map information L2P MAP INFO2 may also be generated in a form for identifying a map segment. For example, the second map information L2P MAP INFO2 may include four map segments L2P SEGMENT #10, L2P SEGMENT #46, L2P SEGMENT #08 and L2P SEGMENT #26. Therefore, the log information OUT_INFO of L2P MAP INFO2 on the second map information L2P MAP INFO2 may also be generated in a form for identifying a map segment.

As the operation of outputting the second map information L2P MAP INFO2 to the host 102 from the memory system 110 (SEND L2P MAP INFO2), the operation described above with reference to FIGS. 7 to 10 may be used.

In detail, when at least one map segment identified as an output map segment exists as a result of checking, the controller 130 may output at least one map segment identified as an output map segment, to the host 102, corresponding to a first command from the host 102. The first command may not be limited. For example, the first command may be a read command, a write command or an erase command. According to an embodiment, the first command may be a command which is specially set for the host 102 to receive second map information from the memory system 110.

According to an embodiment, as described above with reference to FIGS. 7 and 8, after performing a command operation corresponding to the first command from the host 102, when at least one map segment identified as an output map segment exists as a result of checking, the controller 130 may output at least one map segment identified as an output map segment, by including it in a response to the first command, which is to be outputted to the host 102. According to an embodiment, as described above with reference to FIGS. 9 and 10, when at least one map segment identified as an output map segment exists, the controller 130 may notice a request for outputting the second map information L2P MAP INFO2 to the host 102. When the request for outputting the second map information L2P MAP INFO2 is noticed from the memory system 110, the host 102 may check a state of the host memory 106, may selectively generate the first command depending on a checking result, and may output the first command to the memory system 110. When the first command is received from the host 102, after a command operation corresponding to the first command is performed, at least one map segment identified as an output map segment may be included in a response to the first command, which is to be outputted to the host 102. According to an embodiment, when at least two map segments are determined as output map segments, the controller 130 may output a predetermined number of map segments to the host 102 by successively including them in a response to one first command.

When generating the log information OUT_INFO of L2P MAP INFO2 on the second map information L2P MAP INFO2, the controller 130 may generate the log information OUT_INFO of L2P MAP INFO2 not only in the form for identifying map segments but also in a form for divisionally identifying four map sub-segments L2P #10 SUB_0, L2P #10 SUB_1, L2P #10 SUB_2, L2P #10 SUB_3, L2P #46 SUB_0, L2P #46 SUB_1, L2P #46 SUB_2, L2P #46 SUB_3, L2P #08 SUB_0, L2P #08 SUB_1, L2P #08 SUB_2, L2P #08 SUB_3, L2P #26 SUB_0, L2P #26 SUB_1, L2P #26 SUB_2 and L2P #26 SUB_3 of the respective four map segments L2P SEGMENT #10, L2P SEGMENT #46, L2P SEGMENT #08 and L2P SEGMENT #26. This is because, when the second map information L2P MAP INFO2 is identified in the unit of a map segment, and a substantially small number of logical/physical information among a plurality of map information in one map segment is updated, if it is determined that the entire one map segment is updated, an inefficient operation may be caused. That is, when a specific segment is determined to be in an updated state, the controller 130 may need to perform an operation of outputting the specific segment to the host 102 or storing the specific segment in the memory device 150. Because of this fact, in order to efficiently perform an operation of determining an updated state of a specific segment, the controller 130 may use a scheme in which one segment is divided into and identified by a plurality of sub-segments.

In detail, when generating the log information OUT_INFO of L2P MAP INFO2 on the four map segments L2P SEGMENT #10, L2P SEGMENT #46, L2P SEGMENT #08 and L2P SEGMENT #26 in the second map information L2P MAP INFO2, the controller 130 may generate 16 update information bU corresponding to the 16 map sub-segments L2P #10 SUB_0, L2P #10 SUB_1, L2P #10 SUB_2, L2P #10 SUB_3, L2P #46 SUB_0, L2P #46 SUB_1, L2P #46 SUB_2, L2P #46 SUB_3, L2P #08 SUB_0, L2P #08 SUB_1, L2P #08 SUB_2, L2P #08 SUB_3, L2P #26 SUB_0, L2P #26 SUB_1, L2P #26 SUB_2 and L2P #26 SUB_3. Through the 16 update information bU, the controller 130 may indicate which map sub-segment among the 16 map sub-segments in the second map information L2P MAP INFO2 is updated and which map sub-segment is not updated. When the occupation percentage of update information bU indicating 'updated' of the four update information bO corresponding to one specific map segment is greater than or equal to a predetermined percentage, the controller 130 may determine the one specific map segment as an updated state. For example, in the drawing, a map sub-segment of which the value of the update information bU is '0' is not updated and a map sub-segment of which the value of the update information bU is '1' is updated. Since in FIG. 17A none of the 16 map sub-segments in the second map information L2P MAP INFO2 are updated, it may be seen that the values of all the 16 update information bU corresponding to the 16 map sub-segments are '0.'

As described above with reference to FIG. 6, when a command from the host 102 includes not only a logical address but also a physical address as a result of checking, the controller 130 may determine the validity of the physical address by referring to update information bU. For example, when a read command from the host 102 includes a first logical address and a first physical address, the controller 130 may determine the validity of the first physical address by checking the update information bU of the map sub-segment corresponding to the first logical address in the log information OUT_INFO of L2P MAP INFO2 on the second map information L2P MAP INFO2. When it is checked that the update information bU has the value of '0' indicating 'not updated,' the controller 130 may determine the first physical address as valid. Therefore, the controller 130 may perform the read command from the host 102, by using the first physical address. Conversely, when it is checked that the update information bU has the value of '1' indicating 'updated,' the controller 130 may determine the first physical address as invalid. Therefore, the controller 130 may neglect the first physical address and search for a valid physical address corresponding to the first logical address in the first map information L2P MAP INFO1. Then, the controller 130 may perform the read command from the host 102, using a searched valid physical address.

Referring to FIG. 17B, at the time t2 later than the time t1, the controller 130 may identify map information updated by a predetermined operation PREDETERMINED OPERATION (see FIG. 1) of the second map information L2P MAP INFO2, as third map information SELECTED L2P MAP INFO2. For example, it may be seen that, the first and fourth map segments L2P SEGMENT #10 and L2P SEGMENT #26 are determined as the third map information of the four map segments L2P SEGMENT #10, L2P SEGMENT #46, L2P SEGMENT #08 and L2P SEGMENT #26 in the second map information L2P MAP INFO2.

In detail, determination or selection as the third map information may be implemented depending on how many sub-segments are updated among the entire sub-segments in each map segment. According to an embodiment, a reference such as whether the occupation percentage of updated sub-segments is greater than or equal to 20%, 30%, 50% or 70% may be set. In the first map segment L2P SEGMENT #10 of the four map segments, it may be seen that the values of the update information bU corresponding to the first, third and fourth map sub-segments L2P #10 SUB_0, L2P #10 SUB_2 and L2P #10 SUB_3 are '1' indicating 'updated,' of the four map sub-segments L2P #10 SUB_0, L2P #10 SUB_1, L2P #10 SUB_2 and L2P #10 SUB_3. Further, the first map segment L2P SEGMENT #10 may be determined as the third map information according to a predetermined reference (e.g., 40%). In the second map segment L2P SEGMENT #46 of the four map segments, it may be seen that, the value of the update information bU corresponding to the fourth map sub-segment L2P #46 SUB_3 is '1' indicating 'updated,' of the four map sub-segments L2P #46 SUB_0, L2P #46 SUB_1, L2P #46 SUB_2 and L2P #46 SUB_3. Further, the second map segment L2P SEGMENT #46 may not be determined as the third map information according to the predetermined reference (e.g., 40%). In the third map segment L2P SEGMENT #08 of the four map segments, it may be seen that the values of all the update information bU corresponding to the four map sub-segments L2P #08 SUB_0, L2P #08 SUB_1, L2P #08 SUB_2 and L2P #08 SUB_3 are '0' indicating 'not updated.' Accordingly, the third map segment L2P SEGMENT #08 may not be determined as the third map information. In the fourth map segment L2P SEGMENT #26 of the four map segments, it may be seen that the values of the update information bU corresponding to third and fourth map sub-segments L2P #26 SUB_2 and L2P #26 SUB_3 are '1' indicating 'updated,' of the four map sub-segments L2P #26 SUB_0, L2P #26 SUB_1, L2P #26 SUB_2 and L2P #26 SUB_3. Further, the fourth map segment L2P SEGMENT #26 may be determined as the third map information according to the predetermined reference (e.g., 40%).

The controller 130 may output logical addresses LBA of at least one selected map segment identified as the third map information to the host 102, in response to a command from the host 102 (SEND LBA of SELECTED L2P MAP INFO2). For example, the controller 130 may output logical addresses LBA of the first and fourth map segments L2P SEGMENT #10 and L2P SEGMENT #26 which are identified as the third map information, to the host 102. At this time, the controller 130 may output logical addresses LBA of one or more selected map segments identified as the third map information, to the host 102, by grouping the logical addresses LBA in the unit of a segment. Also, the controller 130 may select logical addresses LBA of one or more selected map segments identified as the third map information, and may output selected logical addresses LBA to the host 102. Here, selecting logical addresses LBA of selected map segments in the unit of a segment may mean selecting, at once, all of a plurality of logical addresses in one segment. Conversely, selecting logical addresses LBA of selected map segments may mean selecting some logical addresses of the logical addresses in one segment and not selecting the remaining logical addresses in the one segment. For example, the controller 130 may output, at once, the logical addresses LBA of the first map segment L2P SEGMENT #10 of the logical addresses LBA of the first and fourth map segments L2P SEGMENT #10 and L2P SEGMENT #26 identified as the third map information, to the host 102. Then, the controller 130 may output, at once, the logical addresses LBA of the fourth map segment L2P SEGMENT #26 to the host 102. Also, the controller 130 may select logical addresses LBA of the first and fourth map segments L2P SEGMENT #10 and L2P SEGMENT #26 identified as the third map information, and output the selected logical addresses LBA to the host 102.

As the operation SEND LBA of SELECTED L2P MAP INFO2 of outputting the logical addresses LBA of one or more selected map segments identified as the third map information, from the memory system 110 to the host 102, the operation described above with reference to FIGS. 7 to 10 may be used.

In detail, as described above with reference to FIG. 7, after performing a command operation corresponding to a second command from the host 102, when the third map information exists as a result of checking, the controller 130 may output logical addresses LBA of one or more selected map segments in the third map information, in the unit of a segment or one by one, by including them in a response to the second command, which is to be outputted to the host 102. The second command may not be limited. For example, the second command may be a read command, a write command or an erase command. For example, at the time t2, after performing a read operation corresponding to a read command from the host 102, the controller 130 may output the logical addresses LBA of the first and fourth map segments L2P SEGMENT #10 and L2P SEGMENT #26 which are identified as the third map information, in the unit of a segment or by one or more of the logical addresses LBA, by including them in a response to the read command. For another example, at the time t2, after performing a program operation corresponding to a program command from the host 102, the controller 130 may output the logical addresses LBA of the first and fourth map segments L2P SEGMENT #10 and L2P SEGMENT #26 which are identified as the third map information, in the unit of a segment or by one or more of the logical addresses LBA, by including them in a response to the program command.

In an embodiment, a predetermined flag (not illustrated) may be included in a response to the second command, which is to be outputted to the host 102 from the memory system 110, and a default value of the predetermined flag may be '0.' The controller 130 may set the predetermined flag to '1,' corresponding to a logical address of the third map information in the response. After outputting the second command to the memory system 110, when the response to the second command is received from the memory system 110, the host 102 may check a state of the flag in the response to the second command. Further, the host 102 may be aware of whether a logical address is included in the response to the second command depending on a checking result.

For example, at the time t1 described above with reference to FIG. 17A, the third map information does not exist. Because of this fact, the controller 130 may continuously maintain the flag in the response to be outputted to the host 102 after performing the command operation corresponding to the second command from the host 102, at '0.' Accordingly, at the time t1, the host 102 may check that the flag in the response to the second command, which is inputted from the memory system 110, is in a reset state of '0.' Thereby, the host 102 may be aware that a logical address is not included in the response to the second command. For another example, at the time t2 described above with reference to FIG. 17B, the third map information may exist. Because of this fact, when outputting a logical address of the third map information to the host 102, the controller 130 may change the flag in the response to '1' after performing the command operation corresponding to the second command from the host 102. Accordingly, at the time t2, the host 102 may receive the flag in the response to the second command and check that the flag is '1.' Further, the host 102 may thereby be aware that a logical address is included in the response to the second command, and may check a value of the logical address in the response to the second command.

Referring to FIGS. 12B and 12C, after outputting logical addresses LBA of at least one selected map segment identified as the third map information, to the host 102 (SEND LBA of SELECTED L2P MAP INFO2) in response to a command inputted from the host 102 at the time t2, the controller 130 may erase the third map information in the second map information L2P MAP INFO2 at the time t3 later than the time t2. For example, after outputting the logical addresses LBA of the first and fourth map segments L2P SEGMENT #10 and L2P SEGMENT #26 identified as the third map information of the four map segments L2P SEGMENT #10, L2P SEGMENT #46, L2P SEGMENT #08 and L2P SEGMENT #26 in the second map information L2P MAP INFO2, to the host 102 at the time t2, the controller 130 may erase the first and fourth map segments L2P SEGMENT #10 and L2P SEGMENT #26 at the time t3 later than the time t2. Therefore, at the time t3, the second map information L2P MAP INFO2 may include only the two map segments L2P SEGMENT #46 and L2P SEGMENT #08.

After receiving the logical addresses LBA of the third map information from the memory system 110 at the time t2, the host 102 may unmap map information corresponding to the logical addresses LBA of the third map information in the second map information L2P MAP INFO2 stored in the host memory 106 (UNMAPPING). When the logical addresses LBA of the third map information are received from the memory system 110 in the unit of a segment, the host 102 may unmap map information corresponding to the logical addresses LBA of the third map information in the second map information L2P MAP INFO2 stored in the host memory 106 in the unit of a segment. Also, when the logical addresses LBA of the third map information are received one by one from the memory system 110, the host 102 may unmap map information corresponding to the logical addresses LBA of the third map information in the second map information L2P MAP INFO2 stored in the host memory 106, one by one. In other words, while the host 102 may unmap the second map information L2P MAP INFO2 stored in the host memory 106 in the unit of a segment, unlike the illustration of the drawing, the host 102 may select one by one and unmap the second map information L2P MAP INFO2 stored in the host memory 106.

Therefore, the host 102 does not use any more map information unmapped in the second map information L2P MAP INFO2 stored in the host memory 106. Namely, the host 102 may not determine any more map information unmapped in the second map information L2P MAP INFO2 stored in the host memory 106, as valid map information. Because of this fact, when transmitting a read command corresponding to unmapped map information to the memory system 110, the host 102 may transmit the read command without a physical address as described above with reference to FIG. 6, that is, the read command with only a logical address, to the memory system 110. Since the memory system 110 receives the read command without a physical address, it is not necessary to perform an operation of determining the validity of a physical address.

Figure 18:
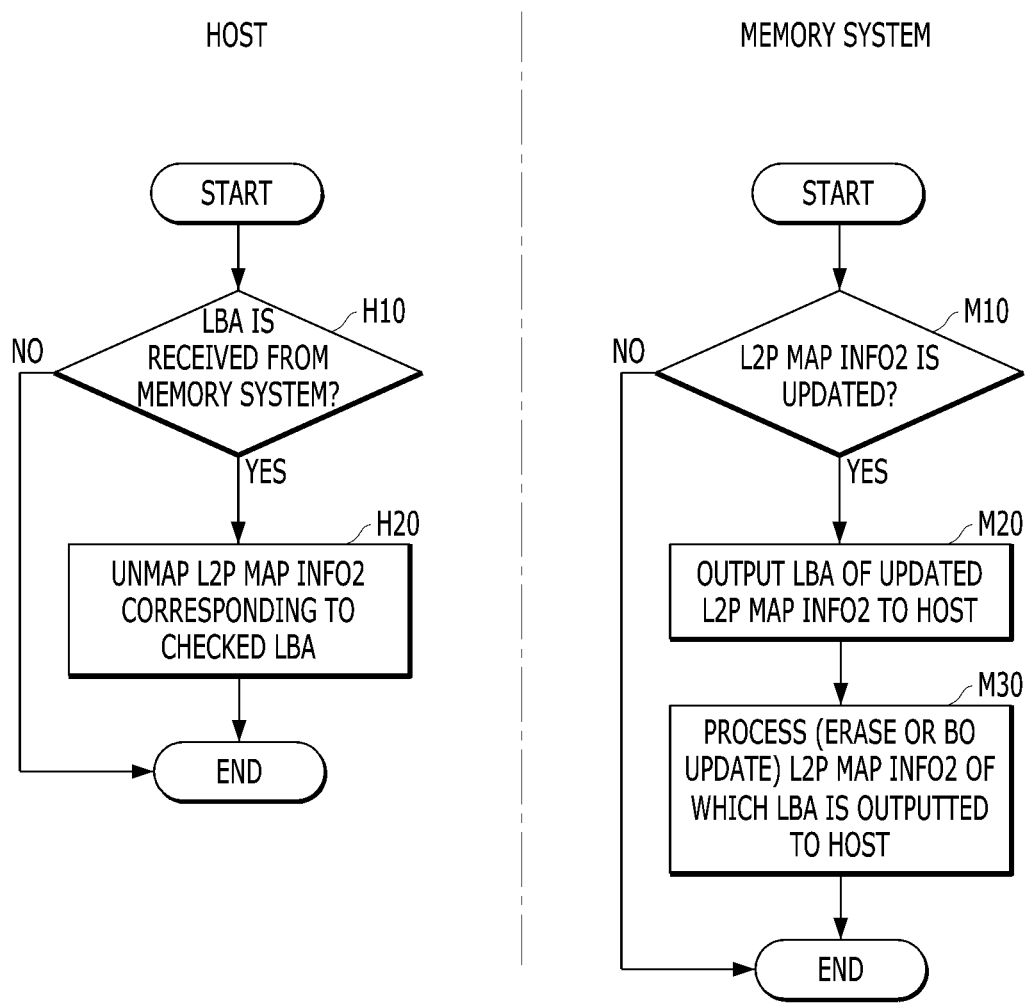
FIG. 18 illustrates another operation in which the host and the memory system share map information in accordance with the embodiment of the disclosure.

FIG. 18 is a flow chart illustrating a third operation in which the host and the memory system share map information in accordance with the embodiment of the disclosure. In detail, FIG. 18 illustrates a case where the memory system transmits logical addresses of updated map information to the host during a process in which the host and the memory system interoperate.

Referring to FIG. 18, the memory system 110 may check whether second map information L2P MAP INFO2, which is shared with the host 102, is updated due to a predetermined operation PREDETERMINED OPERATION (see FIG. 1)(M10).

In the case where the second map information is not updated (NO of M10), the memory system 110 may not perform a separate special operation.

In the case where the second map information is updated (YES of M10), the memory system 110 may output logical addresses LBA of the updated second map information to the host 102 (M20).

After the step M20, the memory system 110 may process the updated second map information (M30). According to an embodiment, the memory system 110 may perform erasing the updated second map information. According to an embodiment, the memory system 110 may perform updating information bO indicating that the updated second map information is outputted to the host 102.

The host 102 may check whether a logical address is received from the memory system 110 (H10).

When it is checked that a logical address is not received from the memory system 110 (NO of H10), the host 102 may not perform a separate special operation.

When it is checked that a logical address is received from the memory system 110 (YES of H10), the host 102 may unmap second map information corresponding to the checked logical address, from the second map information L2P MAP INFO2 shared with the memory system 110 (H20).

As is apparent from the above-described embodiments, a memory system may transmit map information to a host. After processing a command transmitted by the host, the memory system may transmit the map information by using a response corresponding to the command. Further, after transmitting the map information to the host, the memory system may generate and store a log or a history for the transmitted map information. After the map information is transmitted from the memory system to the host, when the map information stored in the host becomes dirty due to the update of the map information performed in the memory system, the memory system may transmit information corresponding to the update of the map information to the host such that the host may self-unmap the dirty map information therein. Through this, it is possible to prevent unnecessary map information from being transmitted from the host to the memory system, and thereby, the operation performance of the memory system may be improved.

Figure 19:
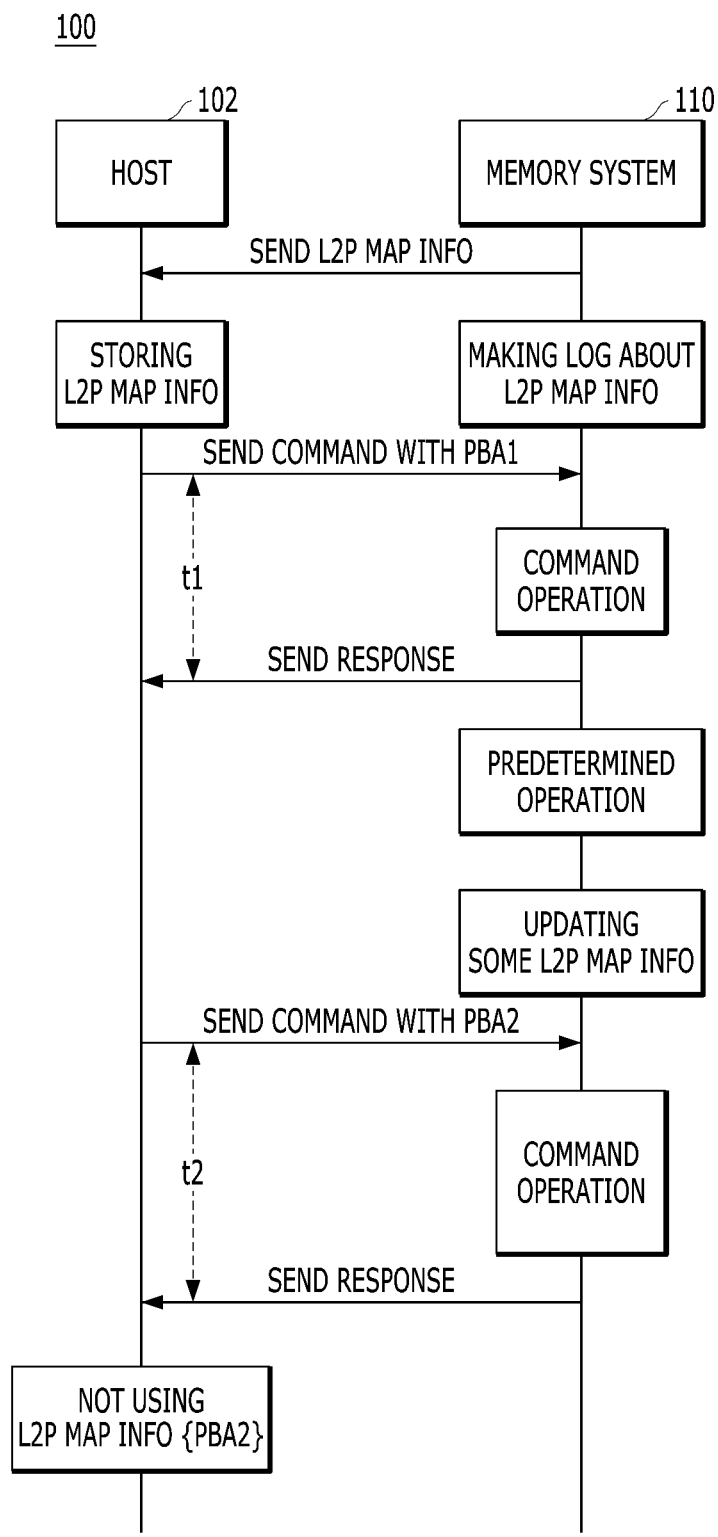
FIG. 19 illustrates a method for sharing map information in accordance with an embodiment.

FIG. 19 shows a method for sharing map information in accordance with an embodiment of the disclosure.

FIG. 19 illustrates how to share map information between a host and a memory system of a data processing system in accordance with an embodiment of the disclosure.

Referring to FIG. 19, a host 102 and a memory system 110 may be operatively engaged. The host 102 may include a computing device. The host 102 may be implemented in a form of a mobile device, a computer, a server, or the like. The memory system 110 operatively engaged with the host 102 may receive a command from the host 102 and store or output data in response to the received command.

The memory system 110 may have a storage space including nonvolatile memory cells. For example, the memory system 110 may be implemented in a form of a flash memory, a solid-state drive (SSD), or the like.

In order to store data in a storage space including the nonvolatile memory cells in response to a request inputted from the host 102, the memory system 110 can perform a mapping operation for associating a file system used by the host 102 with a storage space including the nonvolatile memory cells. This can be referred as to an address translation between a logical address used in the file system and a physical address indicating a physical location in the storage space. For example, an address identifying data according to the file system used by the host 102 may be called a logical address or a logical block address. An address indicating a physical location of data in the storage space including nonvolatile memory cells may be referred to as a physical address or a physical block address. When the host 102 sends a read command with a logical address to the memory system 110, the memory system 110 can search for a physical address corresponding to the logical address, and then read and output data stored in a physical location indicated by the physical address. During these processes, the mapping operation or the address translation may be performed while the memory system 110 searches for the physical address corresponding to the logical address inputted from the host 102. The mapping operation or the address translation can be performed based on mapping information such as a mapping table which can associate a logical address with a physical address.

If the host 102 can perform the mapping operation performed in the memory system 110, an amount of time taken for the memory system 110 to read and output data corresponding to a read command transmitted by the host 102 may be reduced because the memory system 110 may not have to perform the mapping operation. The host 102 may store and access at least some of map information for performing the mapping operation, in order to deliver the read command with the physical address into the memory system 110 through the mapping operation.

Referring to FIG. 19, the memory system 110 may transmit map information MAP_INFO to the host 102. The host 102 receiving the map information MAP_INFO delivered from the memory system 110 may store the map information MAP_INFO in a memory included in the host 102. When the memory system 110 sends the entire map information to the host 102 and the host 102 can store the entire map information in the memory, the memory system 110 may not need to write a log regarding transmitted map information. However, it may be difficult for the host 102 to allocate sufficient storage space in its memory for storing the entire map information generated and delivered by the memory system 110. Accordingly, when the host has a limited storage space for storing map information, the memory system 110 may select or choose a part of map information regarding data or a logical address frequently used or accessed by the host 102 and transmit the selected or chosen map information to the host 102.

Meanwhile, the memory system 110 transmitting at least some of the map information to the host 102 may generate a log or a history regarding the transmitted map information. The log or a history may have one of various formats, structures, marks, variables or types, and may be stored in a memory device or a storage area including nonvolatile memory cells. According to an embodiment, whenever the memory system 110 transmits map information to the host 102, the log or the history may include a type of data which is relevant to transmitted map information. Further, the memory system 110 may determine an amount of transmitted map information recorded in the log or the history corresponding to a size of map information that can be transmitted to the host 102. As an example, a size of map information that the memory system 110 can transmit to the host 102 is 512 KB. Although the memory system 110 may transmit more than 512 KB of map information to the host 102 in a log or a history, the amount of transmitted map information recorded in the log or the history may be limited to 512 KB. The amount of map information that memory system 110 can send to host 102 at one time may be less than the amount of map information that host 102 may store in the memory. For example, the map information may be transmitted to the host 102 in a segment unit. The memory system 110 may transfer segments of the map information to the host 102 several times. The segments of the map information may be transmitted to the host 102 continuously or intermittently.

According to an embodiment, when the memory system 110 transmits more than 1 MB of map information to the host 102, the host 102 can delete old map information, i.e., previously transmitted from the memory system 110 and stored in a memory, according to a timeline. In addition, the map information transmitted from the memory system 110 to the host 102 may include update information. Because a space allocated by the host 102 to store the map information transmitted from the memory system 110 includes volatile memory cells (an overwrite is supported), the host 102 can update map information based on the update information without an additional operation of erasing another map information.

The host 102 may add a physical address PBA1 or PBA2 into a command transmitted to the memory system 110 based on the map information. In the mapping operation, the host 102 can search for and find the physical address PBA1 or PBA2 in the map information stored in the memory, based on a logical address corresponding to a command transmitted into the memory system 110. When the physical address exists and is found, the host 102 may transmit the command with the logical address and the physical address into the memory system 110.

The memory system 110, which receives a command with a logical address and a physical address inputted from the host 102, may perform a command operation corresponding to the command. As described above, when the host 102 transfers a physical address corresponding to a read command, the memory system 110 can use the physical address to access and output data stored in a location indicated by the physical address. The memory system 110 can perform an operation in response to the read command without address translation, so that the memory system 110 can reduce a time spent on the read operation.

When a predetermined operation PREDETERMINED_OPERATION is performed in a memory system 110, some of the map information SOME_L2P_MAP_INFO managed in the memory system 110 may be updated. Although some of the map information was updated through the predetermined operation in the memory system 110, the host 102 does not know about the update until the memory system 110 informs the host 102 of the update. Therefore, the updated map information stored in the host 102 may become unnecessary map information. That is, when the host 102 transfers the physical address PBA2 corresponding to the read command as described above, the memory system 110 cannot use the physical address received from the host 102 when the transferred physical address corresponds to the updated map information in the memory system 110. Instead, the memory system 110 may search for a new physical address again, and access and output data using the searched physical address. In this case, although the physical address was transmitted to the memory system 110 from the host 102, a time difference t2 required for a command operation corresponding to the read command in the memory system 110 may be significantly increased.

The host 102 may check a difference between a first time point that a command COMMAND with a physical address PBA1 or PBA2 searched based on the stored map information is transferred to the memory system 110 and a second time point that a response RESPONSE to a result obtained by performing the corresponding command through the memory system 110 is inputted to the host 102.

For example, when a time difference t1 between the first time point that the command COMMAND is sent with the first physical address PBA1 and the second time point that the response RESPONSE corresponding to the command is inputted to the host 102 is equal to or less than a set reference value, it may be presumed that the memory system 110 had performed the command operation using the first physical address PBA1 which was sent with the command COMMAND. That is, a piece of map information corresponding to the first physical address PBA1 among plural pieces of map information stored in the host 102 may have a 'valid state' because the piece of map information may have been used in the memory system 110. Therefore, the host 120 may continuously retain the piece of map information corresponding to the first physical address PBA1 stored therein.

On the other hand, when the time difference t2 between the first time point that the command COMMAND is sent with the second physical address PBA2 and the second time point that the response RESPONSE corresponding to the command is inputted to the host 102 exceeds the set reference value, it may be presumed that the memory system 110 did not use the second physical address PBA2, but searched for a physical address corresponding to a logical address inputted from the host 102 in order to perform the command operation. That is, a piece of map information corresponding to the second physical address PBA2 in the plural pieces of map information stored in the host 102 may have an 'invalid state' in which the piece of map information cannot be used in the memory system 110. Therefore, the host 102 may determine that the piece of map information, corresponding to the second physical address PBA2 among the plural pieces of map information stored therein, would not be used. Through this operation, the host 102 may include a physical address PBA in a command which is transferred to the memory system 110, using only valid state map information excluding the invalid state map information which is identified as not to be used, among the plural pieces of map information stored therein.

Figure 20:
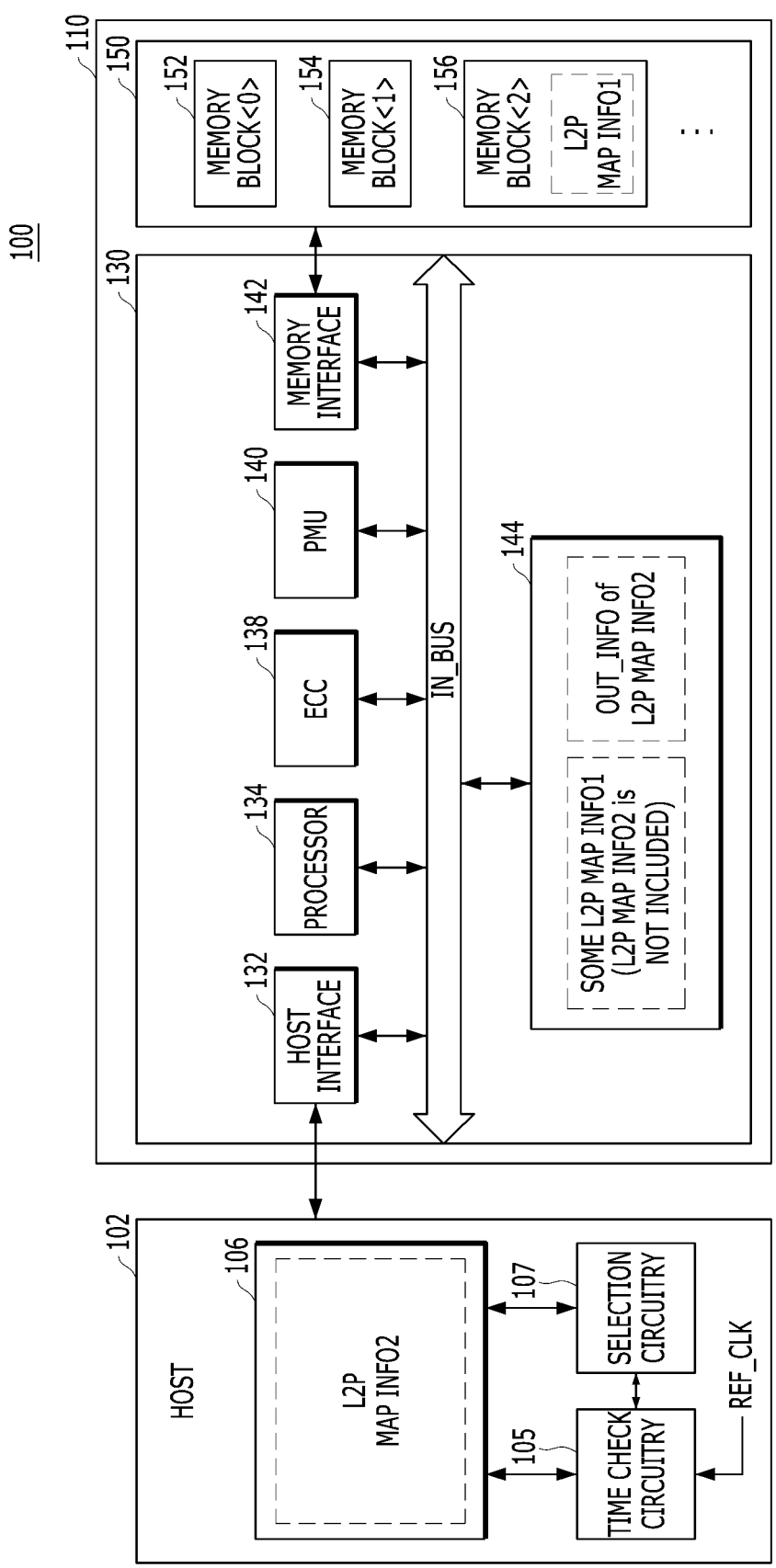
FIG. 20 illustrates an example of a data processing system including a memory system in accordance with an embodiment.

FIG. 20 schematically illustrate an example of a data processing system including a memory system in accordance with an embodiment.

Referring to FIGS. 19 and 20, the host 102 illustrated in FIG. 20 may include additional components 105 and 107, as compared with the host 102 illustrated in FIG. 12. Therefore, the following descriptions will be focused on differences between FIGS. 12 and 20.

First, overall operations of the host 102 in FIG. 12 are performed in the same manner as the host 102 in FIG. 20. That is, the host 102 may store the piece of second map information L2P_MAP_INFO2 received from the memory system 110 in the internal memory 106. Furthermore, the host 102 may select the physical address PBA1 or PBA2 corresponding to the logical address by referring to the piece of second map information L2P_MAP_INFO2 stored in the internal memory 106, send a command with the selected physical address PBA1 or PBA2 to the memory system 110 at the first time point, and then receive data corresponding to the logical address from the memory system 110 at the second time point. The host 102 may check the time difference t1 or t2 between the first time point and the second time point, and decide whether to continuously use the physical address PBA1 or PBA2 selected through the piece of second map information L2P_MAP_INFO2 stored in the internal memory 106 according to the check result.

The host 102 in FIG. 20 may be different from the host 102 in FIG. 12 in that the above-described entire operation of the host 102 can be divided and performed through the subdivided internal components 105, 107.

Specifically, referring to FIG. 20, the time check circuitry 105 may check the time difference between the first time point that the command with the selected physical address PBA1 or PBA2 is sent to the memory system 110 and the second time point that a response to the command is received, based on the frequency of a reference clock REF_CLK. At this time, the reference clock REF_CLK may be a clock signal which may be utilized to perform a different operation in the host 102. Furthermore, the reference clock REF_CLK may be a clock signal which is separately generated for the operation of the time check circuitry 105 in the host 102.

The selection circuitry 107 may selectively decide whether to use the selected physical address PBA1 or PBA2 according to the check result of the time check circuitry 105. That is, the selection circuitry 107 may selectively include the physical address PBA1 or PBA2 corresponding to the selected logical address in the command according to the check result of the time check circuitry 105, by referring to the piece of second map information L2P_MAP_INFO2 stored in the internal memory 106, and send the command with the physical address to the memory system 110.

For example, the time check circuitry 105 may check that the time difference t1 between the first time point that the command COMMAND in which the first physical address PBA1 corresponding to the logical address is included with reference to the piece of second map information L2P_MAP_INFO2 stored in the internal memory 106 is sent, and the second time point that the response RESPONSE corresponding to the command is inputted to the host 102 is equal to or less than the set reference value. Furthermore, the time check circuitry 105 may check that the time difference t2 between the first time point that the command COMMAND in which the second physical address PBA2 corresponding to the logical address is included with reference to the piece of second map information L2P_MAP_INFO2 stored in the internal memory 106 is sent and the second time point that the response RESPONSE corresponding to the command is inputted to the host 102 exceeds the set reference value.

When the first physical address PBA1 corresponds to the logical address selected by referring to the piece of second map information L2P_MAP_INFO2 stored in the internal memory 106 after the operation of the time check circuitry 105, the selection circuitry 107 may send the command COMMAND with the first physical address PBA1 at the first time point according to the check result of the time check circuitry 105. On the other hand, when the second physical address PBA2 corresponds to the logical address selected by referring to the piece of second map information L2P_MAP_INFO2 stored in the internal memory 106, the selection circuitry 107 may send the command COMMAND without the second physical address PBA2 at the first time point according to the check result of the time check circuitry 105.

While FIGS. 2A and 20 illustrates that the log information OUT_INFO of L2P_MAP_INFO2 on the piece of second map information L2P_MAP_INFO2 is stored in the memory 144 in the controller 130, this is only an example. In practice, the log information OUT_INFO of L2P_MAP_INFO2 on the piece of second map information L2P_MAP_INFO2 may be stored in the memory 144 in the controller 130 and at the same time may be stored in a specific memory block of the memory device 150 in a nonvolatile state.

FIGS. 21A to 21F are diagrams for describing a first operation through which the host and the memory system share map information in accordance with an embodiment.

FIG. 221A illustrates the state in which a piece of second map information L2P_MAP_INFO2 newly generated by the memory system 110 may be transferred and stored into the host 102, such that the host 102 and the memory system 110 share the piece of second map information L2P_MAP_INFO2. Therefore, in FIG. 221A, the piece of second map information L2P_MAP_INFO2 shared by the host 102 and the memory system 110 may be all valid.

Specifically, the controller 130 included in the memory system 110 may generate all of the pieces of first map information L2P_MAP_INFO1 in order to map a physical address of data within the memory device 150 in response to a logical address inputted from the host 102 (GENERATING OUT_INFO of L2P_MAP_INFO2). The controller 130 may send the piece of second map information L2P_MAP_INFO2 of all of the pieces of first map information L2P_MAP_INFO1 to the host 102 (SEND L2P_MAP_INFO2). Furthermore, the host 102 may store the piece of second map information L2P_MAP_INFO2 inputted from the memory system 110 in the internal memory 106 (STORING L2P_MAP_INFO2).

The operation described with reference to FIGS. 7 to 10 may be used for the operation SEND L2P_MAP_INFO2 in which the memory system 110 sends the piece of second map information L2P_MAP_INFO2 to the host 102.

Specifically, when sending a response RESPONSE2 corresponding to a second command COMMAND2 inputted from the host 102 to the host 102, the controller 130 included in the memory system 110 may add the piece of second map information L2P_MAP_INFO2 in the response RESPONSE2L2P_MAP_INFO. The second command COMMAND2 may include any one of various commands transmitted between the host 102 and the controller 130. For example, the second command COMMAND2 may be a read command, write command, or erase command. In an embodiment, the second command COMMAND2 may be a special command which is set for the host 102 to receive the piece of second map information L2P_MAP_INFO2 from the memory system 110.

In an embodiment, as described with reference to FIGS. 7 and 8, the controller 130 may include one or more map segments in the response RESPONSE2 to the second command COMMAND2 sent to the host 102 and send the response RESPONSE2 with the one or more map segments L2P_MAP_INFO2 to the host 102 L2P_MAP_INFO, after performing the command operation corresponding to the second command COMMAND2 inputted from the host 102. In an embodiment, when one or more map segments to be transmitted to the host 102 are present in the memory system 110 as described with reference to FIGS. 9 and 10, the controller 130 may notice, to the host 102, a request for sending the piece of second map information L2P_MAP_INFO2. When the request for sending the piece of second map information L2P_MAP_INFO2 is noticed from the memory system 110, the host 102 may check the state of the internal memory 106, selectively generate the second command COMMAND2 according to the check result, and send the second command COMMAND2 to the memory system 110. When the second command COMMAND2 is inputted from the host 102 according to the decision of the host 102, the memory system 110 may perform a command operation corresponding to the second command COMMAND2, and include one or more map segments in the response RESPONSE2 to the second command COMMAND2 sent to the host 1 and send the response RESPONSE2 with the one or more map segments L2P_MAP_INFO2 to the host 102 L2P_MAP_INFO. In an embodiment, when two or more map segments to be transmitted to the host 102 are present in the memory system 110, the controller 130 may successively include a set number of map segments in a response to one second command COMMAND2 and send the response with the map segments to the host 102.

Therefore, the pieces of second map information L2P_MAP_INFO2 shared by the host 102 and the memory system 110 may be managed on a map segment basis. That is, the pieces of second map information L2P_MAP_INFO2 may include a plurality of map segments, and the pieces of second map information L2P_MAP_INFO2 sent to the host 102 by the memory system 110 may include at least one map segment. Furthermore, log information OUT_INFO of the pieces of second map information L2P_MAP_INFO2 may also be generated in the form of information for sorting map segments. For example, as illustrated in FIG. 221A, the pieces of second map information L2P_MAP_INFO2 may include four map segments L2P SEGMENT #10, L2P SEGMENT #46, L2P SEGMENT #08 and L2P SEGMENT #26. Thus, the log information OUT_INFO of the piece of second map information L2P_MAP_INFO2 may also be generated in the form of information for sorting the map segments.

Furthermore, each of the segments included in the pieces of second map information L2P_MAP_INFO2 may include a group of two or more pieces of map information. For example, as illustrated in FIG. 221A, the pieces of second map information L2P_MAP_INFO2 may include the four map segments L2P SEGMENT #10, L2P SEGMENT #46, L2P SEGMENT #08 and L2P SEGMENT #26, and the four map segments may include four pieces of map information L2P #10_0, L2P #10_1, L2P #10_2 and L2P #10_3, L2P #46_0, L2P #46_1, L2P #46_2 and L2P #46_3, L2P #08_0, L2P #08_1, L2P #08_2 and L2P #08_3, and L2P #26_0, L2P #26_1, L2P #26_2 and L2P #26_3, respectively.

For reference, the configuration of FIG. 221A in which the four map segments are included in the piece of second map information L2P_MAP_INFO2 and four pieces of map information are included in each of the four map segments is only an embodiment. A different number of map segments or pieces of map information may be included.

The host 102 may store status bits VAF with the pieces of second map information L2P_MAP_INFO2 in the internal memory 106, the status bits VAF being used to express whether all of the pieces of map information included in the pieces of second map information L2P_MAP_INFO2 are available. For example, map information corresponding to the status bit VAF having a value of '0' may be available map information. On the other hand, map information corresponding to the status bit VAF having a value of '1' may be unavailable map information. In FIG. 221A, since all of the pieces of map information included in the pieces of second map information L2P_MAP_INFO2 may be stored in an available status in the memory 106 of the host 102, the status bits VAF corresponding to all of the pieces of map information included in the pieces of second map information L2P_MAP_INFO2 may have the value of '0'.

FIG. 221B illustrates the state in which all of the pieces of second map information L2P_MAP_INFO2 shared by the host 102 and the memory system 110 may be valid as in FIG. 221A.

In this state, based on a logical address to be sent to the memory system 110, the host 102 may search a physical address corresponding to the logical address in the pieces of second map information L2P_MAP_INFO2 stored therein. When the search result indicates that the physical address is present, the host 102 may transfer a first command COMMAND1 with the logical address and the physical address to the memory system 110. When the search result indicates that the physical address is not present, the host 102 may transfer the first command COMMAND1 including the physical address to the memory system 110. At this time, the host 102 may exclude map information from the search, the map information corresponding to the status bit VAF having an unavailable status value among the plural pieces of second map information L2P_MAP_INFO2. The map information which corresponds to the status bit VAF having an unavailable status value and is excluded from the search may be treated as if the map information were not included in the piece of second map information L2P_MAP_INFO2. Therefore, the physical address of the map information which is included in the pieces of second map information L2P_MAP_INFO2 and corresponds to the status bit VAF having the unavailable status value cannot be transferred to the memory system 110 with the first command COMMAND1. In an embodiment, in FIG. 221B, the host 102 may search the first physical address PBA #10_0 based on the pieces of second map information L2P_MAP_INFO2 stored in the internal memory 106. Therefore, the host 102 may send the first command COMMAND1 with the first physical address PBA #10_0 to the memory system 110. The time point that the host 102 sends the first command COMMAND1 with the first physical address PBA #10_0 to the memory system 110 may be defined as a 'time point A'.

The memory system 110 receiving the first command COMMAND1 with the physical address from the host 102 may perform a command operation corresponding to the first command COMMAND1, based on the physical address included in the first command COMMAND1, when the physical address is valid. However, when the physical address included in the first command COMMAND1 is invalid, the memory system 110 may perform the command operation corresponding to the first command COMMAND1 after a physical address is searched in map information stored therein. In an embodiment, in FIG. 221B, all of the pieces of second map information L2P_MAP_INFO2 shared by the host 102 and the memory system 110 may be valid. That is, the tenth map segment L2P SEGMENT #10 of the pieces of second map information L2P_MAP_INFO2 corresponding to the first physical address PBA #10_0 in the memory system 110 may not be yet updated. For this reason, the first physical address PBA #10_0 included in the first command COMMAND1 may also be valid in the memory system 110. Therefore, the memory system 110 may perform the command operation corresponding to the first command COMMAND1 using the first physical address PBA #10_0, and then send a response RESPONSE1{PBA #10_0} to the performed command operation to the host 102. The time point that the response RESPONSE1{PBA #10_0} sent in response to the first command COMMAND1 by the memory system 110 is received by the host 102 may be defined as a 'time point B'.

The host 102 checks a difference between the time point A and the time point B. According to the check result, the host 102 may determine whether the physical address transmitted with the first command COMMAND1 to the memory system 110 is available. That is, when the difference between the time point A and the time point B is equal to or less than a set reference value, the host 102 may determine that the physical address transmitted with the first command COMMAND1 to the memory system 110 is available. On the other hand, when the difference between the time point A and the time point B exceeds the set reference value, the host 102 may determine that the physical address transmitted with the first command COMMAND1 to the memory system 110 is unavailable. In an embodiment, in FIG. 221B, the first physical address PBA #10_0 transmitted with the first command COMMAND1 to the memory system 110 has been checked to be valid in the memory system 110, and is used for the command operation. Thus, the difference between the time point A and the time point B for the first physical address PBA #10_0 may be equal to or less than the set reference value. Therefore, the host 102 may continuously retain the value of the status bit VAF of the map information L2P #10_0 corresponding to the first physical address PBA #10_0 as '0' indicating the available status.

FIG. 221C illustrates the state in which a predetermined operation may be performed by the memory system 110 in the state of FIG. 221B, such that some of the pieces of second map information L2P_MAP_INFO2 are updated.

Specifically, in an embodiment, the tenth map segment L2P SEGMENT #10 of the pieces of second map information L2P_MAP_INFO2 in the memory system 110 may have been updated by the predetermined operation. However, since the status of the tenth map segment L2P SEGMENT #10, which has been updated by the predetermined operation in the memory system 110, is not yet transferred to the host 102, the host 102 does not know that the tenth map segment L2P SEGMENT #10 has been updated.

In this state, the host 102 may search the first physical address PBA #10_0 based on the pieces of second map information L2P_MAP_INFO2 stored in the internal memory 106. Therefore, the host 102 may send the first command COMMAND1 with the first physical address PBA #10_0 to the memory system 110. The time point that the host 102 sends the first command COMMAND1 with the first physical address PBA #10_0 to the memory system 110 may be defined as a 'time point A'.

The memory system 110 may recognize that the tenth map segment L2P SEGMENT #10 of the piece of second map information L2P_MAP_INFO2 has been updated, by checking the log information OUT_INFO of the pieces of second map information L2P_MAP_INFO2. For this reason, the memory system 110 may recognize that the first physical address PBA #10_0 included in the first command COMMAND1 received from the host 102 is invalid. Therefore, the memory system 110 may not use the first physical address PBA #10_0 received from the host 102. Instead, the memory system 110 may search a new physical address in all of the pieces of first map information L2P_MAP_INFO1, the new physical address corresponding to a logical address (not illustrated) included in the first command COMMAND1 received from the host 102. The memory system 110 may perform a command operation corresponding to the first command COMMAND1 using the physical address newly searched in all of the pieces of first map information L2P_MAP_INFO1, and then send a response RESPONSE1{PBA #10_0} to the performed command operation to the host 102. The time point that the response RESPONSE1{PBA #10_0} sent in response to the first command COMMAND1 by the memory system 110 is received by the host 102 may be defined as a 'time point B'.

The first physical address PBA #10_0 transmitted with the first command COMMAND1 to the memory system 110 has been checked to be invalid by the memory system 110, and has not been used. Instead, a new physical address has been searched and used for the command operation. Thus, the difference between the time point A and the time point B for the first physical address PBA #10_0 may exceed the set reference value. Therefore, the host 102 may set the value of the status bit VAF of the map information L2P #10_0 corresponding to the first physical address PBA #10_0 to '1' indicating the unavailable status.

The host 102 may sort a map segment satisfying a predefined condition, among the plurality of map segments included in the piece of second map information L2P_MAP_INFO2 stored therein, into a selected map segment. At this time, the host 102 may check the values of the status bits VAF of the plurality of map segments on a segment basis. When a ratio of the status bits VAF having the unavailable status value among all of the status bits VAF is equal to or more than a set ratio, the host 102 may sort the corresponding map segments into selected map segments. That is, when the ratio of map information whose status bits VAF have the unavailable status value, among plural pieces of map information included in any one specific map segment of the plurality of map segments, is equal to or more than the set ratio, the specific map segment may be sorted into a selected map segment. On the other hand, when the ratio of map information whose status bits VAF have the unavailable status value, among plural pieces of map information included in any one specific map segment of the plurality of map segments, is less than the set ratio, the specific map segment may not be sorted into a selected map segment. In an embodiment, in FIG. 221C, the host 102 may include four map segments L2P SEGMENT #10, L2P SEGMENT #46, L2P SEGMENT #08, L2P SEGMENT #26, and check whether to sort the tenth map segment L2P SEGMENT #10 into a selected map segment. At this time, FIG. 221C shows that, among the status bits VAF of the four pieces of map information L2P #10_0, L2P #10_1, L2P #10_2, L2P #10_3 included in the tenth map segment L2P SEGMENT #10, three status bits VAF have a value of '0' indicating the available status, and the other one status bit VAF has a value of '1' indicating the unavailable status. When the set ratio is 50%, the host 102 may check that the ratio of unavailable map information among the plural pieces of map information L2P #10_0, L2P #10_1, L2P #10_2, L2P #10_3 included in the tenth map segment L2P SEGMENT #10 is less than the set ratio. Therefore, the host 102 may not sort the tenth map segment L2P SEGMENT #10 into a selected map segment.

The host 102 may set various time points and various conditions for performing the above-described operation of sorting a map segment into a selected map segment, i.e. the operation of sorting a map segment in the piece of second map information L2P_MAP_INFO2 stored therein into a selected map segment according to the state of the host 102 or a designer's selection. For example, when the number of operations which are supposed to be performed by the host 102 is very small, the host 102 may autonomously check all of the statuses of the plurality of map segments included in the piece of second map information L2P_MAP_INFO2 stored therein, and perform the operation of sorting map segments into selected map segments. For another example, when setting the value of the status bit VAF of map information corresponding to a specific physical address to the unavailable status, the host 102 may check the status of the map segment including the corresponding map information, and perform the operation of sorting the map segment into a selected map segment. That is, when setting the value of the status bit VAF of the map information L2P #10_0 corresponding to the first physical address PBA #10_0 to '1' indicating the unavailable status as illustrated in FIG. 221C, the host 102 may check the status of the tenth map segment L2P SEGMENT #10 including the corresponding map information L2P #10_0, and perform the operation of sorting the map segment into a selected map segment.

FIG. 221D illustrates the state in which the operation described with reference to FIG. 221C may be completed, that is, the status bits VAF of some pieces of map information among the plural pieces of second map information L2P_MAP_INFO2 stored in the host 102 may be set to the unavailable status value. In the memory system 110, some pieces of map information of the plural pieces of second map information L2P_MAP_INFO2 may be continuously updated.

Specifically, in an embodiment, the tenth map segment L2P SEGMENT #10 of the piece of second map information L2P_MAP_INFO2 may have been updated by the predetermined operation in the memory system 110. However, since the status of the tenth map segment L2P SEGMENT #10, which has been updated by the predetermined operation in the memory system 110, is not yet transferred to the host 102, the host 102 does not know that the tenth map segment L2P SEGMENT #10 has been updated. Furthermore, in the host 102, the status bit VAF of the first map information L2P #10_0 among the plural pieces of map information L2P #10_0, L2P #10_1, L2P #10_2, L2P #10_3 included in the tenth map segment L2P SEGMENT #10 of the piece of second map information L2P_MAP_INFO2 may be set to '1' indicating the unavailable status.

In this state, the host 102 may search the second physical address PBA #10_2 based on the piece of second map information L2P_MAP_INFO2 stored in the internal memory 106. Therefore, the host 102 may send the first command COMMAND1 with the second physical address PBA #10_2 to the memory system 110. The time point that the host 102 sends the first command COMMAND1 with the second physical address PBA #10_2 to the memory system 110 may be defined as 'time point A'.

The memory system 110 may recognize that the tenth map segment L2P SEGMENT #10 of the piece of second map information L2P_MAP_INFO2 has been updated, by checking the log information OUT_INFO of the piece of second map information L2P_MAP_INFO2. For this reason, the memory system 110 may recognize that the second physical address PBA #10_2 included in the first command COMMAND1 received from the host 102 is invalid. Therefore, the memory system 110 may not use the second physical address PBA #10_2 received from the host 102. Instead, the memory system 110 may search a new physical address in all of the first map information L2P_MAP_INFO1, the new physical address corresponding to a logical address (not illustrated) included in the first command COMMAND1 received from the host 102. The memory system 110 may perform a command operation corresponding to the first command COMMAND1 using the physical address newly searched in all of the first map information L2P_MAP_INFO1, and then send a response RESPONSE1{PBA #10_2} to the performance to the host 102. The time point that the response RESPONSE1{PBA #10_2} sent in response to the first command COMMAND1 by the memory system 110 is received by the host 102 may be defined as 'time point B'.

The second physical address PBA #10_2 transmitted with the first command COMMAND1 to the memory system 110 has been checked to be invalid by the memory system 110, and has not been used. Instead, a new physical address has been searched and used for the command operation. Thus, a difference between the time point A and the time point B for the second physical address PBA #10_2 may exceed the set reference value. Therefore, the host 102 may set the value of the status bit VAF of the map information L2P #10_2 corresponding to the second physical address PBA #10_2 to '1' indicating the unavailable status.

Then, the host 102 may check whether to sort the tenth map segment L2P SEGMENT #10 including the map information L2P #10_2 corresponding to the second physical address PBA #10_2 into a selected map segment. At this time, FIG. 221D shows that, among the status bits VAF of the four pieces of map information L2P #10_0, L2P #10_1, L2P #10_2, L2P #10_3 included in the tenth map segment L2P SEGMENT #10, two status bits VAF have a value of '0' indicating the available status, and the other two status bits VAF have a value of '1' indicating the unavailable status. When the set ratio is 50%, the host 102 may check that the ratio of unavailable map information among the plural pieces of map information L2P #10_0, L2P #10_1, L2P #10_2, L2P #10_3 included in the tenth map segment L2P SEGMENT #10 is equal to the set ratio. Therefore, the host 102 may sort the tenth map segment L2P SEGMENT #10 into a selected map segment.

When one or more selected map segments are present in the plurality of map segments included in the piece of second map information L2P_MAP_INFO2 stored in the host 102, the host 102 may generate a second command COMMAND2 and send the second command COMMAND2 to the memory system 110, in order to receive one or more map segments for replacing the one or more selected map segments from the memory system 110. That is, when receiving a response RESPONSE2 to the second command COMMAND2 from the memory system 110 after generating and sending the second command COMMAND2 to the memory system 110, the host 102 may include one or more map segments included in the response RESPONSE2 in the piece of second map information L2P_MAP_INFO2 instead of the one or more selected map segments, and store the piece of second map information L2P_MAP_INFO2 with the one or map segments in the internal memory 144.

FIG. 221E illustrates the state in which the operation described with reference to FIG. 221D may be completed, that is, some map segments of the plurality of map segments included in the piece of second map information L2P_MAP_INFO2 stored in the host 102 may be sorted into selected map segments. At this time, in the memory system 110, some of the piece of second map information L2P_MAP_INFO2 may be continuously updated.

Specifically, in an embodiment, the tenth map segment L2P SEGMENT #10 of the piece of second map information L2P_MAP_INFO2 may have been updated by the predetermined operation in the memory system 110. However, since the status of the tenth map segment L2P SEGMENT #10, which has been updated by the predetermined operation in the memory system 110, is not yet transferred to the host 102, the host 102 cannot know that the tenth map segment L2P SEGMENT #10 has been updated. Among the four map segments L2P SEGMENT #10, L2P SEGMENT #46, L2P SEGMENT #08, L2P SEGMENT #26 included in the piece of second map information L2P_MAP_INFO2, the tenth map segment L2P SEGMENT #10 may have been sorted into a selected map segment in the host 102.

In this state, the host 102 may generate the second command COMMAND2 and send the second command COMMAND2 to the memory system 110, in order to request a map segment to be stored in the piece of second map information L2P_MAP_INFO2 from the memory system 110, instead of the tenth map segment L2P SEGMENT #10 sorted into a selected map segment.

The memory system 110 may include the updated tenth map segment L2P SEGMENT #10 in the response RESPONSE2 to the second command COMMAND2 inputted from the host 102, and send the response RESPONSE2 with the updated tenth map segment L2P SEGMENT #10 to the host 102. At this time, the memory system 110 may change the log information of the tenth map segment L2P SEGMENT #10 in the log information OUT_INFO of the piece of second map information L2P_MAP_INFO2 to a non-updated status, in response to the sending of the updated tenth map segment L2P SEGMENT #10 to the host 102. That is, before the updated tenth map segment L2P SEGMENT #10 is transmitted to the host 102 from the memory system 110, the value of the tenth map segment L2P SEGMENT #10 stored in the memory system 110 has been changed to a different value from that of the tenth map segment L2P SEGMENT #10 stored in the host 102 by a predetermined operation of the memory system 110. Thus, the memory system 110 has changed the log information OUT_INFO of the tenth map segment L2P SEGMENT #10 into an updated status. However, as the updated tenth map segment L2P SEGMENT #10 is transmitted to the host 102 from the memory system 110, the values of the tenth map segment L2P SEGMENT #10 stored in the memory system 110 and the tenth map segment L2P SEGMENT #10 stored in the host 102 may become equal to each other again. Therefore, the memory system 110 may change the log information OUT_INFO of the tenth map segment L2P SEGMENT #10 into the non-updated status.

The host 102 may receive the response to the second command COMMAND2, i.e. the response RESPONSE2 with the tenth map segment of the piece of second map information L2P_MAP_INFO2{L2P SEGMENT #10} from the memory system 110. Furthermore, the host 102 may store the tenth map segment L2P SEGMENT #10 inputted from the memory system 110 in the internal memory 106, instead of the tenth map segment L2P SEGMENT #10 which has been sorted into a selected map segment before. Therefore, the status bits VAF of all the pieces of map information L2P #10_0, L2P #10_1, L2P #10_2, L2P #10_3 included in the tenth map segment L2P SEGMENT #10 stored in the host 102 may become '0' indicating the available status.

FIG. 22lF illustrates the state in which the operation described with reference to FIG. 22lD may be completed, that is, some map segments among the plurality of map segments included in the piece of second map information L2P_MAP_INFO2 stored in the host 102 may be sorted into selected map segments. In the memory system 110, some map information of the piece of second map information L2P_MAP_INFO2 may be continuously updated.

Specifically, in an embodiment, the tenth map segment L2P SEGMENT #10 of the piece of second map information L2P_MAP_INFO2 may have been updated by the predetermined operation in the memory system 110. However, since the status of the tenth map segment L2P SEGMENT #10, which has been updated by the predetermined operation in the memory system 110, is not yet transferred to the host 102, the host 102 does not know that the tenth map segment L2P SEGMENT #10 has been updated. Among the four map segments L2P SEGMENT #10, L2P SEGMENT #46, L2P SEGMENT #08, L2P SEGMENT #26 included in the piece of second map information L2P_MAP_INFO2, the tenth map segment L2P SEGMENT #10 may have been sorted into a selected map segment in the host 102.

In this state, the host 102 may generate the second command COMMAND2 and send the second command COMMAND2 to the memory system 110, in order to request a map segment to be stored in the piece of second map information L2P_MAP_INFO2 from the memory system 110, instead of the tenth map segment L2P SEGMENT #10 sorted into a selected map segment.

The memory system 110 may include the 17th map segment L2P SEGMENT #17 in the response RESPONSE2 to the second command COMMAND2 inputted from the host 102, and send the response RESPONSE2 with the 17th map segment L2P SEGMENT #17 to the host 102. That is, the memory system 110 may select the 17th map segment L2P SEGMENT #17, which is a totally different map segment, from all of the pieces of first map information L2P_MAP_INFO1 instead of the updated tenth map segment L2P SEGMENT #10, and include the 17th map segment L2P SEGMENT #17 in the piece of second map information L2P_MAP_INFO2. Thus, the memory system 110 may include the 17th map segment L2P SEGMENT #17 in the response RESPONSE2 to the second command COMMAND2 inputted from the host 102, instead of the updated tenth map segment L2P SEGMENT #10, and send the response RESPONSE2 with the 17th map segment L2P SEGMENT #10.

The host 102 may receive the response to the second command COMMAND2, i.e. the response RESPONSE2 with the 17th map segment of the piece of second map information L2P_MAP_INFO2{L2P SEGMENT #17} from the memory system 110. Furthermore, the host 102 may store the 17th map segment L2P SEGMENT #17 inputted from the memory system 110 in the internal memory 106, instead of the tenth map segment L2P SEGMENT #10 which has been sorted into a selected map segment before. Therefore, the tenth map segment L2P SEGMENT #10 which has been sorted into a selected map segment may be erased from the piece of second map information L2P_MAP_INFO2 stored in the host 102, and the 17th map segment L2P SEGMENT #17 may be stored instead. In this state, no selected map segments may be present in the piece of second map information L2P_MAP_INFO2 stored in the host 102.

Figure 22A:
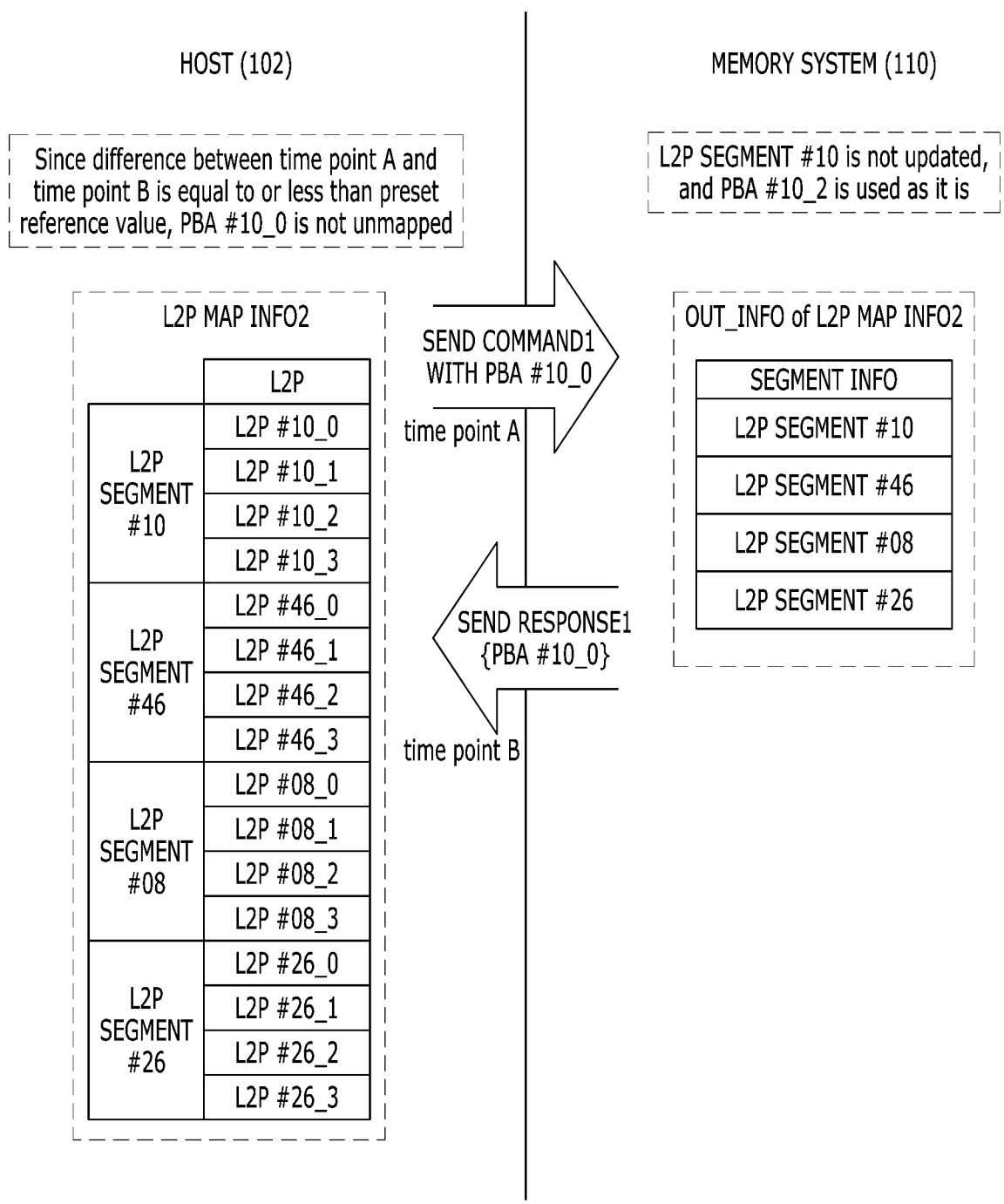
FIGS. 22A to 22C show another operation through which the host and the memory system share map information in accordance with an embodiment.
Figure 22B:
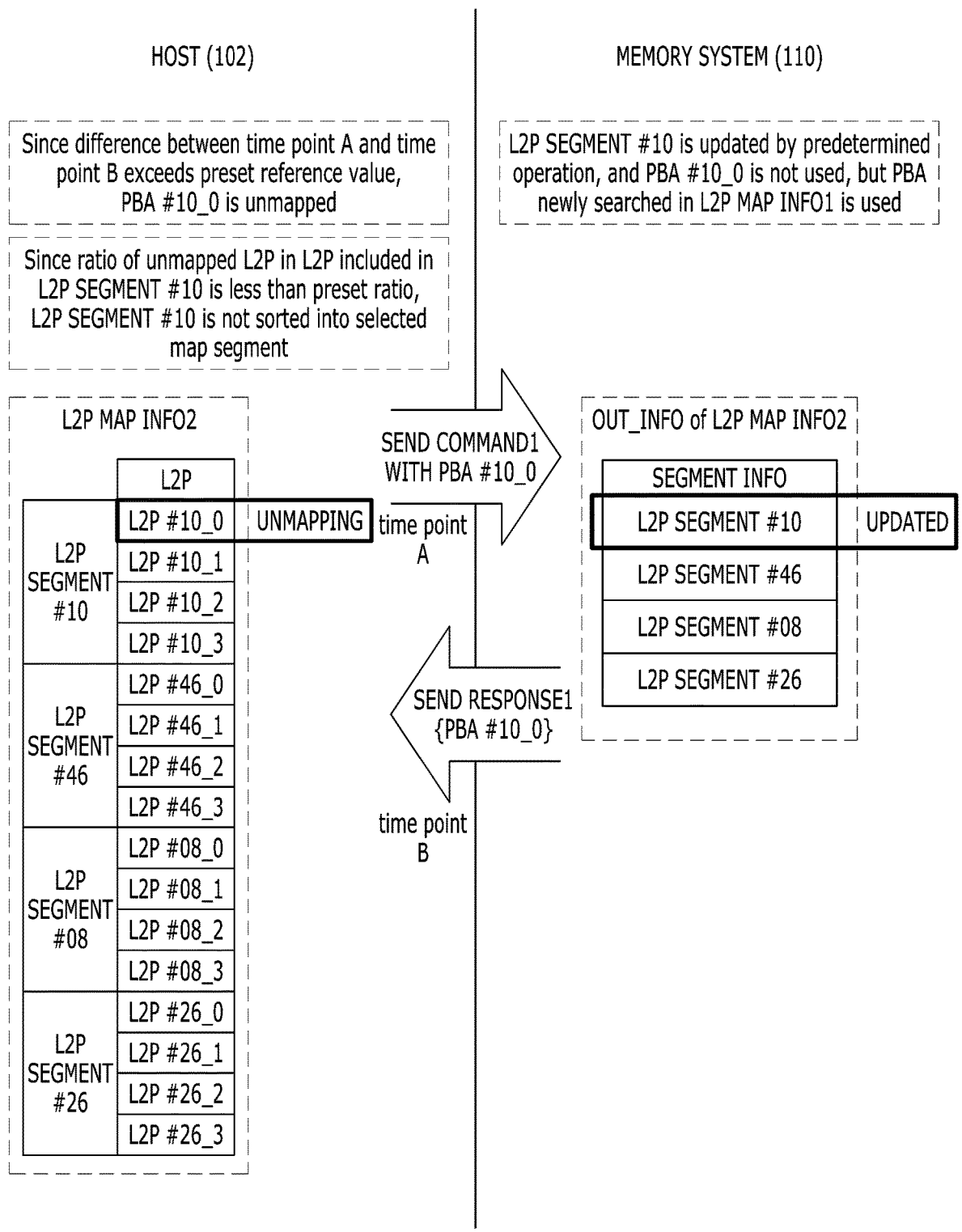
Figure 22C:
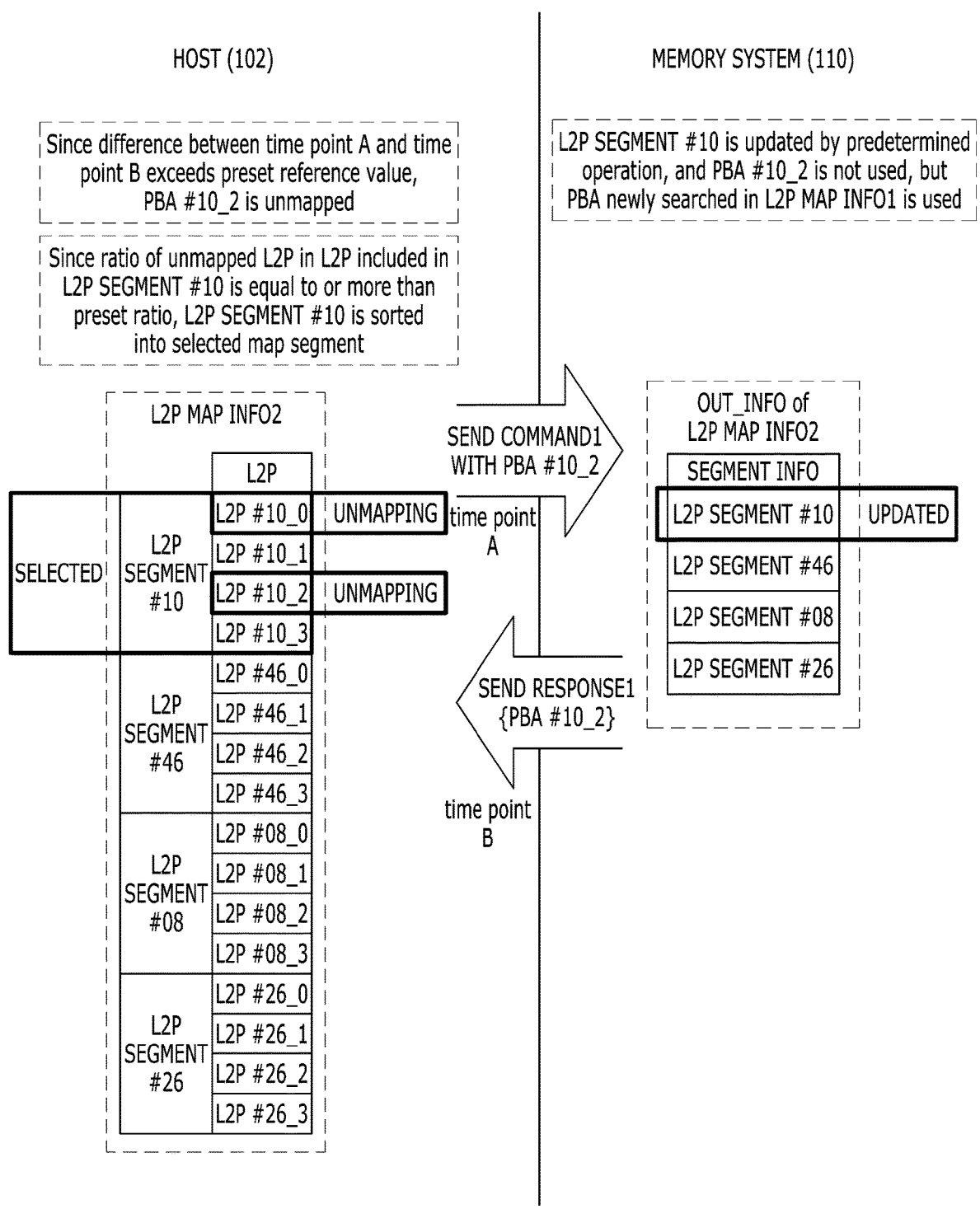

FIGS. 22A to 22C are diagrams for describing a second operation through which the host and the memory system share map information in accordance with an embodiment.

FIG. 22A illustrates the state in which all of the pieces of second map information L2P_MAP_INFO2 shared by the host 102 and the memory system 110 may be valid as described with reference to FIG. 22lA. FIG. 22A is different from FIG. 22lA in that the host 102 stores the piece of second map information L2P_MAP_INFO2 with no status bits VAF in the internal memory 144. Therefore, in FIG. 22A, the piece of second map information L2P_MAP_INFO2 stored in the host 102 has no status bits VAF. Instead of not using the status bits VAF, the memory system 110 in FIG. 22A may sort the piece of second map information L2P_MAP_INFO2 stored in the host 102 into available map information and unavailable map information through an operation of unmapping invalid second map information L2P_MAP_INFO2 in the piece of second map information L2P_MAP_INFO2 stored in the host 102.

Specifically, referring to FIG. 22A, all of the pieces of second map information L2P_MAP_INFO2 shared by the host 102 and the memory system 110 may be valid. Therefore, no unmapped map information exists in the piece of second map information L2P_MAP_INFO2 stored in the host 102.

In this state, based on a logical address to be sent to the memory system 110, the host 102 may search a physical address corresponding to the logical address in the piece of second map information L2P_MAP_INFO2 stored therein. When the physical address associated with the logical address is found, the host 102 may transfer a first command COMMAND1 with the logical address and the physical address to the memory system 110. When the physical address associated with the logical address is not found, the host 102 may transfer the first command COMMAND1 with the logical address to the memory system 110. At this time, the host 102 may exclude the unmapped map information of the piece of second map information L2P_MAP_INFO2 from the search. The unmapped map information excluded from the search may be treated as if the unmapped map information were not included in the piece of second map information L2P_MAP_INFO2. Therefore, the physical address of the unmapped map information included in the piece of second map information L2P_MAP_INFO2 cannot be transferred to the memory system 110 with the first command COMMAND1. In an embodiment, in FIG. 22A, the host 102 may search the first physical address PBA #10_0 based on the piece of second map information L2P_MAP_INFO2 stored in the internal memory 106. Therefore, the host 102 may send the first command COMMAND1 with the first physical address PBA #10_0 to the memory system 110. The time point that the host 102 sends the first command COMMAND1 with the first physical address PBA #10_0 to the memory system 110 may be defined as a 'time point A'.

The memory system 110 receiving the first command COMMAND1 with the physical address from the host 102 may perform a command operation corresponding to the first command COMMAND1, based on the physical address included in the first command COMMAND1, when the physical address is valid. However, when the physical address included in the first command COMMAND1 is invalid, the memory system 110 may perform the command operation corresponding to the first command COMMAND1, after a physical address is searched in map information stored therein. In an embodiment, in FIG. 22A, all of the pieces of second map information L2P_MAP_INFO2 shared by the host 102 and the memory system 110 may be valid. That is, the tenth map segment L2P SEGMENT #10 of the piece of second map information L2P_MAP_INFO2 corresponding to the first physical address PBA #10_0 in the memory system 110 may not be yet updated. For this reason, the first physical address PBA #10_0 included in the first command COMMAND1 may also be valid in the memory system 110. Therefore, the memory system 110 may perform the command operation corresponding to the first command COMMAND1 using the first physical address PBA #10_0, and then send a response RESPONSE1{PBA #10_0} to the performance to the host 102. The time point that the response RESPONSE1{PBA #10_0} sent in response to the first command COMMAND1 by the memory system 110 is received by the host 102 may be defined as a 'time point B'.

The host 102 may check a difference between the time point A and the time point B, and determine whether the physical address transmitted with the first command COMMAND1 to the memory system 110 is available, according to the check result. That is, when the difference between the time point A and the time point B is equal to or less than the set reference value, the host 102 may determine that the physical address transmitted with the first command COMMAND1 to the memory system 110 is available. On the other hand, when the difference between the time point A and the time point B exceeds the set reference value, the host 102 may determine that the physical address transmitted with the first command COMMAND1 to the memory system 110 is unavailable. In an embodiment, in FIG. 22A, the first physical address PBA #10_0 transmitted with the first command COMMAND1 to the memory system 110 has been checked to be also valid in the memory system 110, and used for the command operation. Therefore, the difference between the time point A and the time point B for the first physical address PBA #10_0 may be equal to or less than the set reference value. Thus, the host 102 may not unmap the map information L2P #10_0 corresponding to the first physical address PBA #10_0.

FIG. 22B illustrates the state in which the predetermined operation may be performed by the memory system 110 in the state of FIG. 22A, such that some of the piece of second map information L2P_MAP_INFO2 are updated.

Specifically, in an embodiment, the tenth map segment L2P SEGMENT #10 of the piece of second map information L2P_MAP_INFO2 may have been updated by the predetermined operation in the memory system 110. However, since the status of the tenth map segment L2P SEGMENT #10, which has been updated by the predetermined operation in the memory system 110, is not yet transferred to the host 102, the host 102 does not know that the tenth map segment L2P SEGMENT #10 has been updated.

In this state, the host 102 may search the first physical address PBA #10_0 based on the piece of second map information L2P_MAP_INFO2 stored in the internal memory 106. Therefore, the host 102 may send the first command COMMAND1 with the first physical address PBA #10_0 to the memory system 110 (SEND COMMAND WITH PBA #10_0). The time point that the host 102 sends the first command COMMAND1 with the first physical address PBA #10_0 to the memory system 110 may be defined as a 'time point A'.

The memory system 110 may recognize that the tenth map segment L2P SEGMENT #10 of the piece of second map information L2P_MAP_INFO2 has been updated, by checking the log information OUT_INFO of the piece of second map information L2P_MAP_INFO2. For this reason, the memory system 110 may recognize that the first physical address PBA #10_0 included in the first command COMMAND1 received from the host 102 is invalid. Therefore, the memory system 110 may not use the first physical address PBA #10_0 received from the host 102. Instead, the memory system 110 may search a new physical address in all of the pieces of first map information L2P_MAP_INFO1, the new physical address corresponding to a logical address (not illustrated) included in the first command COMMAND1 received from the host 102. The memory system 110 may perform a command operation corresponding to the first command COMMAND1 using the physical address newly searched in all of the pieces of first map information L2P_MAP_INFO1, and then send a response RESPONSE1{PBA #10_0} to the performed command operation to the host 102. The time point that the response RESPONSE1{PBA #10_0} sent in response to the first command COMMAND1 by the memory system 110 is received by the host 102 may be defined as a 'time point B'.

The first physical address PBA #10_0 transmitted with the first command COMMAND1 to the memory system 110 has been checked to be invalid by the memory system 110, and has not been used. Instead, a new physical address has been searched and used for the command operation. Therefore, a difference between the time point A and the time point B for the first physical address PBA #10_0 may exceed the set reference value. Thus, the host 102 may unmap the map information L2P #10_0 corresponding to the first physical address PBA #10_0.

The host 102 may sort a map segment satisfying a predefined condition, among the plurality of map segments included in the piece of second map information L2P_MAP_INFO2 stored therein, into a selected map segment. At this time, the host 102 may check a ratio of unmapped map information to the plurality of map segments. When the ratio of the unmapped map information to the entire map information is equal to or more than a set ratio, the host 102 may sort the corresponding map segment into a selected map segment. That is, when the ratio of unmapped map information among plural pieces of map information included in any one specific map segment of the plurality of map segments is equal to or more than the set ratio, the specific map segment may be sorted into a selected map segment. On the other hand, when the ratio of the unmapped map information among the plural pieces of map information included in any one specific map segment of the plurality of map segments is less than the set ratio, the specific map segment may not be sorted into a selected map segment. In an embodiment, in FIG. 22C, the host 102 may include four map segments L2P SEGMENT #10, L2P SEGMENT #46, L2P SEGMENT #08, L2P SEGMENT #26, and check whether to sort the tenth map segment L2P SEGMENT #10 into a selected map segment. At this time, FIG. 22C shows that, among the four pieces of map information L2P #10_0, L2P #10_1, L2P #10_2, L2P #10_3 included in the tenth map segment L2P SEGMENT #10, three pieces of map information are not unmapped, and only the other piece of map information is unmapped. When the set ratio is 50%, the host 102 may check that the ratio of unmapped map information among the plural pieces of map information L2P #10_0, L2P #10_1, L2P #10_2, L2P #10_3 included in the tenth map segment L2P SEGMENT #10 is less than the set ratio. Therefore, the host 102 may not sort the tenth map segment L2P SEGMENT #10 into a selected map segment.

The host 102 may establish or set various time points and various conditions for performing the above-described operation of sorting a map segment into a selected map segment, i.e. the operation of sorting a map segment among the plurality of map segments included in the piece of second map information L2P_MAP_INFO2 stored therein into a selected map segment according to the state of the host 102 or a designer's selection. For example, when the number of operations which are supposed to be performed by the host 102 is very small, the host 102 may independently check all of the statuses of the plurality of map segments included in the piece of second map information L2P_MAP_INFO2 stored therein, and perform the operation of sorting map segments into selected map segments. For another example, when unmapping map information corresponding to a specific physical address, the host 102 may check the status of the map segment including the corresponding map information, and perform the operation of sorting the map segment into a selected map segment. That is, when unmapping the map information L2P #10_0 corresponding to the first physical address PBA #10_0 as illustrated in FIG. 22B, the host 102 may check the status of the tenth map segment L2P SEGMENT #10 including the corresponding map information L2P #10_0, and perform the operation of sorting the map segment into a selected map segment.

FIG. 22C illustrates the case in which the operation described with reference to FIG. 22B may be completed, that is, some pieces of map information among the plural pieces of second map information L2P_MAP_INFO2 stored in the host 102 may be unmapped. In the memory system 110, some pieces of map information among the plural pieces of the piece of second map information L2P_MAP_INFO2 may be continuously updated.

Specifically, in an embodiment, the tenth map segment L2P SEGMENT #10 of the piece of second map information L2P_MAP_INFO2 may have been updated by the predetermined operation in the memory system 110. However, since the status of the tenth map segment L2P SEGMENT #10, which has been updated by the predetermined operation in the memory system 110, is not yet transferred to the host 102, the host 102 does not know that the tenth map segment L2P SEGMENT #10 has been updated. In the host 102, the first map information L2P #10_0 among the plural pieces of map information L2P #10_0, L2P #10_1, L2P #10_2, L2P #10_3 included in the tenth map segment L2P SEGMENT #10 of the piece of second map information L2P_MAP_INFO2 may be unmapped.

In this state, the host 102 may search the second physical address PBA #10_2 based on the piece of second map information L2P_MAP_INFO2 stored in the internal memory 106. Therefore, the host 102 may send the first command COMMAND1 with the second physical address PBA #10_2 to the memory system 110. The time point that the host 102 sends the first command COMMAND1 with the second physical address PBA #10_2 to the memory system 110 may be defined as a 'time point A'.

The memory system 110 may recognize that the tenth map segment L2P SEGMENT #10 of the piece of second map information L2P_MAP_INFO2 has been updated, by checking the log information OUT_INFO of the piece of second map information L2P_MAP_INFO2. For this reason, the memory system 110 may recognize that the second physical address PBA #10_2 included in the first command COMMAND1 received from the host 102 is invalid. Therefore, the memory system 110 may not use the second physical address PBA #10_2 received from the host 102. Instead, the memory system 110 may search for a new physical address in all of the pieces of first map information L2P_MAP_INFO1, the new physical address corresponding to a logical address (not illustrated) included in the first command COMMAND1 received from the host 102. The memory system 110 may perform a command operation corresponding to the first command COMMAND1 using the physical address newly searched in all of the pieces of first map information L2P_MAP_INFO1, and then send a response RESPONSE1{PBA #10_2} to the performed command operation to the host 102. The time point that the response RESPONSE1{PBA #10_2} sent in response to the first command COMMAND1 by the memory system 110 is received by the host 102 may be defined as a 'time point B'.

The second physical address PBA #10_2 transmitted with the first command COMMAND1 to the memory system 110 has been checked to be invalid by the memory system 110, and has not been used. Instead, a new physical address has been searched and used for the command operation. Therefore, a difference between the time point A and the time point B for the second physical address PBA #10_2 may exceed the set reference value. Thus, the host 102 may unmap the map information L2P #10_2 corresponding to the second physical address PBA #10_2.

Then, the host 102 may check whether to sort the tenth map segment L2P SEGMENT #10 including the map information L2P #10_2 corresponding to the second physical address PBA #10_2 into a selected map segment. At this time, FIG. 22C shows that, among the four pieces of map information L2P #10_0, L2P #10_1, L2P #10_2, L2P #10_3 included in the tenth map segment L2P SEGMENT #10, two pieces of map information are not unmapped, and the other two pieces of map information are unmapped. When the set ratio is 50%, the host 102 may check that the ratio of unmapped map information among the plural pieces of map information L2P #10_0, L2P #10_1, L2P #10_2, L2P #10_3 included in the tenth map segment L2P SEGMENT #10 is equal to the preset ratio. Therefore, the host 102 may sort the tenth map segment L2P SEGMENT #10 into a selected map segment SELECTED.

When one or more selected map segments are present in the plurality of map segments included in the piece of second map information L2P_MAP_INFO2 stored in the host 102, the host 102 may generate the second command COMMAND2 and send the second command COMMAND2 to the memory system 110, in order to receive one or more map segments for replacing the one or more selected map segments from the memory system 110. That is, when receiving the response RESPONSE2 to the second command COMMAND2 from the memory system 110 after generating and sending the second command COMMAND2 to the memory system 110, the host 102 may include one or more map segments included in the response RESPONSE2 in the piece of second map information L2P_MAP_INFO2 instead of the one or more selected map segments, and store the piece of second map information L2P_MAP_INFO2 with the one or more map segments in the internal memory 144.

Figure 21A:
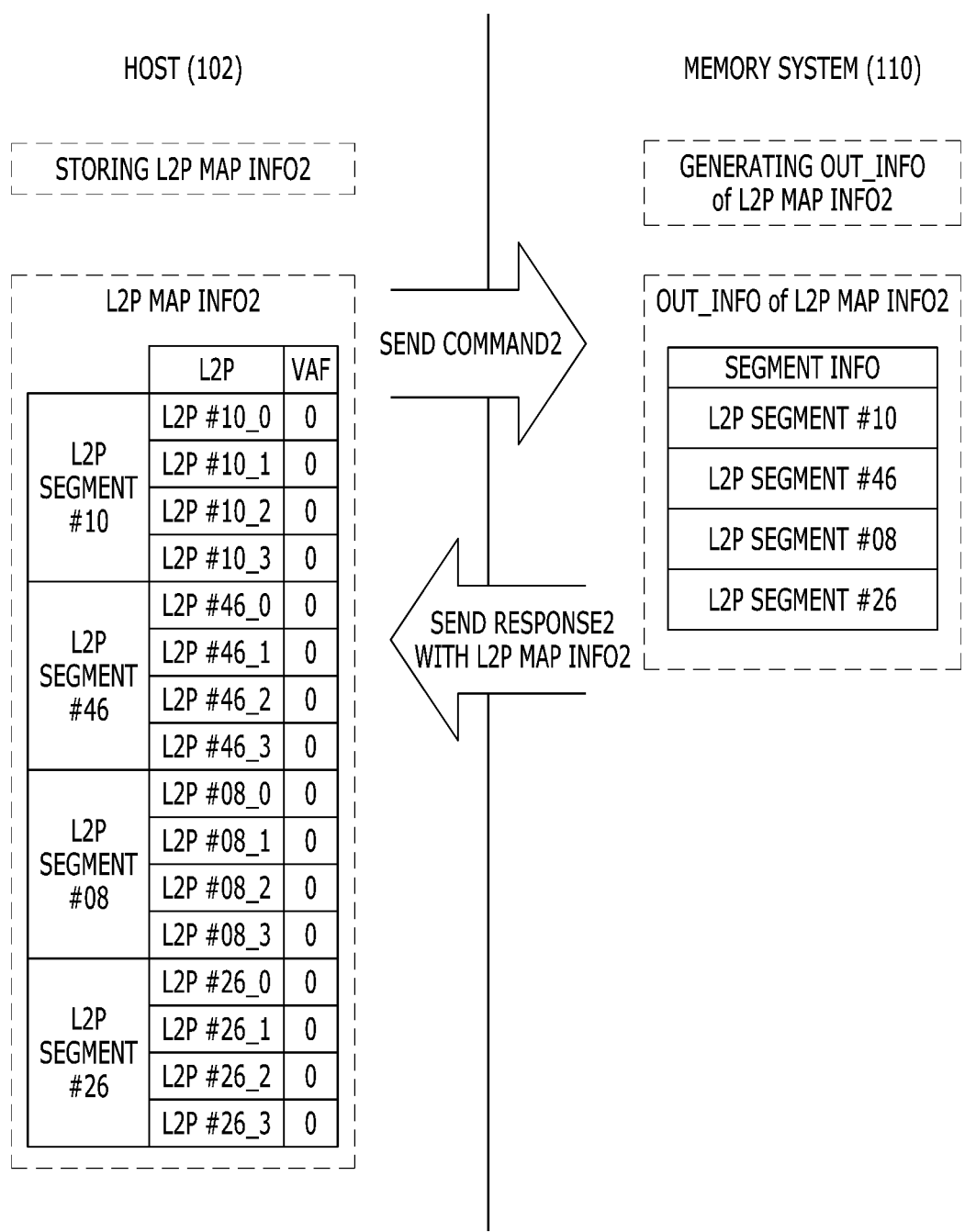
FIGS. 21A to 21F show another operation through which the host and the memory system share map information in accordance with an embodiment.
Figure 21B:
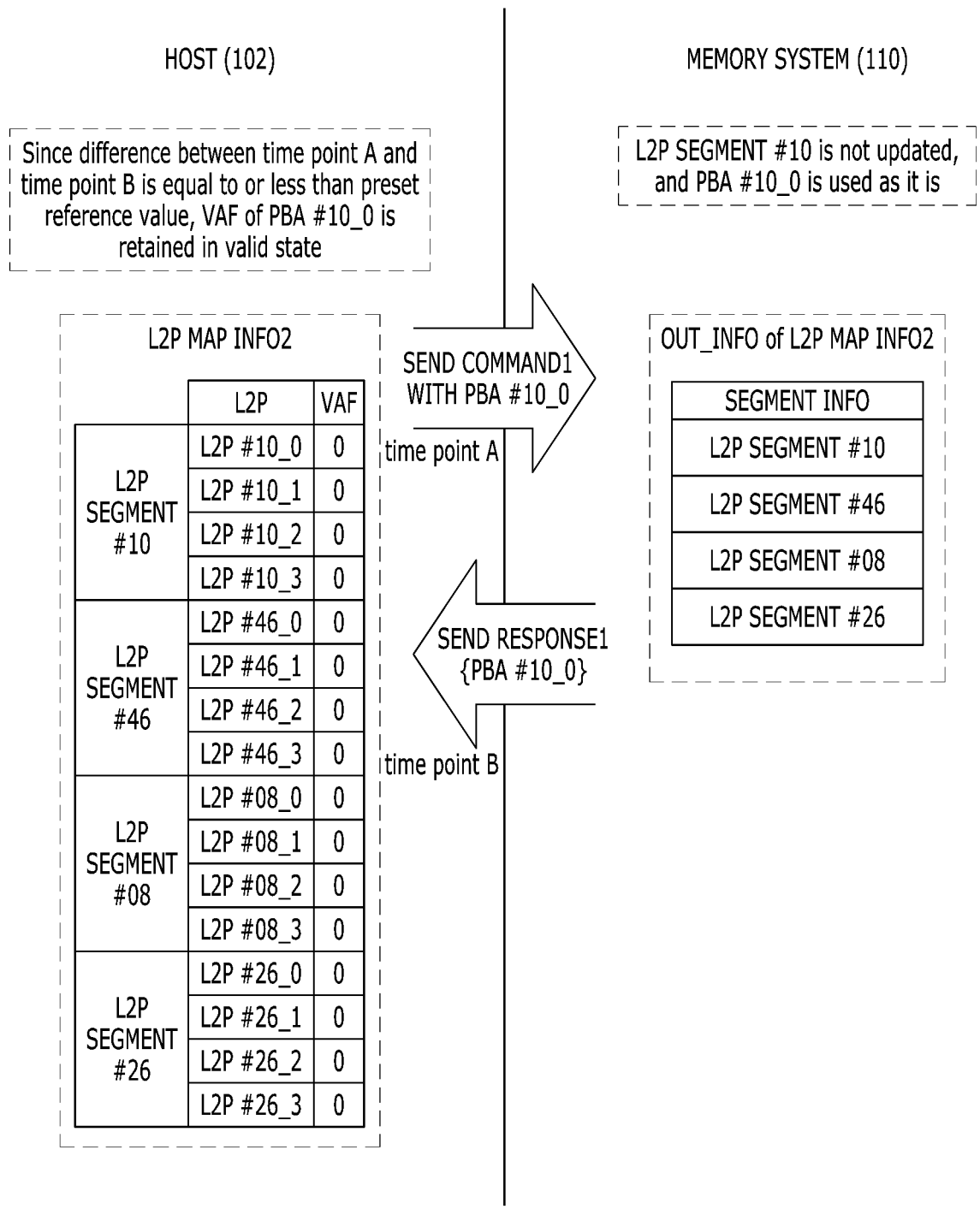
Figure 21C:
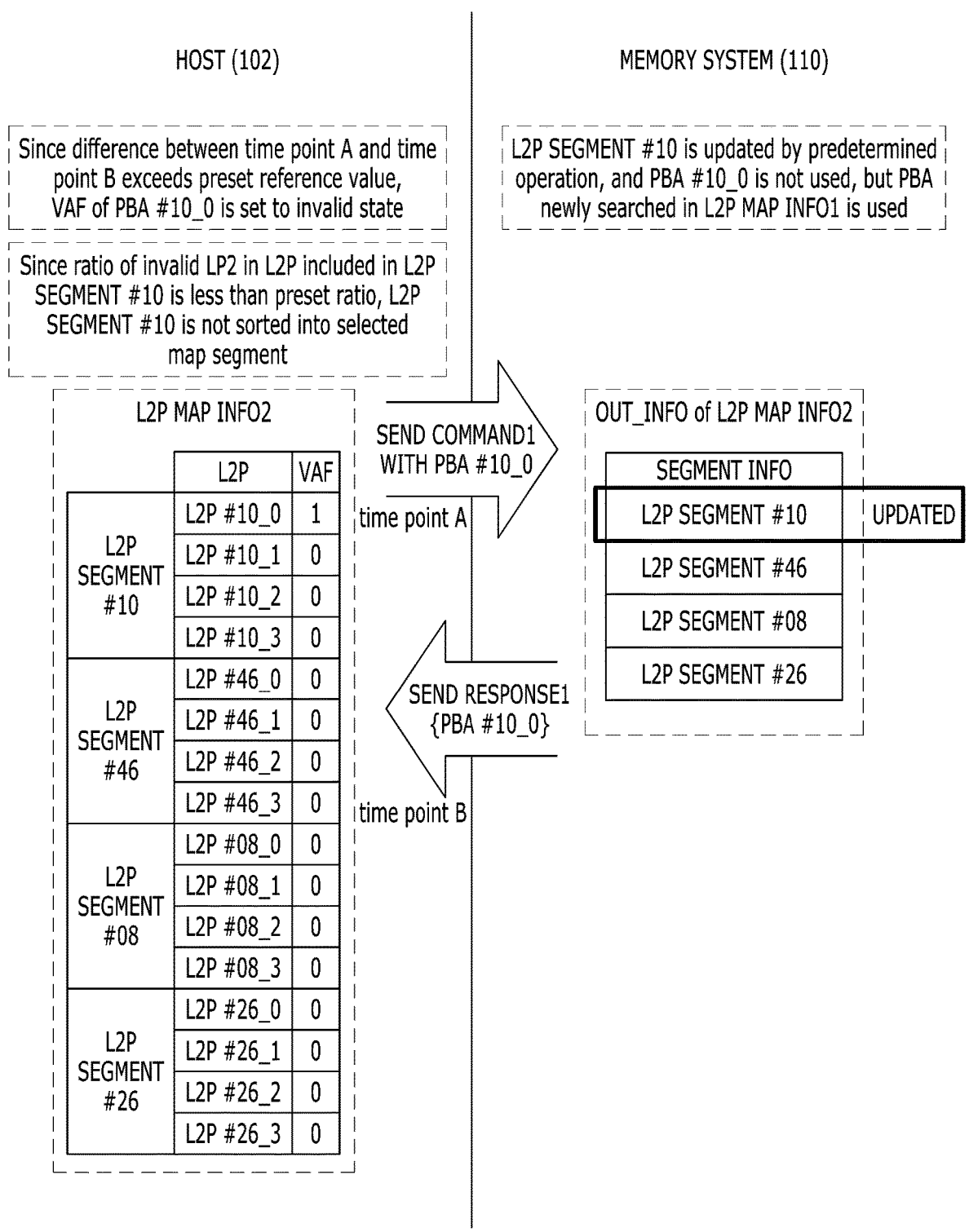
Figure 21D:
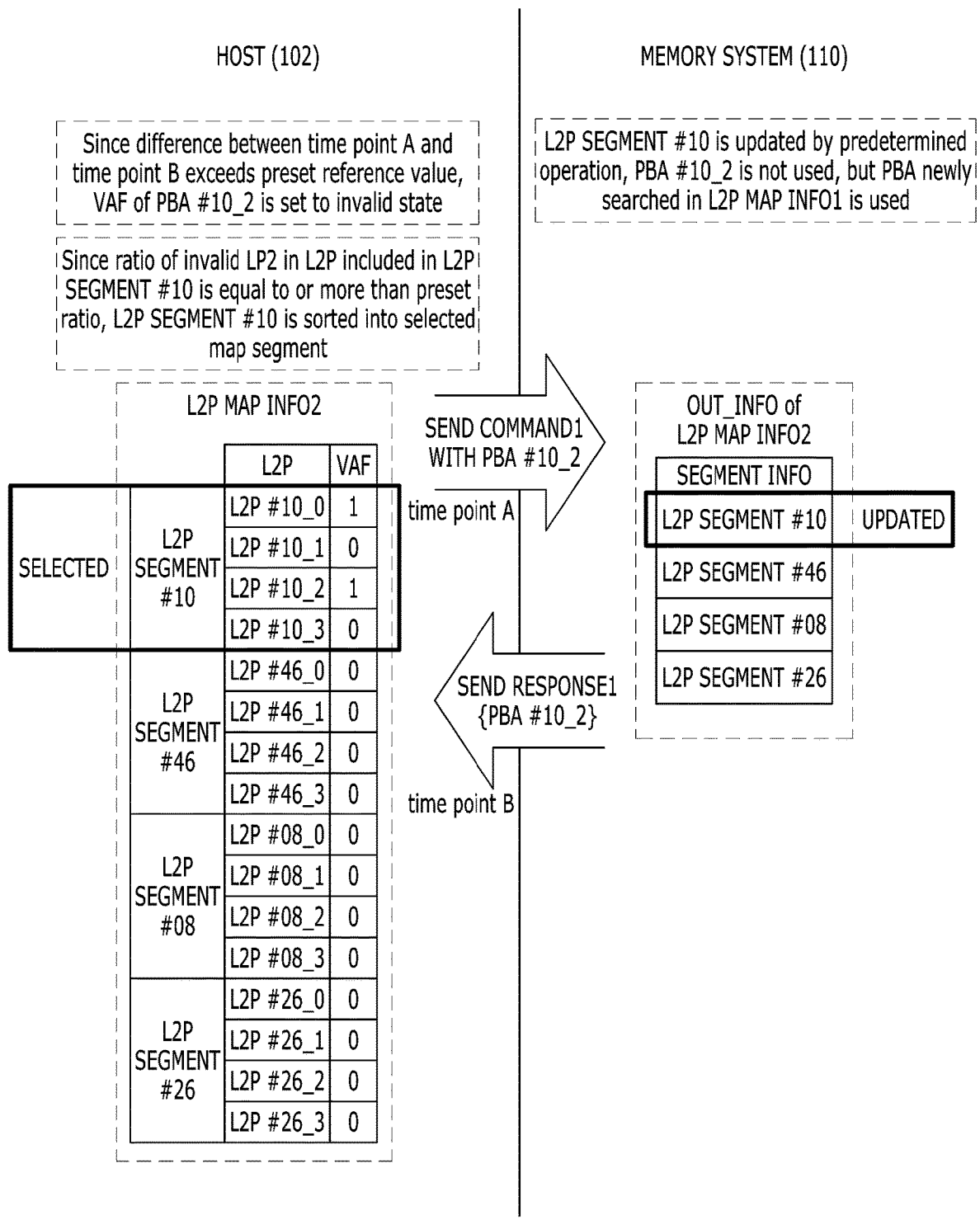
Figure 21E:
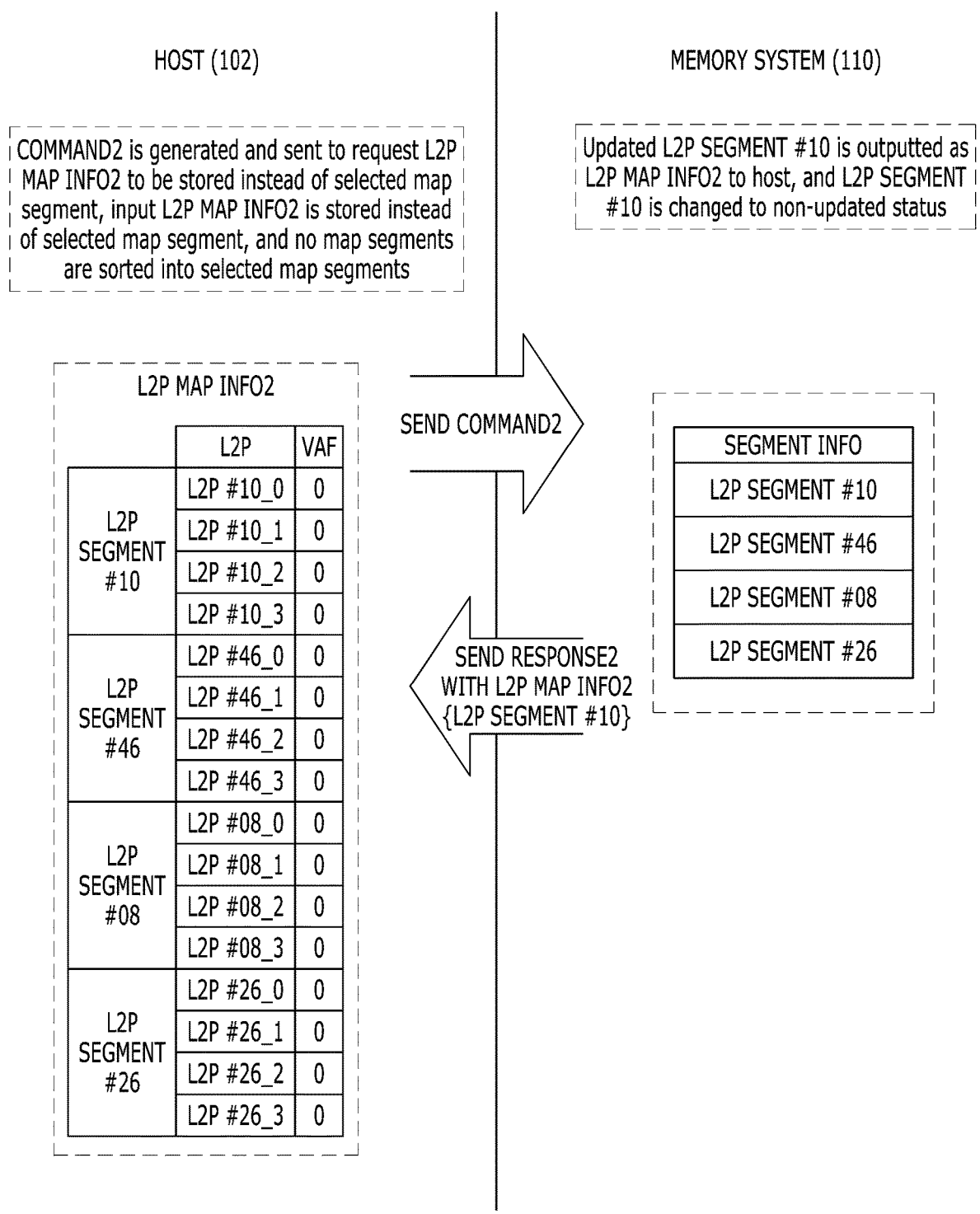
Figure 21F:
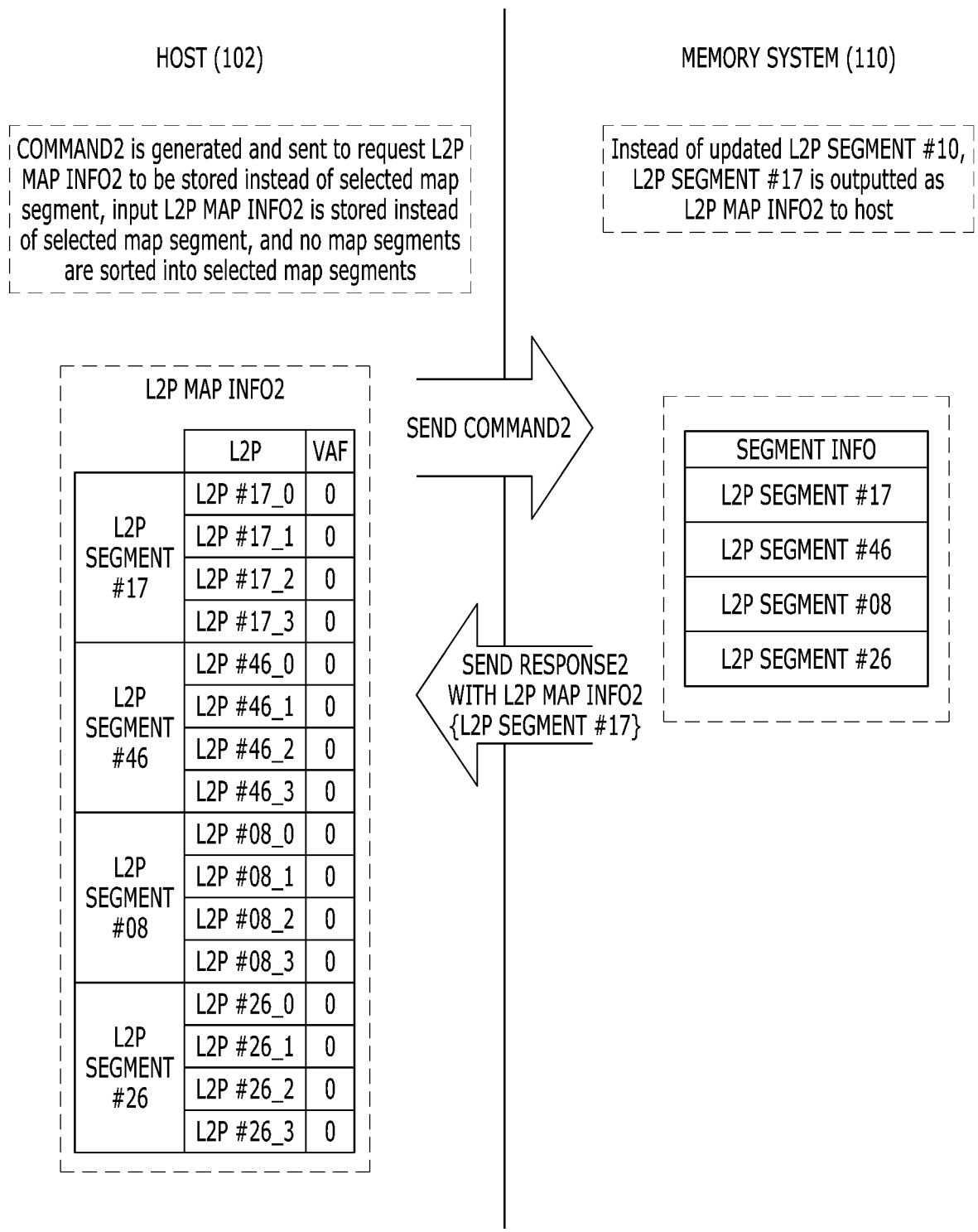

Therefore, when the tenth map segment L2P SEGMENT #10 among the four map segments L2P SEGMENT #10, L2P SEGMENT #46, L2P SEGMENT #08, L2P SEGMENT #26 included in the piece of second map information L2P_MAP_INFO2 is sorted into a selected map segment in the host 102, the tenth map segment L2P SEGMENT #10 may be replaced with another map segment through the operation described with reference to FIGS. 21E and 21F and stored in the internal memory 106 of the host 102.

Figure 23:
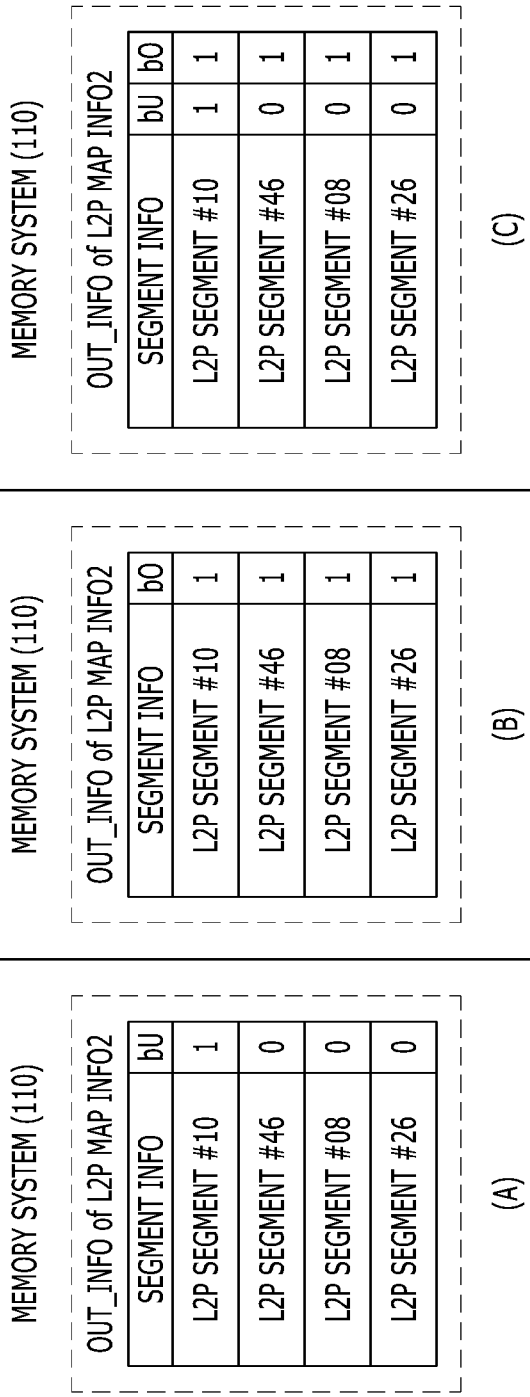
FIG. 23 illustrates another operation through which the host and the memory system share map information in accordance with an embodiment.

FIG. 23 is a diagram illustrating a third operation through which the host and the memory system share map information in accordance with an embodiment.

FIG. 23 illustrates a method for managing the log information OUT_INFO of the piece of second map information L2P_MAP_INFO2 in the memory system 110.

As described with reference to FIGS. 21A to 22C, the memory system 110 may generate the log information OUT_INFO for the piece of second map information L2P_MAP_INFO2 in the form of information for sorting map segments. Furthermore, the memory system 110 may include information in the log information OUT_INFO of L2P_MAP_INFO2, the information indicating whether each of the map segments included in the piece of second map information L2P_MAP_INFO2 has been updated. Furthermore, the memory system 110 may include information in the log information OUT_INFO of L2P_MAP_INFO2, the information indicating whether each of the map segments included in the piece of second map information L2P_MAP_INFO2 was sent to the host 102.

Referring to subscripts (A) and (C) in FIG. 23, the memory system 110 may include update information bU in the log information OUT_INFO of the piece of second map information L2P_MAP_INFO2, the update information bU indicating whether each of the map segments has been updated. That is, when generating the log information OUT_INFO of the piece of second map information L2P_MAP_INFO2, the memory system 110 may also generate update information bU corresponding to each of the four map segments L2P SEGMENT #10, L2P SEGMENT #46, L2P SEGMENT #08, L2P SEGMENT #26. The update information bU generated by the memory system 110 may indicate which map segment has been updated and which map segment has not been updated, among the four map segments L2P SEGMENT #10, L2P SEGMENT #46, L2P SEGMENT #08, L2P SEGMENT #26 included in the piece of second map information L2P_MAP_INFO2. For example, subscripts (A) and (C) of FIG. 23 may be based on that a map segment whose update information bU has a value of '0' has not been updated, and a map segment whose update information bU has a value of '1' has been updated. At this time, in subscripts (A) and (C) of FIG. 23, the tenth map segment L2P SEGMENT #10 among the four map segments L2P SEGMENT #10, L2P SEGMENT #46, L2P SEGMENT #08, L2P SEGMENT #26 included in the piece of second map information L2P_MAP_INFO2 has been updated, and the other map segments L2P SEGMENT #46, L2P SEGMENT #08, L2P SEGMENT #26 have not been updated. Therefore, the update information bU corresponding to the tenth map segment L2P SEGMENT #10 is '1', and the three pieces of update information bU corresponding to the other map segments L2P SEGMENT #46, L2P SEGMENT #08, L2P SEGMENT #26 are all '0'.

Referring to subscripts (B) and (C) in FIG. 23, the memory system 110 may include sending information bO in the log information OUT_INFO of the piece of second map information L2P_MAP_INFO2, the sending information bO indicating whether each of the map segments was sent to the host 102. That is, when generating the log information OUT_INFO of the piece of second map information L2P_MAP_INFO2, the memory system 110 may also generate the sending information bO corresponding to each of the four map segments L2P SEGMENT #10, L2P SEGMENT #46, L2P SEGMENT #08, L2P SEGMENT #26. The sending information bO generated by the memory system 110 may indicate which map segment was sent to the host 102 and which map segment was not sent to the host 102, among the four map segments included in the piece of second map information L2P_MAP_INFO2. For example, subscripts (B) and (C) in FIG. 23 may be based on that a map segment whose sending information bO has a value of '1' was sent to the host 102, and a map segment whose sending information bO has a value of '0' was not sent to the host 102. Unlike the configuration of subscripts (B) and (C) in FIG. 23, the four map segments L2P SEGMENT #10, L2P SEGMENT #46, L2P SEGMENT #08, L2P SEGMENT #26 among the plurality of map segments (not illustrated) included in all of the pieces of first map information L2P_MAP_INFO1 may be sorted into the piece of second map information L2P_MAP_INFO2, and all four pieces of sending information bO corresponding to the four map segments included in the piece of second map information L2P_MAP_INFO2 may have a value of '0' indicating that the map segments are not sent, before the map segments are sent to the host 102 in response to the second command COMMAND2 inputted from the host 102. Therefore, the memory system 110 may sort the four map segments included in the piece of second map information L2P_MAP_INFO2 into sent map segments by referring to the four pieces of sending information bO. Then, the memory system 110 may send at least one map segment sorted into a sent map segment, among the four map segments included in the piece of second map information L2P_MAP_INFO2, to the host 102 in response to the second command COMMAND2 inputted from the host 102. Whenever sending a map segment to the host 102, the memory system 110 may update the value of the sending information corresponding to at least one map segment sorted into a sent map segment into '1' indicating that the map segment was sent. At this time, since subscripts (B) and (C) in FIG. 23 are based on that the four map segments included in the piece of second map information L2P_MAP_INFO2 are all transmitted to the host 102, the four pieces of sending information bO corresponding to the four map segments are all '1'.

Figure 24:
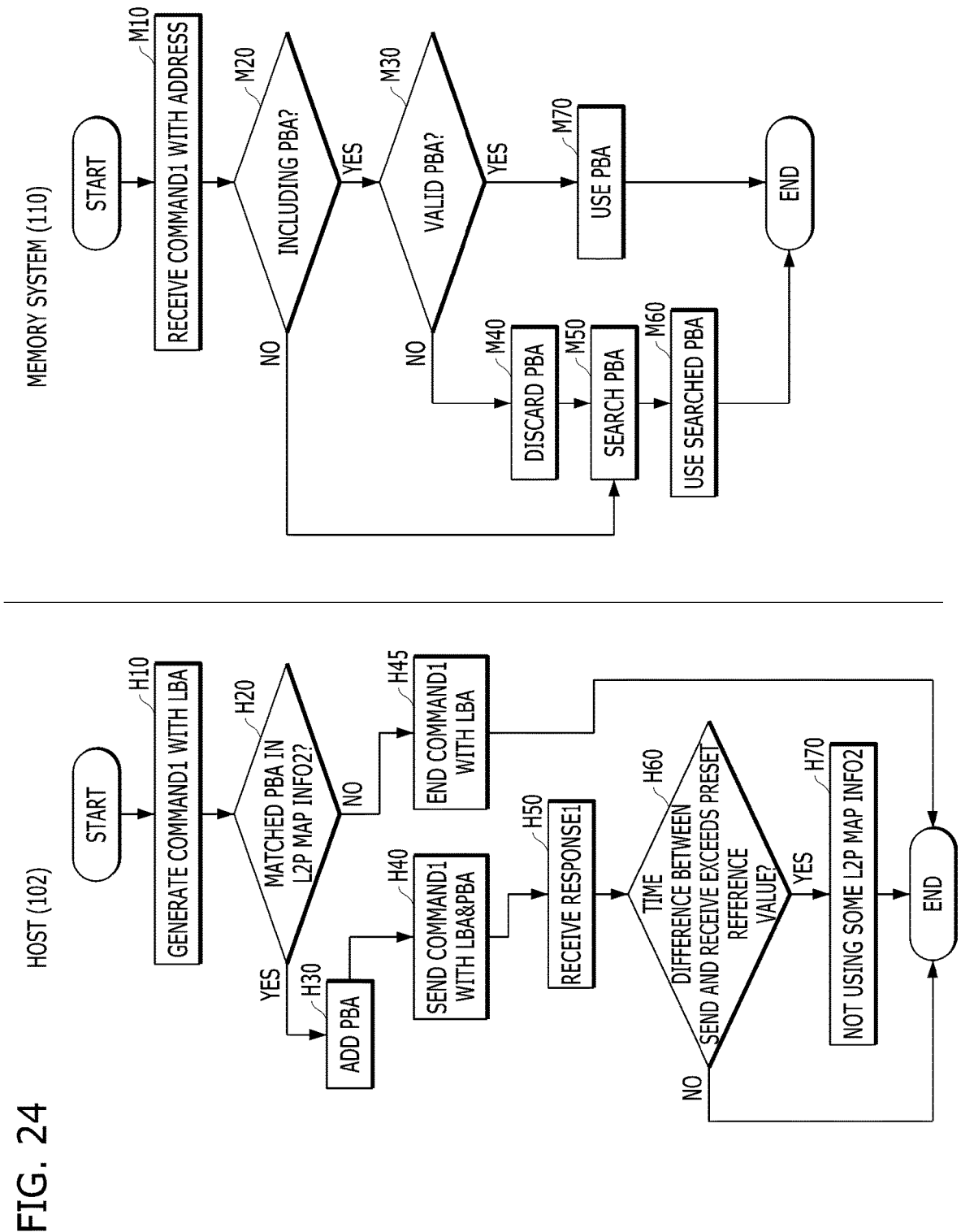
FIG. 24 illustrates another operation through which the host and the memory system share map information in accordance with an embodiment.

FIG. 24 is a diagram for describing a fourth operation through which the host and the memory system share map information in accordance with an embodiment.

Specifically, FIG. 24 illustrates the operations of the host 102 and the memory systems 110, which have been described with reference to FIGS. 21A to 13.

Referring to FIG. 24, the host 102 may generate the first command COMMAND1 including a logical address LBA in step H10. Then, the host 102 may check whether a physical address PBA corresponding to the logical address LBA is included in the piece of second map information L2P_MAP_INFO2 stored in the host 102, in step H20. When there is no physical address PBA (NO in step H20), the host 102 may transmit the first command COMMAND1 with the logical address LBA to the memory system 110 in step H45.

On the other hand, when there is the physical address PBA (YES in step H20), the host 102 may add the physical address PBA to the first command COMMAND1 including the logical address LBA in step H30. The host 102 may transmit the first command COMMAND1 with the logical address LBA and the physical address PBA to the memory system 110 in step H40.

Then, the host 102 may receive a response RESPONSE1 corresponding to the result of the performed first command COMMAND1 from the memory system 110 in a step H50.

The host 102 may check whether a difference between the time point (operation time point of step H40) that the first command COMMAND1 with the logical address LBA and the physical address PBA is sent to the memory system 110 and the time point (operation time point of step H50) that the response RESPONSE1 corresponding to the result of the performed first command COMMAND1 is inputted from the memory system 110 exceeds a set reference value, in step H60.

When the check result indicates that the difference exceeds the set reference value (YES in step H60), the host 102 may set some map segments SOME L2P_MAP_INFO2, among the plurality of map segments included in the piece of second map information L2P_MAP_INFO2 stored therein, not to be used, in step H70.

The memory system 110 may receive the first command COMMAND1 from the host 102 in step M10. The memory system 110 may check whether the physical address PBA is included in the received first command COMMAND1, in step M20. If no physical address PBA is included in the received first command COMMAND1 (NO in step M20), the memory system 110 may search a physical address PBA corresponding to the logical address LBA included in the received command in step M60. Then, the memory system 110 may perform an operation corresponding to the first command COMMAND1 using the searched physical address SEARCHED PBA in step M60.

If the physical address PBA is included in the received first command COMMAND1 (YES in step M20), the memory system 110 may check whether the physical address PBA is valid, in step M30. The memory system 110 may transfer the piece of second map information L2P_MAP_INFO2 to the host 102, and the host 102 may perform mapping based on the piece of second map information L2P_MAP_INFO2 transferred from the memory system 110, and transfer the first command COMMAND1 with the physical address PBA. However, after the memory system 110 transfers the piece of second map information L2P_MAP_INFO2 to the host 102, the piece of second map information L2P_MAP_INFO2 managed by the memory system 110 may be changed or updated by the performance of the predetermined operation (see FIG. 19). When the piece of second map information L2P_MAP_INFO2 is dirty, the physical address PBA transferred by the host 102 cannot be used. Thus, the memory system 110 may determine whether the physical address PBA included in the received first command COMMAND1 is valid. When the physical address PBA included in the received first command COMMAND1 is valid (YES in step M30), the memory system 110 may perform an operation corresponding to the first command COMMAND1 by using the physical address PBA.

On the other hand, when the physical address PBA included in the received first command COMMAND1 is not valid (NO in step M30), the memory system 110 may discard the physical address PBA included in the received first command COMMAND1 in step M40. In this case, the memory system 110 may search another physical address PBA based on the logical address LBA included in the received first command COMMAND1 in step M50. Then, the memory system 110 may perform an operation corresponding to the first command COMMAND1 using the searched physical address SEARCHED PBA in step M60.

Based on the above-described embodiments, the memory system may transmit map information to the host. The memory system may process a command transmitted by the host, and then transmit map information using a response corresponding to the command. Furthermore, after transmitting the map information to the host, the memory system may generate and store a log or history information on the transmitted map information. When map information stored in the host or the computing device becomes dirty due to update of the map information by the memory system after the memory system transmits the map information to the host or the computing device, the host or the computing device may estimate the state of the map information, autonomously determine whether to use the map information, and set the map information not to be used. Such an operation can prevent a command including unnecessary map information from being transmitted to the memory system from the host or the computing device, thereby improving the operation performance of the memory system.

In accordance with an embodiment, the apparatus may have the following effects.

When the map information shared by the host or the computer device and the memory system, is changed by a predetermined operation within the memory system of the data processing system, the host or the computing device may estimate the changed map information and independently determine whether to use the map information, and then select only the map information determined to be used, thereby improving the data input/output performance of the memory system.

Furthermore, the host or the computing device can add a physical address corresponding to a logical address into a read command transmitted to the memory system from the host or the computing device, and selectively transmit the read command with the physical address based on a validity of the physical address. Therefore, the operation of determining whether the physical address is valid in the memory system can be omitted, thereby improving the operation performance.

Figure 25:
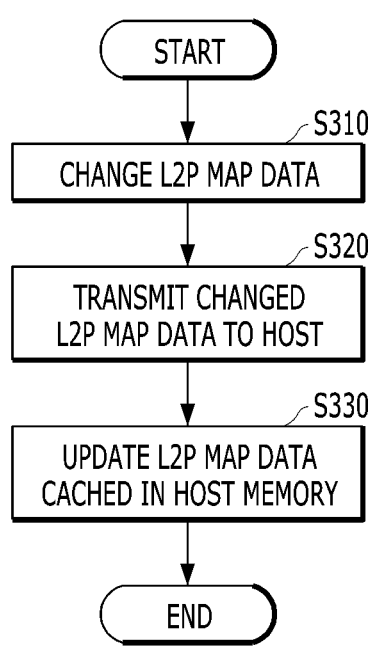
FIGS. 25 and 26 show an operation of a memory system in accordance with an embodiment of the disclosure.
Figure 26:
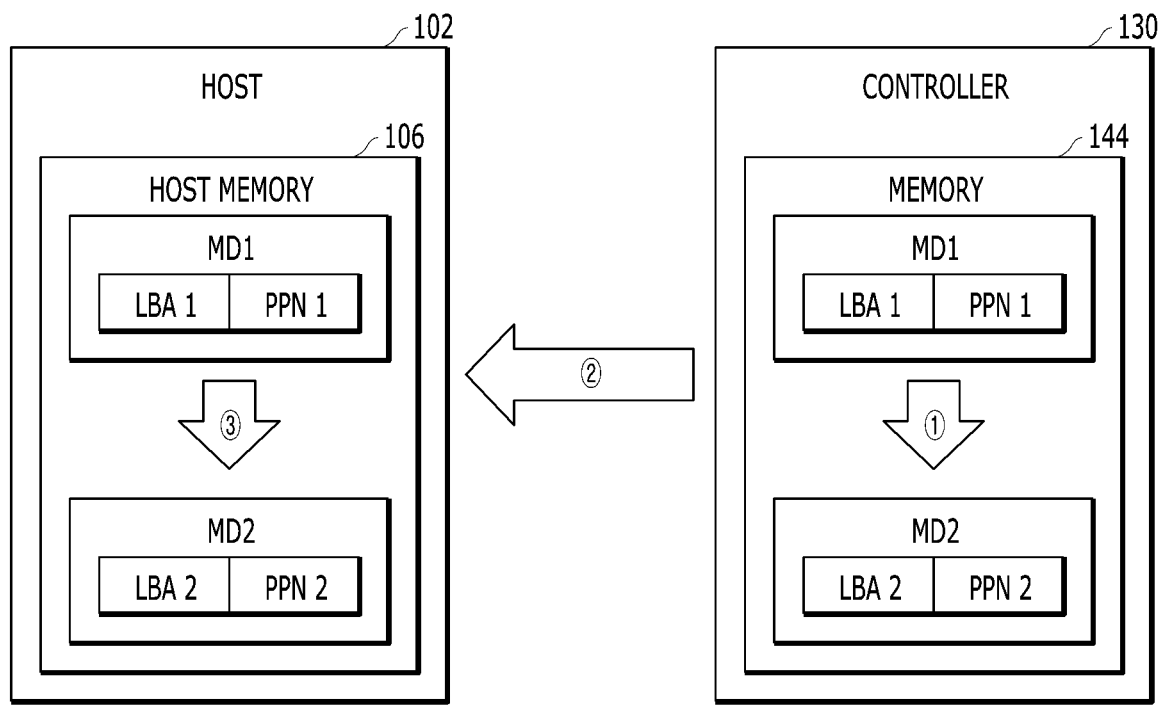

FIGS. 25 and 26 are diagrams illustrating an operation of a memory system in accordance with an embodiment of the disclosure. L2P map data MD1 can be cached in the host memory 106, which is described in the data processing system shown in FIGS. 1, 12 and 20. Herein, the L2P map data MD1 may correspond to the map information MAP INFO.

Referring to FIGS. 3 and 4, in step S310, the memory system 110 may change the L2P map data MD1 stored in the memory 230. For example, the controller 130 may store data, which is originally stored in a storage location indicated by the physical page number PPN1, in a storage location indicated by a physical page number PPN2 by performing an operation to cause a map data change event such as a garbage collection operation, a read reclaim operation, data update operation or the like. As illustrated in FIG. 26, the L2P map data MD1 may change to L2P map data MD2 to reflect a change in the mapping relationship such data represents, since the physical page number PPN1, which is mapped to the logical block address LBA1 in MD1, is changed to the physical page number PPN2 (①). In this case, since the logical block address LBA1 of MD1 cached in the host memory 106 still has the mapping relationship with the physical page number PPN1, a sync-up operation is required to be performed to synchronize MD1 cached in the host memory 106 with MD2 stored in the controller 130.

In an embodiment, the memory system 110 may inform the host 102 of the change from the L2P map data MD1 to the L2P map data MD2.

In an embodiment, the host 102 may request, from the memory system 110, sync-up of the L2P map data MD1 cached in the host memory 106.

In an embodiment, the host 102 may transmit, when informed of the change from MD1 to MD2 by the memory system 110, a sync-up request to the memory system 110.

In step S320 the memory system 110 may transmit, when the sync-up request is received from the host 102, all or some of a plurality of pieces of changed L2P map data to the host 102. That is, as illustrated in FIG. 26, the controller 130 may transmit, to the host 102, the L2P map data MD2 stored in the memory 230 (②).

In step S330, the host 102 may receive the L2P map data MD2 from the controller 130. The host 102 may update the L2P map data MD1 cached in the host memory 106 based on the L2P map data MD2 (③). That is, the mapping relationship represented by the L2P map data MD1 cached in the host memory 106 may be changed such that the physical page number PPN1 mapped to the logical block address LBA1 is changed to the physical page number PPN2.

Figure 27:
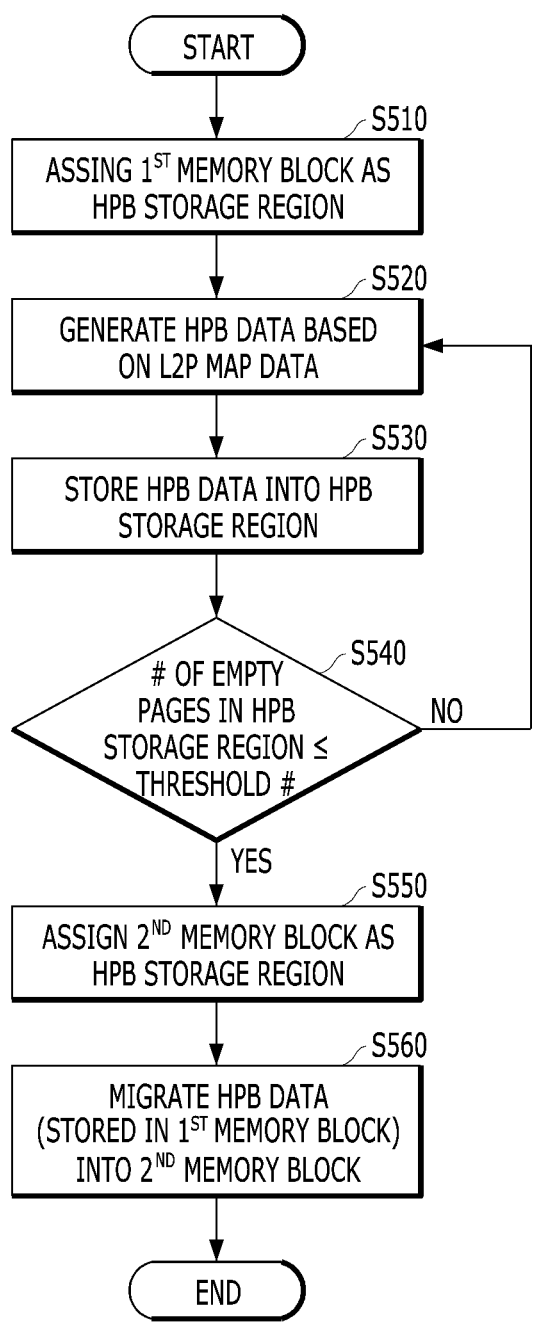
FIG. 27 illustrates an operation of a memory system in accordance with an embodiment of the disclosure.
Figure 28:
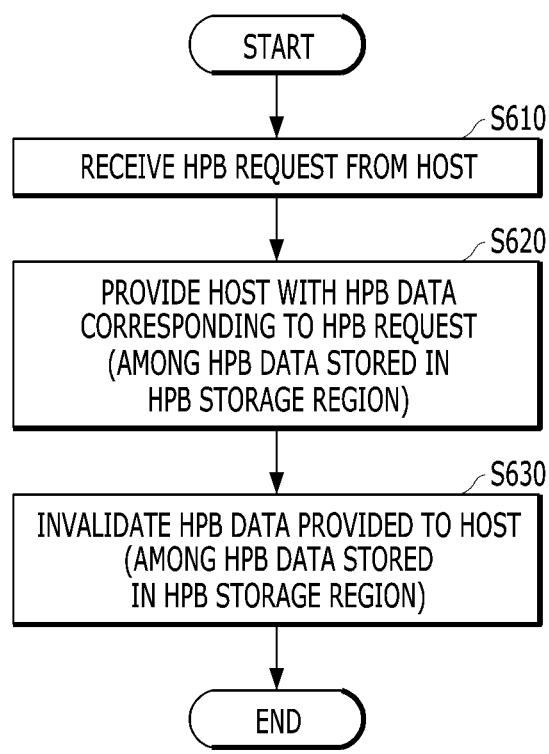
FIG. 28 illustrates an operation of the memory system in accordance with an embodiment of the disclosure.

Although FIGS. 27 and 28 illustrate L2P map data as a whole, as indicated above the update in the host memory 106 of the host 102 may be performed on a piece basis, where each piece is a unit of a L2P segment.

FIG. 27 is a diagram illustrating an operation of a memory system, e.g., memory system 110, in accordance with an embodiment of the disclosure. The memory system 110 may include the controller 130. The controller 130 may include, or coupled to, the memory 144.

Referring to FIG. 27, in step S510, the memory system 110 may assign a High Performance Booster (HPB) storage region for storing HPB data. For example, the controller 130 may assign at least one first memory block as an HPB storage region among a plurality of memory blocks included in the nonvolatile memory device 100.

In step S520, the memory system 110 may generate HPB data. For example, the controller 130 may generate HPB data including L2P map data. For example, the controller 130 may generate HPB data by adding a reliability bit to the L2P map data. The reliability bit may indicate reliability of the L2P map data, which reliability indicates whether or not the L2P map data has been changed. The controller 130 may utilize, when HPB data is received from the host 102, the reliability bit in the received HPB data to determine whether the received L2P map data has changed.

In step S530, the memory system 110 may store HPB data into the HPB storage region. For example, the controller 130 may store, when the first memory block is assigned as the HPB storage region, HPB data into an empty page in the first memory block.

In step S540, the memory system 110 may determine a number of empty pages in the HPB storage region. For example, the controller 130 may determine whether the number of empty pages included in the HPB storage region is less than a set threshold number.

In step S550, the memory system 110 may assign another HPB storage region. For example, the controller 130 may assign, when the number of empty pages in the first memory block assigned as the HPB storage region is less than a set threshold number, a second memory block as the HPB storage region.

In step S560, the memory system 110 may perform a migration operation between the initially assigned HPB storage region and the additionally assigned HPB storage region. For example, the controller 130 may perform, when the second memory block is assigned as the additional HPB storage region, a migration operation of moving, into the second memory block, a selected piece (or pieces) of HPB data among a plurality of pieces of HPB data stored in the first memory block.

In an embodiment, the controller 130 may migrate, to the second memory block, a piece of HPB data that is generated on the basis of L2P map data having a high reference frequency among a plurality of pieces of HPB data stored in the first memory block. For this, the controller 130 may count a number of times the L2P map data is referenced and may store that number in the memory 230. Based on the number of references to the L2P map data, the controller 130 may migrate, to the second memory block, a piece (or pieces) of HPB data corresponding to the L2P map data having a high reference frequency among a plurality of pieces of HPB data stored in the first memory block.

In an embodiment, the controller 130 may migrate, to the second memory block, a piece of HPB data that is most recently generated among a plurality of pieces of HPB data stored in the first memory block.

In an embodiment, the controller 130 may migrate, to the second memory block, a valid piece of HPB data among a plurality of pieces of HPB data stored in the first memory block.

FIG. 28 is a diagram illustrating an operation of the memory system 110 in accordance with an embodiment of the disclosure.

Operations of the memory system 110 described hereinafter with reference to FIG. 28 may be performed simultaneously with, prior to or subsequently to any of the steps of the memory system 110 described with reference to FIG. 27.

Referring to FIG. 28, in step S610, the memory system 110 may receive an HPB request from the host 102.

In step S620, the memory system 110 may transmit, to the host 102, a piece (or pieces) of HPB data corresponding to the HPB request among a plurality of pieces of HPB data stored in the HPB storage region (e.g., the first memory block). At this time, the host 102 may cache, into the host memory 106, the piece(s) of HPB data received from the memory system 110. That is, at least one of a plurality of pieces of HPB data stored in the memory system 110 may be cached into the host memory 106.

In step S630, the memory system 110 may invalidate a page storing the piece(s) of HPB data transmitted to the host 102. The piece(s) of HPB data stored in the invalidated page may be excluded from a target of the migration operation from the initially assigned HPB storage region to the later assigned HPB storage region (e.g., from the first to second memory blocks).

Figure 29:
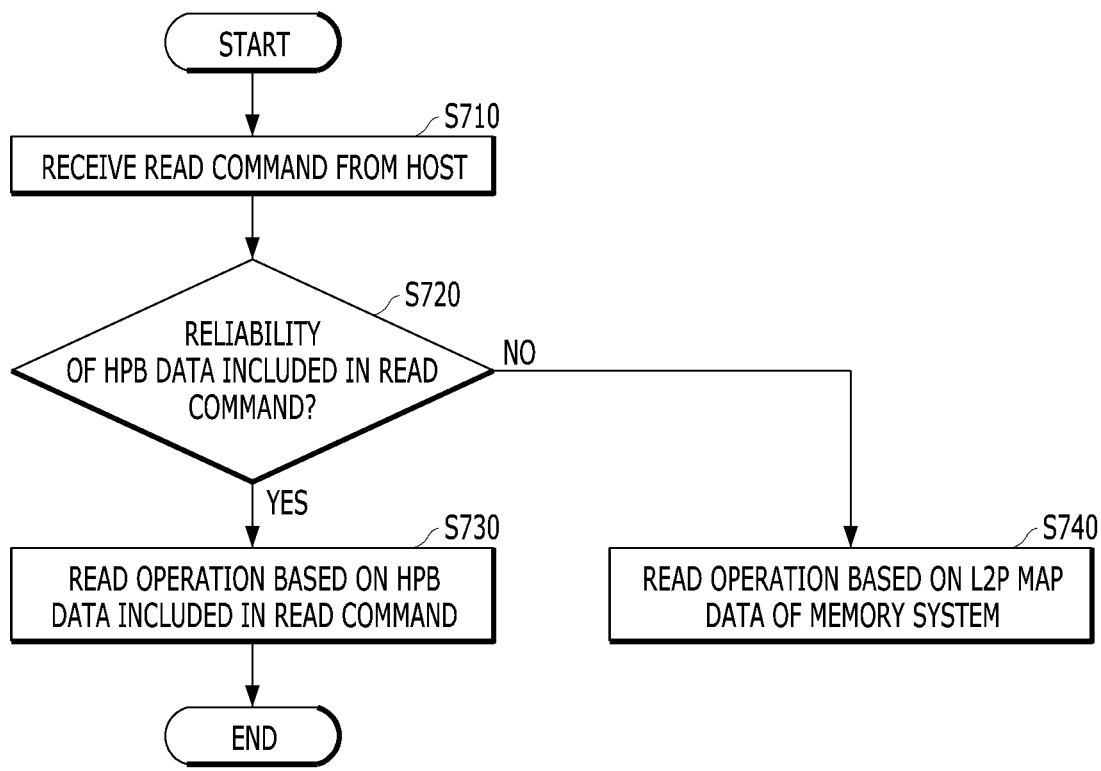
FIG. 29 illustrates an operation of a memory system in accordance with an embodiment of the disclosure.

FIG. 29 is a diagram illustrating an operation of a memory system, e.g., memory system 110, in accordance with an embodiment of the disclosure.

FIG. 29 illustrates the operation of the memory system 110 after completion of the operation described with reference to FIG. 28.

Referring to FIG. 29, in step S710, the memory system 110 may receive a read command from the host 102. The read command may include HPB data for data to be read from the nonvolatile memory device 100. The HPB data included in the read command may be that cached in the host memory 106.

In step S720, the memory system 110 may determine the reliability of the HPB data included in the read command received from the host 102.

In an embodiment, the controller 130 utilize the reliability bit included in the received HPB data to determine whether the received HPB data is reliable (e.g., whether the HPB data has been changed). For example, when a piece of L2P map data has been changed in the memory system 110 but the change is not yet reflected in the host 102, the reliability bit in the HPB data corresponding to the changed L2P map data in the memory system 110 may have a different value than that of the HPB data in the host 102.

In step S730, the memory system 110 may perform, when the HPB data in the read command is determined to be reliable, a read operation based on the HPB data included in the read command. For example, the controller 130 may control the nonvolatile memory device 100 to perform a read operation based on the L2P map data in the HPB data in the read command.

In step S740, the memory system 110 may control, when the HPB data in the read command is determined not to be reliable, the nonvolatile memory device 100 to perform a read operation based on the L2P map data stored in the memory system 110 without utilizing the HPB data in the read command.

Figure 30A:
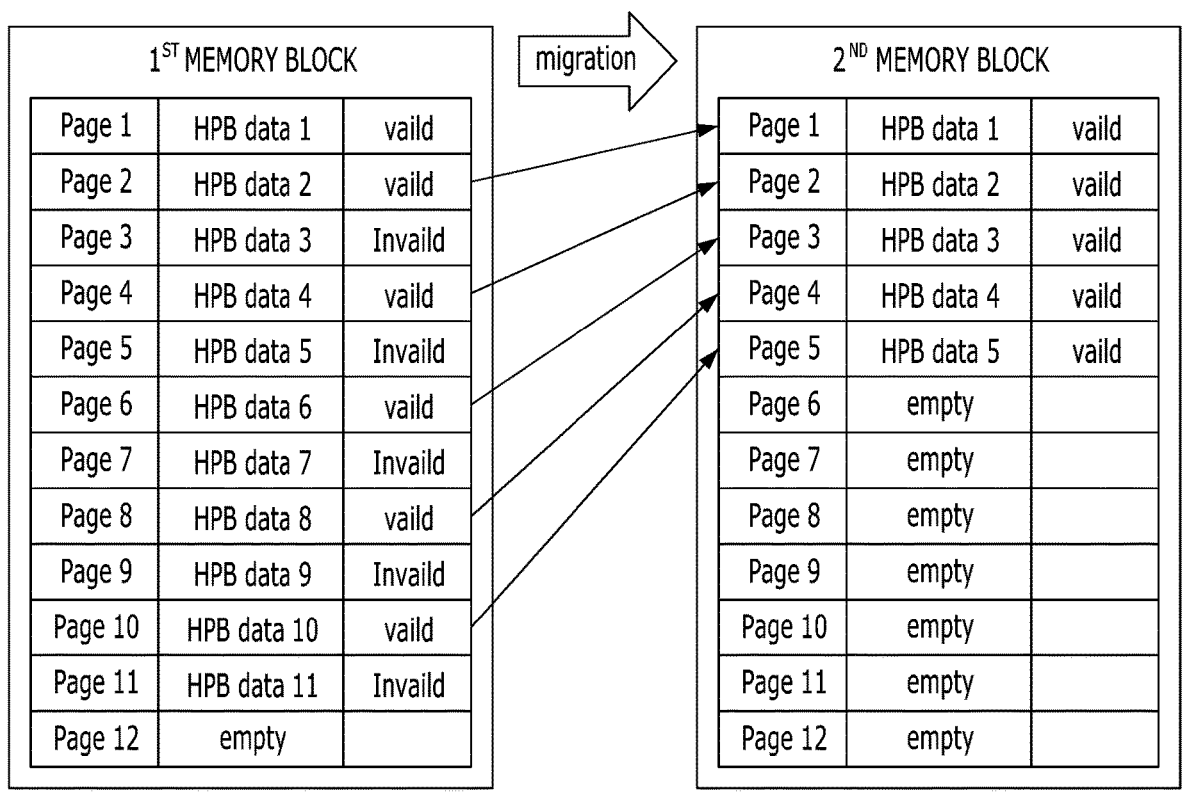
FIGS. 30A and 30B show an operation of the memory system in accordance with an embodiment of the disclosure.
Figure 30B:
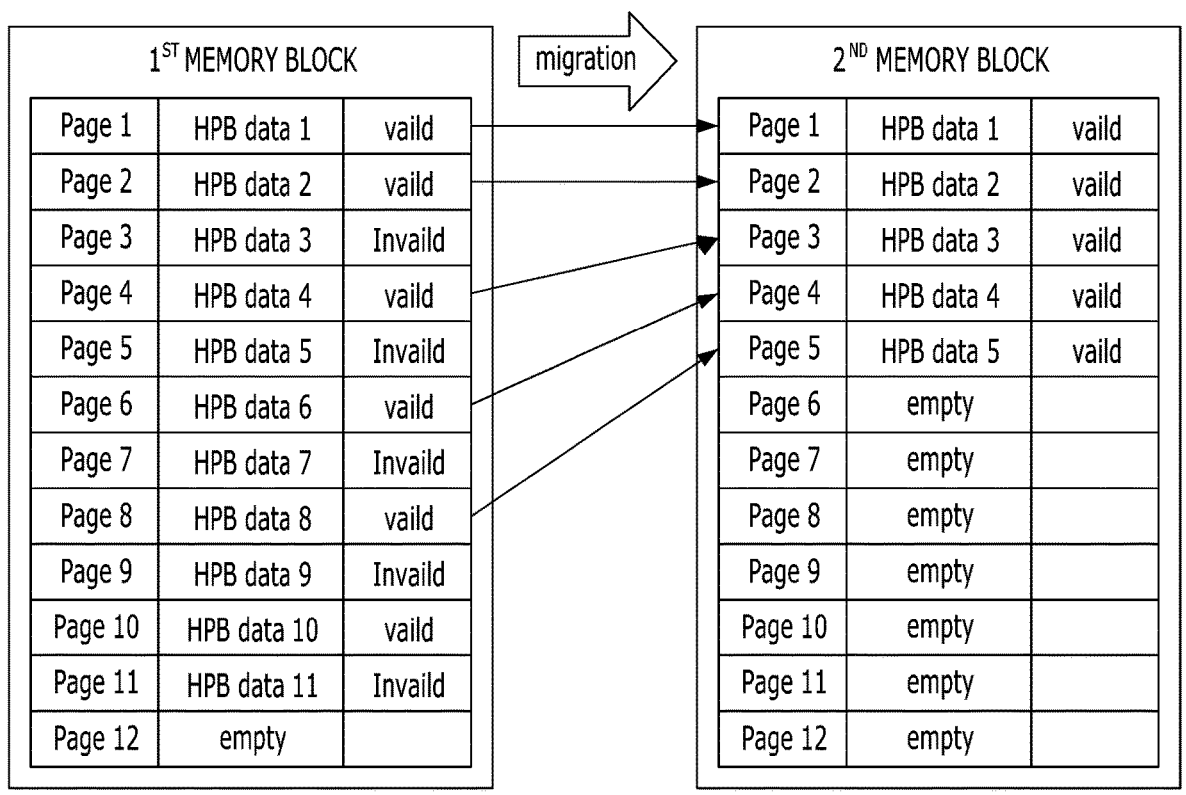

FIGS. 30A and 30B are diagrams illustrating an operation of the memory system 110 in accordance with an embodiment of the disclosure.

FIG. 30A exemplifies the migration of the HPB data, which is stored in the first memory block, i.e., the initially assigned HPB storage region, to the second memory block, i.e., the later assigned HPB storage region. The memory system 110 may migrate, when the number of empty pages in the first memory block is less than a set threshold number, the HPB data, which is stored in the first memory block, to the second memory block. For example, the memory system 110 may migrate, to empty pages within the second memory block, five pieces of most recently stored HPB data among a plurality of pieces of HPB data stored in valid pages within the first memory block. FIG. 30A exemplifies that the five pieces of most recently stored HPB data are in Pages 2, 4, 6, 8 and 10. The empty pages to which these five pieces of most recently stored HPB data are migrated are Pages 1-5 in the second memory block.

FIG. 30B exemplifies the migration of the HPB data, which is stored in the first memory block, i.e., the initially assigned HPB storage region, to the second memory block, i.e., the later assigned HPB storage region. The memory system 110 may migrate, when the number of empty pages in the first memory block is less than a set threshold number, the HPB data, which is stored in the first memory block, to the second memory block. For example, assuming that pieces of L2P map data corresponding to HPB data 1, HPB data 2, HPB data 4, HPB data 6 and HPB data 8 have respectively higher reference frequencies, the memory system 110 may migrate, to empty pages within the second memory block, HPB data 1 stored in Page 1, HPB data 2 stored in Page 2, HPB data 4 stored in Page 4, HPB data 6 stored in Page 6 and HPB data 8 stored in Page 8 within the first memory block. As illustrated in FIG. 30B, those empty pages are Pages 1-5 in the second memory block.

Figure 31A:
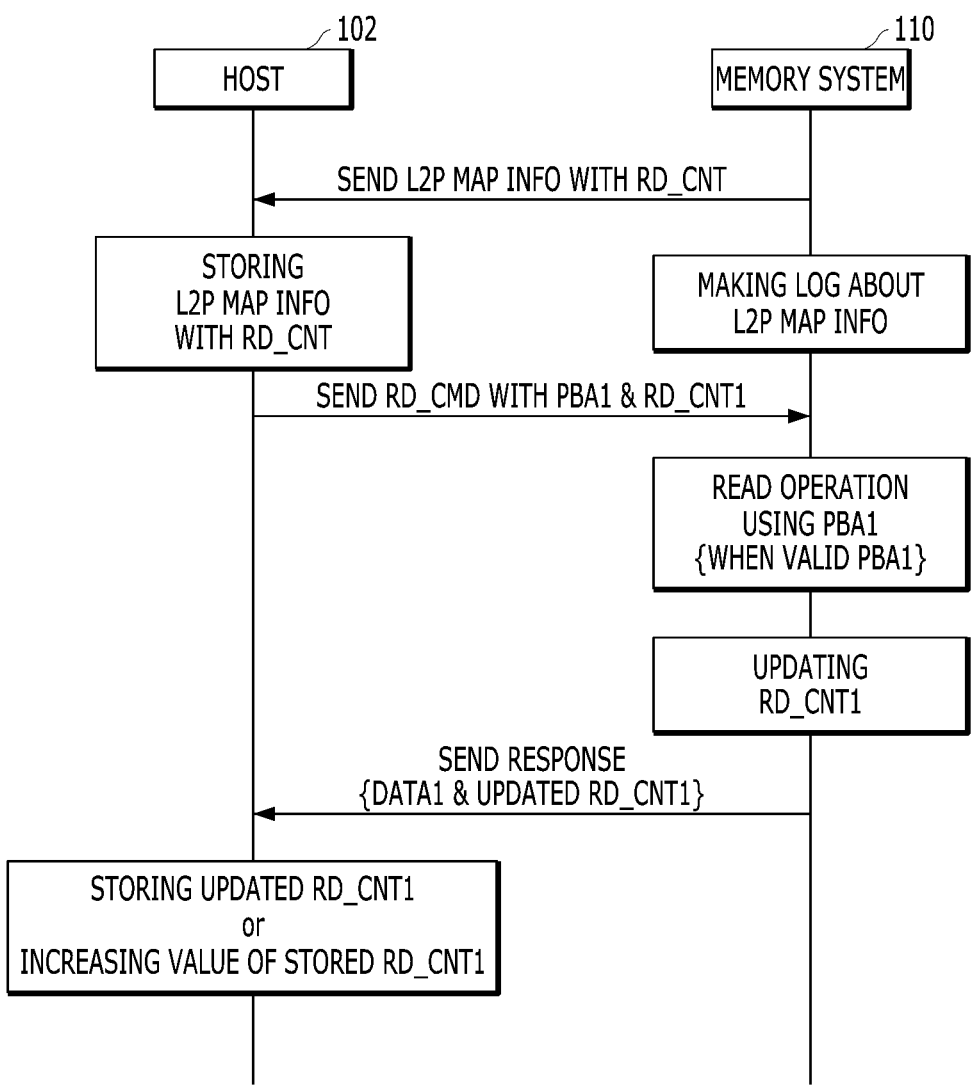
FIGS. 31A and 31B describe a method for sharing map information and a read count in accordance with an embodiment.
Figure 31B:
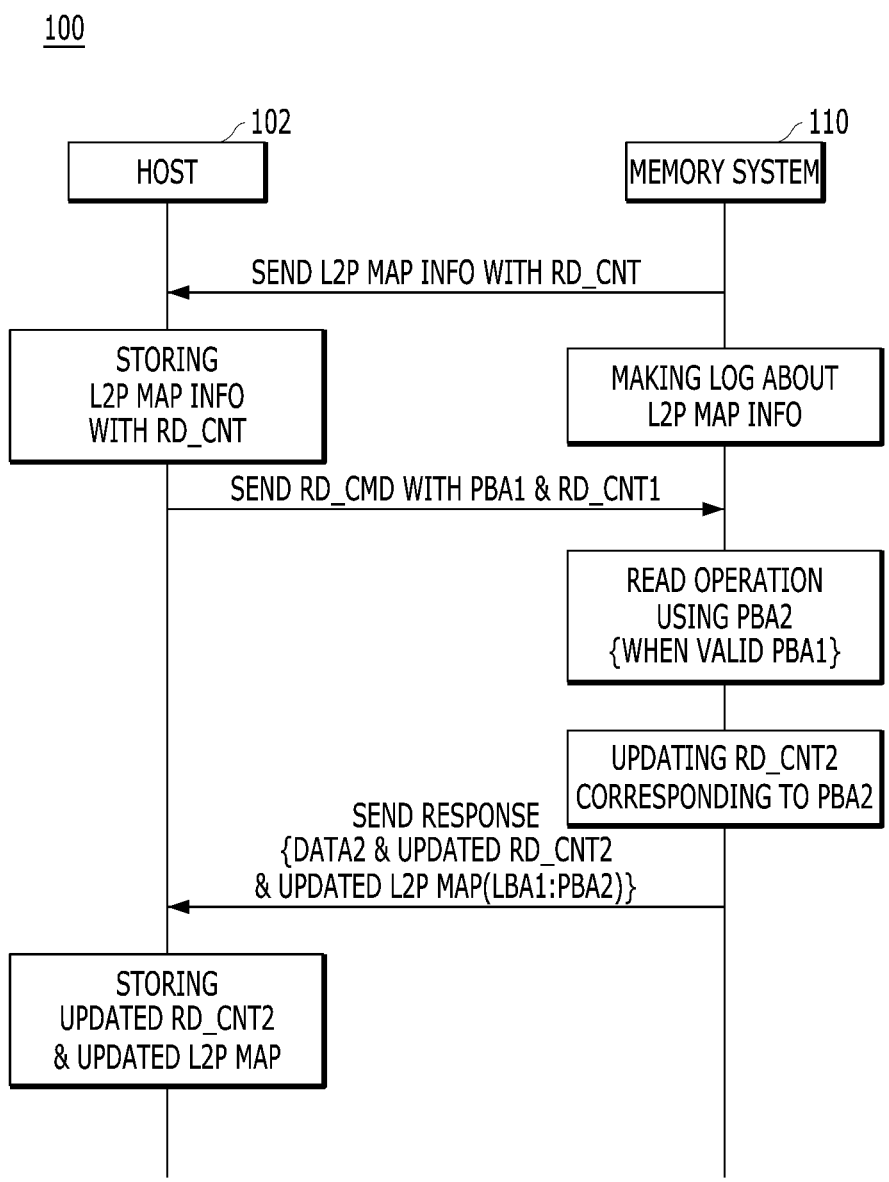

FIGS. 31A and 31B are diagram for describing a method for sharing map information and a read count in accordance with an embodiment.

Referring to FIG. 31A, a host 102 and a memory system 110 may be engaged operatively. The host 102 may include a computing device and may be implemented in a form of a mobile device, a computer, a server, or the like. The memory system 110 operatively engaged with the host 102 may receive a command from the host 102 and store or output data in response to the received command.

The memory system 110 may have a storage space including nonvolatile memory cells. For example, the memory system 110 may be implemented in a form of a flash memory, a solid-state drive (SSD), or the like.

In order to store data in a storage space in response to a request by the host 102, the memory system 110 may perform a mapping operation for associating a file system used by the host 102 with the storage space including the nonvolatile memory cells. This can be referred as to an address translation between a logical address and a physical address. For example, an address identifying data according to the file system used by the host 102 may be called a logical address or a logical block address, and the address indicating a physical location of data in the storage space including nonvolatile memory cells may be referred to as a physical address or a physical block address. When the host 102 sends a read command with a logical address to the memory system 110, the memory system 110 searches for a physical address corresponding to the logical address and reads (or outputs) data stored in a physical location indicated by the physical address. During this process, the mapping operation or the address translation may be performed while the memory system 110 searches for the physical address corresponding to the logical address received from the host 102. The mapping operation or the address translation may be performed based on mapping information such as a mapping table that associates a logical address to a physical address.

However, if the host 102 performs the mapping operation performed by the memory system 110, an amount of time taken for the memory system 110 to read and output data corresponding to a read command transmitted by the host 102 could be reduced. The host 102 may store and access at least some portion of the map information to perform the mapping operation, in order to deliver the read command with the physical address to the memory system 110 through the mapping operation.

The nonvolatile memory device may include a plurality of memory blocks each having a plurality of pages. The memory system 110 may perform a read/write operation on the nonvolatile memory device on a page basis, and perform an erase operation on a block basis. The memory system 110 may generate read/write/erase count data which are computed on a block basis, in order to manage the reliability and lifetime of the nonvolatile memory device. At this time, since the write/erase count may be programmed to the nonvolatile memory device substantially at the same time when a write/erase operation is performed, an accurate value of the write/erase count can be retained without a relatively large difference even when a sudden power off (SPO) occurs in the memory system 110. However, since the read count may be programmed to the nonvolatile memory device at a separate check point that may be significantly different from when a read operation is performed, the read count could be lost when an SPO occurs. In the related art, the read count values of the memory blocks are randomly increased when an SPO occurs, which could result in a significantly inaccurate read count.

Referring to FIGS. 31A and 31B, the memory system 110 may transmit a map information MAP_INFO and a read count RD_CNT to the host 102. The host 102 may store the map information MAP_INFO and the read count RD_CNT in a memory included in the host 102. When the memory system 110 sends the entire map information and the entire read count to the host 102 and the host 102 can store these in its memory, the memory system 110 may not need to write a log regarding transmitted map information. However, if the host 102 is not able to allocate a sufficient memory space for the entire map information, the memory system 110 may selectively transmit, to the host 102, map information on data or a logical address which is frequently used by the host 102 and a read count corresponding to that selected map information.

Meanwhile, the memory system 110 transmitting at least some of the map information and the read count to the host 102 may generate a log or a history regarding the transmitted map information. The log or a history may have one of various formats, structures, marks, variables or types, and may be stored in a memory device or a storage area including nonvolatile memory cells. In an embodiment, whenever the memory system 110 transmits the map information and the read count to the host 102, the log or the history may include a kind of data which is relevant to transmitted map information. Here, since the read count transmitted to the host 102 from the memory system 110 is associated with the map information, a separate log does not need to be made. Further, the memory system 110 may determine an amount of transmitted map information recorded in the log or the history corresponding to a size of map information that can be transmitted to the host 102. For example, it may be assumed that a size of map information that the memory system 110 can transmit to the host 102 is 512 KB. Although the memory system 110 may transmit more than 512 KB of map information to the host 102 in a log or a history, the amount of transmitted map information recorded in the log or the history may be limited to 512 KB. The amount of map information that memory system 110 can send to host 102 at one time may be less than the amount of map information that host 102 may store in the memory. For example, the map information and the read count may be transmitted to the host 102 in a segment unit. The memory system 110 may transfer segments of the map information and the read count to the host 102 multiple times, and the segments of the map information and the read count may be transmitted to the host 102 continuously or intermittently.

In an embodiment, when the memory system 110 transmits more than a given size (e.g., 1 MB) of map information and read count to the host 102, the host 102 can delete the map information and the read count previously received from the memory system 110 according to a timeline (e.g., the older information is deleted first). In addition, the map information and the read count output by the memory system 110 to the host 102 may include update information. Because a space allocated by the host 102 to store the map information and the read count transmitted from the memory system 110 includes volatile memory cells (an overwrite is supported), the host 102 can update map information and read count based on the update information without an additional operation of erasing another map information and anther read count.

The host 102 may add a physical address PBA and the read count RD_CNT into a command transmitted to the memory system 110 based on the map information and the read count. In the mapping operation, the host 102 searches for the physical address PBA1 corresponding to a logical address in the map information stored in the memory. When the physical address PBA1 is located, the host 102 retrieves its read count RD_CNT1. Once the physical address PBA1 and the read count RD_CNT1 have been found, the host 102 transmits the command with the logical address, the physical address PBA1 and the read count RD_CNT1 to the memory system 110.

More specifically, referring to FIG. 31A, the host 102 may generate a map transfer command, receive map information L2P MAP INFO and a read count RD_CNT of a memory block corresponding to the map information L2P MAP INFO from the memory system 110, and store the map information L2P MAP INFO and the read count RD_CNT in an internal memory. At this time, the memory system 110 may generate a log corresponding to the map information L2P MAP INFO sent to the host 102. The map transfer command generated by the host 102 may not be specifically limited. That is, a specific command predefined between the host 102 and the memory system 110 or a command used already therebetween may be used as the map transfer command. For example, the host 102 may generate a write command as the map transfer command and transmit the write command to the memory system 110, and the memory system 110 may recognize the write command as the map transfer command, and send the map information L2P MAP INFO and the read count RD_CNT of the memory block corresponding to the map information L2P MAP INFO to the host 102 in response to the write command. The host 102 may send a read command RD_CMD with a first logical address, a first physical address PBA1 and a first read count RD_CNT1 to the memory system 110 by referring to the map information L2P MAP INFO stored therein.

When the first logical address, the first physical address PBA1 and the first read count RD_CNT1 are included in the read command RD_CMD from the host 102, the memory system 110 may check whether the first physical address PBA1 is valid. When the first physical address PBA1 is valid (WHEN VALID PBA1), the memory system 110 may read first data DATA1 from a first memory block corresponding to the first physical address PBA1. At this time, since the first physical address PBA1 is a valid physical address, the first read count RD_CNT1 is an accurate read count for the first memory block. Therefore, the memory system 110 may update the first read count RD_CNT1 in response to the read operation for the first data DATA1, and apply the updated first read count RD_CNT1 as the new read count for the first memory block. The memory system 110 may include the first data DATA1 and the updated value UPDATED of the first read count RD_CNT1 in a response to the read command RD_CMD, and send the response with the first data DATA1 and the updated value UPDATED of the read count RD_CNT1 to the host 102.

The updated value UPDATED of the first read count RD_CNT1 sent to the host 102 by the memory system 110 may be generated through a number of different methods according to a protocol with the host 102.

A first method can be described with reference to FIGS. 31A and 7A. The updated value UPDATED of the first read count RD_CNT1 may be obtained by increasing the value of the first read count RD_CNT1 by a preset value. For example, when the value of the first read count RD_CNT1 received is 10, the memory system 110 may increase the value of the first read count RD_CNT1 by a preset value of 1, making the updated value to 11. The updated value UPDATED of the first read count RD_CNT1 is sent to the host 102 as part of a response to the read commend RD_CMD by the memory system 110.

The host 120 may store the updated value UPDATED of the first read count RD_CNT1 received in response to the read command RD_CMD in the internal memory (STORING UPDATED RD_CNT1). For example, the host 102 may change the first read count RD_CNT1 having a value of 10 to 11.

A second method can be described with reference to FIGS. 31A and 34B. A code value for increasing the value of the first read count RD_CNT1 by a preset value may be applied.

For example, when the value of the first read count RD_CNT1 received from the host 102 is 10 and needs to be increased by a preset value of 1, the memory system 110 may generate the updated value UPDATED of the first read count RD_CNT1 as a value of 1. The memory system 110 may include the updated value UPDATED of the first read count RD_CNT1 in a response to the read command RD_CMD with the first data DATA1, and send the response with the first data DATA1 and the updated value UPDATED.

When the updated value UPDATED of the first read count RD_CNT1, generated through the second method, is received in the response of the read command RD_CMD, the host 120 may increase the value of the first read count RD_CNT1 stored in the internal memory using the updated value UPDATED of the first read count RD_CNT1 (INCREASING VALUE OF STORED RD_CNT1). For example, the host 102 may increment the first read count RD_CNT1 having a value of 10 stored in the internal memory with the updated value UPDATE of 1 received from the memory system 110, thereby changing the value of the first read count RD_CNT1 to 11.

When a predetermined operation PREDETERMINED OPERATION is performed in a memory system 110, some map information SOME L2P MAP INFO managed in the memory system 110 may be updated. Although the some map information (or the selected map information) was updated through the predetermined operation in the memory system 110, the host 102 may not know about the update until the memory system 110 informs the host 102 of the update. Therefore, the selected map information stored in the host 102 may become outdated map information. That is, when the host 102 transfers the physical address PBA2 corresponding to the read command as described above, the memory system 110 cannot use the physical address received from the host 102 as it is, if the transferred physical address corresponds to the updated map information in the memory system 110. Instead, the memory system 110 may search for a new physical address again, and access and output data using the new physical address. In this case, although the physical address was provided to the memory system 110 by the host 102, a time t2 required to perform an operation corresponding to the read command in the memory system 110 may be significantly increased.

Referring to FIG. 31B, the host 102 may receive map information L2P MAP INFO and a read count RD_CNT of a memory block corresponding to the map information L2P MAP INFO from the memory system 110, and store the map information L2P MAP INFO and the read count RD_CNT in the internal memory. At this time, the memory system 110 may generate a log corresponding to the map information L2P MAP INFO sent to the host 102.

The host 102 may send the read command RD_CMD with a first logical address, a first physical address PBA1 and a first read count RD_CNT1 to the memory system 110 by referring to the map information L2P MAP INFO stored therein.

The memory system 110 may check whether the first physical address PBA1 is valid after receiving the read command RD_CMD. If the first physical address PBA1 is invalid (WHEN INVALID PBA1), the first read count RD_CNT1 corresponding to the first physical address PBA1 may also be invalid. Therefore, when the first physical address PBA1 is invalid (WHEN INVALID PBA1), the memory system 110 may discard the first physical address PBA1 and the first read count RD_CNT1 corresponding to the first physical address PBA1, and search for a second physical address PBA2 corresponding to the first logical address. The memory system 110 may read second data DATA2 from a second memory block corresponding to the second physical address PBA2 using the second physical address PBA2. The memory system 110 may generate a second read count RD_CNT2 by updating a read count corresponding to the second memory block. That is, the memory system 110 may discard the first read count RD_CNT1 received from the host 102, and generate the second read count RD_CNT2 using a read count corresponding to the second memory block, which has been managed in the memory system 110. The memory system 110 may send a response to the read command RD_CMD to the host 102, where the response includes the second data DATA2, the second read count RD_CNT2 and updated map information UPDATED L2P MAP (LBA1:PBA2). The updated map information UPDATED L2P MAP (LBA1:PBA2) is obtained by associating the first logical address with the second physical address PBA2.

When in the response to the read command RD_CMD is received the host 102 may update the map information stored in the internal memory by referring to the updated map information UPDATED L2P MAP (LBA1:PBA2), so that the first logical address LBA1 is associated with the second physical address PBA2 (UPDATED L2P MAP). Then, the host 102 may match the second read count RD_CNT2 with the second physical address PBA2 and store the second read count RD_CNT2.

Figure 32:
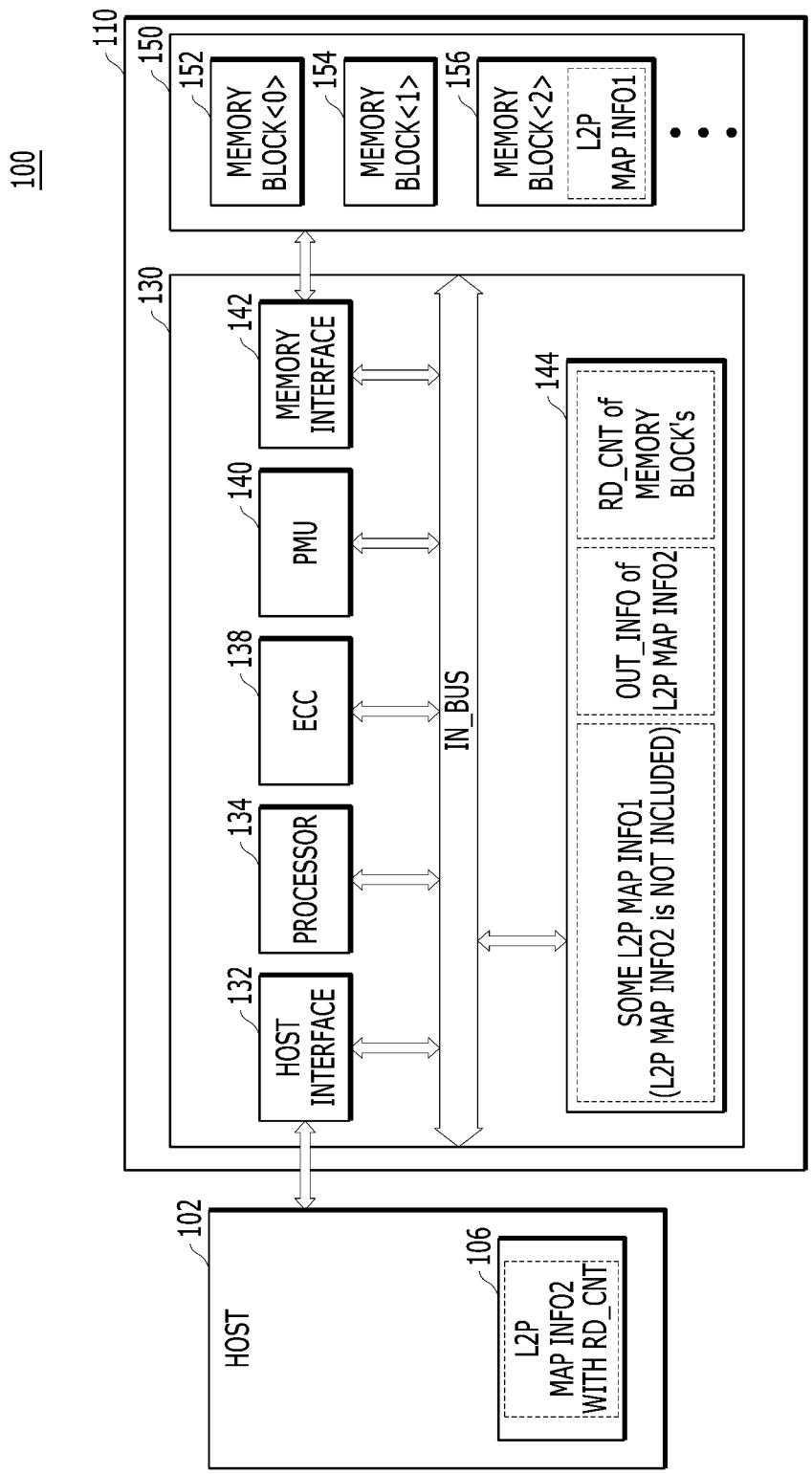
FIG. 32 shows an example of a data processing system including a memory system in accordance with an embodiment.

FIG. 32 illustrates a data processing system 100 in accordance with an embodiment of the present disclosure. The data processing system 100 may include a host 102 engaged or operating with a memory system 110.

Referring to FIGS. 331A to 32, the host 102 illustrated in FIG. 320 may store a read count for each map information, as compared with the host 102 illustrated in FIGS. 12 and 20. Therefore, the following descriptions will be focused on differences between FIGS. 12, 20 and 32.

Referring to FIGS. 331A, 31B and 32, the memory system 110 may generate first map information L2P MAP INFO1 which maps a physical address of data in the memory device 150 to a logical address received from the host 102. More specifically, when a write command with a second logical address and write data is received from the host 102, the memory system 110 may generate first map information L2P MAP INFO1 to associate the second logical address with a physical address of the memory device 150 in which the write data is stored. The entire first map information L2P MAP INFO1 generated in the memory system 110 may be stored in a memory block MEMORY BLOCK<2> (or in multiple memory blocks) in the memory device 150. The memory block may be non-volatile device and the information may be stored in a nonvolatile state. Also, some of first map information SOME L2P MAP INFO1 (or a portion of first map information) from the entire first map information L2P MAP INFO1 stored in the memory device 150 in the nonvolatile state may be stored in the memory 144 in the controller 130. The memory system 110 may manage the read counts RD_CNT of the memory blocks 152, 154, 156 included in the nonvolatile memory device 150, and some or all of the read counts may be stored in the memory 144 within the controller 130. Furthermore, some of second map information L2P MAP INFO2 (or a portion of second map information) and read count RD_CNT from the entire first map information L2P MAP INFO1 stored in the memory device 150 in the nonvolatile state may be transmitted to the host 102 and stored in the memory 106 in the host 102. The portion of the first map information SOME L2P MAP INFO1 stored in the memory 144 in the controller 130 and the second map information L2P MAP INFO2 transmitted to the host 102 and stored in the memory 106 in the host 102 may not overlap each other. After transmitting the second map information L2P MAP INFO2 and the read count RD_CNT to the host 102, the controller 130 of the memory system 110 may generate log information OUT_INFO of L2P MAP INFO2 on the second map information L2P MAP INFO2.

FIG. 32 illustrates that the log information OUT_INFO of L2P MAP INFO2 on the second map information L2P MAP INFO2 is stored in the memory 144 in the controller 130, but this merely shown as an example. In practice, the log information OUT_INFO of L2P MAP INFO2 on the second map information L2P MAP INFO2 may be stored in the memory 144 in the controller 130 and at the same time may be stored in a specific memory block of the memory device 150 in a nonvolatile state.

Figure 33:
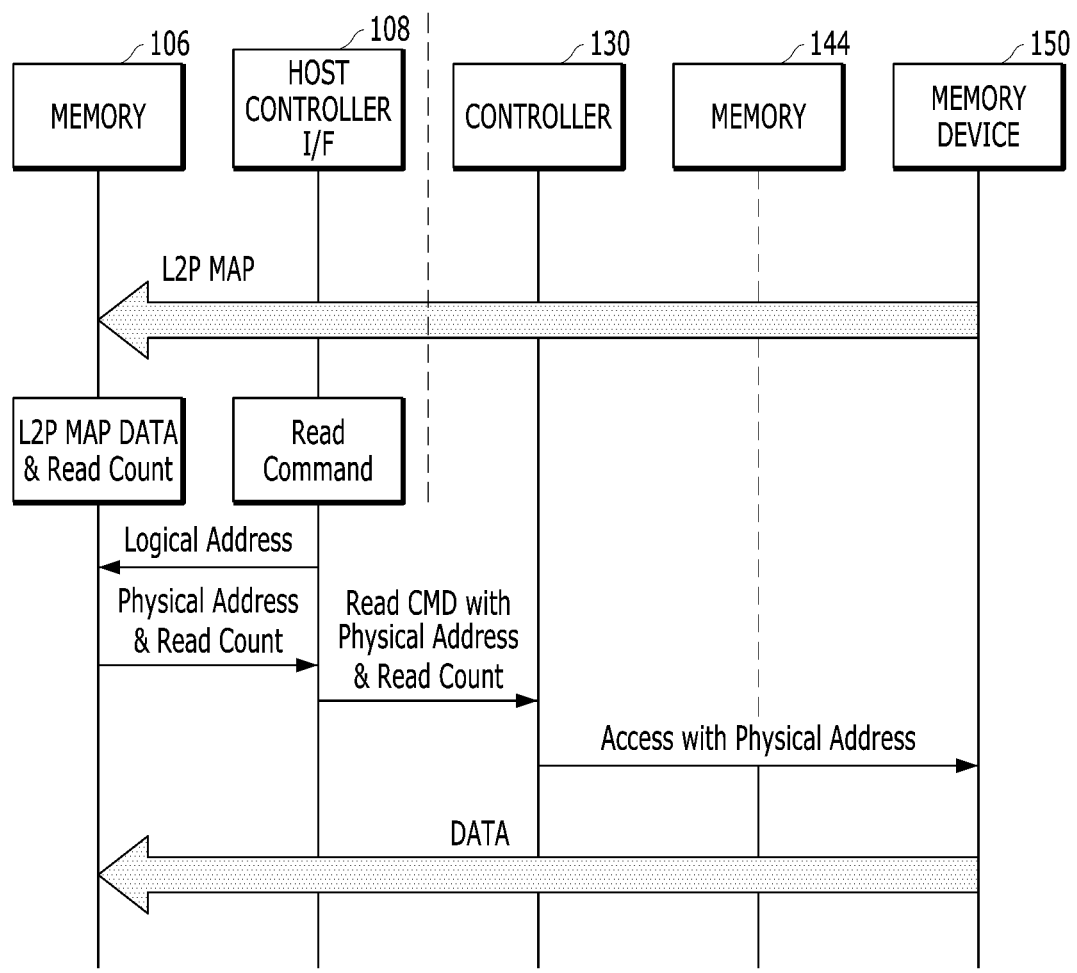
FIG. 33 illustrates a first example of a transaction between the host and the memory system in the data processing system in accordance with the embodiment.

FIG. 33 is a diagram illustrating a first example of a transaction between the host and the memory system in the data processing system in accordance with the present embodiment.

FIG. 33 illustrates the format of the read command RD_CMD transferred to the memory system 110 from the host 102, which has described with reference to FIGS. 31A and 31B.

Specifically, referring to FIGS. 331A, 31B and 5, the host 102 which stores the map information MAP_INFO and the read count RD_CNT may send a read command READ COMMAND with a first logical address LBA1, a first physical address PBA1 and a first read count RD_CNT1 to the memory system 110. When the first physical address PBA1 corresponding to the first logical address LBA1 corresponding to the read command READ COMMAND is present in the map information stored in the host 102, the host 102 may transmit the read command READ COMMAND including the first logical address LBA1, the first physical address PBA1, and the first read count RD_CNT1 corresponding to the first physical address PBA1, to the memory system 110. However, when the physical address PBA corresponding to the logical address LBA corresponding to the read command READ COMMAND is not present in the map information stored in the host 102, the host 102 may transmit the read command READ COMMAND including only the logical address LBA without the physical address PBA, to the memory system 110.

Figure 34A:
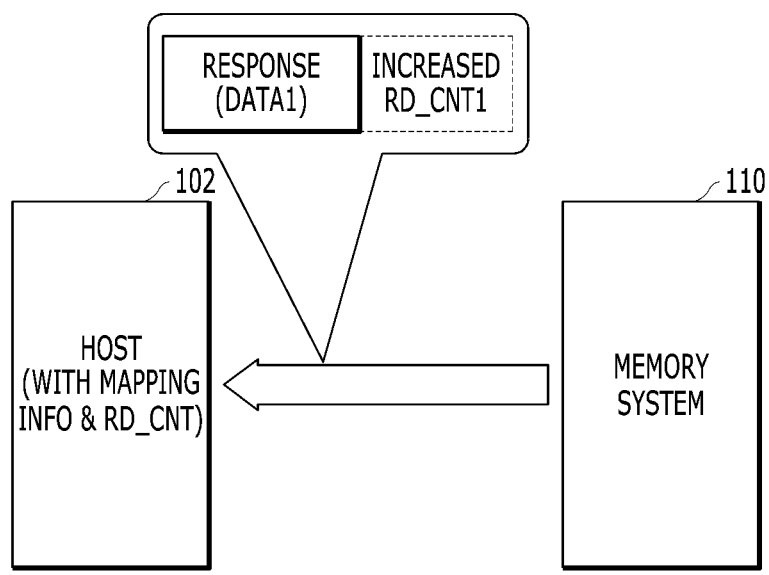
FIGS. 34A and 34B show a second example of the transaction between the host and the memory system in the data processing system in accordance with the embodiment.
Figure 34B:
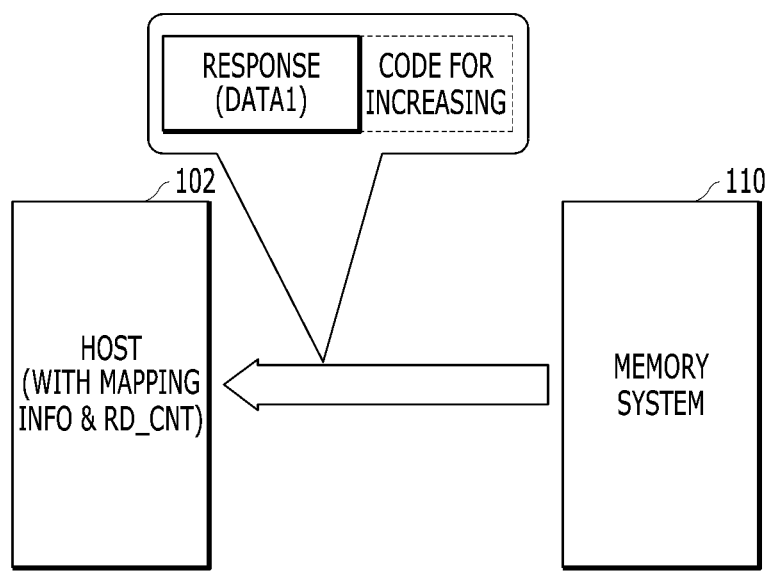

FIGS. 34A and 34B are diagrams illustrating a second example of the transaction between the host and the memory system in the data processing system in accordance with the embodiment.

FIGS. 34A and 34B illustrate the format of the response RESPONSE to the read command RD_CMD, which is transmitted to the host 102 from the memory system 110 and has been described with reference to FIG. 31A.

Specifically, referring to FIGS. 31A, 34A and 34B, the memory system 110 may include the first data DATA1 and the updated value UPDATED of the first read count RD_CNT1 in the response RESPONSE to the read command RD_CMD inputted from the host 102, and send the response RESPONSE with the first data DATA1 and the update value UPDATED of the first read count RD_CNT1 to the host 102.

FIG. 34A illustrates the case in which the updated value UPDATED of the first read count RD_CNT1 is a first read count INCREASED RD_CNT1 increased by a preset value. Therefore, the memory system 110 may include the first data DATA1 and the first read count INCREASED RD_CNT1 increased by the preset value in the response RESPONSE to the read command RD_CMD inputted from the host 102, and send the response RESPONSE with the first data DATA1 and the increased first read count INCREASED RD_CNT1 to the host 102.

FIG. 34B illustrates the case in which the updated value UPDATED of the first read count RD_CNT1 is a code for increasing the value of the first read count RD_CNT1 by a preset value. Therefore, the memory system 110 may include the first data DATA1 and the code CODE FOR INCREASING for increasing the value of the first read count RD_CNT1 by a preset value in the response RESPONSE to the read command RD_CMD inputted from the host 102, and send the response RESPONSE with the first data DATA1 and the code CODE FOR INCREASING to the host 102.

Figure 35:
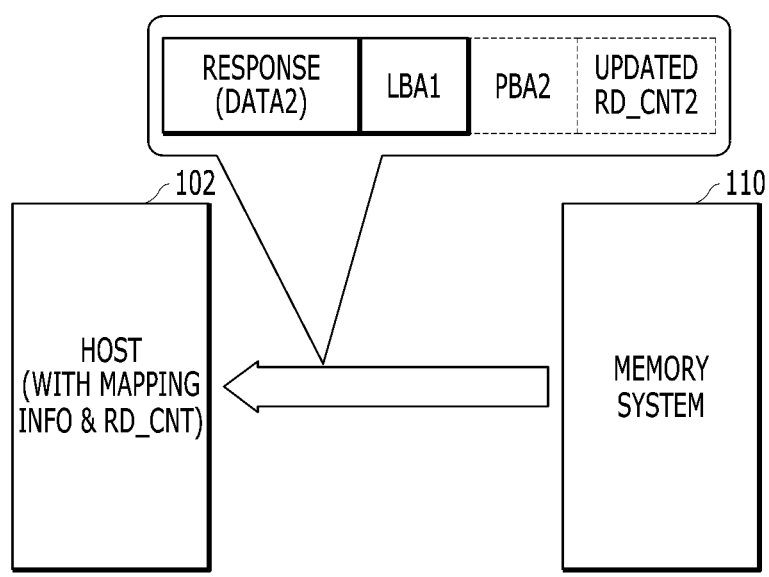
FIG. 35 illustrates a third example of the transaction between the host and the memory system in the data processing system in accordance with the embodiment.

FIG. 35 is a diagram illustrating a third example of the transaction between the host and the memory system in the data processing system in accordance with the embodiment.

FIG. 35 illustrates the format of the response RESPONSE to the read command RD_CMD, which is transmitted to the host 102 from the memory system 110 and has been described with reference to FIG. 31B.

Specifically, referring to FIGS. 31B and 8, the memory system 110 may include the second data DATA2, the first logical address LBA1, the second physical address PBA2 and the second read count RD_CNT2 in the response RESPONSE to the read command RD_CMD inputted from the host 102, and send the response with the second data DATA2, the first logical address LBA1, the second physical address PBA2 and the second read count RD_CNT2 to the host 102.

Figure 36:
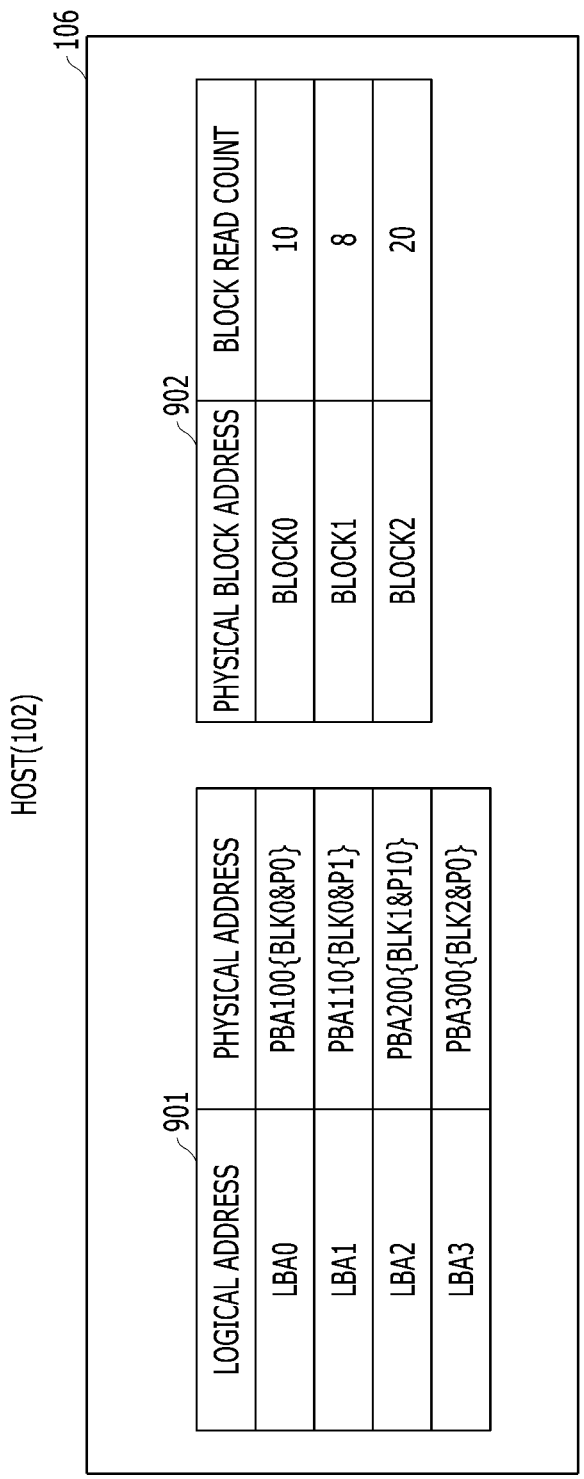
FIG. 36 describes an example of the host including an internal memory in accordance with the embodiment.

FIG. 36 is a diagram illustrating an example of the host including the internal memory in accordance with the embodiment.

FIGS. 31A, 31B, 32 and 36 show a method in which the host 102 manages the map information L2P MAP INFO and the read count RD_CNT inputted from the memory system 110.

First, the memory device 150 may include the plurality of memory blocks 152, 154, 156, and each of the memory blocks 152, 154, 156 may include the plurality of pages. At this time, physical addresses of the memory device 150 may include block physical addresses for identifying the memory blocks 152, 154, 156 and page physical addresses for identifying the pages. For example, as illustrated in FIG. 36, a 100th physical address PBA100 corresponding to a zeroth logical address LBA0 may indicate a combination of a block physical address indicating a zeroth memory block BLK0 and a page physical address indicating a zeroth page P0. Furthermore, a 110th physical address PBA110 corresponding to a first logical address LBA1 may indicate a combination of the block physical address indicating the zeroth memory block BLK0 and a page physical address indicating a first page P1. Furthermore, a 200th physical address PBA200 corresponding to a second logical address LBA2 may indicate a combination of a block physical address indicating a first memory block BLK1 and a page physical address indicating a tenth page P10. Furthermore, a 300th physical address PBA300 corresponding to a third logical address LBA3 may indicate a combination of a block physical address indicating a second memory block BLK2 and the page physical address indicating the zeroth page P0.

When receiving the map information L2P MAP INFO and the read count RD_CNT corresponding to the map information L2P MAP INFO from the memory system 110, the host 102 may store the received map information L2P MAP INFO in the internal memory 106 as it is (901). Furthermore, the host 102 may generate read count information 902 for managing read counts on a memory block basis by referring to the block physical address included in the physical address of the map information L2P MAP INFO, and store the read count information 902 in the internal memory 106.

The reason why the host 102 separately stores the map information L2P MAP INFO and the read count RD_CNT is that the map information L2P MAP INFO is sorted on a page basis, but the read count RD_CNT is sorted on a block basis. For example, FIG. 36 illustrates that since the zeroth logical address LBA0 and the first logical address LBA1 are all mapped to the physical address indicating the zeroth memory block BLK0, the read count corresponding to the zeroth memory block BLK0 may correspond to a value obtained by adding up the read count of the 100th physical address PBA100 mapped to the zeroth logical address LBA0 and the read count of the 110th physical address PBA110 mapped to the first logical address LBA1.

In accordance with the embodiments, the memory system may transmit the read counts of the memory blocks included therein to the host or computing device to manage the read counts. Therefore, even when an SPO occurs in the memory system, the host or computing device can accurately recover the read counts of the memory blocks included in the memory system based on the read counts stored in the host or the computing device. Therefore, it is possible to prevent a background operation which may be unnecessarily performed based on the read counts in the memory system, thereby improving the operation performance of the memory system.

Figure 37:
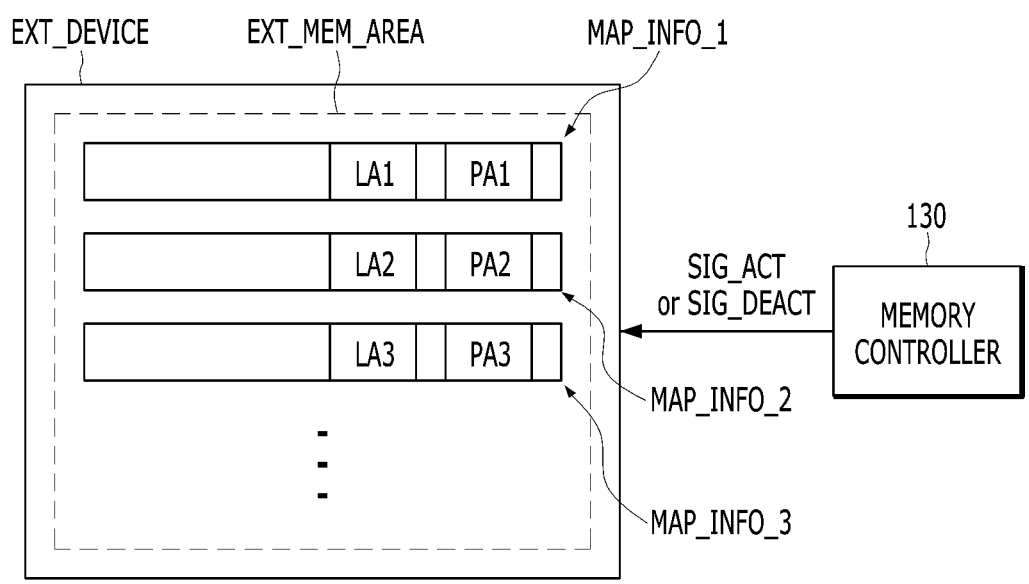
FIG. 37 illustrates an example operation of a memory controller based on an embodiment of the disclosure.

FIG. 37 is a diagram schematically illustrating an example operation of the controller 130 based on an embodiment of the disclosure.

In an embodiment, the controller 130 may store mapping information for mapping between logical addresses and physical addresses in a memory area EXT_MEM_AREA. In one example, the controller 130 includes the memory area EXT_MEM_AREA. In another example, the memory area EXT_MEM_AREA is outside the controller 130.

In an embodiment, upon receipt a logical address from the host 102, the memory system 1100 translates the logical address to a physical address at which data is stored in the memory device 150. A physical address may include at least one of die information, plane information, memory block information, or page information. Mapping information between a logical address and a physical address may be used to map each logical address to a physical address, and such logical and physical addresses may include logical and physical page addresses, logical and physical sector addresses, and logical and physical block address.

The memory device 150 may store the mapping information for mapping between the logical address and the physical address. For example, the memory device 150 may store the mapping information in a mapping table.

The controller 130 may load all or some of mapping information and cache the mapping information in the working memory 125 of the controller 130.

The memory area EXT_MEM_AREA described above may include mapping information MAP_INFO_1, MAP_INFO_2 and MAP_INFO_3. The mapping information may include a logical address, a physical address associated with the logical address, and may also be referred to as map data or a map data segment.

The memory area EXT_MEM_AREA may be positioned outside the memory system 1100. Specifically, the memory area EXT_MEM_AREA may be positioned in an external device EXT_DEVICE of the controller 130.

Example of the external device EXT_DEVICE may include an SRAM, a DRAM, an SDRAM and a NAND flash memory included in the host 102. For another example, the external device EXT_DEVICE may be a separate storage device positioned outside the host 102.

Referring to FIG. 37, first mapping information MAP_INFO_1 may include mapping information between a first logical address LA1 and a first physical address PA1. Second mapping information MAP_INFO_2 may include mapping information between a second logical address LA2 and a second physical address PA2. Third mapping information MAP_INFO_3 may include mapping information between a third logical address LA3 and a third physical address PA3.

The controller 130 may activate the memory area EXT_MEM_AREA to use the memory area EXT_MEM_AREA as a cache memory for mapping information which can be accessed directly by an external device. For example, the controller 130 may generate an activation signal SIG_ACT when the controller 130 intends to activate the memory area EXT_MEM_AREA, and conversely, may generate a deactivation signal SIG_DEACT when the controller 130 intends to deactivate the memory area EXT_MEM_AREA. For instance, each of the activation signal SIG_ACT and the deactivation signal SIG_DEACT may be a command signal to be transmitted to the host 102. The external device EXT_DEVICE in which the memory area EXT_MEM_AREA is positioned may receive the activation signal SIG_ACT or the deactivation signal SIG_DEACT, and thereby may control an operation for actually activating/deactivating the corresponding memory area EXT_MEM_AREA.

If the memory area EXT_MEM_AREA is activated by the controller 130, an external device such as the host 102 may directly refer to the mapping information stored in the memory area EXT_MEM_AREA. That is to say, the device such as the host 102 may refer to the mapping information stored in the activated memory area EXT_MEM_AREA, and may include both the logical address and the value of the physical address corresponding to the logical address, in the command signal to be transmitted to the controller 130.

On the other hand, if the memory area EXT_MEM_AREA is deactivated by the controller 130, the host 102 does not refer to the mapping information stored in the memory area EXT_MEM_AREA.

In this way, the controller 130 selectively activate or deactivate the memory area EXT_MEM_AREA.

If the mapping information stored in the memory area EXT_MEM_AREA is referred to by the host 102, upon receiving a command transmitted from the host 102, the controller 130 may use a physical address included in the corresponding command, without the need for separately searching for the physical address mapped to a logical address included in the corresponding command. Therefore, if the mapping information stored in the memory area EXT_MEM_AREA is highly likely to be referred to by the host 102, it is advantageous in terms of performance to activate the memory area EXT_MEM_AREA.

On the other hand, in the case where the mapping information stored in the memory area EXT_MEM_AREA is less likely to be referred to by the host 102, keeping the memory area EXT_MEM_AREA in an activated state may rather increase an overhead to the system, thereby deteriorating the performance of the memory system.

For example, when the controller 130 performs an operation of controlling the mapping information to be stored in the memory area EXT_MEM_AREA, the overhead to the system may increase. Further, if the memory area EXT_MEM_AREA is activated, the host 102 first searches mapping information in the memory area EXT_MEM_AREA before transmitting a command to the controller 130, and in this process, an overhead may additionally increase.

In the case where the host 102 fails to search for, in the memory area EXT_MEM_AREA, a physical address mapped to a logical address included in a command, the controller 130 needs to search again for, in a mapping table, the physical address mapped to the corresponding logical address, as in a general FTL operation, and thus, a total time for searching mapping information rather increases.

Therefore, in order for the controller 130 to quickly execute a command instructed by the host 102, the controller 130 implemented based on an embodiment of the disclosure can selectively activate or deactivate the memory area EXT_MEM_AREA.

If the controller 130 activates or deactivates the memory area EXT_MEM_AREA as described above, the host 102 may differently generate a command to be transmitted to the controller 130, based on whether the memory area EXT_MEM_AREA is activated or not.

As will be discussed below, the host 102 generates a command to be transmitted to the controller 130 based on whether the memory area EXT_MEM_AREA in the external device EXT_DEVICE is activated or deactivated.

Figure 38:
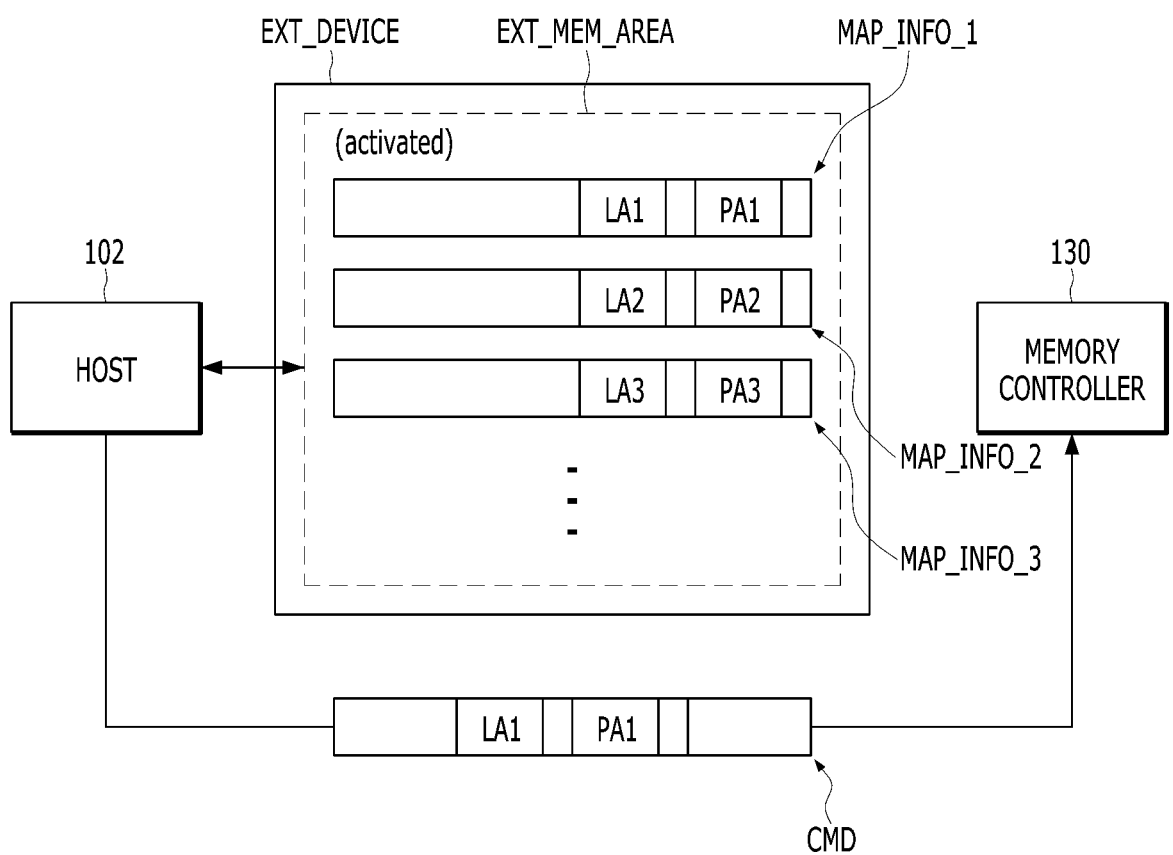
FIG. 38 is a diagram illustrating an example operation of a host and the memory controller in the case where a memory area the disclosure is activated.

FIG. 38 is a diagram illustrating an example operation of the host 102 and the controller 130 in a case where the memory area EXT_MEM_AREA is activated.

FIG. 38 illustrates, as an example, a case where the host 102 transmits a command CMD for performing an operation (e.g., a read operation or a write operation) for the first logical address LA1, to the controller 130.

The host 102 may search for mapping information corresponding to the first logical address LA1 in the mapping information included in the activated memory area EXT_MEM_AREA, and may check the first physical address PA1 corresponding to the first logical address LA1, in the first mapping information MAP_INFO_1 corresponding to the first logical address LA1.

When transmitting the command CMD for performing the operation for the first logical address LA1, to the controller 130, the host 102 may include the first logical address LA1 and the first physical address PA1 checked in the memory area EXT_MEM_AREA, in the command CMD.

When the controller 130 receives the command CMD from the host 102, the controller 130 may determine the value of the first physical address PA1 included in the received command CMD, as a target physical address for which the operation indicated by the corresponding command CMD is to be performed. In this case, the controller 130 does not need to search mapping information stored in the memory device 150 or search mapping information cached in the working memory 125 of the controller 130, to determine a target physical address so that the operation indicated by the corresponding command CMD is performed on a memory cell corresponding to the target physical address. Therefore, the controller 130 may quickly process the command CMD received from the host 102.

However, there may be a case where the value of the first physical address PA1 included in the command CMD received from the host 102 does not match actual mapping information. For example, after the controller 130 loads mapping information on the first logical address LA1 to the memory area EXT_MEM_AREA, a physical address mapped to the first logical address LA1 by a background operation (e.g., garbage collection/wear leveling) may have a different value from the first physical address PA1.

Therefore, instead of using the value of the first physical address PA1 included in the corresponding command CMD as it is, the controller 130 may check whether the first logical address LA1 is actually mapped to the first physical address PA1 to use the first physical address PA1 included in the corresponding command CMD, only when the mapping is correct. If the first logical address LA1 is not mapped to the first physical address PA1, the controller 130 may search for another physical address the first logical address LA1 is actually mapped to, from the mapping information stored in the memory device 150 or the mapping information cached in the working memory 125 of the controller 130.

In the above, mapping information on the first logical address LA1 corresponding to the operation instructed by the command CMD is included in the memory area EXT_MEM_AREA. However, in some cases, mapping information on a logical address corresponding to the operation instructed by the command CMD is not in the memory area EXT_MEM_AREA. In this case, the command CMD includes only the value of the logical address corresponding to the operation instructed by the command CMD, and does not include the value of a physical address mapped to the corresponding logical address.

Figure 39:
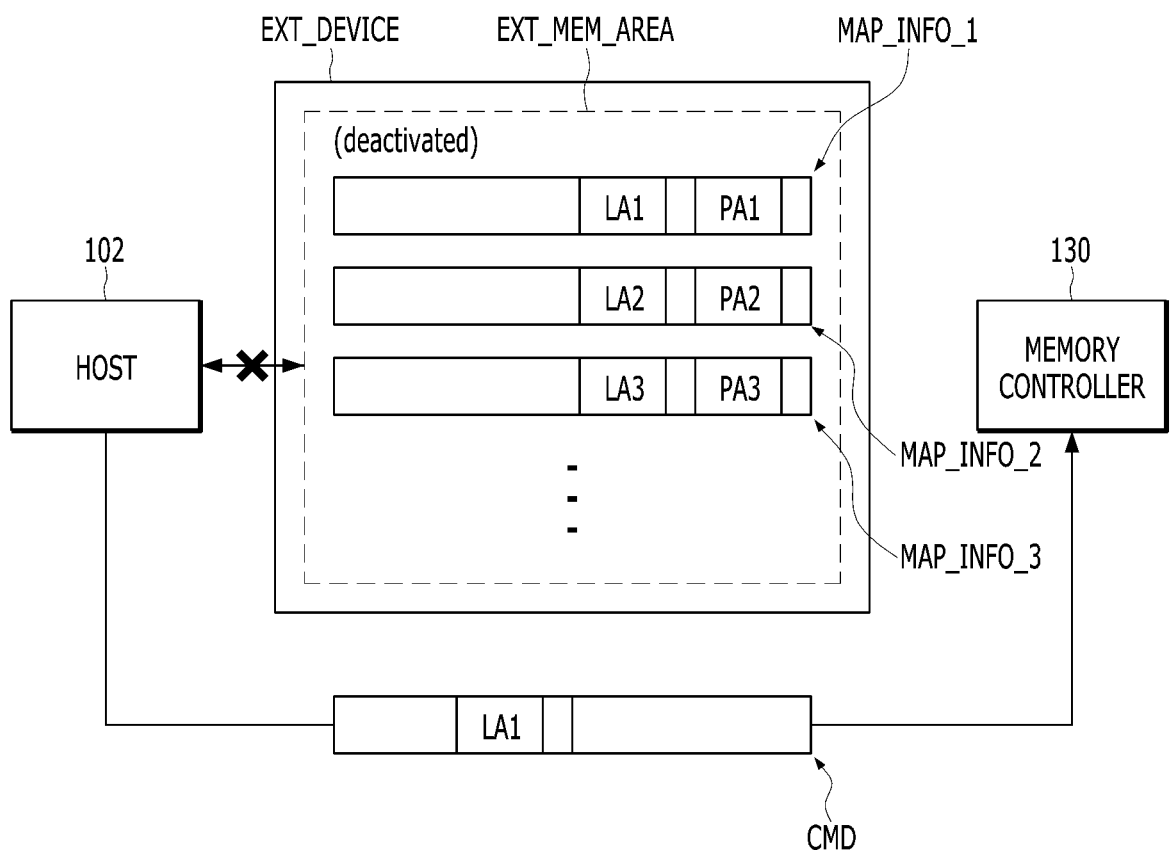
FIG. 39 is a diagram illustrating an example of operations of the host and the memory controller in the case where the memory area the disclosure is deactivated.

FIG. 39 is a diagram illustrating an example of operations of the host 102 and the controller 130 in the case where the memory area EXT_MEM_AREA is deactivated.

In one example, the host 102 transmits, to the controller 130, a command CMD for performing an operation (e.g., a read operation or a write operation) on the first logical address LA1.

Unlike the example shown in FIG. 38, since the memory area EXT_MEM_AREA is in a deactivated state, the host 102 does not refer to mapping information included in the memory area EXT_MEM_AREA. Thus, the host 102 includes in the command CMD the value of the first logical address LA1 corresponding to the operation instructed by the command CMD, but does not include in the command CMD the value of a physical address mapped to the first logical address LA1.

When the controller 130 receives the command CMD from the host 102, the controller 130 needs to search for the value of a physical address mapped to the first logical address LA1 included in the corresponding command CMD, in a manner similar to a general FTL operation method. For example, the controller 130 may search for a physical address which is actually mapped to the first logical address LA1, from the mapping information stored in the memory device 150 or the mapping information cached in the working memory 125 of the controller 130.

As shown in FIGS. 4 to 6, the operations of the host 102 and the controller 130 vary depending on whether the memory area EXT_MEM_AREA is activated. As will be discussed below, the controller 130 can determine whether to activate the memory area EXT_MEM_AREA.

FIGS. 7 and 8 are diagrams schematically illustrating examples operations of determining whether to activate the memory area EXT_MEM_AREA based on the embodiments of the disclosure.

Figure 40:
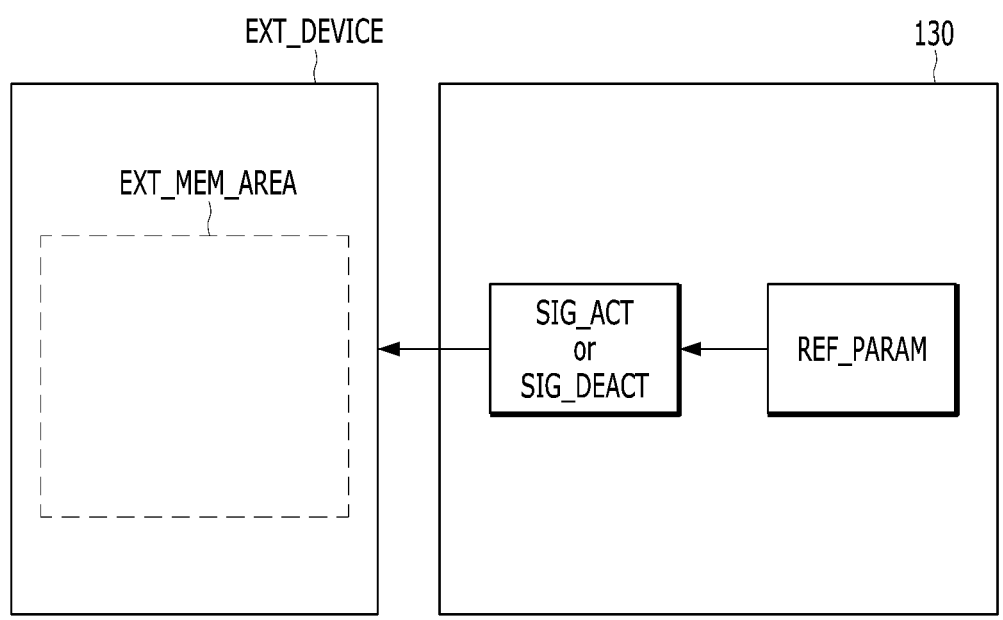
FIG. 40 is a diagram schematically illustrating an example operation of determining whether to activate the memory area based on an embodiment of the disclosure.

Referring to FIG. 40, the controller 130 may update a reference parameter REF_PARAM for the memory area EXT_MEM_AREA, and may determine whether to activate the memory area EXT_MEM_AREA, based on the reference parameter REF_PARAM. The controller 130 may generate the activation signal SIG_ACT when the controller 130 intends to activate the memory area EXT_MEM_AREA, and conversely, may generate the deactivation signal SIG_DEACT when the controller 130 intends to deactivate the memory area EXT_MEM_AREA. In an embodiment, the reference parameter REF_PARAM may be determined based on the workload of the system. In one example, the reference parameter REF_PARAM may be determined based on how often read or write operations, which require looking up the mapping information, are performed.

A method of determining whether to activate the memory area EXT_MEM_AREA depending on the reference parameter REF_PARAM may be realized in various ways. For example, the controller 130 may activate the memory area EXT_MEM_AREA when the value of the reference parameter REF_PARAM is equal to or greater than a preset threshold value, and may deactivate the memory area EXT_MEM_AREA when the value of the reference parameter REF_PARAM is less than the corresponding threshold value. As another example, the controller 130 may activate the memory area EXT_MEM_AREA, when the value of the reference parameter REF_PARAM that is equal to or greater than the preset threshold value is maintained for a predetermined time period, and otherwise, may deactivate the memory area EXT_MEM_AREA.

The reference parameter REF_PARAM described above with reference to FIG. 40 may be updated according to various methods. Hereinafter, a method of updating the reference parameter REF_PARAM based on a workload WKL will be described in detail.

Figure 41:
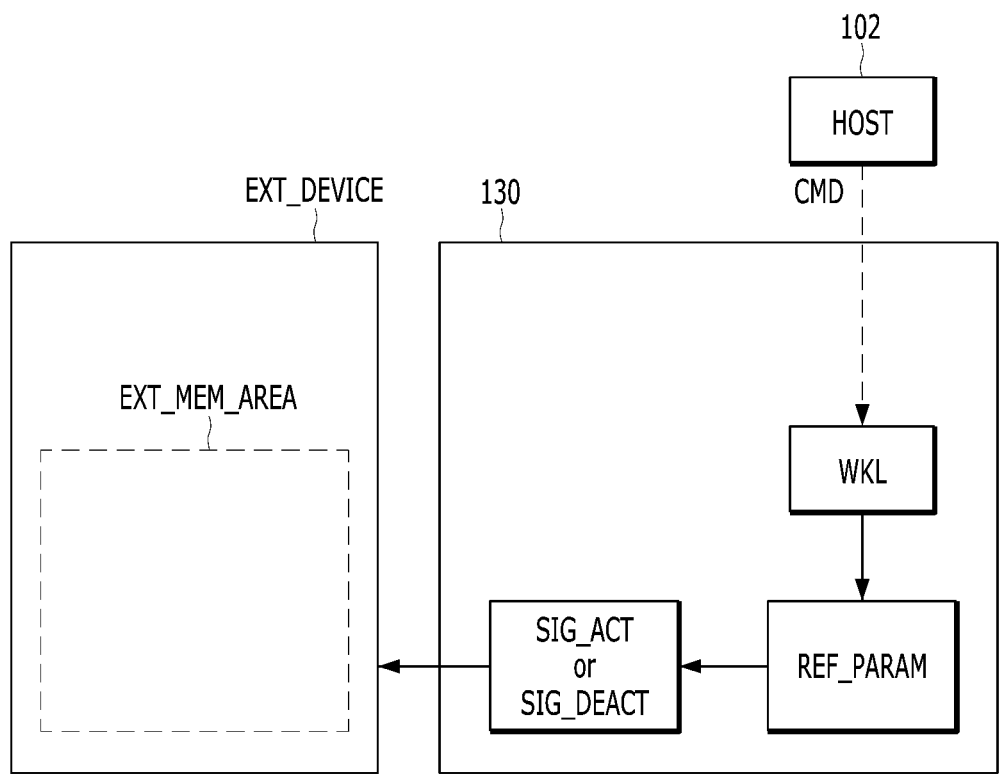
FIG. 41 is a diagram schematically illustrating an example operation of determining whether to activate the memory area based on an embodiment of the disclosure.

Referring to FIG. 41, the controller 130 may dynamically update the reference parameter REF_PARAM based on workload WKL information on a command CMD received from the host 102.

The workload WKL information may be generated in various ways. For example, the workload WKL information may include types of the command CMD (e.g., a read command or a write command) received from the host 102, the size of data corresponding to the command CMD, a pattern in which the command CMD is received, and a frequency of receiving the command CMD. Such workload WKL information may vary over time, and accordingly, the reference parameter REF_PARAM may be dynamically updated as well.

Hereinafter, specific examples of workload WKL information and specific examples of an operation in which the controller 130 updates the reference parameter REF_PARAM using the workload WKL information and determines whether to activate the memory area EXT_MEM_AREA, based on the updated reference parameter REF_PARAM, will be described with reference to FIGS. 42 to 47.

Figure 42:
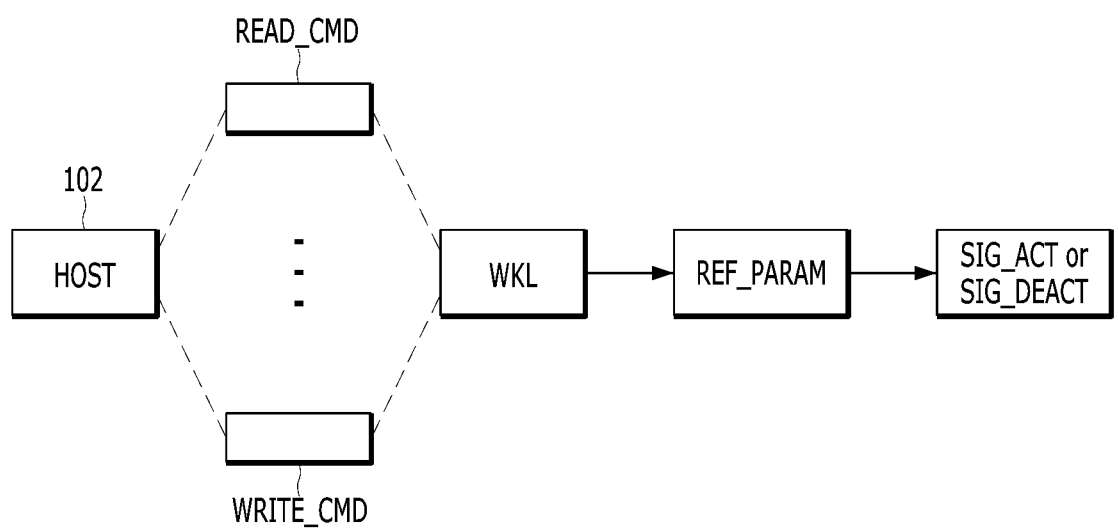
FIG. 42 is a diagram illustrating an example process of determining a workload of FIG. 41.

FIG. 42 is a diagram illustrating an example process of determining the workload WKL of FIG. 41.

Referring to FIG. 42, the workload WKL information may include information on a read command READ_CMD received from the host 102 for a predetermined time period or information on a write command WRITE_CMD received from the host 102 for a predetermined time period.

A method of updating the reference parameter REF_PARAM based on the information on the read command READ_CMD or the write command WRITE_CMD received from the host 102 may be variously determined.

For example, if mapping information on a logical address included in the read command READ_CMD is included in the memory area EXT_MEM_AREA, the controller 130 may determine that, since the mapping information stored in the memory area EXT_MEM_AREA has been referred to by the host 102, the mapping information is highly likely to be referred to even later. Therefore, the controller 130 may update the reference parameter REF_PARAM to increase the possibility that the memory area EXT_MEM_AREA is activated.

On the other hand, if mapping information on a logical address included in the read command READ CMD is not included in the memory area EXT_MEM_AREA (or the mapping information is included in the memory area EXT_MEM_AREA but is different from actual mapping information), the controller 130 may determine that, since mapping information stored in the memory area EXT_MEM_AREA is not referred to by the host 102, the mapping information is less likely to be referred to even later. Therefore, the controller 130 may update the reference parameter REF_PARAM to decrease the possibility that the memory area EXT_MEM_AREA is activated or omit update for the reference parameter REF_PARAM.

As another example, if mapping information on a logical address included in the write command WRITE CMD is stored in the memory area EXT_MEM_AREA, the controller 130 may determine that the mapping information stored in the memory area EXT_MEM_AREA will be no longer referred to. This is because, if a write operation is performed for a logical address, the value of a physical address corresponding to the logical address is changed and this means that the existing mapping information on the corresponding logical address is changed and is thus no longer used. Therefore, the controller 130 may update the reference parameter REF_PARAM to decrease the possibility that the memory area EXT_MEM_AREA is activated.

On the other hand, if mapping information on a logical address included in the write command WRITE CMD is not stored in the memory area EXT_MEM_AREA, the controller 130 may omit update for the reference parameter REF_PARAM.

Even in the case where mapping information on a logical address included in the write command WRITE CMD is stored in the memory area EXT_MEM_AREA, if there is a history in which the mapping information on the corresponding logical address is referred to by another read command READ_CMD generated previously, the controller 130 may update the reference parameter REF_PARAM in a direction in which the memory area EXT_MEM_AREA is highly likely to be activated or may omit update for the reference parameter REF_PARAM. This is because, in the case where the mapping information on the corresponding logical address is referred to by the host 102, when the write command WRITE_CMD is completely executed and mapping information on the corresponding logical address is newly generated, the newly generated mapping information has high possibility to be referred to later by the host 102.

Figure 43:
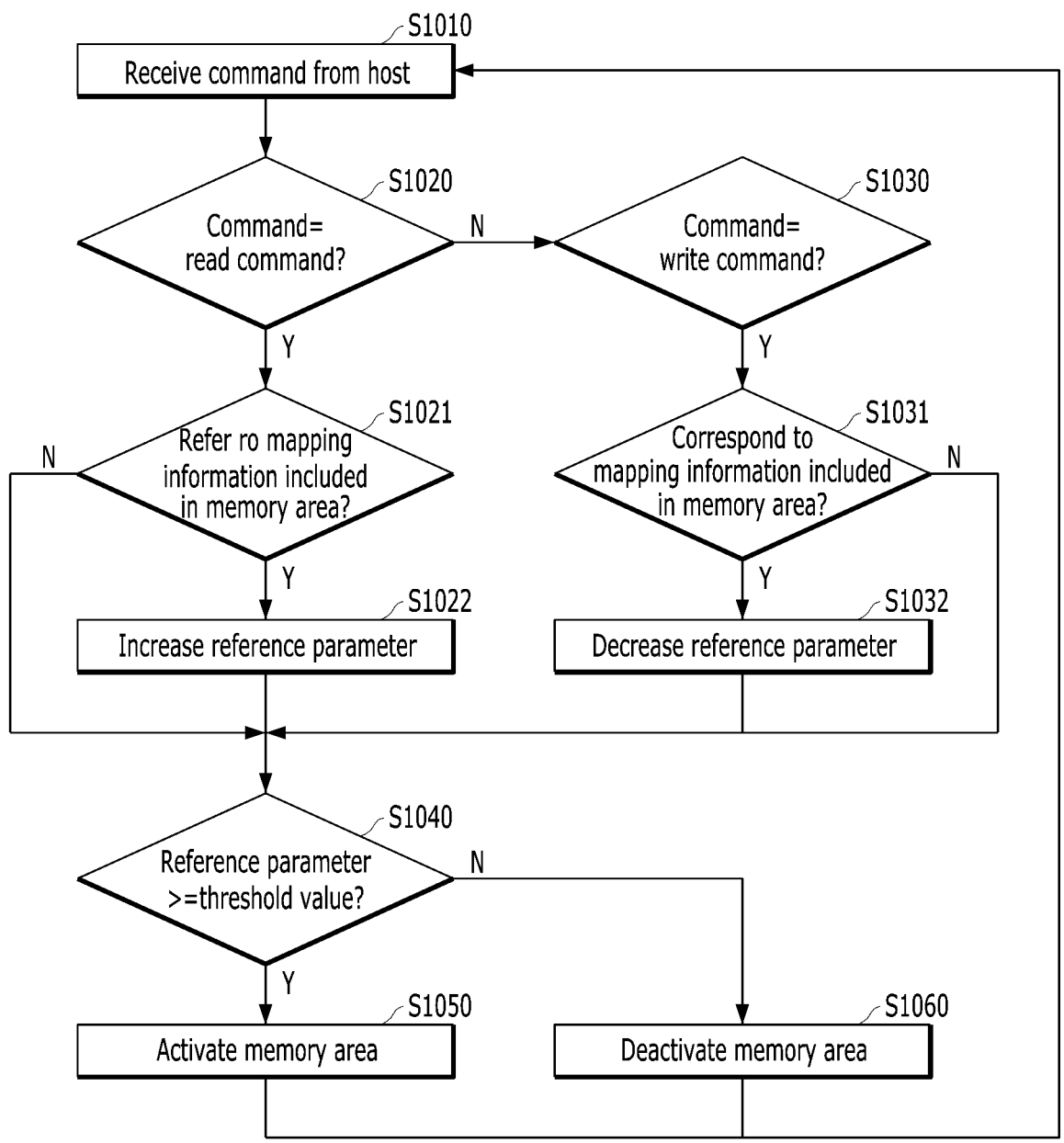
FIG. 43 is a flow chart illustrating an example process of performing an operation illustrated in FIG. 42.

FIG. 43 is a flow chart illustrating an example process of performing the operation illustrated in FIG. 42.

In an embodiment, this example process may be performed by the controller 130 described above. Further, it is assumed that the controller 130 activates the memory area EXT_MEM_AREA when the value of the reference parameter REF_PARAM is equal to or greater than the threshold value and deactivates the memory area EXT_MEM_AREA when the value of the reference parameter REF_PARAM is less than the threshold value.

First, the controller 130 may receive a command from the host 102 (S1010). The controller 130 first determines whether the command received from the host 102 is a read command READ_CMD (S1020).

If the command received from the host 102 is the read command READ_CMD (S1020—Y), the controller 130 determines whether the received read command READ_CMD refers to mapping information included in the memory area EXT_MEM_AREA (S1021).

If, at the step S1021, the received read command READ_CMD refers to the mapping information included in the memory area EXT_MEM_AREA (S1021—Y), the controller 130 increases the reference parameter REF_PARAM (S1022), and then, enters step S1040. On the other hand, if the received read command READ_CMD does not refer to the mapping information included in the memory area EXT_MEM_AREA (S1021—N), the controller 130 immediately enters the step S1040.

If the command received from the host 102 is not the read command READ_CMD (S1020—N), the controller 130 determines whether the received command is a write command WRITE CMD (S1030).

If the command received from the host 102 is the write command WRITE_CMD (S1030—Y), the controller 130 determines whether a logical address included in the received write command WRITE_CMD corresponds to mapping information included in the memory area EXT_MEM_AREA (S1031).

If, at the step S1031, the received write command WRITE_CMD corresponds to the mapping information included in the memory area EXT_MEM_AREA (S1031—Y), the controller 130 decreases the reference parameter REF_PARAM (S1032), and then, enters the step S1040. On the other hand, if the received write command WRITE_CMD does not correspond to the mapping information included in the memory area EXT_MEM_AREA (S1031—N), the controller 130 immediately enters the step S1040.

The controller 130 determines whether the value of the reference parameter REF_PARAM is equal to or greater than the threshold value (S1040). If the value of the reference parameter REF_PARAM is equal to or greater than the threshold value (S1040—Y), the controller 130 controls the memory area EXT_MEM_AREA to be activated (S1050). On the other hand, if the value of the reference parameter REF_PARAM is less than the threshold value (S1040—N), the controller 130 controls the memory area EXT_MEM_AREA to be deactivated (S1060).

Figure 44:
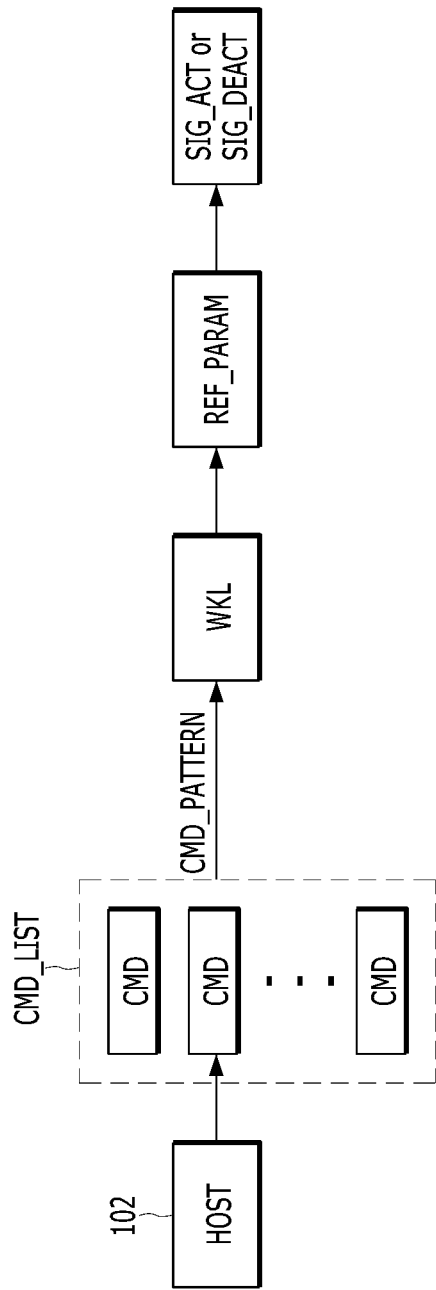
FIG. 44 is a diagram illustrating an example process of determining a workload of FIG. 41.

FIG. 44 is a diagram illustrating an example process of determining the workload WKL of FIG. 41.

Referring to FIG. 44, the workload WKL information may include information on a pattern CMD_PATTERN of logical addresses corresponding to one or more commands CMD received from the host 102 for a predetermined time period.

The controller 130 may receive one or more commands CMD from the host 102 for the predetermined time period, and thereby, may determine the pattern CMD_PATTERN from a command list CMD_LIST including the one or more commands CMD received for the predetermined time period.

For instance, the controller 130 may determine whether the pattern CMD_PATTERN is a sequential pattern or a random pattern.

The fact that the pattern CMD_PATTERN is a sequential pattern may mean that logical addresses corresponding to the commands CMD, respectively, included in the command list CMD_LIST have a tendency to be consecutive to each other. For example, in the case where the logical addresses corresponding to the commands CMD, respectively, included in the command list CMD_LIST are consecutive such as 100, 101, 102, 103, . . . or 120, 119, 118, . . . , the controller 130 may determine that the pattern of the commands CMD is a sequential pattern. However, even though not all of the logical addresses corresponding to the commands CMD, respectively, included in the command list CMD_LIST are consecutive to each other, if the percentage of commands CMD consecutive to each other is equal to or greater than a specific threshold percentage, the controller 130 may determine that the pattern of the commands CMD is a sequential pattern.

On the other hand, the fact that the pattern CMD_PATTERN is a random pattern may mean that logical addresses corresponding to the commands CMD, respectively, included in the command list CMD_LIST have no particular tendency. For example, in the case where the logical addresses corresponding to the commands CMD, respectively, included in the command list CMD_LIST are irregularly changed such as 100, 200, 80, 145, . . . or 90, 93, 45, 182, . . . , the controller 130 may determine that the pattern of the commands CMD is a random pattern. However, even though some of the commands CMD included in the command list CMD_LIST have a particular tendency (e.g., logical addresses corresponding to commands are consecutive to each other), if the percentage of commands CMD having the particular tendency is equal to or less than a specific threshold percentage, the controller 130 may determine that the pattern of the commands CMD is a random pattern.

If the pattern CMD_PATTERN is determined in this way, the controller 130 may update the value of the reference parameter REF_PARAM depending on the pattern CMD_PATTERN of the logical addresses corresponding to the one or more commands CMD received from the host 102 for the predetermined time period.

For example, if the pattern CMD_PATTERN is a random pattern, the controller 130 may update the value of the reference parameter REF_PARAM to increase the possibility that the memory area EXT_MEM_AREA is activated. This is because, if the pattern CMD_PATTERN is a random pattern, there is a possibility that the mapping information stored in the memory area EXT_MEM_AREA is continuously referred to and because, when the mapping information stored in the memory area EXT_MEM_AREA is referred to once, there is a high possibility that the mapping information is continuously referred to later due to locality.

On the other hand, if the pattern CMD_PATTERN is a sequential pattern, the controller 130 may update the value of the reference parameter REF_PARAM to decrease the possibility that the memory area EXT_MEM_AREA is activated. This is because, if the pattern CMD_PATTERN is a sequential pattern, it is highly likely that the values of logical addresses for searching for mapping information are sequentially changed, and in this case, mapping information referred to once is highly unlikely to be referred to any more.

Figure 45:
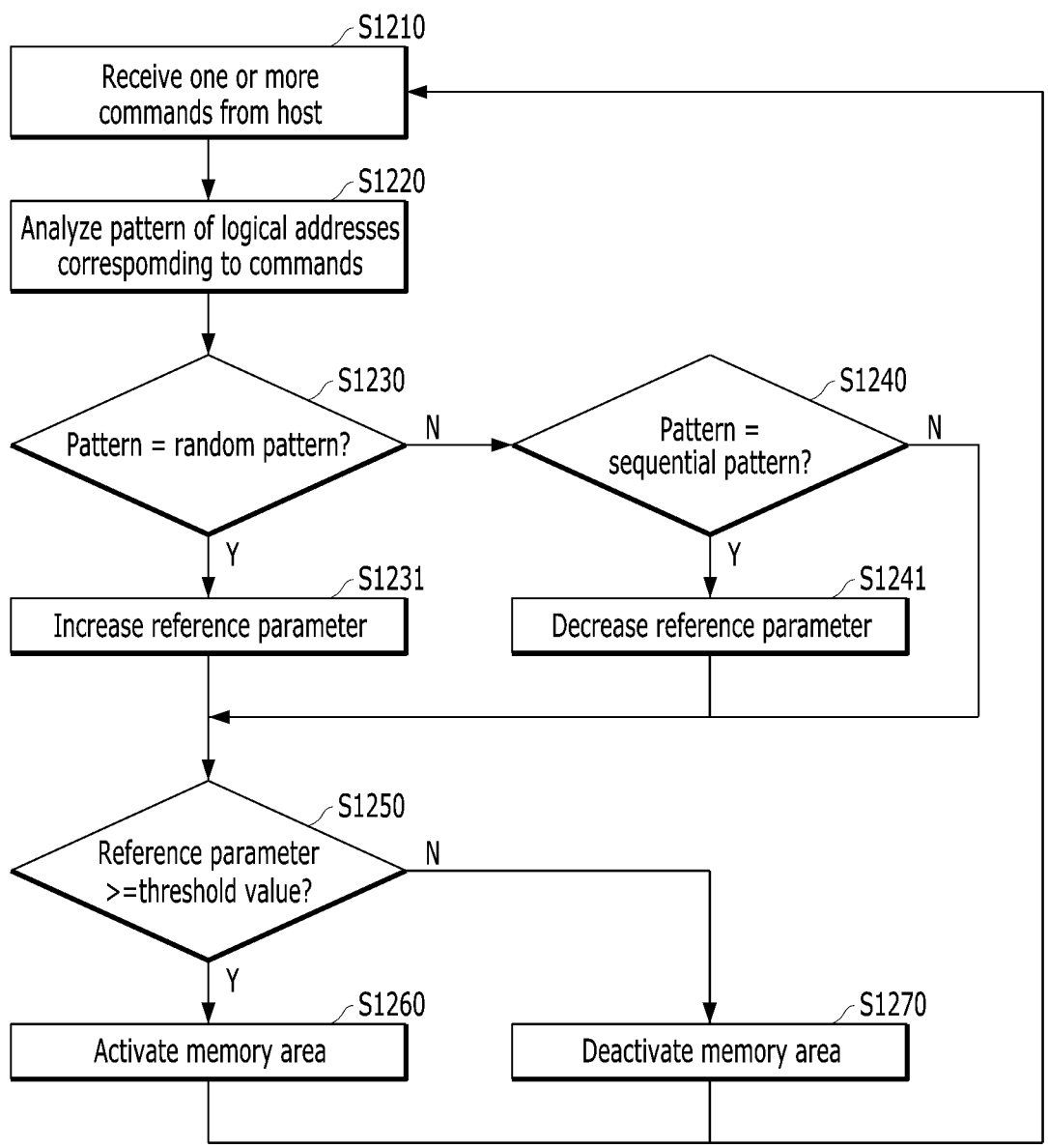
FIG. 45 is a flow chart illustrating an example process of performing an operation illustrated in FIG. 44.

FIG. 45 is a flow chart illustrating an example process of performing the operation illustrated in FIG. 44.

In an embodiment, the operation shown in FIG. 45 is performed by the controller 130 described above. Further, it is assumed that the controller 130 activates the memory area EXT_MEM_AREA when the value of the reference parameter REF_PARAM is equal to or greater than the threshold value and deactivates the memory area EXT_MEM_AREA when the value of the reference parameter REF_PARAM is less than the threshold value.

First, the controller 130 may receive one or more commands CMD from the host 102 for a predetermined time period (S1210). The controller 130 may analyze the pattern CMD_PATTERN of logical addresses corresponding to the one or more commands CMD received from the host 102 (S1220).

The controller 130 may determine whether the pattern CMD_PATTERN is a random pattern (S1230). If the pattern CMD_PATTERN is a random pattern (S1230—Y), the controller 130 may increase the reference parameter REF_PARAM (S1231), and then, may enter step S1250.

On the other hand, in the case where the pattern CMD_PATTERN is not a random pattern (S1230—N), the controller 130 may determine whether the pattern CMD_PATTERN is a sequential pattern (S1240). If the pattern CMD_PATTERN is a sequential pattern (S1240—Y), the controller 130 may decrease the reference parameter REF_PARAM (S1241), and then, may enter the step S1250. In the case where the pattern CMD_PATTERN is not even a sequential pattern, the controller 130 immediately enters the step S1250.

The controller 130 determines whether the value of the reference parameter REF_PARAM is equal to or greater than the threshold value (S1250). If the value of the reference parameter REF_PARAM is equal to or greater than the threshold value (S1250—Y), the controller 130 controls the memory area EXT_MEM_AREA to be activated (S1260). On the other hand, if the value of the reference parameter REF_PARAM is less than the threshold value (S1250—N), the controller 130 controls the memory area EXT_MEM_AREA to be deactivated (S1270).

Figure 46:
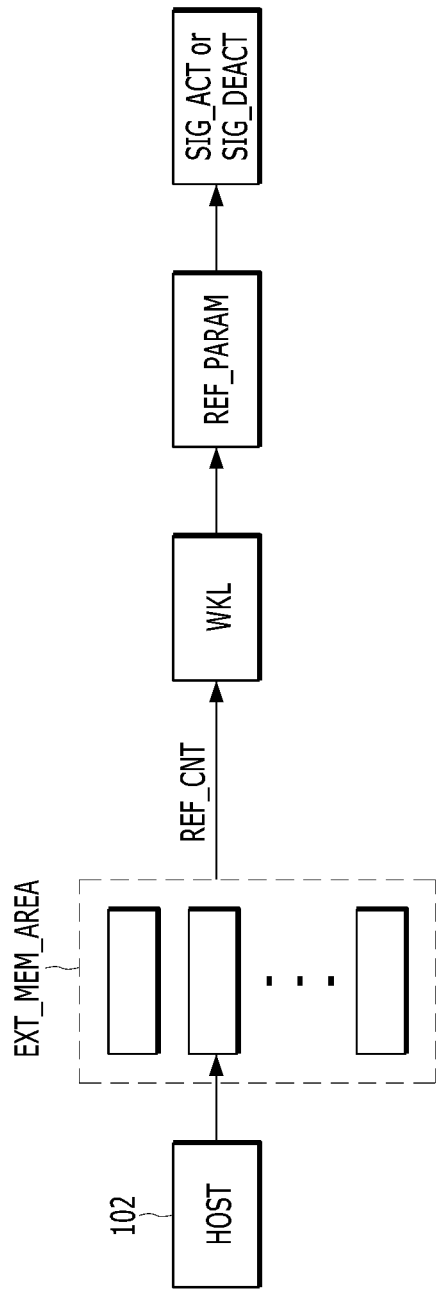
FIG. 46 is a diagram illustrating an example process of determining a workload of FIG. 41.

FIG. 46 is a diagram illustrating an example process of determining the workload WKL of FIG. 41.

Referring to FIG. 46, the workload WKL information may include information on a reference frequency REF_CNT, which is a frequency of referring to the memory area EXT_MEM_AREA responsive to commands received from the host 102 for a predetermined time period.

The fact that the memory area EXT_MEM_AREA is referred to may mean that a command transmitted from the host 102 to the controller 130 includes a portion of the mapping information included in the memory area EXT_MEM_AREA.

By determining the reference frequency REF_CNT, the controller 130 may update the value of the reference parameter REF_PARAM to increase the possibility that the memory area EXT_MEM_AREA is activated, when the reference frequency REF_CNT is equal to or greater than a threshold frequency, and may update the value of the reference parameter REF_PARAM to decrease the possibility that the memory area EXT_MEM_AREA is activated, when the reference frequency REF_CNT is less than the threshold frequency.

Figure 47:
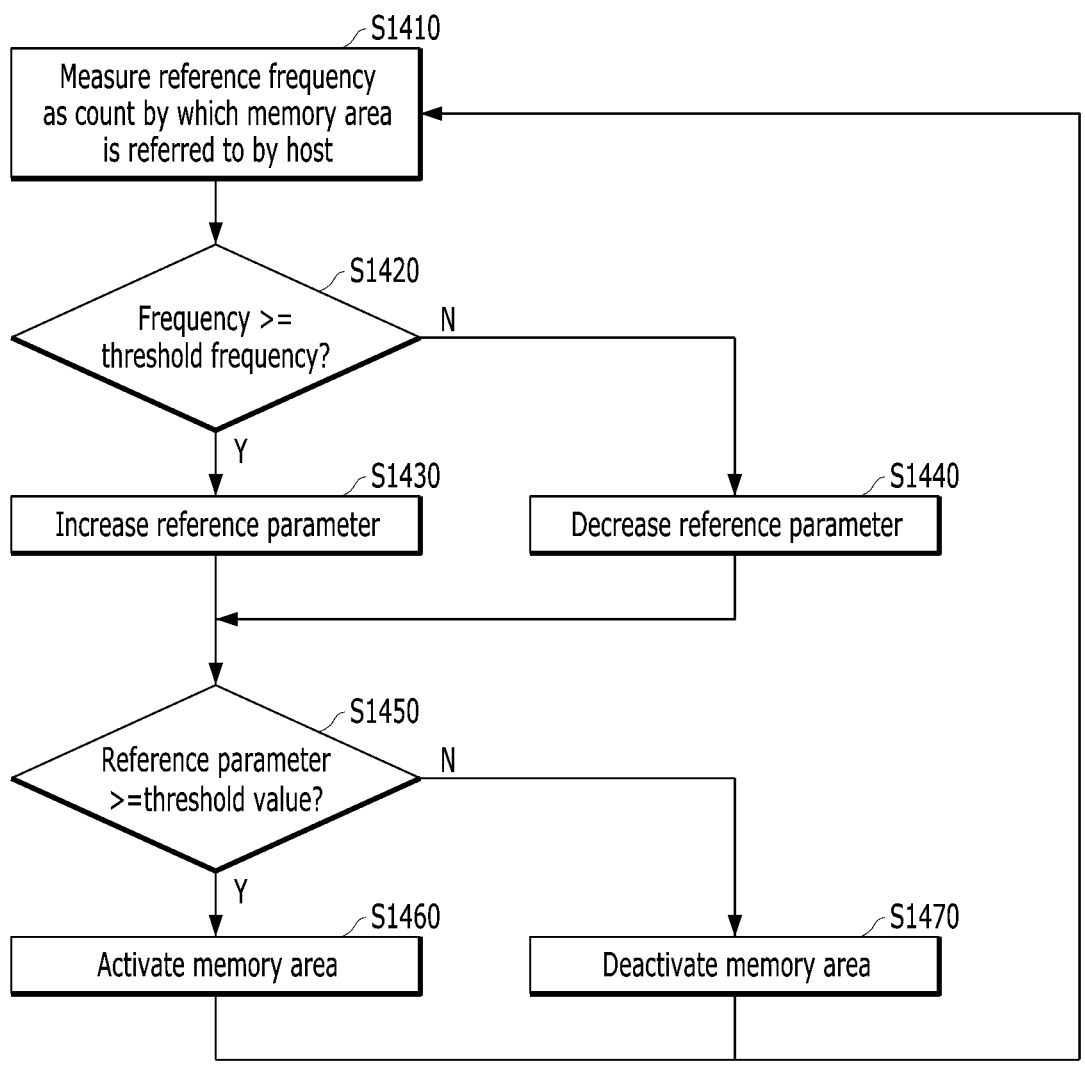
FIG. 47 is a flow chart illustrating an example process of performing an operation illustrated in FIG. 46.

FIG. 47 is a flow chart illustrating an example process of performing the operation illustrated in FIG. 46.

In an embodiment, the operation shown in FIG. 47 is performed by the controller 130 described above. Further, it is assumed that the controller 130 activates the memory area EXT_MEM_AREA when the value of the reference parameter REF_PARAM is equal to or greater than the threshold value and deactivates the memory area EXT_MEM_AREA when the value of the reference parameter REF_PARAM is less than the threshold value.

First, the controller 130 measures the reference frequency by counting the number of iterations where the memory area EXT_MEM_AREA has been referred to responsive to commands received from the host 102 for a predetermined time period (S1410).

The controller 130 determines whether the reference frequency is equal to or greater than the threshold frequency (S1420). If the reference frequency is equal to or greater than the threshold frequency (S1420—Y), the controller 130 increases the reference parameter REF_PARAM (S1430), and then, enters step S1450. On the other hand, if the reference frequency is less than the threshold frequency (S1420—N), the controller 130 decreases the reference parameter REF_PARAM (S1440), and then, enters the step S1450.

The controller 130 determines whether the value of the reference parameter REF_PARAM is equal to or greater than the threshold value (S1450). If the value of the reference parameter REF_PARAM is equal to or greater than the threshold value (S1450—Y), the controller 130 controls the memory area EXT_MEM_AREA to be activated (S1460). On the other hand, if the value of the reference parameter REF_PARAM is less than the threshold value (S1450—N), the controller 130 controls the memory area EXT_MEM_AREA to be deactivated (S1470).

Figure 48:
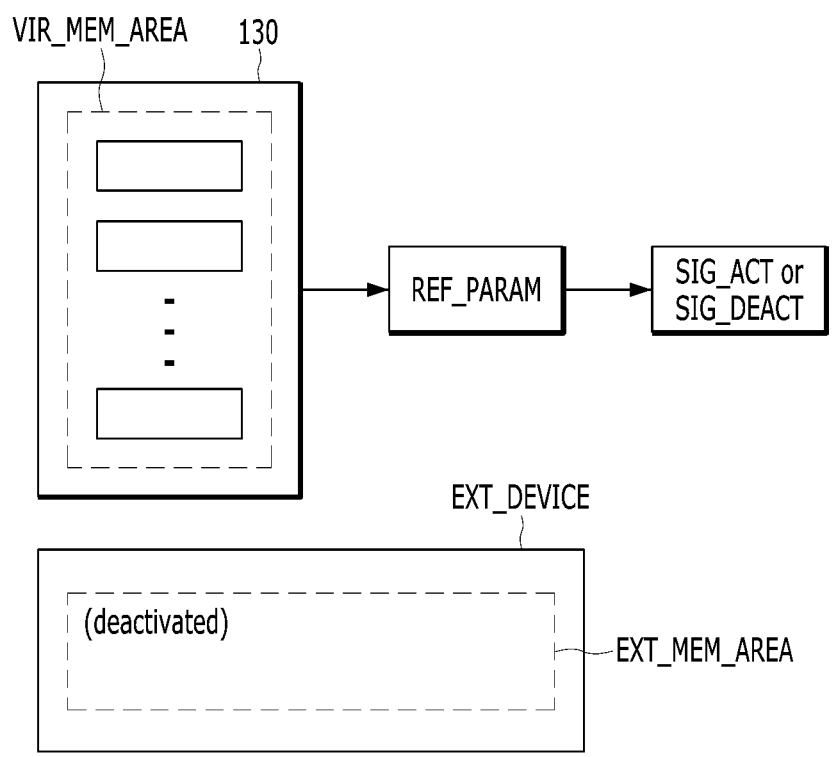
FIG. 48 is a diagram illustrating an example operation of updating a reference parameter based on a virtual memory area based on an embodiment of the disclosure.

FIG. 48 is a diagram illustrating an example operation of updating a reference parameter based on a virtual memory area based on the embodiments of the disclosure.

A virtual memory area VIR_MEM_AREA may be positioned inside the controller 130, and may be used to update the reference parameter REF_PARAM in the case where the memory area EXT_MEM_AREA positioned in the external device EXT_DEVICE is in a deactivated state.

If the memory area EXT_MEM_AREA is in the deactivated state, the host 102 no longer refers to the memory area EXT_MEM_AREA when transmitting a command to the controller 130. Thus, in the case where the reference parameter REF_PARAM is updated depending on whether the mapping information stored in the memory area EXT_MEM_AREA is referred to, a problem may arise in that the reference parameter REF_PARAM is no longer updated and thus the memory area EXT_MEM_AREA is continuously maintained in the deactivated state.

Therefore, the controller 130 may create the virtual memory area VIR_MEM_AREA in the controller 130, and may update the reference parameter REF_PARAM even when the memory area EXT_MEM_AREA is in the deactivated state, by using the virtual memory area VIR_MEM_AREA.

In detail, when the memory area EXT_MEM_AREA is in the deactivated state, the controller 130 may update the reference parameter REF_PARAM based on whether a logical address included in a command received from the host 102 and a logical address included in mapping information stored in the virtual memory area VIR_MEM_AREA correspond to each other. However, the mapping information stored in the virtual memory area VIR_MEM_AREA is used only to update the reference parameter REF_PARAM, and is not used to determine a physical address actually mapped to a logical address included in a command received from the host 102. Namely, the mapping information stored in the virtual memory area VIR_MEM_AREA is different from mapping information used for the controller 130 to determine a physical address mapped to a logical address included in a command received from the host 102.

For example, when the memory area EXT_MEM_AREA is in the deactivated state, if a logical address corresponding to a command received from the host 102 is searched for in the mapping information stored in the virtual memory area VIR_MEM_AREA, the controller 130 may increase the reference parameter REF_PARAM, and, on the contrary, if not searched for, the controller 130 may decrease the reference parameter REF_PARAM.

The operation of updating the reference parameter REF_PARAM through the virtual memory area VIR_MEM_AREA in this way may be performed only in the case where the memory area EXT_MEM_AREA is in the deactivated state.

That is to say, in the case where the memory area EXT_MEM_AREA is converted into the activated state from the deactivated state, the controller 130 may deactivate the virtual memory area VIR_MEM_AREA so that the virtual memory area VIR_MEM_AREA is not used. At this time, the mapping information stored in the virtual memory area VIR_MEM_AREA may be loaded to the memory area EXT_MEM_AREA or may be erased.

Figure 49:
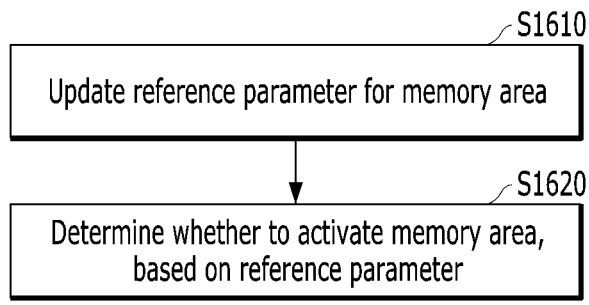
FIG. 49 shows an example method for operating the memory system based on an embodiment of the disclosure.

FIG. 49 shows an example method for operating the memory system 1100 based on an embodiment of the disclosure.

Referring to FIG. 49, first, the method for operating the memory system 1100 may include updating a reference parameter for a memory area (S1610). All or some of mapping information between logical addresses and physical addresses may be stored in a first device, and the memory area may be positioned in a second device different from the first device.

The first device may be, for example, the controller 130 included in the memory system 1100, and the second device may be, for example, the host 102 which transmits a command to the controller 130.

In the case where the second device is the host 102, at the step S1610, the controller 130 included in the memory system 1100 may dynamically update the reference parameter based on workload information on a command received from the host 102.

As described above with reference to FIGS. 9 to 14, the workload information may include 1) information on a read command received from the host 102 for a predetermined time period or a write command received from the host 102 for a predetermined time period, 2) information on a pattern of logical addresses corresponding to one or more commands received from the host 102 for a predetermined time period, or 3) information on a reference frequency obtained by counting the number of iterations where the memory area is referred to responsive to commands received from the host 102 for a predetermined time period.

The method for operating the memory system 1100 may include step S1620 in which the first device determines whether to activate the memory area, based on the reference parameter. A method of determining whether to activate the memory area may be the same as the methods described above with reference to FIGS. 9 to 15.

In an embodiment, the above-described operation of the controller 130 may be controlled by the control circuit 123, and may be performed in such a manner that the processor 124 executes (drives) a firmware in which general operations of the controller 130 are programmed.

While the disclosure has been described with respect to the specific embodiments, it will be apparent to those skilled in the art that various changes and modifications may be made without departing from the spirit and scope of the invention as defined in the following claims.

What is claimed is:

1. A memory system, comprising:
   a memory device configured to store a piece of data in a location which is distinguished by a physical address; and
   a controller configured to, in response to a read request inputted along with a first logical address and a first physical address, check a validity of the first physical address based on map data update information, find a second physical address for performing a read operation corresponding to the read request when the first physical address is no longer associated with the first logical address, and transfer a read response corresponding to the read request to a host,
   wherein the controller is further configured to generate a piece of map data regardless of the read operation performed in response to the read request and the first logical address, and transmit a response including a first piece of map data obtained through the read operation performed in response to the read request and the first logical address, the first piece of map data associating the first logical address with the second physical address, and a second piece of map data generated regardless of the read operation performed in response to the read request and the first logical address.

2. The memory system according to claim 1, wherein, in response to a write request inputted along with a logical address, the controller is configured to generate the piece of map data associating the logical address with a new physical address and to transfer the response including information indicating a pass or a failure regarding an operation corresponding to the write request and the piece of data generated during the operation.

3. The memory system according to claim 1, wherein the controller is configured to store the first and second pieces of map data in an exclusive area of a memory included, or coupled to, the controller and to process the first and second pieces of map data in a form suitable for being transferred to the external device.

4. A memory system, comprising:
   a memory device configured to store a piece of data in a location which is distinguished by a physical address; and
   a controller configured to, in response to a read request inputted along with a logical address and a physical address, check a validity of first physical address based on map data update information, find another physical address when the physical address is no longer associated with the logical address, perform a read operation based on the another physical address to obtain a piece of data associated with the logical address, and transfer a response including the piece of data associating the logical address with the another physical address, a read count linked to the another physical address, and a piece of map data generated regardless of the read operation performed in response to the read request and the logical address.

5. The memory system according to claim 4, wherein the controller is configured to monitor a workload based on a request inputted from an external device and to transfer an inquiry regarding whether the external device uses a piece of map data, based on the workload.

6. The memory system according to claim 5, wherein the controller is configured to establish a reference parameter based on the request or the logical address which is inputted from the external device and to dynamically determine the workload based on the reference parameter.

7. A controller operating between plural devices, each device including an independent address scheme to indicate a location in which a piece of data is stored, wherein the controller is configured to check a validity of first physical address based on map data update information in response to a read request inputted from one of the plural devices, the read request including a first logical address and a first physical address, to find a second physical address when the first physical address is no longer associated with the first logical address, to perform a read operation based on the second physical address, and to transfer a response, including a first piece of map data associating the first logical address with the second physical address, a read count associated with the second physical address, and a second piece of map data generated regardless of the read operation performed in response to the read request and the first logical address, to another of the plural devices.

8. The controller according to claim 7, wherein, in response to a write request inputted along with a logical address, the controller is configured to generate the piece of map data corresponding to the logical address with a new physical address and to transfer the response including information indicating a pass or a failure regarding an operation corresponding to the write request and the piece of data generated during the operation.

9. The controller according to claim 7, wherein the controller is configured to store the first and second pieces of map data in an exclusive area of a memory included, or coupled to, the controller and to process the first and second pieces of map data in a form suitable for being transferred to one of the plural devices.

10. The controller according to claim 7, wherein the controller is configured to monitor a workload based on a request inputted from one of the plural devices and to transfer an inquiry regarding whether the one of the plural devices uses the first and second pieces of map data, based on the workload.

11. The controller according to claim 10, wherein the controller is configured to establish a reference parameter based on the request or a logical address of plural addresses, which is inputted from the one of the plural devices, and to dynamically determine the workload based on the reference parameter.

12. The controller according to claim 7, wherein the controller is further configured to generate the second piece of map data associating a logical address, inputted along with a request from an external device, with a physical address.

13. The controller according to claim 12, wherein the response includes the second piece of map data which is either obtained through an operation performed in response to the request and the logical address or generated regardless of the operation performed in response to the request and the logical address.

* * * * *